US012654356B2

(12) United States Patent
Xiao et al.

(10) Patent No.: US 12,654,356 B2
(45) Date of Patent: Jun. 16, 2026

(54) INTEGRATED ADDITIVE MANUFACTURING AND LASER PROCESSING SYSTEMS AND METHODS FOR CERAMIC, GLASS, AND SILICON CARBIDE APPLICATIONS

(71) Applicant: Clemson University Research Foundation, Clemson, SC (US)

(72) Inventors: Hai Xiao, Clemson, SC (US); Jianhua Tong, Central, SC (US); Fei Peng, Clemson, SC (US); Kyle S. Brinkman, Clemson, SC (US); Shenglong Mu, Clemson, SC (US); Jincheng Lei, Clemson, SC (US); Yuzhe Hong, Clemson, SC (US); Hua Huang, Clemson, SC (US); Rajendra Bordia, Seneca, SC (US)

(73) Assignee: Clemson University Research Foundation, Clemson, SC (US)

( * ) Notice: Subject to any disclaimer, the term of this patent is extended or adjusted under 35 U.S.C. 154(b) by 65 days.

(21) Appl. No.: 18/746,522

(22) Filed: Jun. 18, 2024

(65) Prior Publication Data

US 2024/0408790 A1     Dec. 12, 2024

Related U.S. Application Data

(63) Continuation of application No. 17/138,173, filed on Dec. 30, 2020, now Pat. No. 12,053,906.

(Continued)

(51) Int. Cl.
B28B 1/00 (2006.01)
B23K 26/402 (2014.01)
(Continued)

(52) U.S. Cl.
CPC ............ B28B 1/001 (2013.01); B23K 26/402 (2013.01); B33Y 10/00 (2014.12); B33Y 40/20 (2020.01); C03B 19/01 (2013.01); B23K 2103/52 (2018.08)

(58) Field of Classification Search
CPC ......... C03B 19/01; B33Y 30/00; B33Y 40/20; B33Y 10/00; B23K 26/34; B23K 26/144;
(Continued)

(56) References Cited

U.S. PATENT DOCUMENTS 6,749,813 B1 *  6/2004  David ................ G01N 30/6052
                                                422/500
9,422,187 B1 *  8/2016  Bankaitis ............ C03B 19/1492
(Continued)

OTHER PUBLICATIONS

Lei, et al., Thick Er-doped silica films sintered using CO2 laser for scintillation applications, Jun. 2017, Elsevier, Optical Materials vol. 68, pp. 63-69 (Year: 2017).*
Ma, et al., Ceramic Slurry Concentration Measurement Based on the Theory of Particle Backscattering, Aug. 3, 2010, IEEE Xplore, IEEE, 2010 International Conference on Mechanic Automation and Control Engineering, 2010, pp. 2380-2383. (Year: 2010).*
Presentation entitled "Additive Manufacturing and Test of Sensor Embedded Parts", Clemson University, Mar. 2017, 21 pages.
(Continued)

*Primary Examiner* — Christina A Johnson
*Assistant Examiner* — Kelsey C Grace
(74) *Attorney, Agent, or Firm* — Myers Bigel, P.A.

(57) ABSTRACT

A method for fabricating a protonic ceramic energy device includes: coating an electrolyte layer on an anode layer; and densifying the electrolyte layer by a rapid laser reactive sintering (RLRS) process on the electrolyte layer and/or the anode layer to form a half-cell comprising a dense electrolyte and a porous anode.

12 Claims, 91 Drawing Sheets

Related U.S. Application Data

(60) Provisional application No. 62/955,780, filed on Dec. 31, 2019.

(51) Int. Cl.

| | |
|---|---|
| *B33Y 10/00* | (2015.01) |
| *B33Y 40/20* | (2020.01) |
| *C03B 19/01* | (2006.01) |
| *B23K 103/00* | (2006.01) |

(58) Field of Classification Search
CPC .............. B23K 26/402; B23K 26/0624; B23K 26/0861; B23K 26/032; B23K 26/082; B23K 26/0006; B23K 2103/52; B23K 2101/36; B28B 1/001; Y02P 40/57
See application file for complete search history.

(56) References Cited

U.S. PATENT DOCUMENTS

2002/0094528 A1\* 7/2002 Salafsky ................ B82Y 30/00
435/6.12
2018/0159459 A1\* 6/2018 Mills ........................ G21B 3/00

OTHER PUBLICATIONS

Hong, Yuzhe , et al., "Fabricating ceramics with embedded microchannels using an integrated additive manufacturing and laser machining method", J Am Ceram Soc. 2019; 102:1071-1082.
Mu, Shenglong , et al., "Engineering of microstructures of protonic ceramics by a novel rapid laser reactive sintering for ceramic energy conversion devices", Solid State Ionics 320 (2018) 369-377.
Zhang, Qi , et al., "3D Printing of All-Glass Fiber-Optic Pressure Sensor for High Temperature Applications", IEEE Sensors Journal, vol. 19, No. 23, Dec. 1, 2019.

\* cited by examiner

Fig. 2.2. Schematic of the picosecond laser microfabrication system.

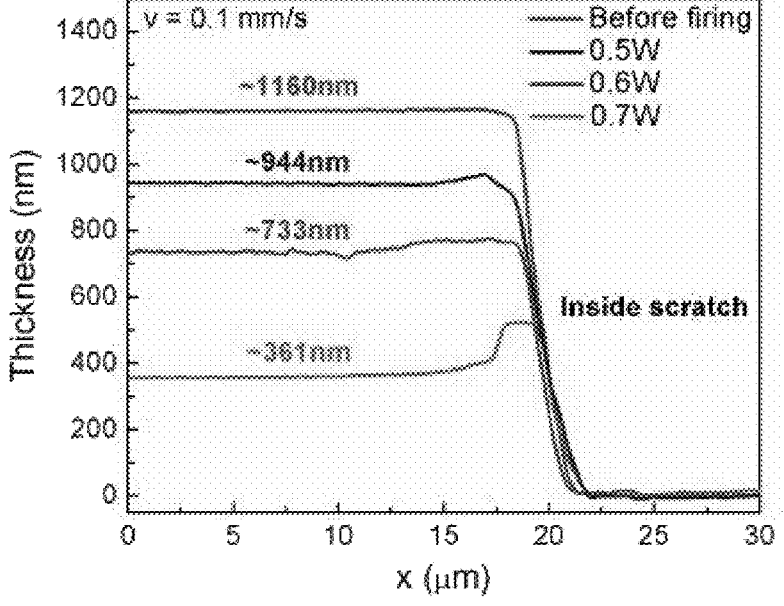
FIG. 8
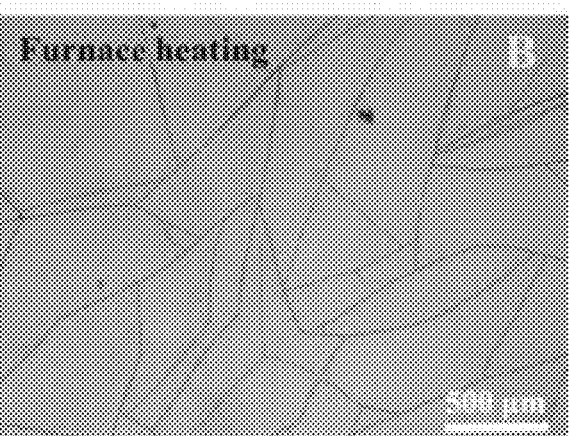
FIG. 9A                              FIG. 9B

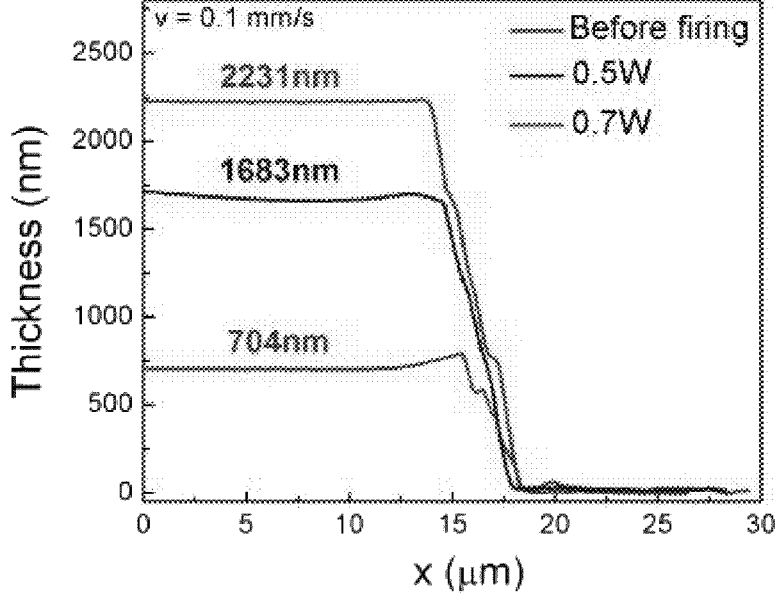
FIG. 10
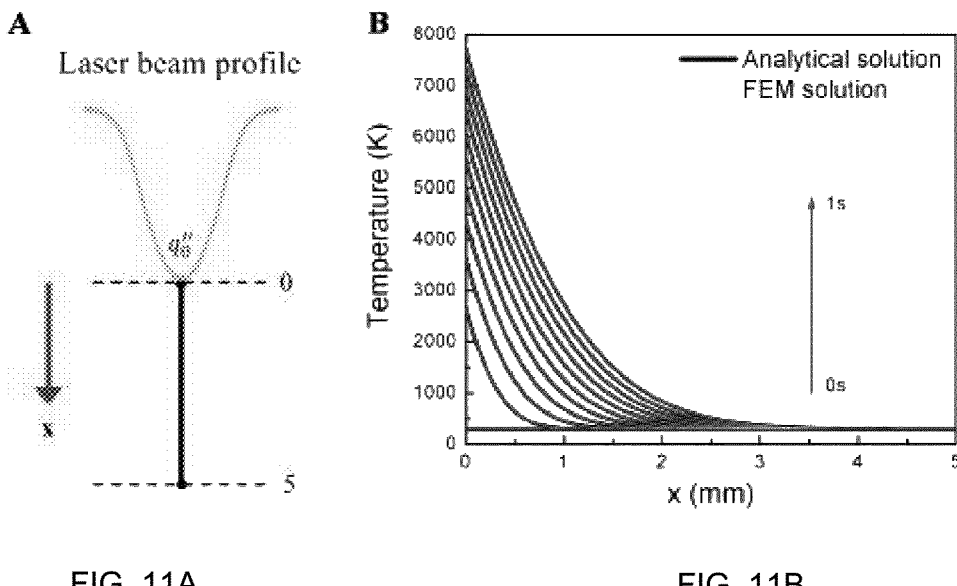
FIG. 11A                                    FIG. 11B

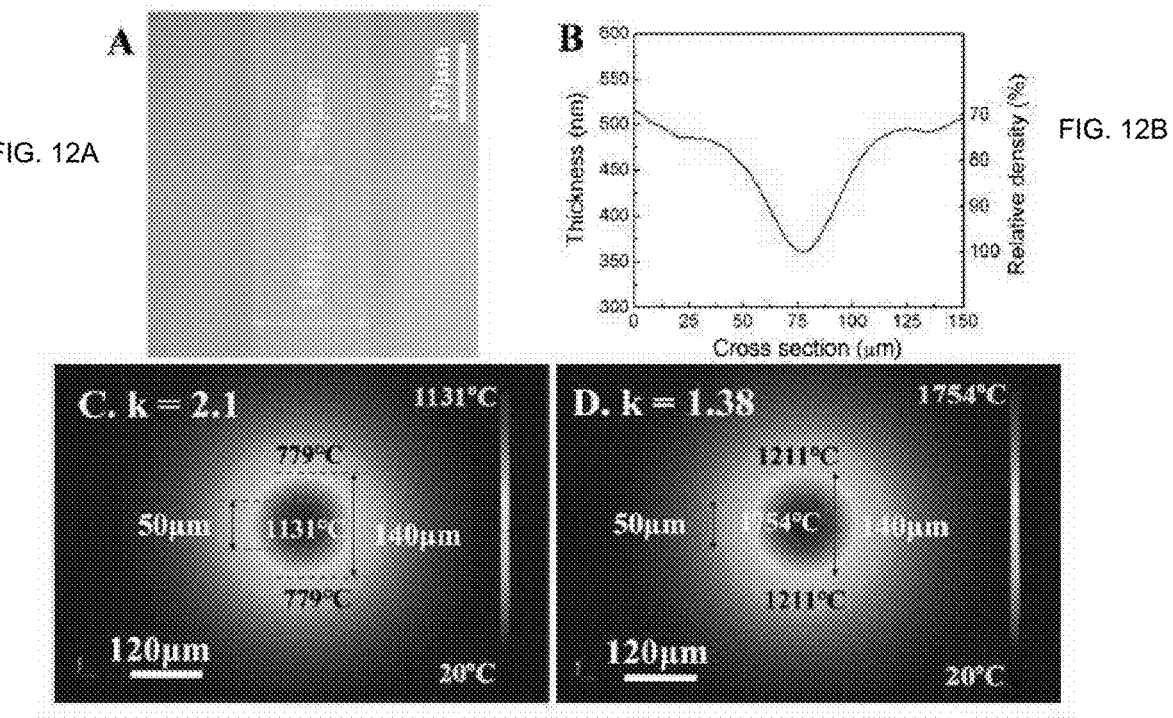
FIG. 12A
FIG. 12B
FIG. 12C
FIG. 12D
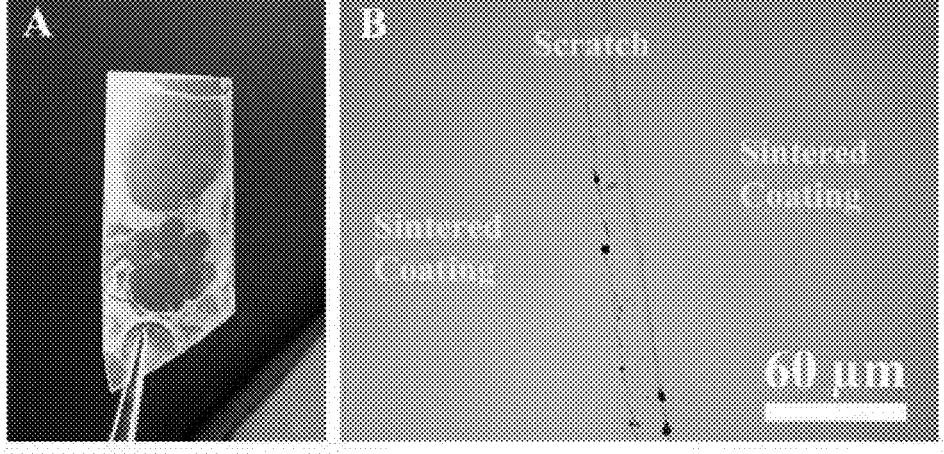
FIG. 13A
FIG. 13B

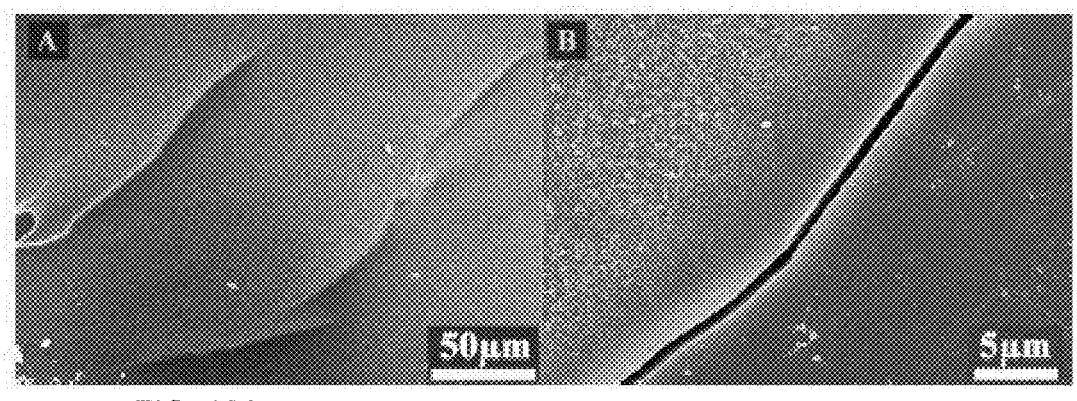
FIG. 18A                          FIG. 18B
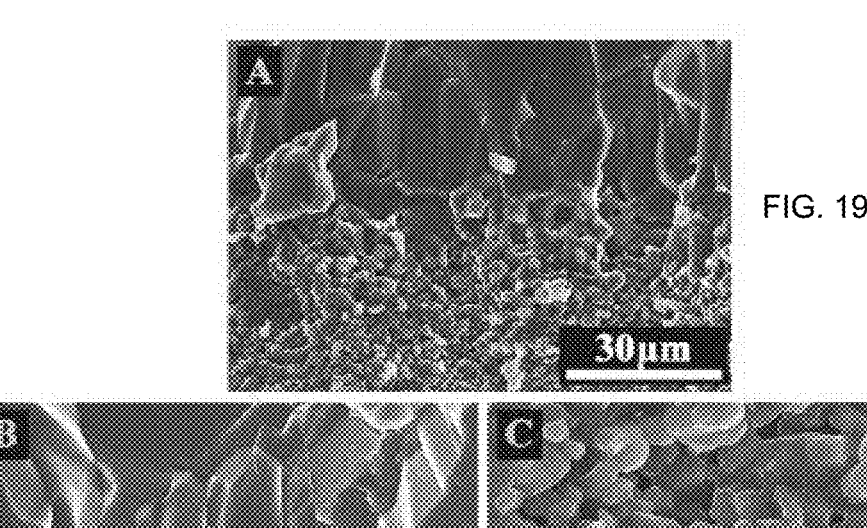
FIG. 19A
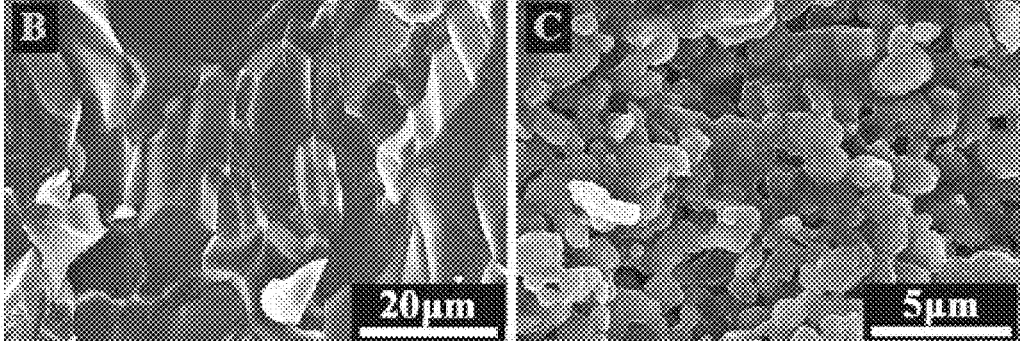
FIG. 19B                          FIG. 19C FIG. 22A                    FIG. 22B
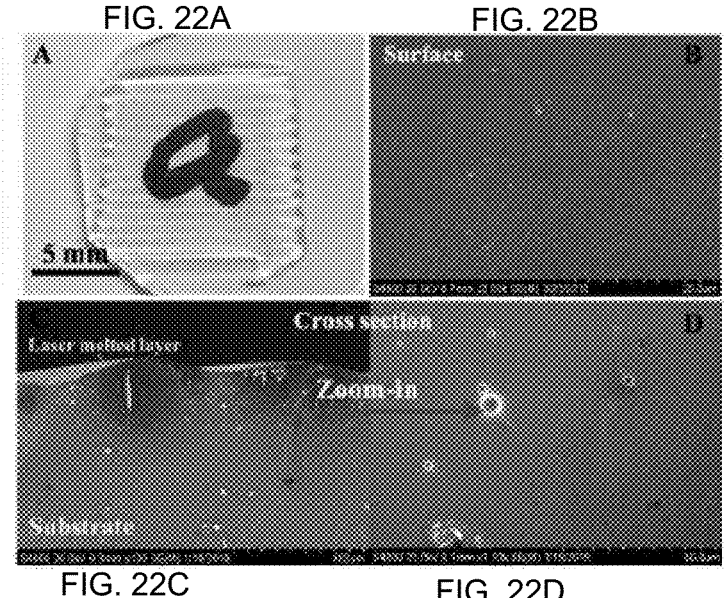
FIG. 22C                    FIG. 22D
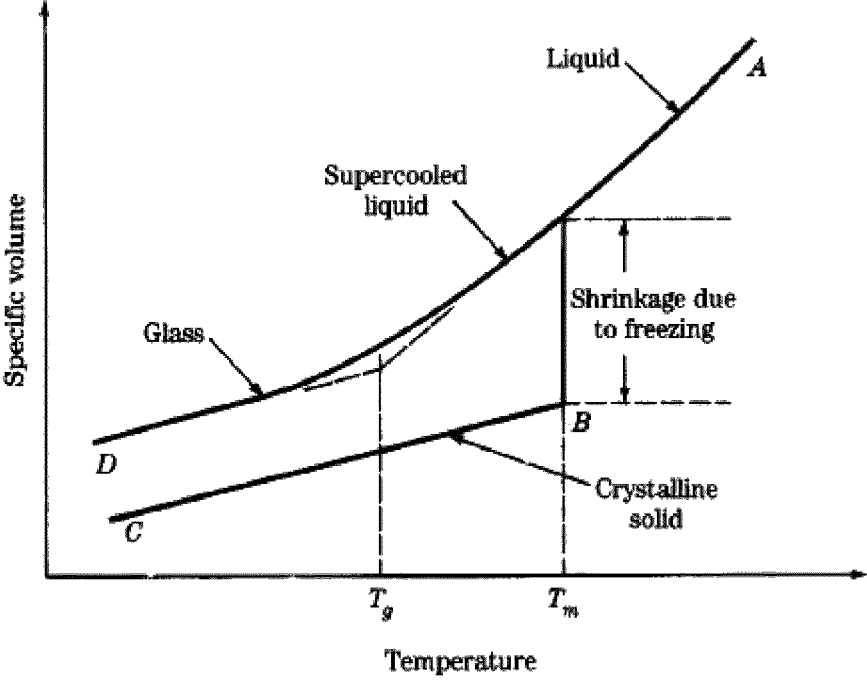
FIG. 23

FIG. 27A
FIG. 27B
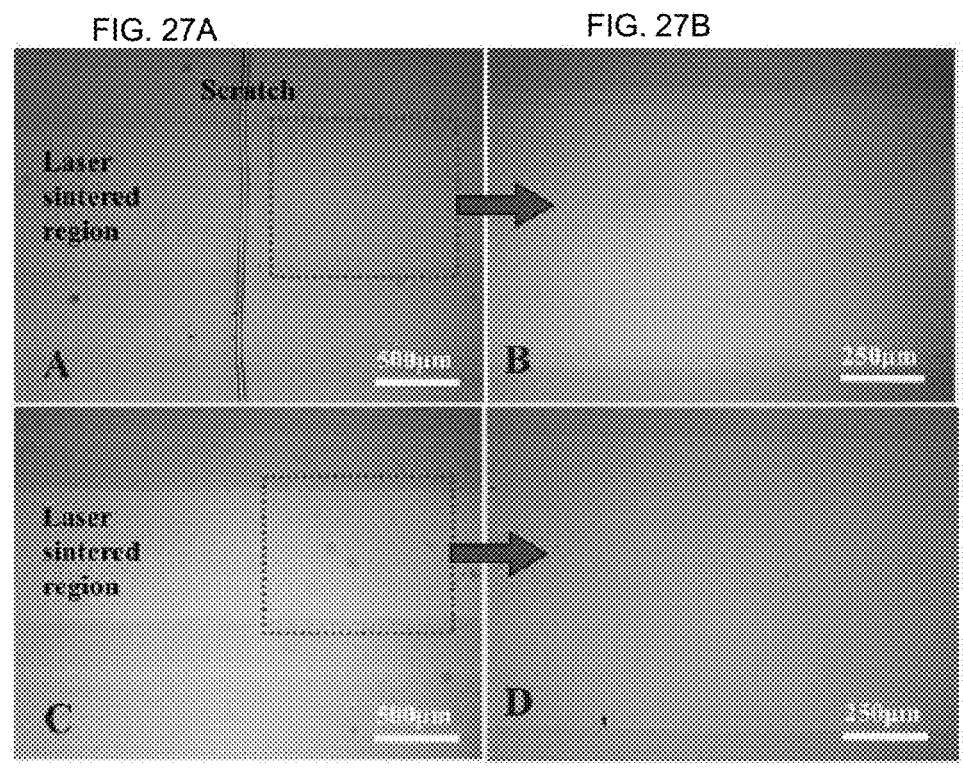
FIG. 27C
FIG. 27D
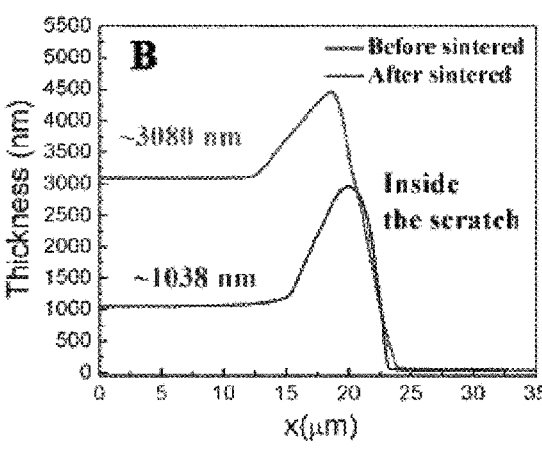
FIG. 28A
FIG. 28B

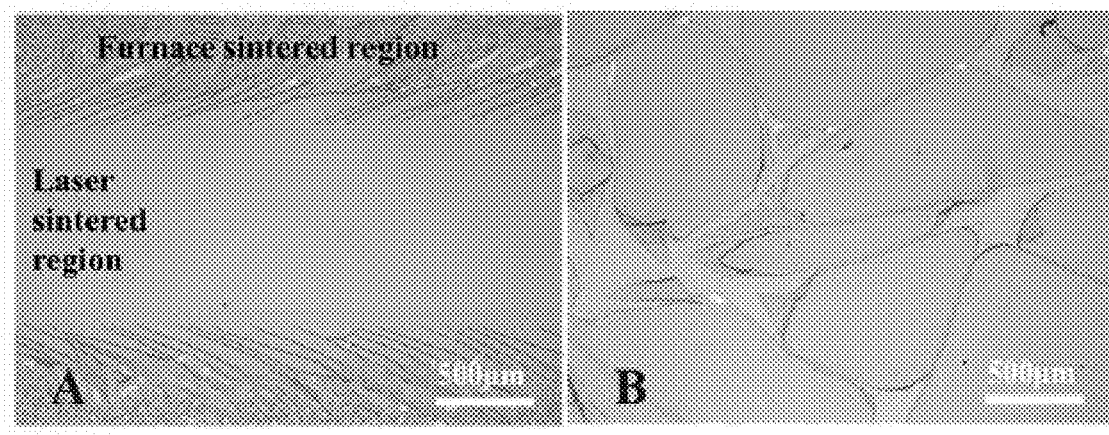
FIG. 30A                                        FIG. 30B
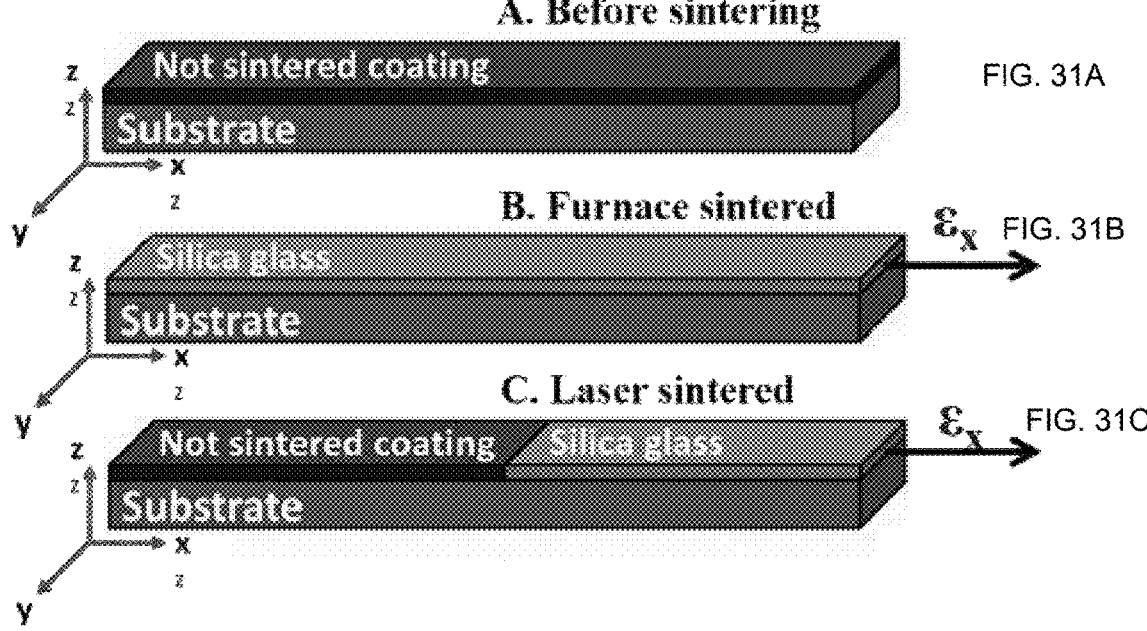

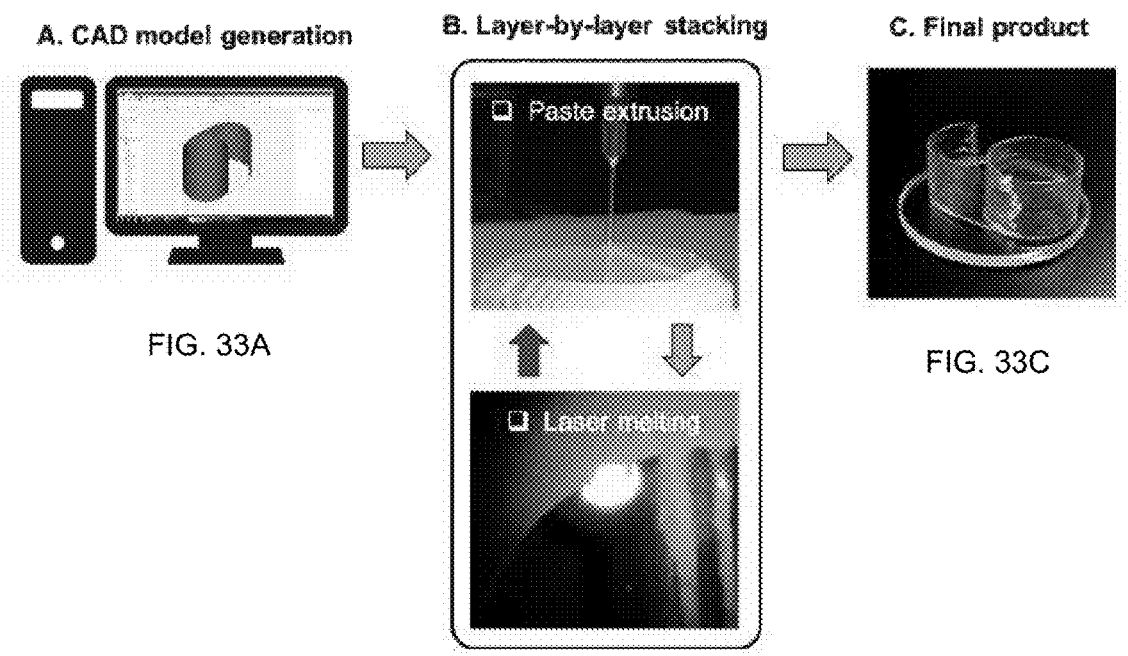
FIG. 33A
FIG. 33B
FIG. 33C
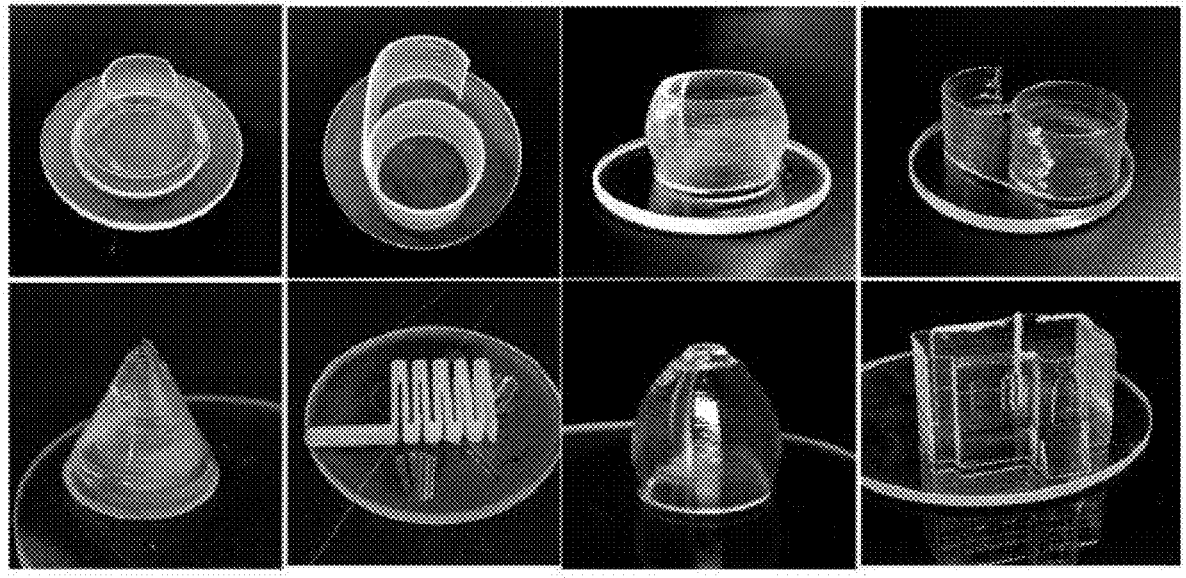
FIG. 34

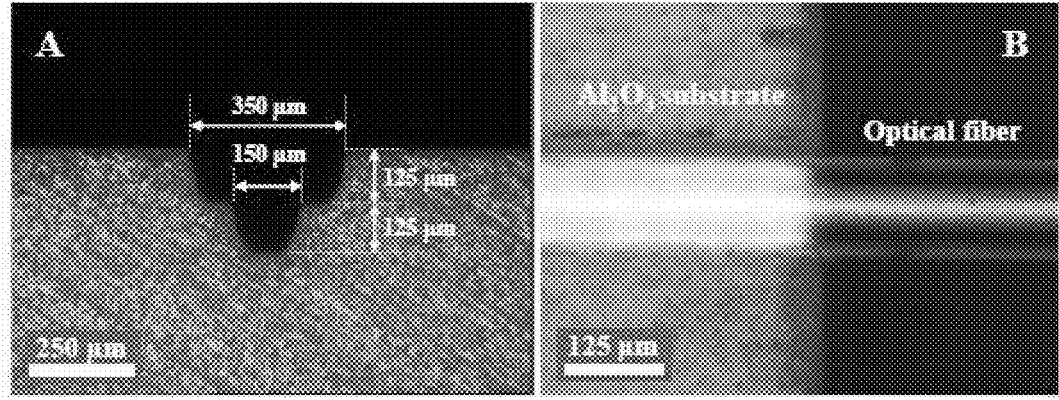
FIG. 38A                    FIG. 38B
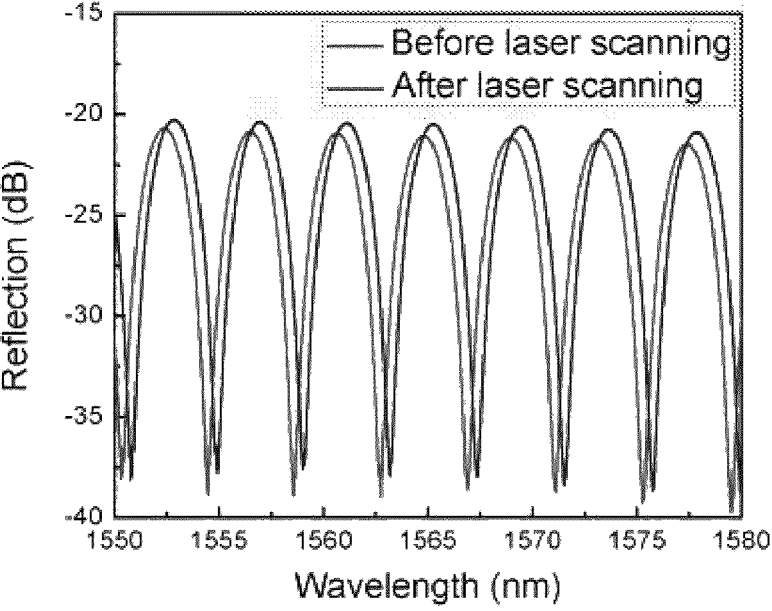
FIG. 39

FIG. 40A                     FIG. 40B
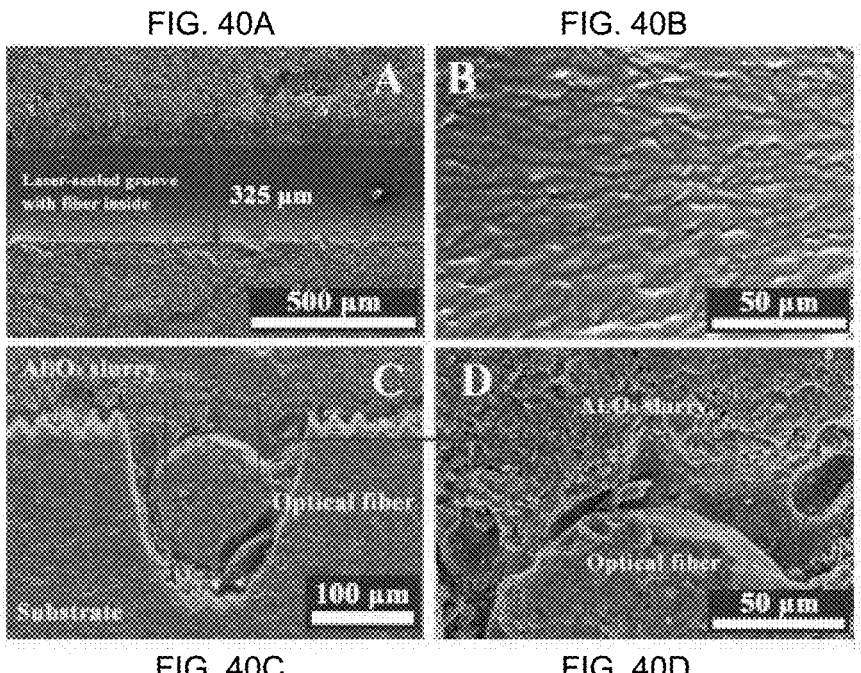
FIG. 40C                     FIG. 40D
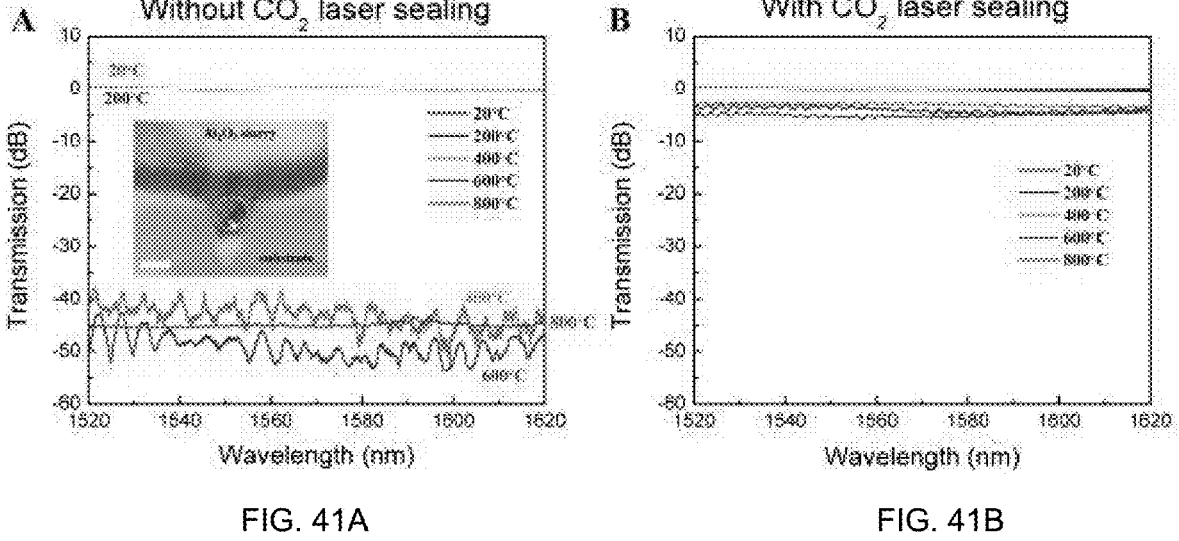
FIG. 41A                     FIG. 41B

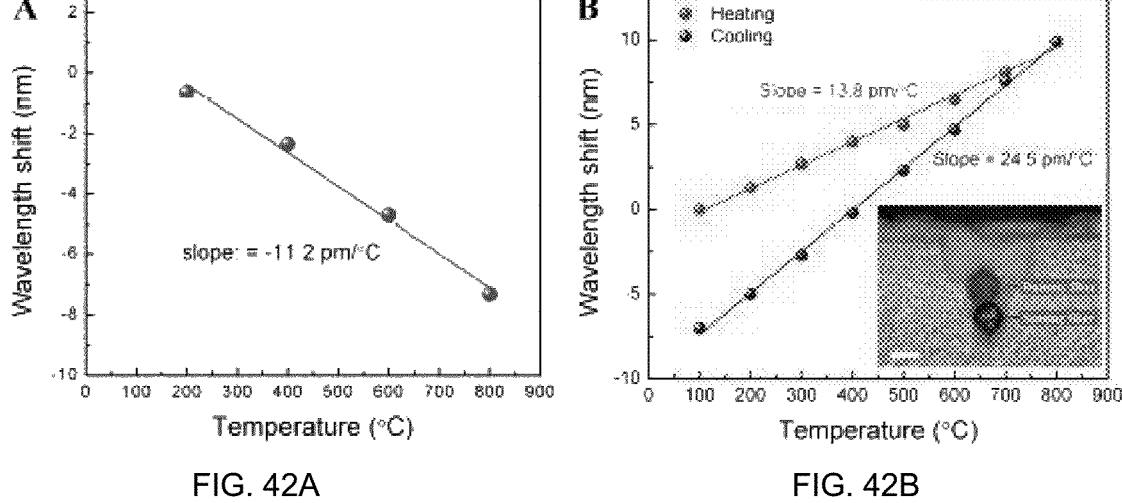
FIG. 42A                              FIG. 42B

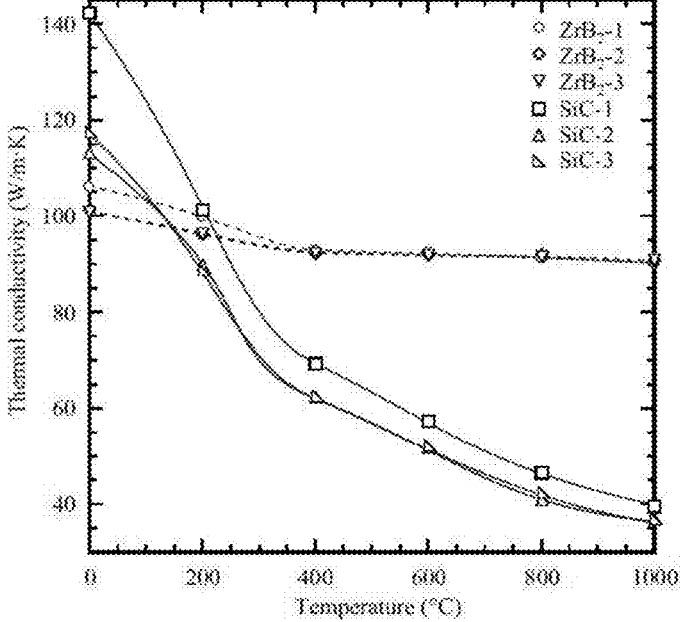
FIG. 46
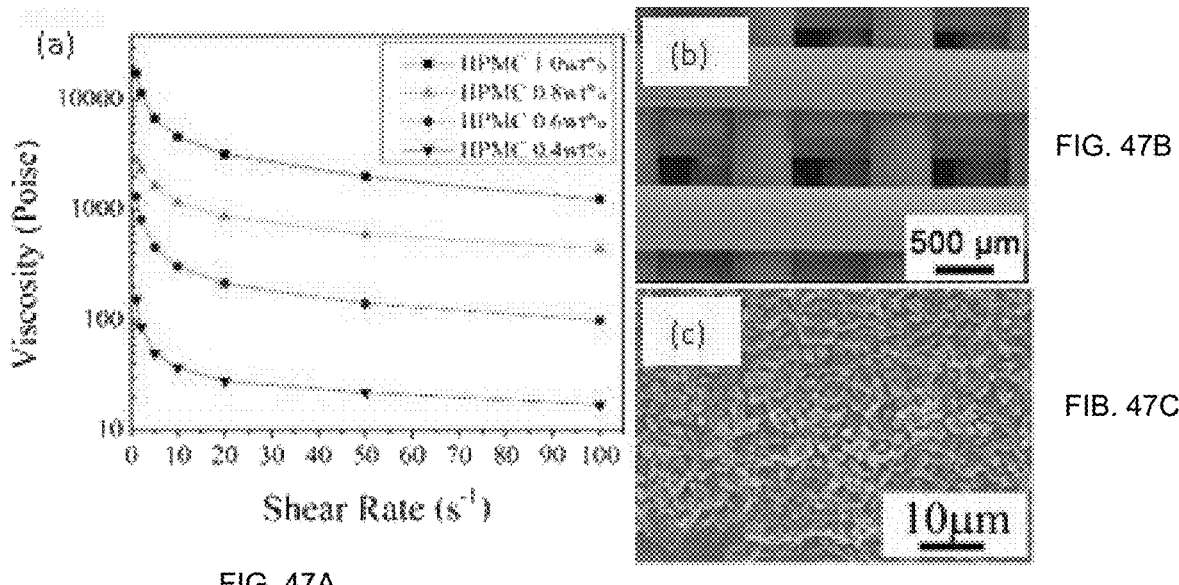
FIG. 47A
FIG. 47B
FIB. 47C

FIG. 48A                    FIG. 48B
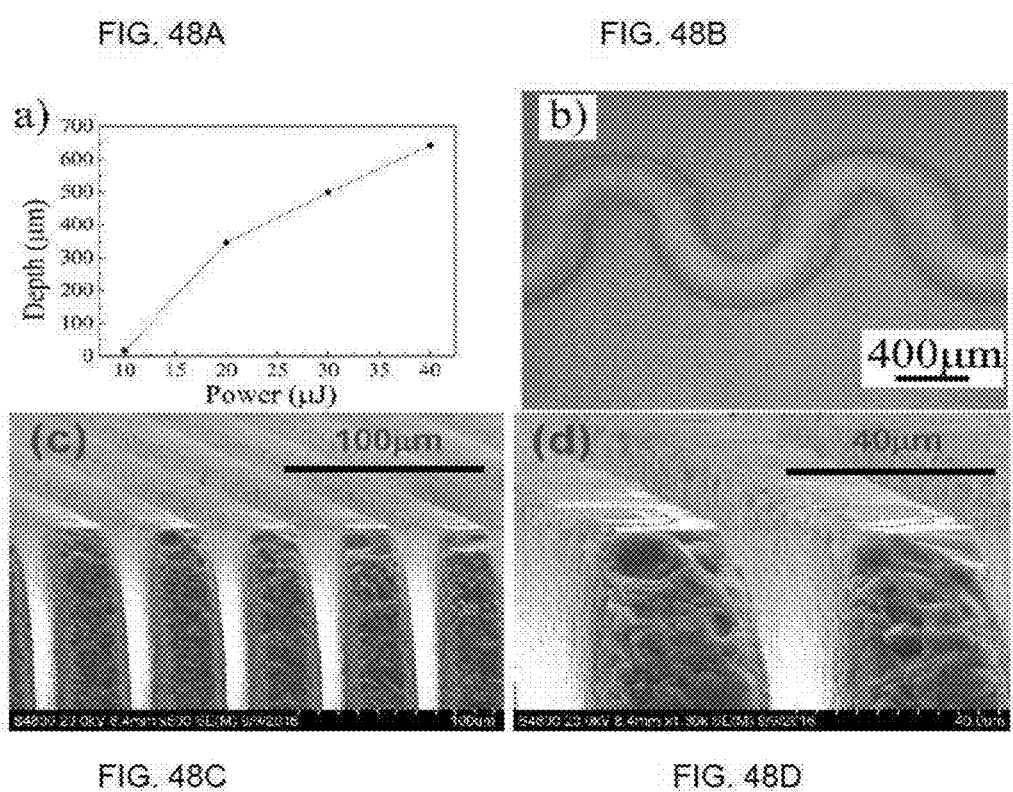
FIG. 48C                    FIG. 48D
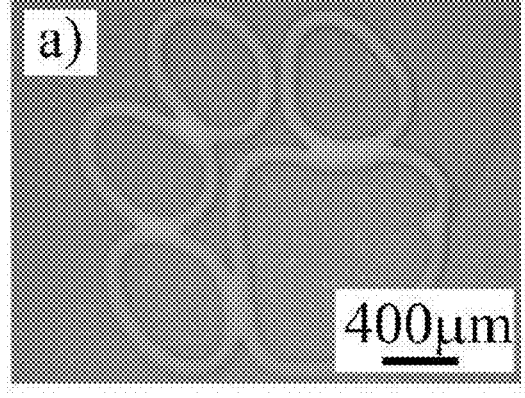 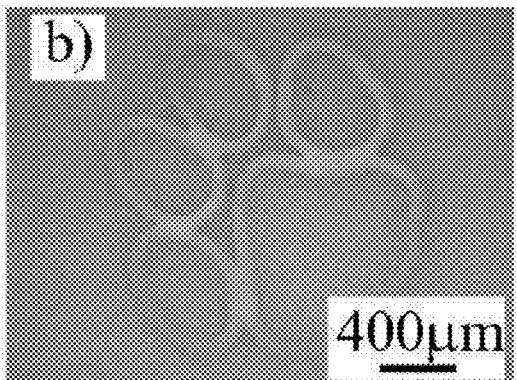
FIG. 49A                    FIG. 49B (a)                         (b)                         (c)
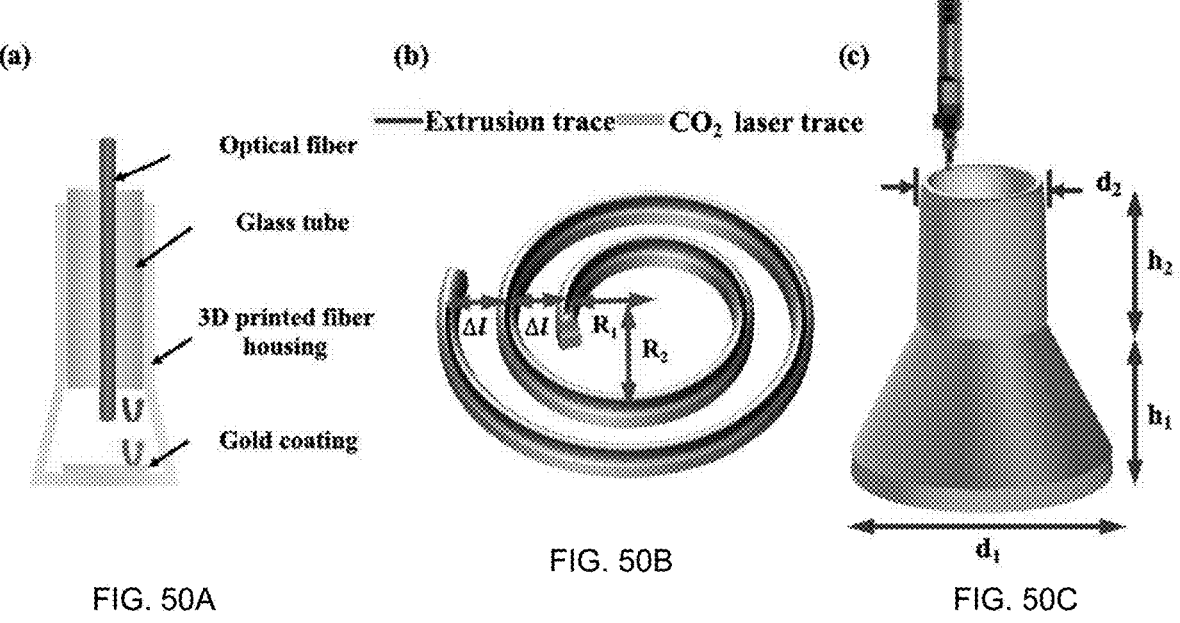
FIG. 50A                    FIG. 50B                    FIG. 50C Single mode optical fiber A. Ps laser microchannel fabrication     B. On-demand slurry dispensing     C. $CO_2$ laser sealing

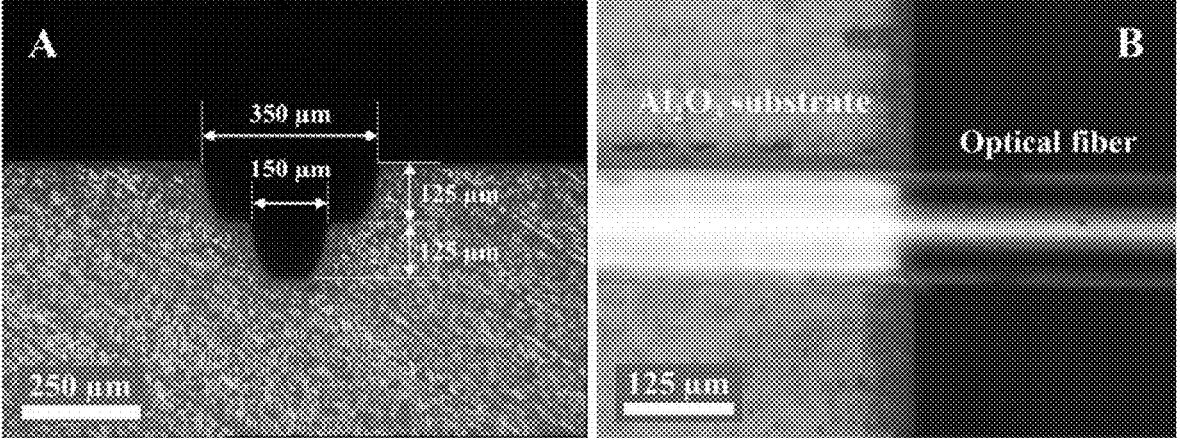
FIG. 59A                    FIG. 59B
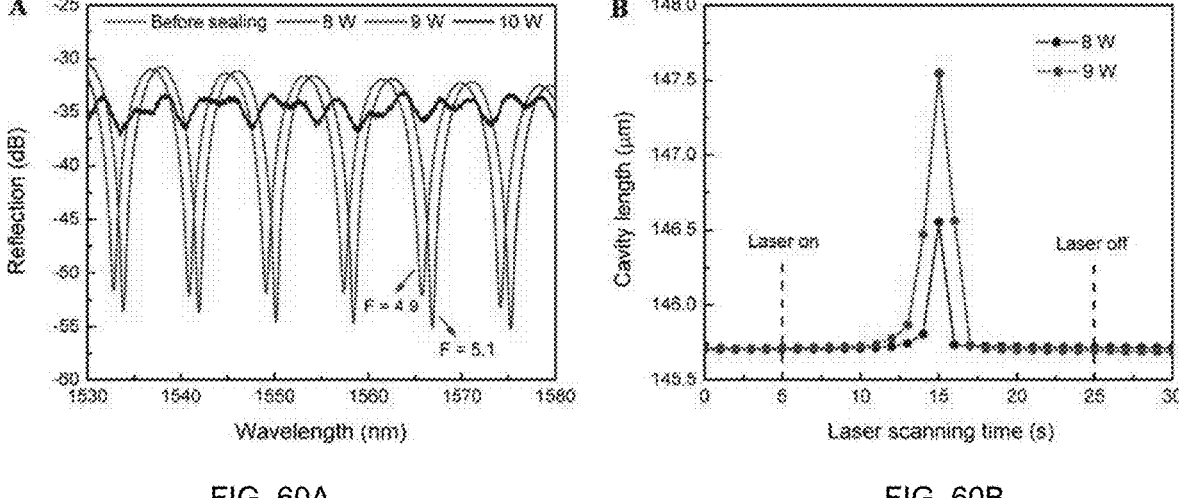
FIG. 60A                    FIG. 60B FIG. 61A        FIG. 61B
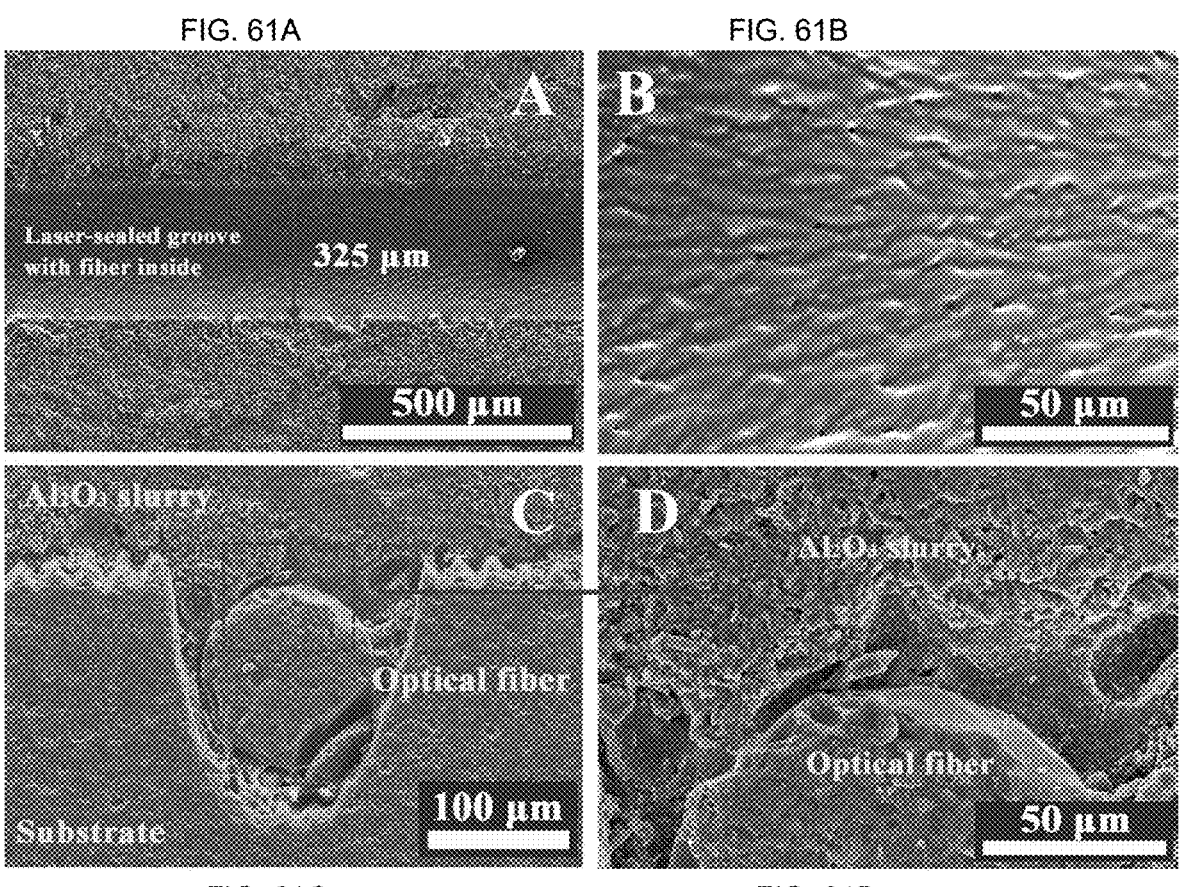
FIG. 61C        FIG. 61D
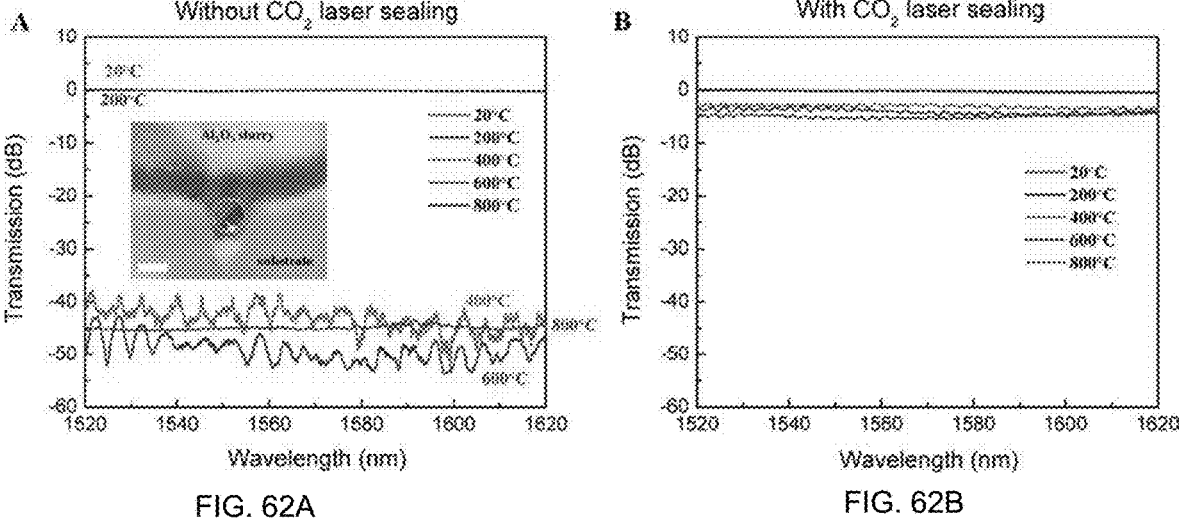
FIG. 62A        FIG. 62B

(a)

(b)

(c)

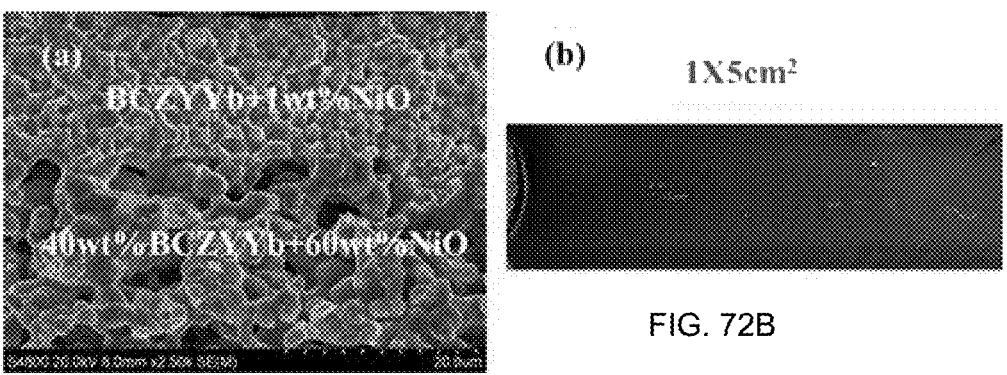
FIG. 72A
FIG. 72B
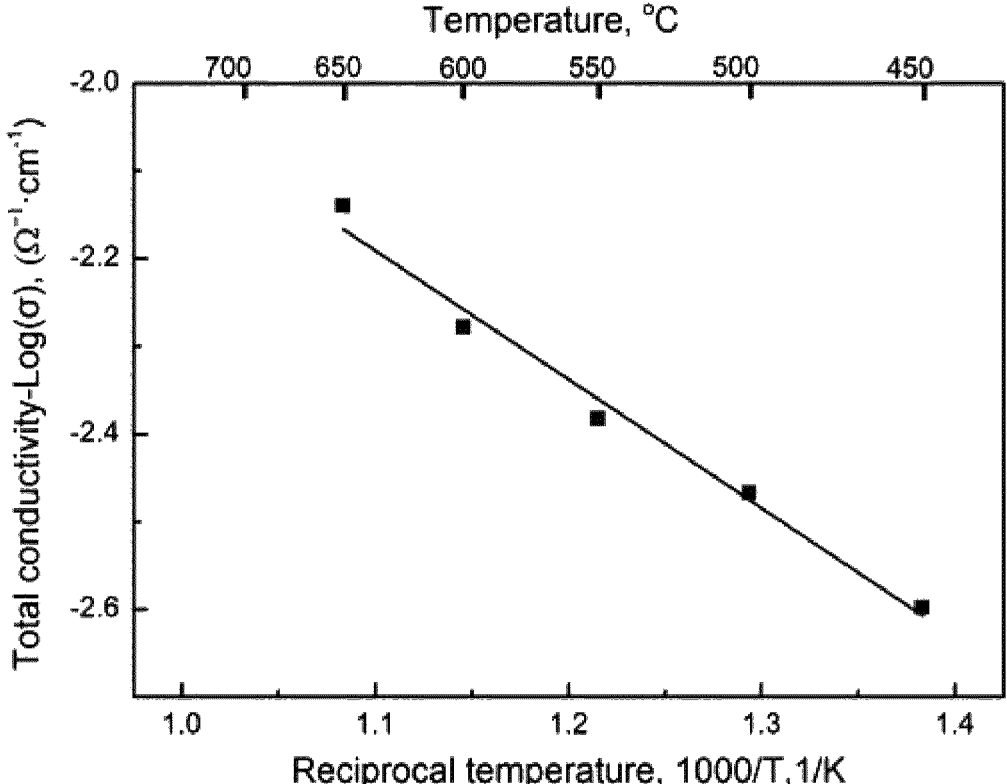
FIG. 73

FIG. 74A
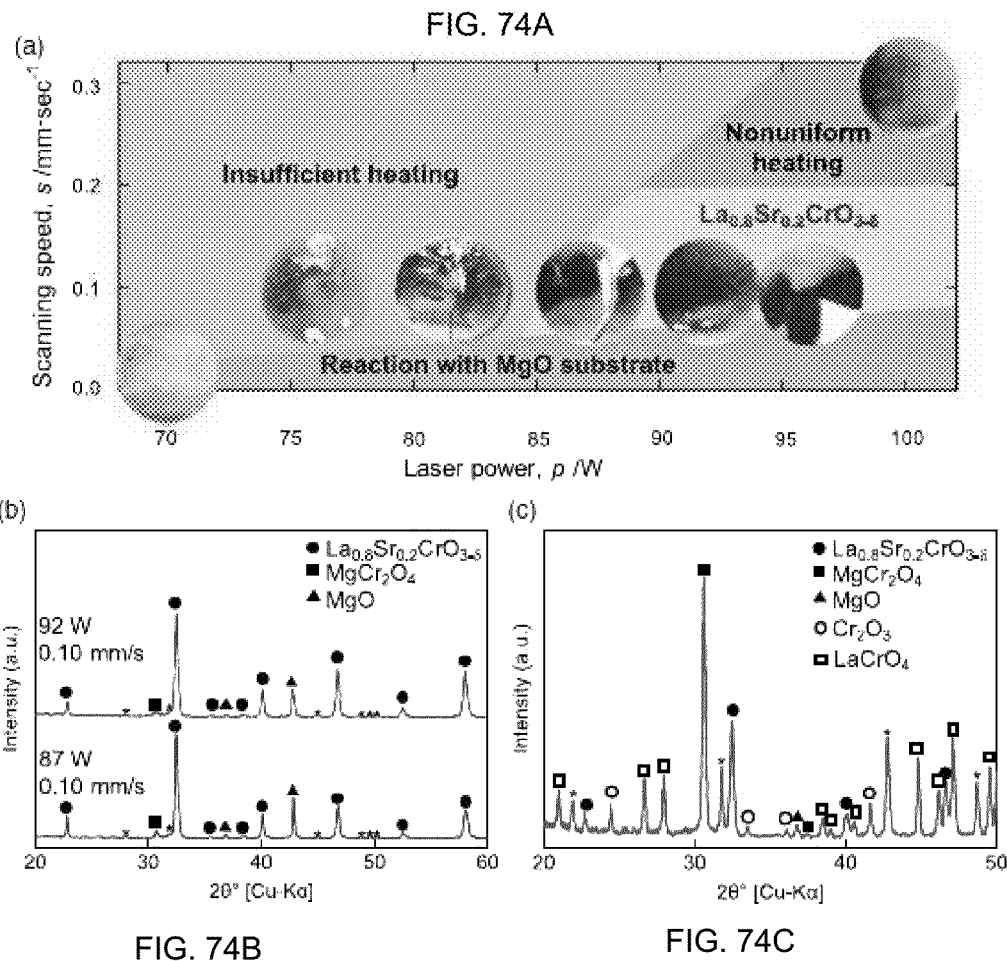
FIG. 74B
FIG. 74C
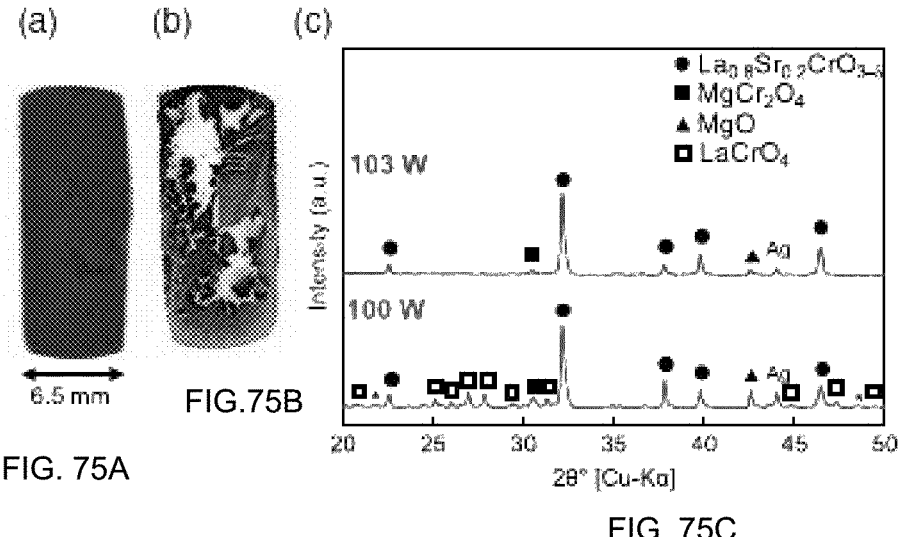
FIG. 75A
FIG.75B
FIG. 75C

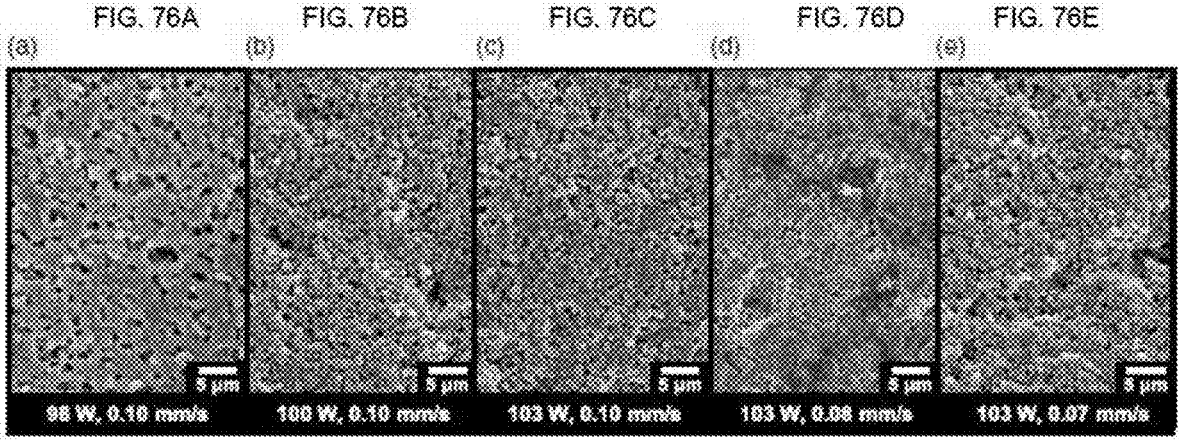
FIG. 76A  FIG. 76B  FIG. 76C  FIG. 76D  FIG. 76E
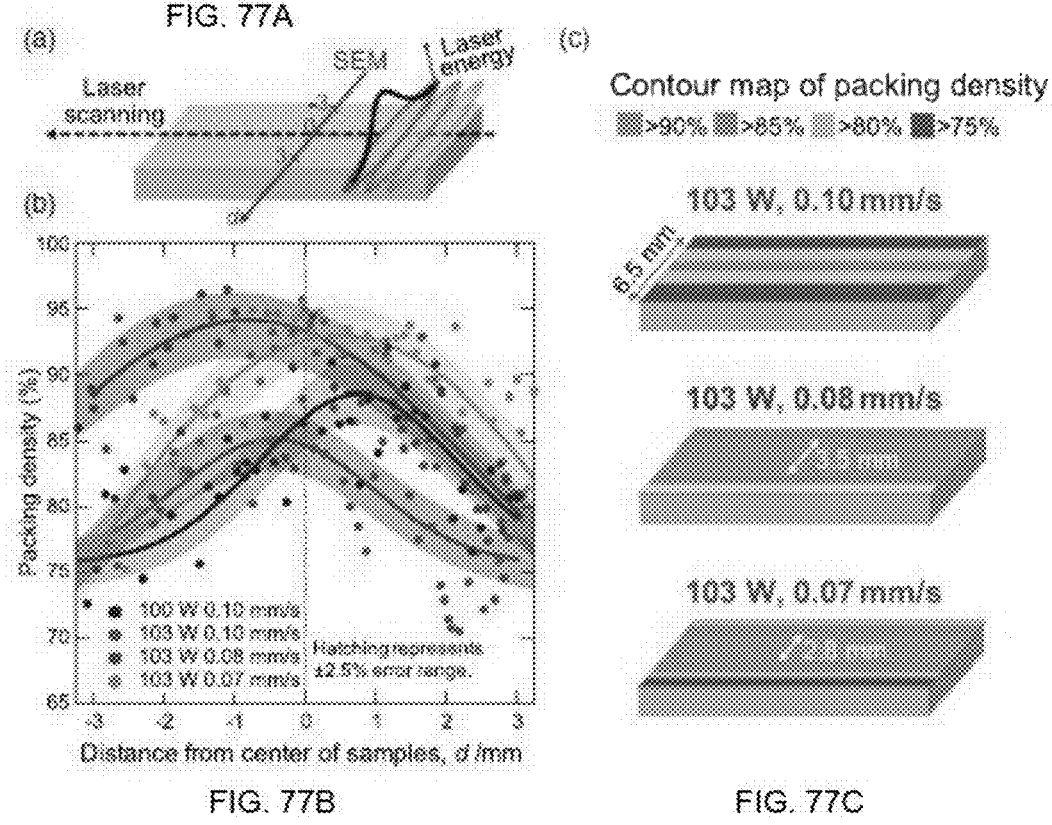
FIG. 77A
FIG. 77B  FIG. 77C FIG. 78A
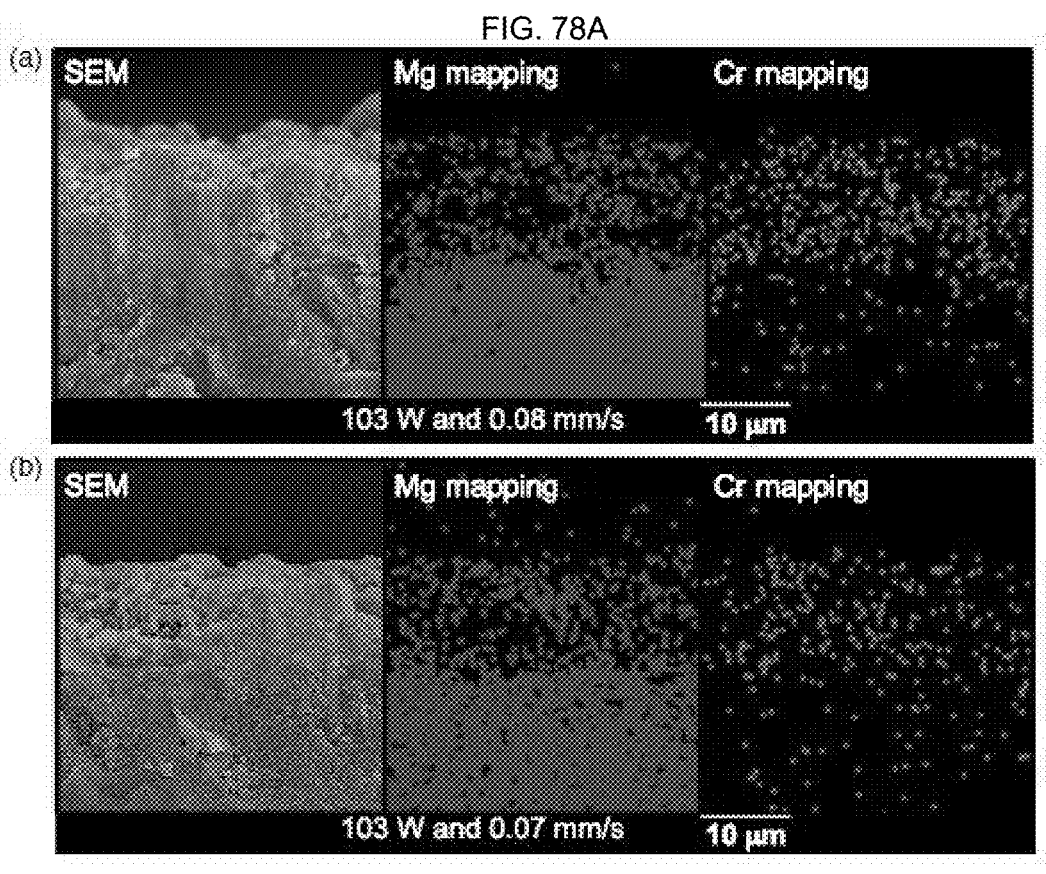
FIG. 78 B
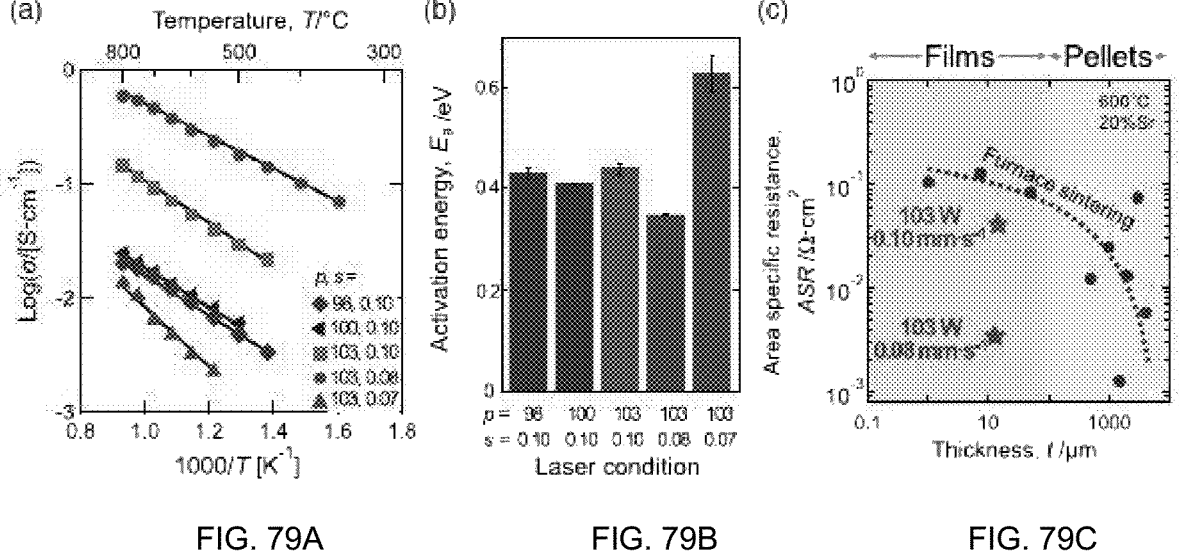
FIG. 79A    FIG. 79B    FIG. 79C

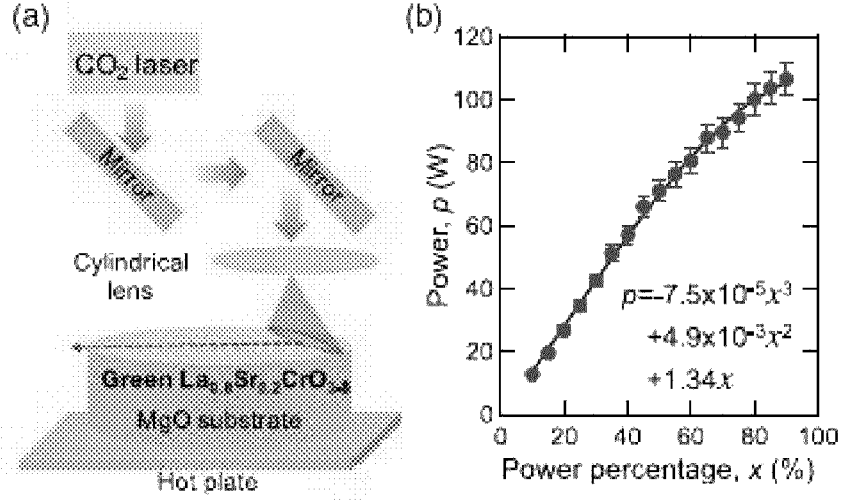
FIG. 80A                    FIG. 80B
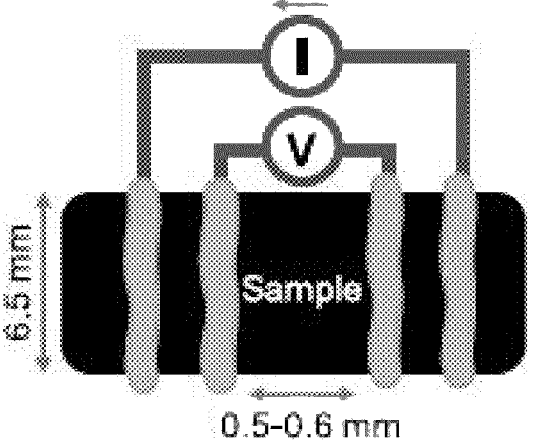
FIG. 81

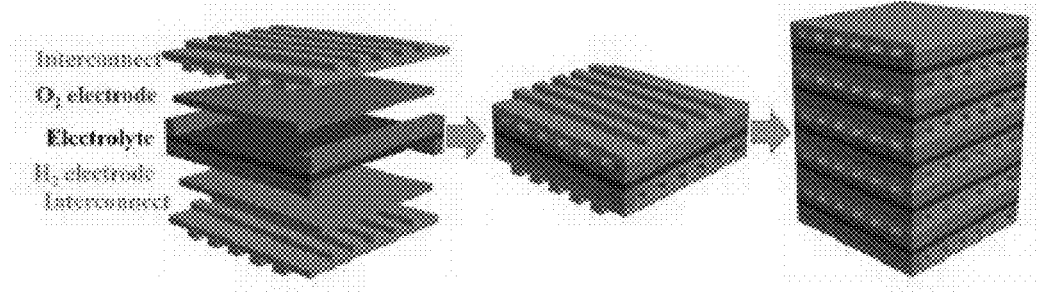
FIG. 82
FIG. 83A
FIG. 83B
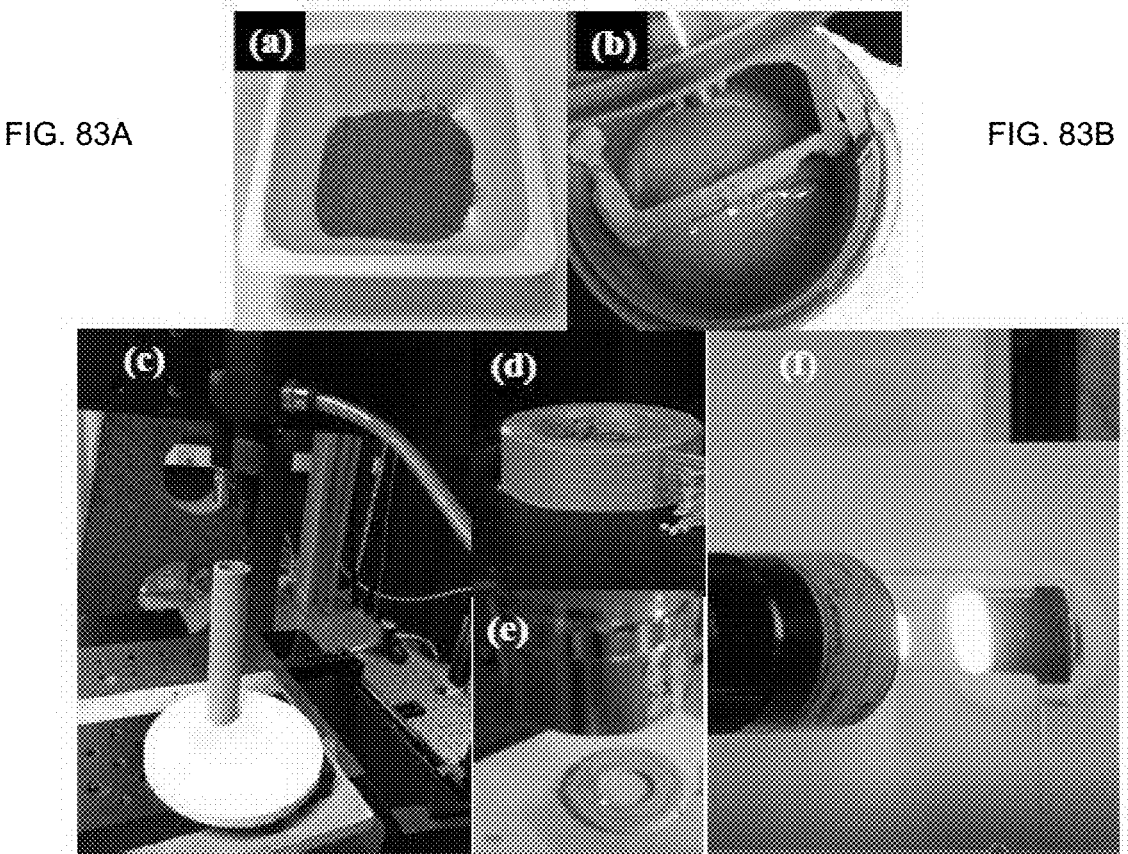
FIG. 83C          FIG. 83E          FIG. 83F
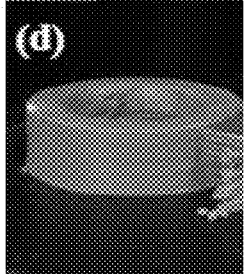
FIG. 83D

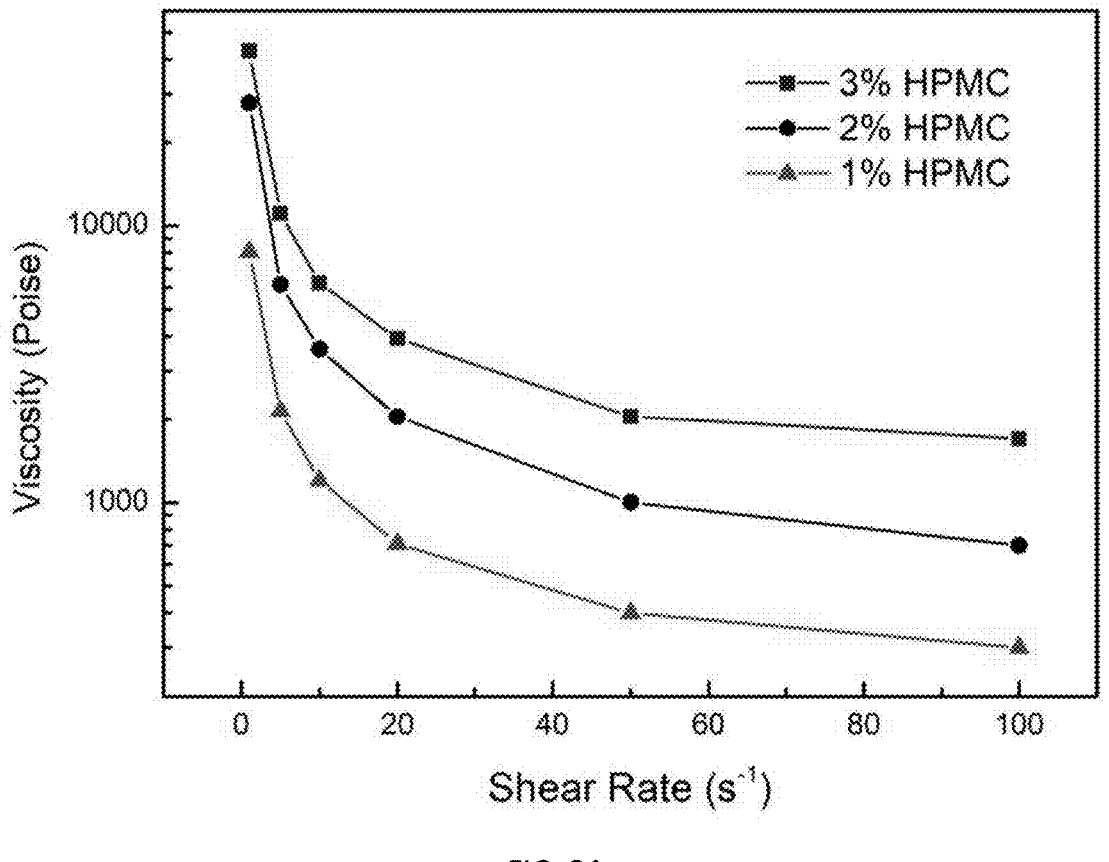
FIG. 84
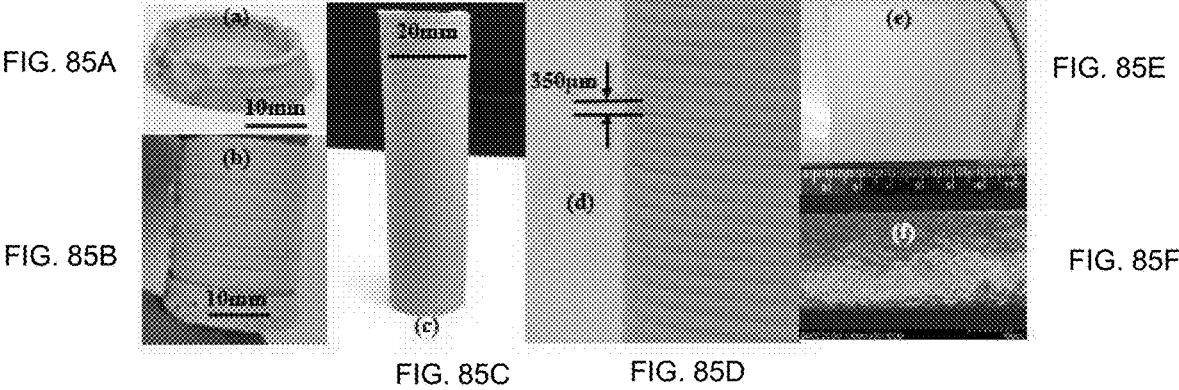
FIG. 85A
FIG. 85B
FIG. 85C
FIG. 85D
FIG. 85E
FIG. 85F

FIG. 86E                    FIG. 86F                    FIG. 86H

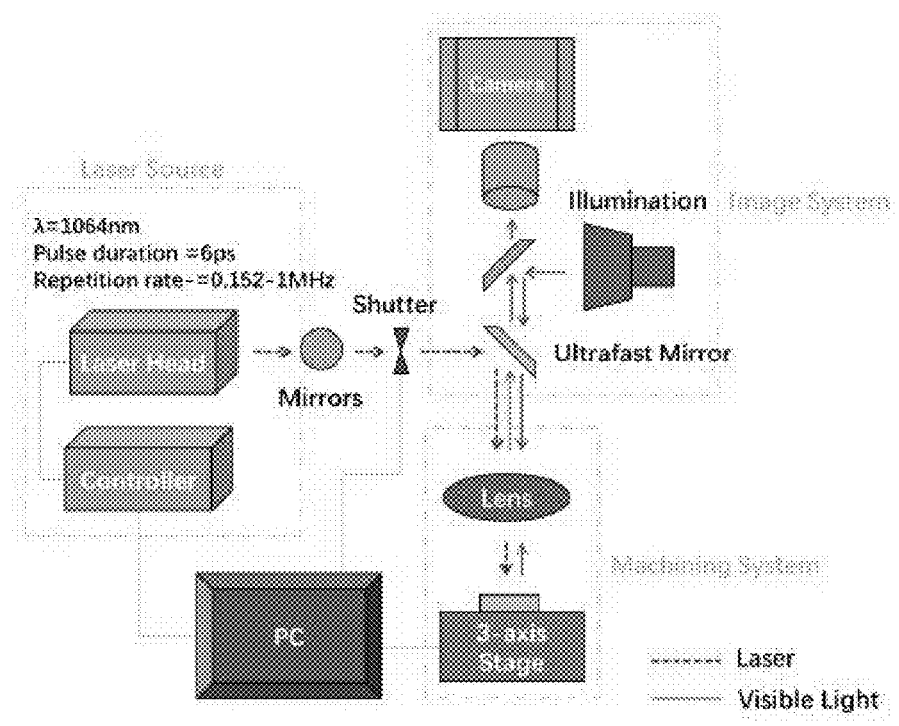
FIG. 89
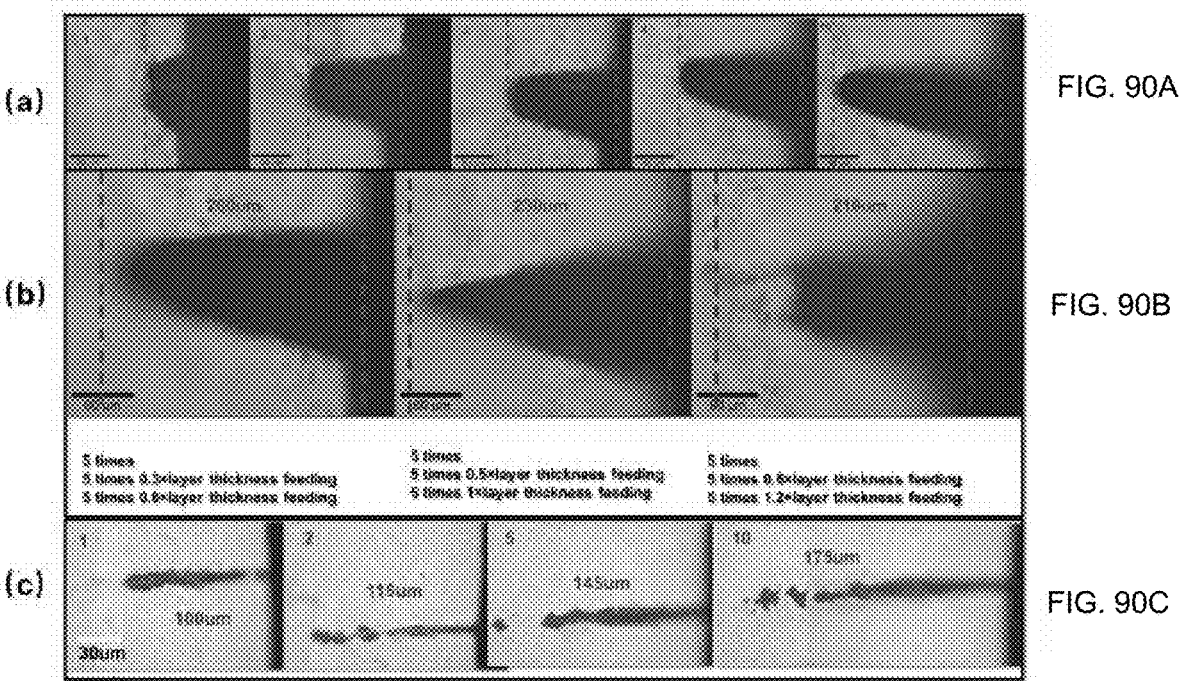
(a)      FIG. 90A
(b)      FIG. 90B
(c)      FIG. 90C

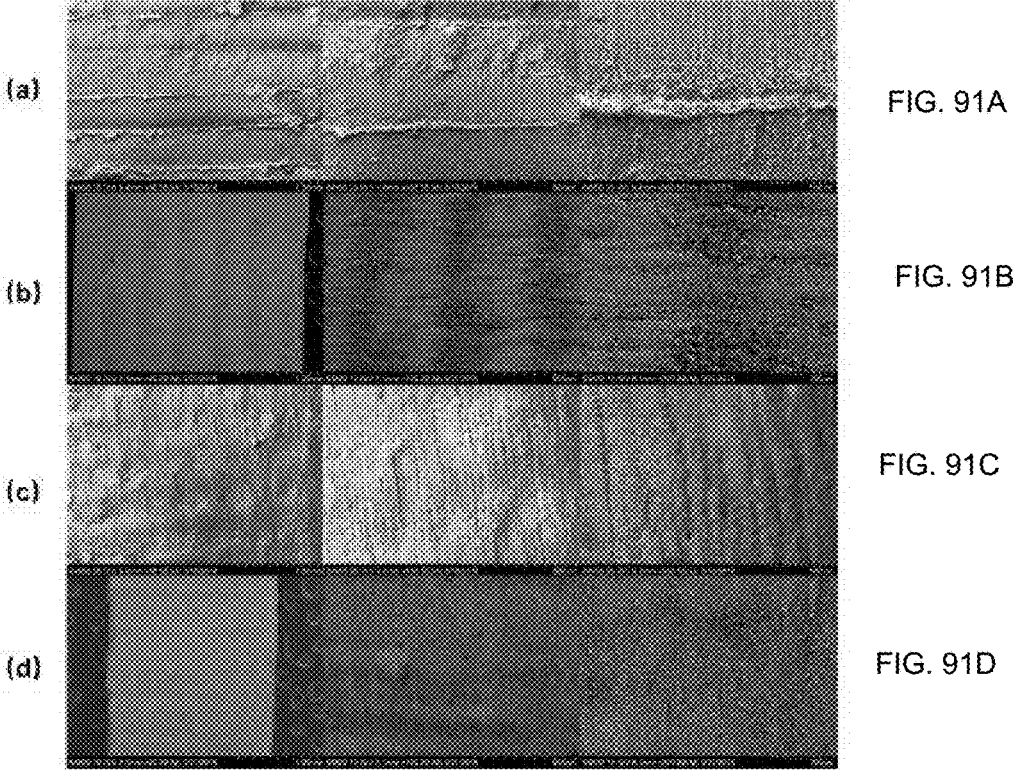
(a)     FIG. 91A
(b)     FIG. 91B
(c)     FIG. 91C
(d)     FIG. 91D
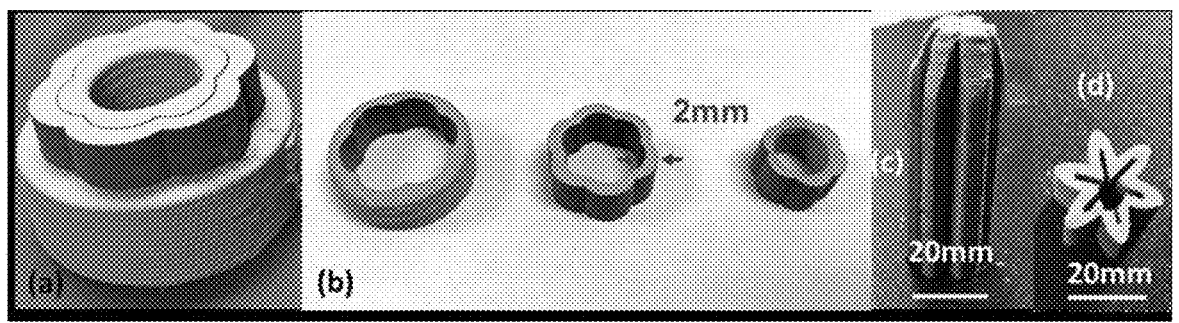
FIG. 92A          FIG. 92B          FIG. 92C     FIG. 92D

FIG. 93B                    FIG. 93C                    FIG. 93D

FIG. 94A     FIG. 94B
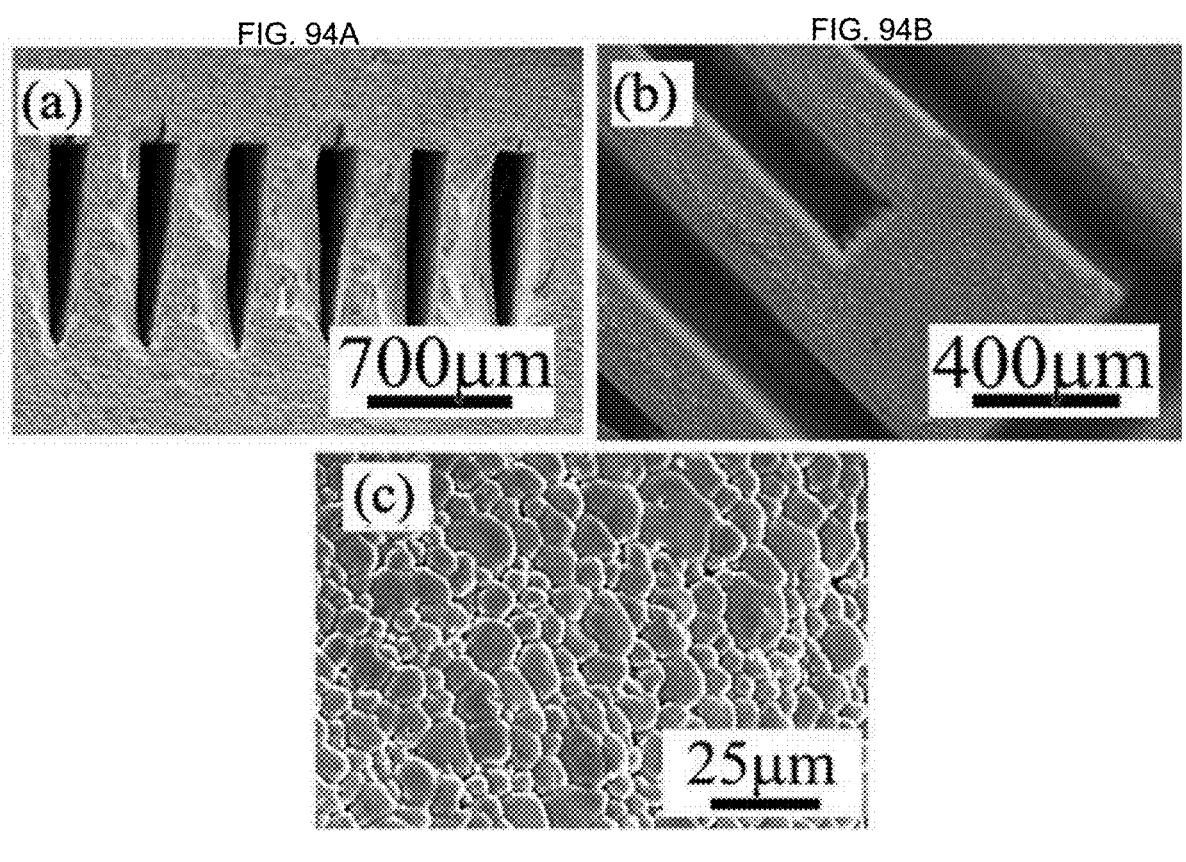
FIG. 94C
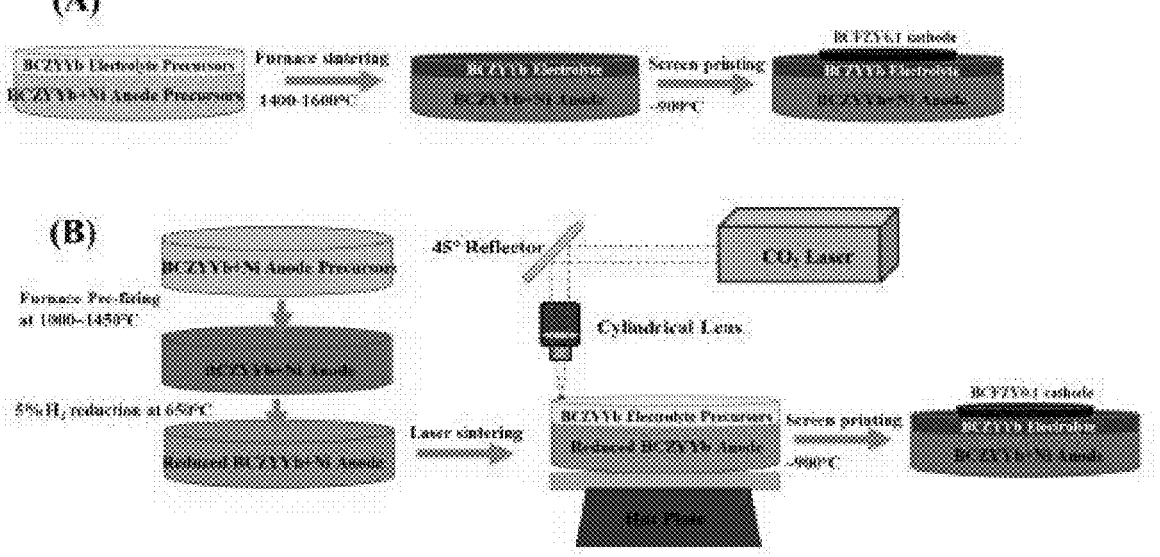
FIG. 95

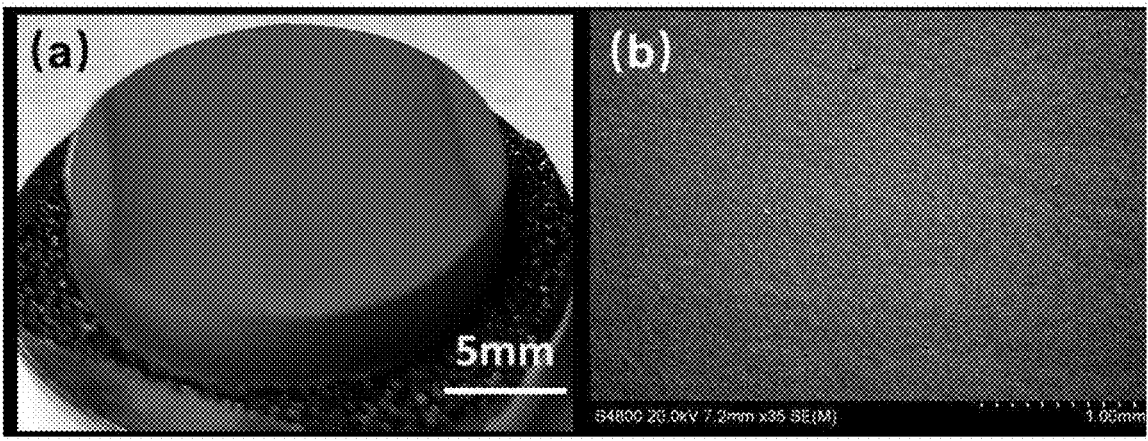
FIG. 97A                    FIG. 97B
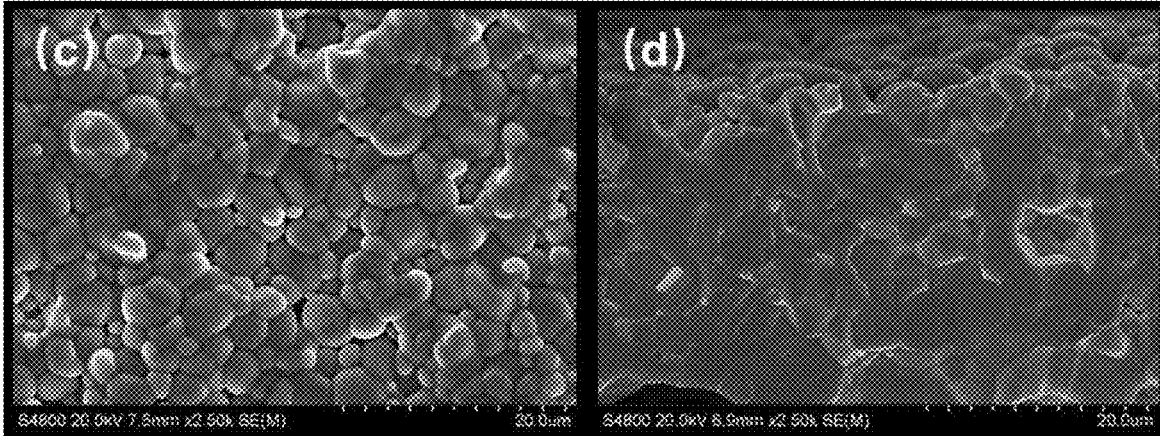
FIG. 97C                    FIG. 97D
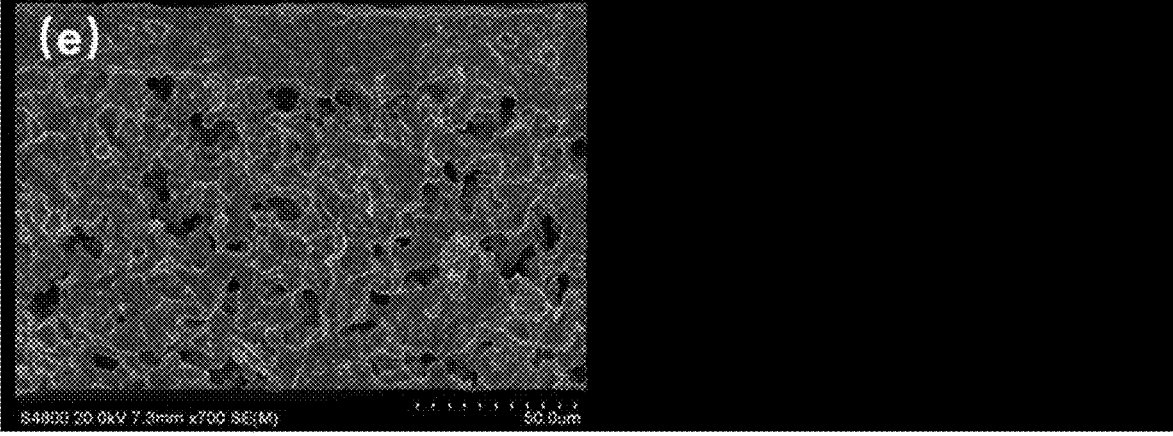
FIG. 97E

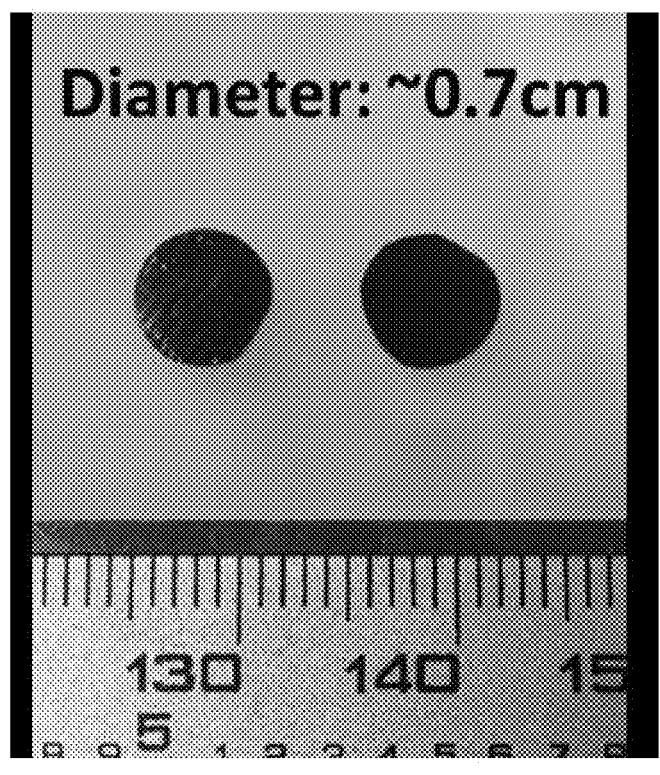
FIG. 106
FIG. 107A                                        FIG. 107B
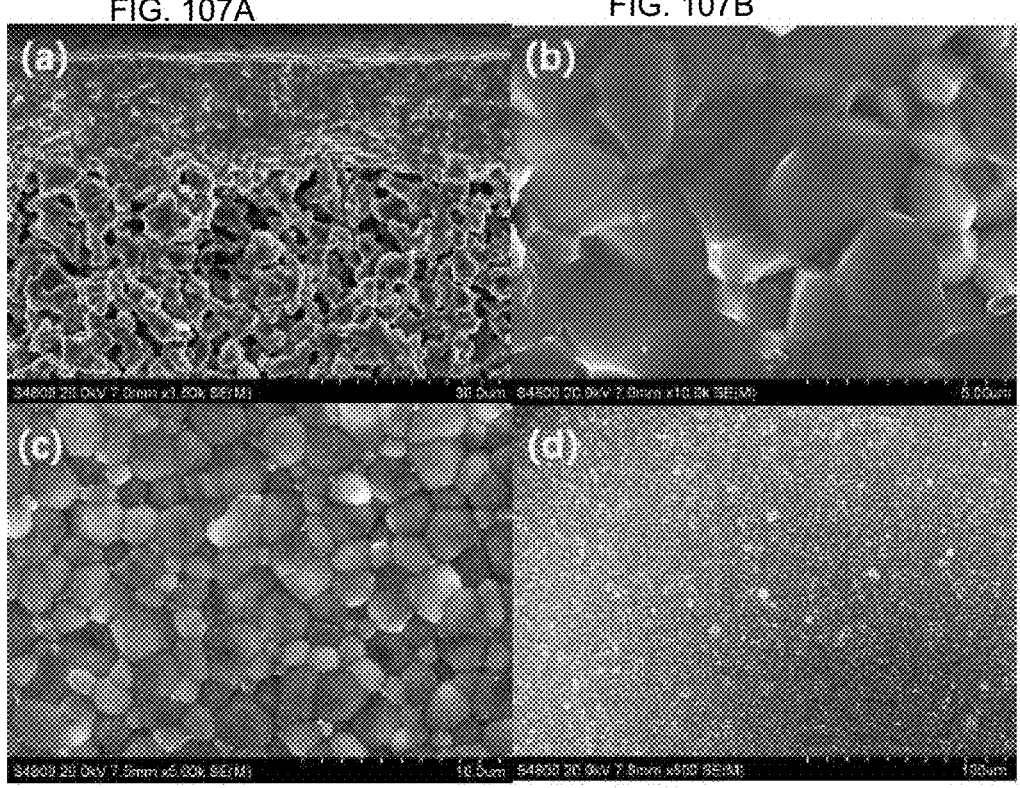
FIG. 107C                                        FIG. 107D

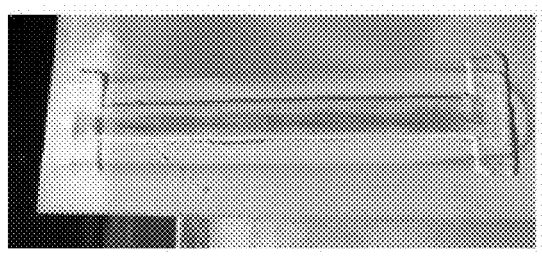
20% Laser power
0.1mm/s
13mm DF
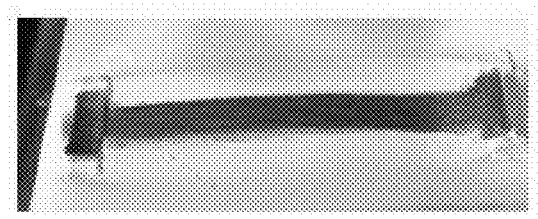
40% Laser power
0.1mm/s
13mm DF
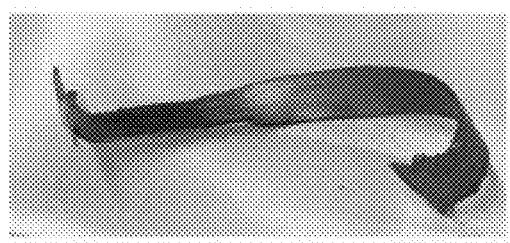
70% Laser power
0.1mm/s
13mm DF
FIG. 111

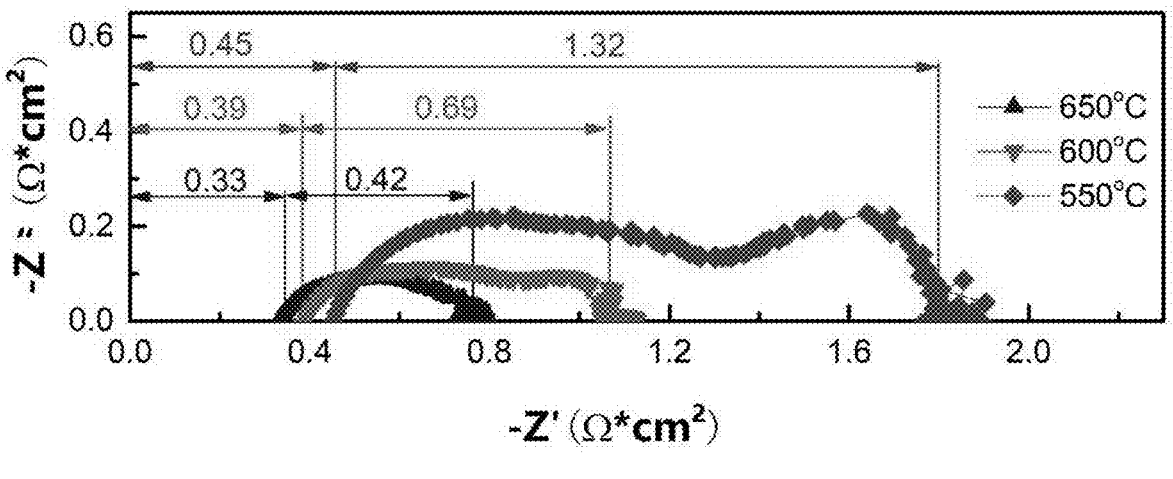
FIG. 116
Performance
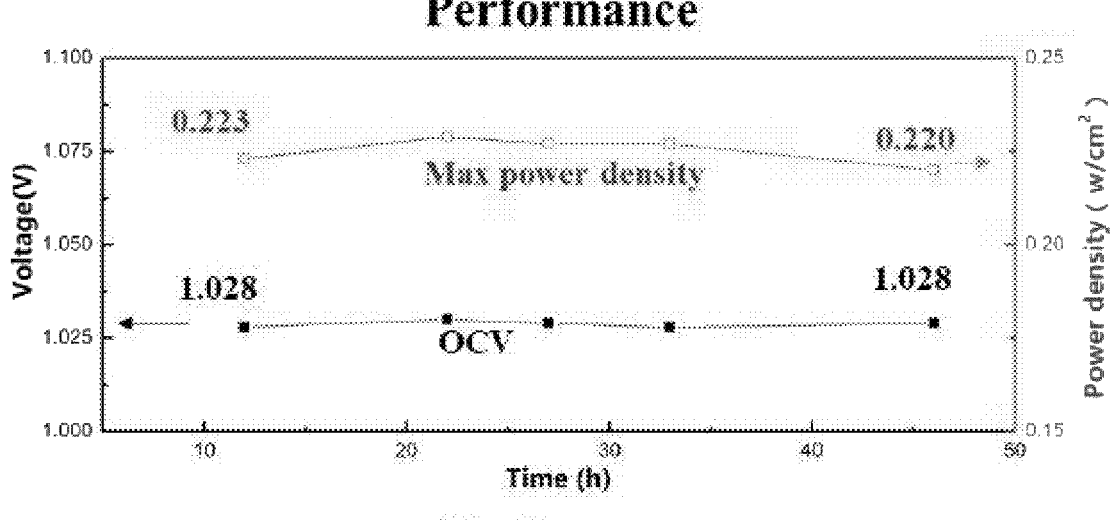
Resistance
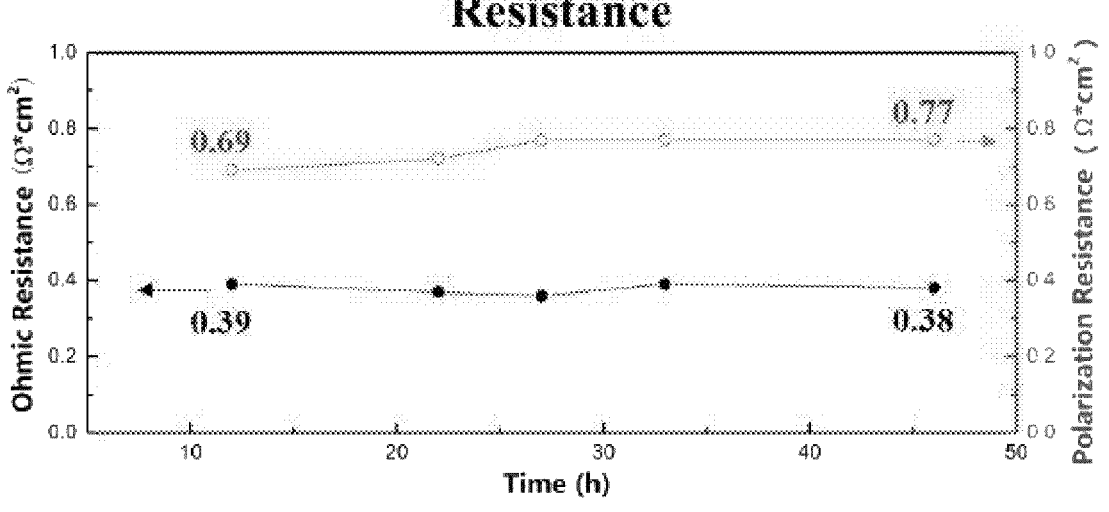
FIG. 117

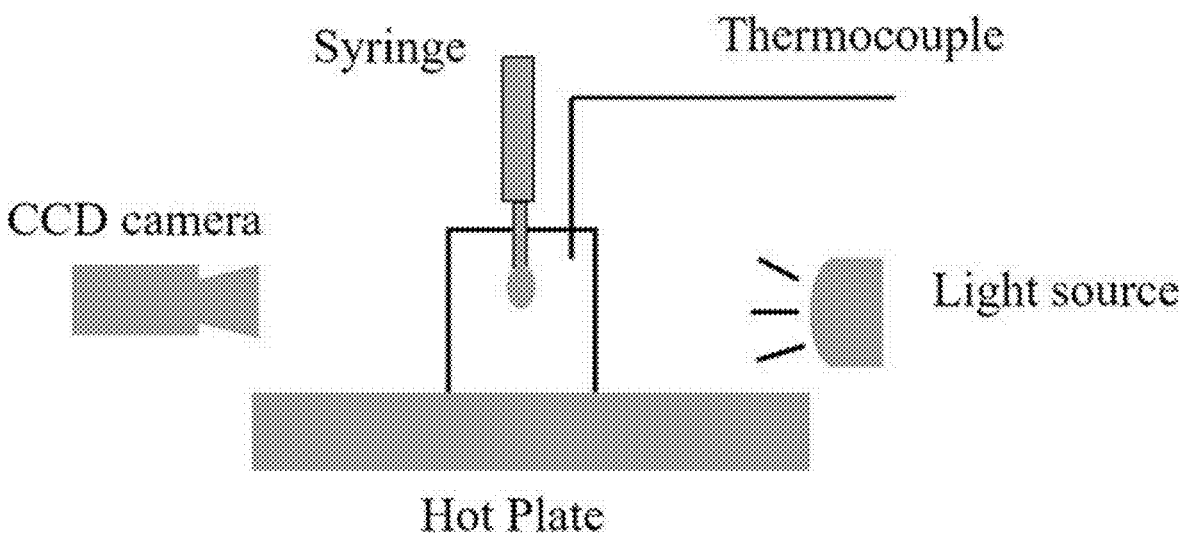
FIG. 131
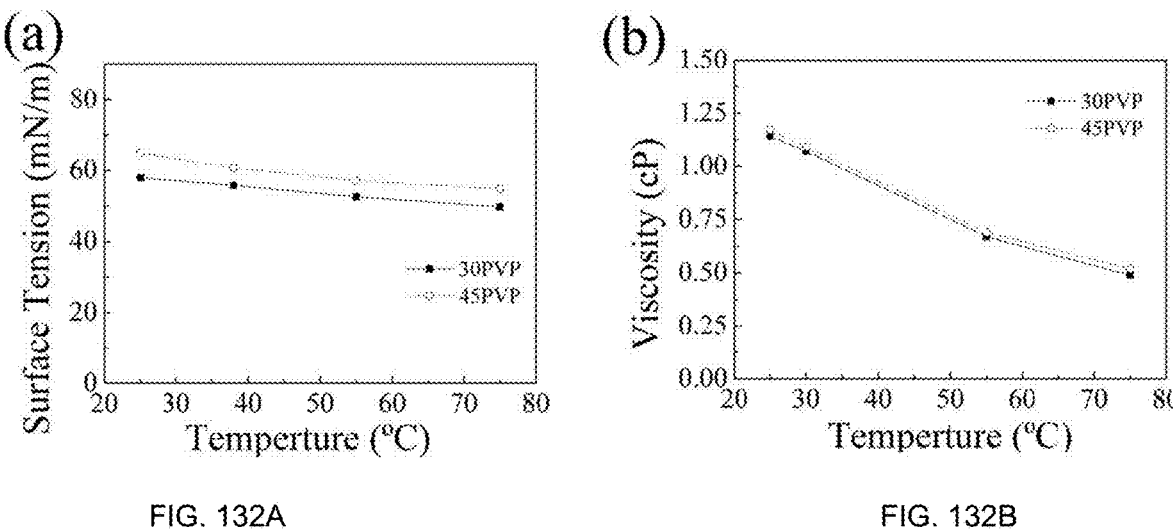
FIG. 132A                              FIG. 132B

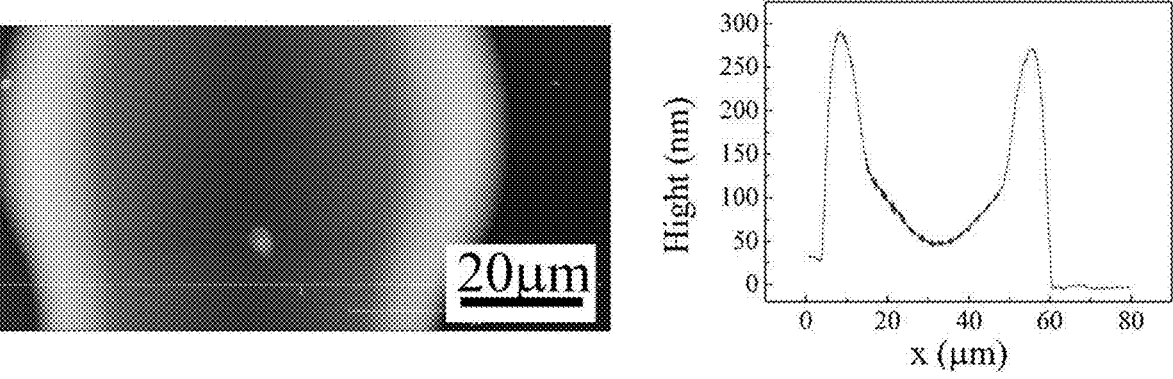
FIG. 134
FIG. 135A          FIG. 135B
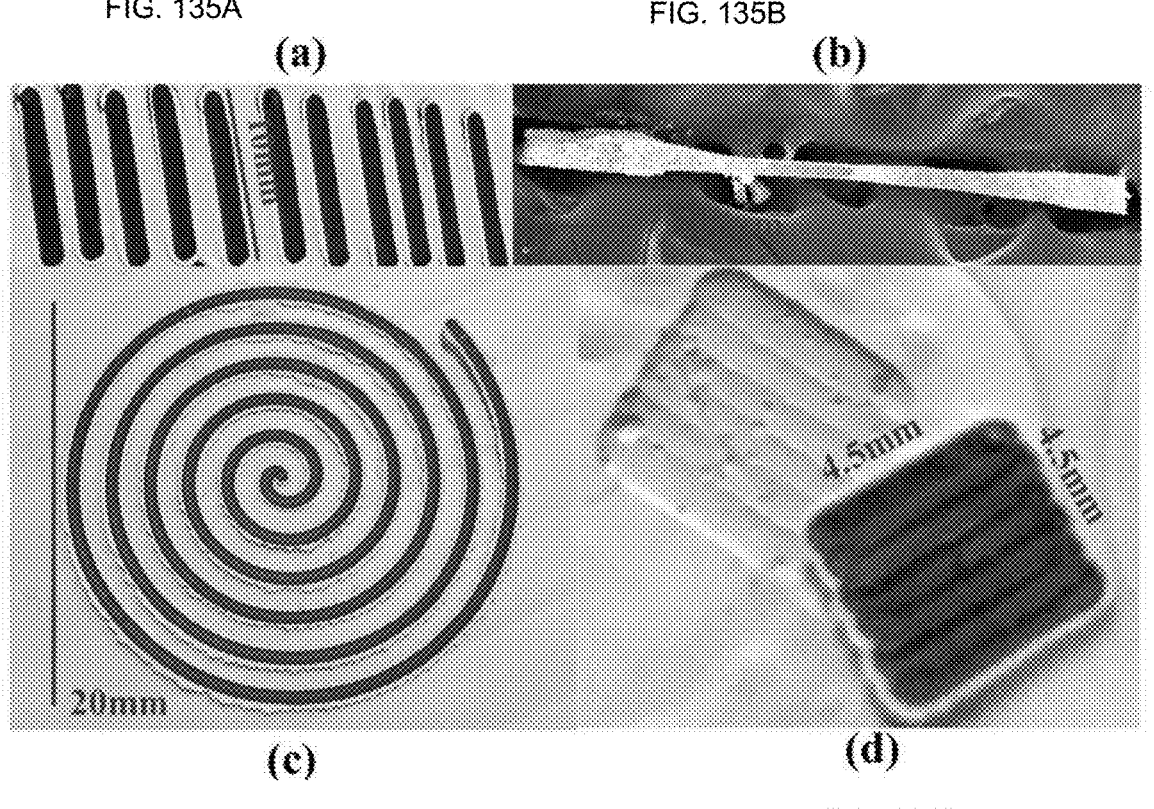
FIG. 135C          FIG. 135D

|  | ED(J/mm2) |
|---|---|
| 25% | 4.166667 |
| 28% | 4.666667 |
| 31% | 5.166667 |
| 35% | 5.833333 |
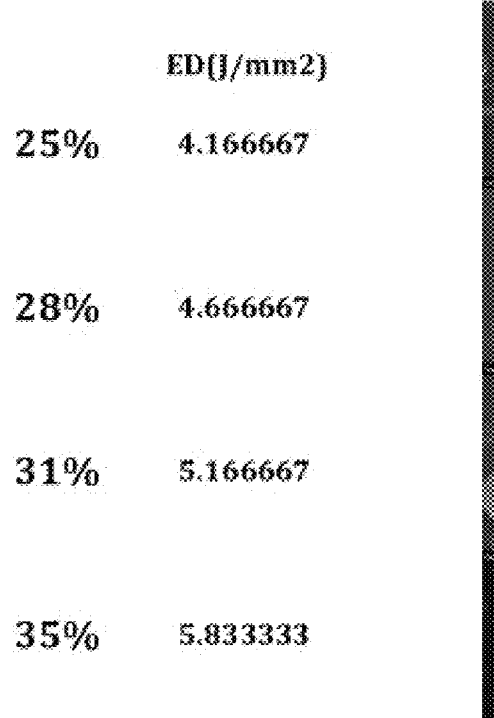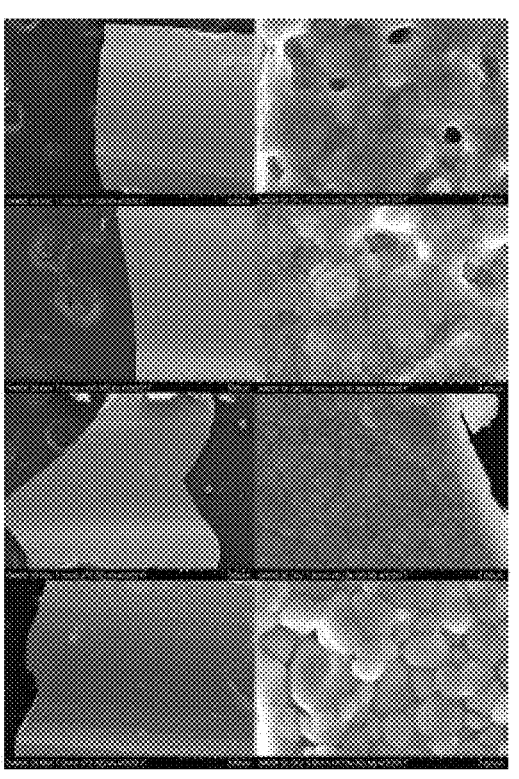
FIG. 138
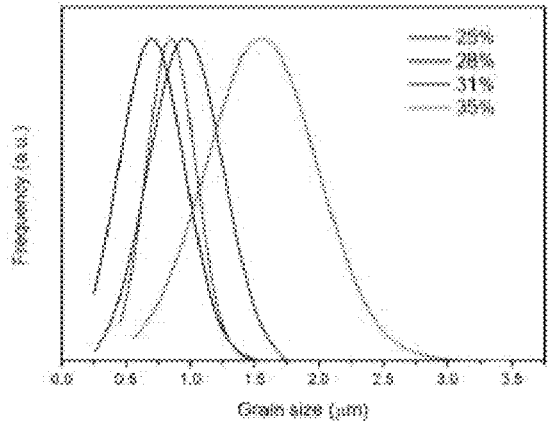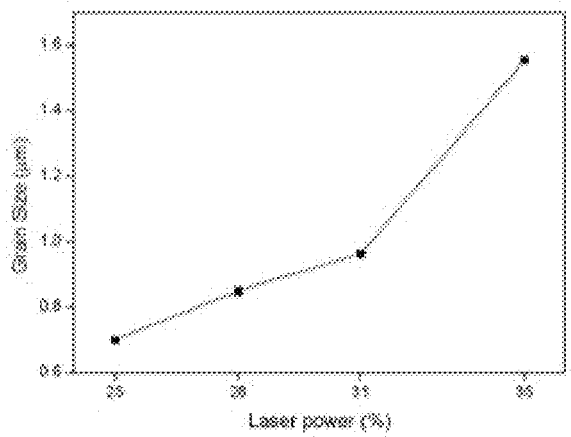
FIG. 139

INTEGRATED ADDITIVE MANUFACTURING AND LASER PROCESSING SYSTEMS AND METHODS FOR CERAMIC, GLASS, AND SILICON CARBIDE APPLICATIONS

RELATED APPLICATIONS

This is a continuation of U.S. application Ser. No. 17/138,173, filed Dec. 30, 2020, which application claims priority from U.S. Provisional Application No. 62/955,780, filed Dec. 31, 2019, the disclosure of which is incorporated by reference in its entirety.

STATEMENT AS TO FEDERALLY SPONSORED RESEARCH

This invention was made with the support of the United States government under Federal Grant No. DE-EE0008428 and awarded by the Department of Energy, Federal Grant No. DE-FE0031826 and awarded by the Department of Energy, Grant No. DE-FE0012272 and awarded by the Department of Energy, and Grant No. 1P20GM130451 awarded by the National Institutes of Health. The Government has certain rights in this invention.

BACKGROUND

Research and development of advanced manufacturing technologies are continuously changing the world, aiming at triggering innovations for product design, enhancing manufacturing efficiency, reducing cost, and allowing for the design for manufacturability (DFM).

Additive manufacturing (AM) and laser-material processing are important manufacturing technologies developed in recent decades. Unlike subtractive methods, AM completes a three-dimensional (3D) object by adding and fusing the materials in a predefined geometry. AM is promising to improve the manufacturing of materials that are notoriously difficult to shape and/or process. However, due to the high melting point of inorganic materials and/or lack of effective in-situ processing techniques, AM of certain materials is still very challenging and can be highly dependent on post-treatments.

Laser-material processing is a promising candidate to integrate with the AM techniques for in-situ materials processing due to its compact size, high processing resolution, short processing time, and flexibility in processing control.

SUMMARY

Some embodiments of the present invention are directed to a method of forming a silica film. The method includes: depositing silica sol-gel coating on a silica substrate; and sintering the coating by scanning the coating using a $CO_2$ laser to form the silica film.

In some embodiments, scanning the coating includes scanning the coating in a straight line track of about 10 mm, at a fixed scanning speed of about 0.1 mm/sec, and using a laser power density of about 0.7 W.

In some embodiments, scanning the coating includes scanning the coating using a Galvo scanner and in a two-dimensional pattern to form the silica film with a two-dimensional pattern corresponding to the two dimensional pattern.

In some embodiments, the silica sol-gel coating includes an Er-doped silica sol-gel coating and the silica film includes an Er-doped silica film.

Some other embodiments of the present invention are directed to a method for fabricating a ceramic component. The method includes: (a) depositing a layer of ceramic paste on a substrate; and (b) scanning the layer of ceramic paste using a $CO_2$ laser to form a laser-melted layer of ceramic.

In some embodiments, scanning the layer of ceramic paste includes scanning the layer of ceramic paste at a fixed scanning speed of at least about 3.5 mm/sec.

In some embodiments, scanning the layer of ceramic paste includes scanning the layer of ceramic paste along first and second spaced apart scanning paths. The first and second scanning paths may be spaced apart by about half a width of a melting zone of one of the scanning paths.

In some embodiments, scanning the layer of ceramic paste includes scanning the layer of ceramic paste with the first and second scanning paths spaced apart about 0.20 mm, at a scanning speed of about 1 mm/sec, and at a laser power of about 10 W.

In some embodiments, the layer of ceramic paste is a first layer of ceramic paste and the laser-melted layer of ceramic is a first laser-melted layer of ceramic, and the method further includes: (c) depositing a second layer of ceramic paste on the first layer of ceramic paste; and (d) scanning the second layer of ceramic paste using the $CO_2$ laser to form a second laser-melted layer of ceramic.

In some embodiments, the ceramic paste includes at least one of alumina paste and fused silica paste.

Some other embodiments of the present invention are directed to a method of 3D printing a component formed of fused silica glass. The method includes: (a) depositing a first layer of fused silica paste based on a first 2D slice of a 3D model corresponding to the component; (b) melting the first layer of fused silica paste using a $CO_2$ laser; (c) depositing a second layer of fused silica paste based on a second 2D slice of the 3D model corresponding to the component; (d) melting the second layer of fused silica paste using the $CO_2$ laser; and (e) depositing and melting at least a third layer of fused silica paste to 3D print the component.

In some embodiments, the method further includes increasing laser power during the melting steps to reduce the porosity of the component to thereby increase the transparency of the component.

Some other embodiments of the present invention are directed to a method of forming an optical fiber sensor. The method includes: machining a microchannel in a ceramic substrate using a laser, the microchannel having a first portion having a first width and a second portion having a second width that is greater than the first width; receiving an optical fiber in the first portion of the microchannel; filling the second portion of the microchannel with a ceramic slurry to cover the optical fiber; preheating the slurry by scanning with a laser at a first power density and a first scanning speed; and sintering the slurry by scanning with the laser at a second power density that is greater than the first power density and at a second scanning speed that is slower than the first scanning speed.

In some embodiments, the machining step is carried out using a ps laser.

In some embodiments, the preheating step is carried out using a $CO_2$ laser.

Some other embodiments of the present invention are directed to a method of forming a fiber-optic sensor. The method includes: 3D printing a housing on a diaphragm, the housing including a first cone-shaped portion and a second tubular portion on the first portion, the housing including a plurality of layers, wherein each layer is formed by extruding paste and irradiating the paste using a laser to melt the paste; coating an inner surface of the diaphragm; inserting a glass tube into the housing; filling a gap between the glass tube and the housing by inserting paste (e.g., fused silica paste) and melting the paste using a laser; inserting an optical fiber into the glass tube such that an end of the optical fiber is proximate the diaphragm; and fixing the optical fiber in place using laser irradiation.

In some embodiments, the 3D printing step, the filling step, and/or the fixing step are carried out using a $CO_2$ laser.

In some embodiments, the paste comprises fused silica paste.

In some embodiments, the coating comprises gold.

Some other embodiments of the present invention are directed to a method for fabricating a protonic ceramic energy device. The method includes: coating an electrolyte layer on an anode layer; and densifying the electrolyte layer by a rapid laser reactive sintering (RLRS) process on the electrolyte layer and/or the anode layer to form a half-cell including a dense electrolyte and a porous anode.

In some embodiments, the method further includes depositing a cathode layer on the electrolyte layer or the dense electrolyte. The method may further include treating the half-cell and cathode layer in a furnace to form a single cell including the dense electrolyte, the porous anode, and a porous cathode. The RLRS process may include a one-step tri-sintering of the anode layer, the electrolyte layer, and the cathode layer to form a single cell.

In some embodiments, the RLRS process includes a one-step co-sintering of the anode layer and the electrolyte layer.

In some embodiments, the RLRS process is carried out using a $CO_2$ laser.

In some embodiments, the method further includes preheating the anode layer and the electrolyte layer before the RLRS process.

In some embodiments, the porous anode includes a nanoporous anode.

In some embodiments, the anode layer includes a presintered anode.

In some embodiments, the RLRS process allows for the rapid manufacturing of the protonic ceramic half-cell with desired crystal structure, microstructure, and thickness.

Some other embodiments of the present invention are directed to a method for manufacturing at least one component for a protonic ceramic energy device. The method includes: depositing a precursor on a build surface; and rapid laser reactive sintering the precursor to form the at least one component, wherein the at least one component includes at least one of a dense electrolyte, a porous electrode/electrode scaffold, and a dense interconnect.

In some embodiments, the precursor includes an electrolyte precursor, the build surface includes an anode or an anode precursor, and the formed component includes a half-cell comprising a porous anode and the dense electrolyte. The rapid laser reactive sintering may include rapid laser reactive sintering the anode precursor and the electrolyte precursor in a single step to form the half-cell.

In some embodiments, the precursor includes an electrolyte precursor, the build surface includes an anode or an anode precursor, the method further includes depositing a cathode precursor on the electrolyte precursor, and the formed component includes a single cell comprising the porous anode, the dense electrolyte, and a porous cathode, and the rapid laser reactive sintering includes rapid laser reactive sintering the anode precursor, the electrolyte precursor, and the cathode precursor in a single step to form the single cell.

Some other embodiments of the present invention are directed to a method for fabricating a protonic ceramic component for a protonic ceramic energy device using an integrated additive manufacturing and laser processing system. The method includes: extruding a plurality of layers of paste in a layer-by-layer construction; after extruding each layer of paste, drying said layer of paste to form a green component; and sintering the green component to form the protonic ceramic component.

In some embodiments, the method further includes laser machining the green component. The laster machining may be for polishing the green component and/or for creating a complex geomertry for the green component. The complex geometry may be one of a pellet, a cylinder, a cone, a ring, a bottom-closed straight tube, a top-closed straight tube, and a lobed tube. Laser machining the green component may include cutting each layer during the layer-by-layer construction to create the complex geometry.

In some embodiments, the drying step is carried out using a CO2 laser, the sintering step is carried out using a rapid laser reactive sintering (RLRS) process, and/or the laser machining step is carried out using a picosecond laser.

Some other embodiments of the present invention are directed to a method of direct inkjet printing nano-ribbons. The method includes: inkjet printing a set of spaced apart droplets of ink on a substrate, wherein the droplets interact and coalesce to form a line; and controlling a temperature of the substrate and/or a spacing of the droplets to stabilize the line.

In some embodiments, the temperature of the substrate is at least 60° C.

In some embodiments, the spacing of the droplets is between about 25 and 50 μm.

In some embodiments, the ink includes sol-gel precursors.

In some embodiments, the nano-ribbons include mullite.

Further features, advantages and details of the present invention will be appreciated by those of ordinary skill in the art from a reading of the figures and the detailed description of the preferred embodiments that follow, such description being merely illustrative of the present invention.

BRIEF DESCRIPTION OF THE DRAWINGS

FIG. 3A illustrates that laser scanning is controlled by a 3D moving stage. FIG. 3B illustrates that laser scanning is controlled by a Galvo scanner.

FIG. 8 is a chart illustrating the thickness of the laser sintered tracks measured by AFM after scanning by laser at 0.5 W, 0.6 W, and 0.7 W. The thickness of the film before sintering is also measured as reference.

FIG. 9A is an optical image of the laser sintered track of the thick film (Power: 0.7 W, Scanning speed: 0.1 mm/s, film thickness: ~2.2 μm.

FIG. 9B is an optical image of the furnace treated thick film.

FIG. 10 is a chart illustrating the thickness of the laser sintered thick tracks by AFM after scanning by laser at 0.5 W and 0.7 W. The thickness of the films before sintering (~2.2 μm) is also measured as reference.

FIG. 11A is a schematic of the 1D heat conduction model.

FIG. 11B includes plots of the temperature values along the x axis from 0 to 1 s of the 1D heat conduction model calculated by the analytical equation and the FEM model.

FIG. 12A is an optical image of the top view of the laser sintered silica track (Power: 0.7 W, Scanning speed: 0.1 mm/s).

FIG. 12B is a chart of the thickness profile of the cross section of the laser sintered track obtained by AFM.

FIG. 12C illustrates the temperature profile of the silica substrate at 50 s during laser scanning calculated with thermal conductivity (k)=2.1 W/(mK). Laser power: 0.7 W, Scanning speed: 0.1 mm/s.

FIG. 12D illustrates the temperature profile of the silica substrate at 50 s during laser scanning calculated with thermal conductivity (k)=1.38 W/(mK). Laser power: 0.7 W, Scanning speed: 0.1 mm/s.

FIG. 13A is a photograph of the silica film in a tiger paw sintered by 2D laser scanning.

FIG. 13B is an optical image of the sintered silica film pattern at the scratch.

FIGS. 16A and 16B are top views at 1 mm/s and 3.5 mm/s, respectively. FIGS. 16C and 16D are cross section views at 1 mm/s and 3.5 mm/s, respectively.

FIGS. 18A and 18B are zoomed-in SEM images of the surface of the laser processed alumina layers at the line spacing of 0.2 mm (Scanning speed: 1 mm/s, Laser power: 10 W).

FIGS. 19A-19C includes SEM images of the fracture surface of the cross section of the laser processed alumina squares scanned with a scanning speed of 1 mm/s. FIG. 19A illustrates two-layer structures after laser scanning. FIG. 19B illustrates a zoom-in image of the top layer. FIG. 19C illustrates a zoom-in image of the bottom layer. (Laser output power: 10 W).

FIG. 22A is a digital image of the laser melted fused silica layer.

FIGS. 22B-22D are SEM images of the surface, the cross section, and a zoom-in of the cross section of the laser melted fused silica layer (Laser power: 15 W, spot size: 2 mm, Line-spacing: 0.5 mm, Scanning speed: 1 mm/s).

FIG. 23 is a graph of the specific volume of materials vs. temperature for glass and crystalline solid, respectively.

FIGS. 27A and 27C are optical images of the surface of the laser sintered Er-doped silica thin film samples with original thicknesses of ~0.9 μm and ~3 μm, respectively.

FIGS. 27B and 27D are SEM micrograph high magnification images of FIGS. 27A and 27C, respectively.

FIGS. 28A and 28B are graphs showing the thickness of the thin films measured by AFM after 7 W laser scanning with speed of 1 mm/s and with original thicknesses of ~914 nm and ~3080 nm, respectively.

FIG. 29A is low magnification before sintering; FIG. 29B is a high magnification image of the coating before sintering; FIG. 29C is low magnification after sintering; FIG. 29D is a high magnification image of the coating after laser sintering; FIG. 29E is a high magnification image of the substrate; FIG. 29F is a high magnification image of the furnace sintered coating.

FIGS. 30A and 30B are optical microscopy images of the laser sintered film after treated in a furnace at 1100° C. for 1 hour and film thermally treated in furnace at 1100° C. for 1 hour, respectively.

FIGS. 31A-31C are simulation schematics of the stress distribution models before sintering, furnace sintered, and laser sintered, respectively.

FIGS. 33A-33C are a schematic of the process flow of laser 3D printing fused silica glass.

FIG. 34 includes pictures of the fused silica glass with different 3D structures obtained from the newly developed 3D printing technology.

FIG. 37A show the ps laser microchannel fabrication; FIG. 37B shows the on-demand slurry dispensing; FIG. 37C shows the CO2 laser sealing.

FIGS. 38A and 38B are optical microscope images of the cross section of the ps laser machined two-step microchannel and the top view of the microchannel embedded with an optical fiber, respectively.

FIG. 39 illustrates a spectrum of the embedded optical fiber IFPI sensor before and after CO2 laser sealing.

FIG. 40A is a top view of the sensor embedded microchannel after CO2 laser sealing and FIG. 40B is a zoom-in image of FIG. 40A.

FIG. 40C is a cross section of the sensor embedded part after $CO_2$ laser sealing and FIG. 40D is a zoom-in image of FIG. 40C.

FIG. 41A illustrates transmission spectra of the embedded optical fibers heating from room temperature to 800° C. without CO2 laser sealing. The inset illustrates the cross section optical microscope image of the part without laser sealing after tested to 800° C. (scale bar: 125 μm).

FIG. 41B illustrates transmission spectra of the embedded optical fibers heating from room temperature to 800° C. with CO2 laser sealing.

FIG. 42A illustrates the temperature response of the embedded optical fiber IFPI sensors without co-embedded dummy fiber.

FIG. 42B illustrates the temperature response of the dummy fiber co-embedded component in the heating and cooling process, respectively. The inset is a cross section optical microscope image of the dummy fiber co-embedded component (scale bar: 125 μm).

FIG. 45B illustrates a crack-free CO2 laser sintered SiC tiger paw. FIG. 45C illustrates SiC micro-waves.

FIG. 46 is a graph illustrating the high thermal conductivity of ZrB2 at high temperatures. This material may be used as an additive to tune the local thermal conductivity of the SiC microdomains.

FIG. 47A is a graph illustrating the adjustment of the alumina slurry composition to control the viscosity of the paste.

FIG. 47B is an SEM micrograph of $Al_2O_3$ woodpile lattice structure after sintering at 1600° C. to a relative density of above 95%. By taking advantage of $CO_2$ laser instant drying, overhanging filaments were extruded without warping or sagging.

FIG. 47C is an SEM micrograph of the cross-section of a filament after firing, showing a high relative density.

FIG. 48A is a graph illustrating that cutting depth for each 60-repeats increases with laser power.

FIG. 48B illustrates a sinuous microchannel fabricated using a laser power of 40 μJ showing damage due to excessive laser power.

FIGS. 48C and 48D illustrate cross section of the printed glass showing microstructure control with ps laser micromachining.

FIGS. 49A and 49B illustrate that the geometry of the microchannels can be well preserved during sintering. FIG. 49A illustrates the microchannel fabricated in an extruded green body. FIG. 49B illustrates the green body of alumina sintered to greater than 95% relative density. The geometry of the microchannel was almost identical before and after sintering.

FIG. 50A is a schematic of the pressure sensor.

FIG. 50B is a schematic diagram of the process flow for one single printing layer. Glass paste is extruded following the extrusion trace and then CO2 laser irradiating going through the CO2 laser trace will be conducted for paster meting and fusing.

FIG. 50C is a 3D model for the fiber housing structure.

FIG. 59A is an optical microscope image of the cross section of the ps laser-machined two-step microchannel.

FIG. 59B is an optical microscope image of the top view of the microchannel embedded with an optical fiber.

FIG. 60A is a graph showing the spectra of the embedded optical fiber IFPI sensor before and after CO2 laser melting at the laser power of 8 W, 9 W, and 10 W.

FIG. 60B is a graph showing the cavity length variation of the embedded IFPI sensor during the laser sealing process at 8 W and 9 W.

FIG. 61A is an SEM image of the top view of the sensor-embedded microchannel after $CO_2$ laser sealing.

FIG. 61B is an SEM image showing a zoom-in image of FIG. 61A.

FIG. 61C is an SEM image of the cross section of the sensor-embedded part after $CO_2$ laser sealing.

FIG. 61D is an SEM image showing a zoom-in image of FIG. 61C.

FIG. 62A is a graph showing the transmission spectra of the embedded optical fibers heating from room temperature to 800° C. without $CO_2$ laser sealing. The inset is a cross section optical microscope image of the part without laser sealing after testing to 800° C. (scale bar: 125 μm).

FIG. 62B is a graph showing the transmission spectra of the embedded optical fibers heating from room temperature to 800° C. with $CO_2$ laser sealing.

FIG. 64C is a graph showing the high temperature stability of the embedded IFPI sensor in the dummy fiber co-embedded component heated at 800° C. for 17 h.

FIG. 67A is chart showing I-V and I-P curves. FIG. 67B is a chart showing electrochemical impedance spectra. FIG. 67C is an SEM micrograph of the cell cross-section.

FIG. 70A shows a cross section of BCZYYb+1 wt % NiO electrolyte film. FIG. 70B shows a cross section of BZY20+1 wt % NiO electrolyte film. FIG. 70C shows a cross section of LSC interconnect film. FIG. 70D shows a cross section of BCF composite film.

FIG. 71A is a cross section of 40 wt % BCZYYb+60 wt % NiO $H_2$ electrode film. FIG. 71B is a cross section of BCZY63 $O_2$ electrode scaffold film. FIG. 71C is a cross section of BCFZY0.1 $O_2$ electrode film.

FIGS. 72A and 72B are an SEM image and an optical photo of BCZYYb+1 wt % NiO|40 wt % BCZYYb+60 wt % NiO|BCZYYb+1 wt % NiO half-cells, respectively.

FIG. 73 is a graph showing the conductivity of the BCZYYb electrolyte obtained by the RLRS method measured in the single cell operation under open-circuit voltage condition (air/$H_2$ without humidification).

FIG. 74A illustrates sample appearance depending on laser power and scanning speed, and processing window for the RLRS of $La_{0.8}Sr_{0.2}CrO_{3-\delta}$ on MgO proposed by taking XRD patterns of the samples.

FIGS. 74B and 74C illustrate XRD patterns of the samples generated at 87 W, 92 W, and 0.10 mm/s (FIG. 74B) and 70 W and 0.10 mm/s (FIG. 74C). Laser scanning was conducted from right to left of each pellet. XRD patterns were taken only for the color-changed regions of the pellets.

FIGS. 75A and 75B illustrate samples appearance after RLRS of $La_{0.8}Sr_{0.2}CrO_{3-\delta}$ on MgO bars at 100 W and 0.10 mm/s (FIG. 75A) and 87 W and 0.10 mm/s (FIG. 75B).

FIG. 75C illustrates XRD patterns of RLRS-derived $La_{0.8}Sr_{0.2}CrO_{3-\delta}$ films prepared at 100 W and 103 W (at 0.10 mm/s). Ag is the current corrector.

FIGS. 76A-76E are surface SEM images of the $La_{0.8}Sr_{0.2}CrO_{3-\delta}$ on MgO bars at 98 W and 0.10 mm/s (FIG. 76A), 100 W and 0.10 mm/s (FIG. 76B), 103 W and 0.10 mm/s (FIG. 76C), 103 W and 0.08 mm/s (FIG. 76D), and 103 W and 0.07 mm/s (FIG. 76E).

FIG. 77A illustrates the geometrical relation between laser scanning and SEM observation directions.

FIG. 77B is a chart showing location dependence of relative density.

FIG. 77C is a schematic contour diagram of the relative density distribution.

FIGS. 78A and 78B are SEM images and EDS mapping of the $La_{0.8}Sr_{0.2}CrO_{3-\delta}$ on MgO bars after RLRS at 103 W and 0.08 mm/s (FIG. 78A) and 103 W and 0.07 mm/s (FIG. 78B).

FIGS. 79A-79C are plots showing conductivity (FIG. 79A), activation energy (FIG. 79B), and ASR at 600° C. of RLRS-derived $La_{0.8}Sr_{0.2}CrO_{3-\delta}$ films prepared at a power, p (W), and a speed, s (mm/s). ASR of furnace-sintered $La_{0.8}Sr_{0.2}CrO_{3-\delta}$ are also shown for comparison.

FIG. 80A is a schematic illustrating a laser sintering apparatus.

FIG. 80B is a chart showing the relation between power percentage and actual laser power.

FIG. 81 illustrates the configuration of four-probe measurement.

FIG. 82 is a schematic illustration of an example design of highly compacted SOEC stacks.

FIGS. 83A-83F illustrate the manufacturing operation functions the I-AMPL system can do starting from printable pastes: Ball-milled precursor powder (FIG. 83A), preparation of paste (FIG. 83B), 3D printing based on microextrusion (FIG. 83C), rapid laser drying during 3D printing (FIG. 83D), rapid laser machining during 3D printing (FIG. 83E), and rapid laser sintering of green parts (FIG. 83F).

FIG. 84 is a chart illustrating viscosity vs. shear rate for 40 wt % BZY20+60 wt % NiO anode precursor pastes prepared by adding different amounts of binder (HPMC).

FIGS. 85A-85F illustrate the effect of paste viscosity on the 3D printing performance. FIGS. 85A-85C are the photos of the 40 wt % BZY20+60 wt % NiO anode green tubes 3D printed from pastes with 1 wt %, 3 wt %, and 2 wt % of HPMC binder. FIG. 85D is the high-magnification photo of 3D printed high-quality tube shown in FIG. 85C. FIG. 85E is the photo of a 40 wt % BCZYYb+60 wt % NiO anode green film 3D printed from paste with 1 wt % HPMC binder. FIG. 85F is the SEM image of this film's cross-section.

FIGS. 86A-86H illustrate 40 wt % BZY20+60 wt % NiO anode green parts prepared from direct micro-extrusion-based 3D printing. The parts include pellets (FIG. 86A), cylinders (FIG. 86B), cones (FIG. 86C), rings (FIG. 86D), straight tube with a closed bottom (FIG. 86E), straight tubes with a closed top (FIG. 86F), and CAD 3D model (FIG. 86G) and printed (FIG. 86H) lobed tube with a closed bottom.

Figures 87A, 87B, 87C, 87D, 87E, 87F, 87G, 87H, 87I:
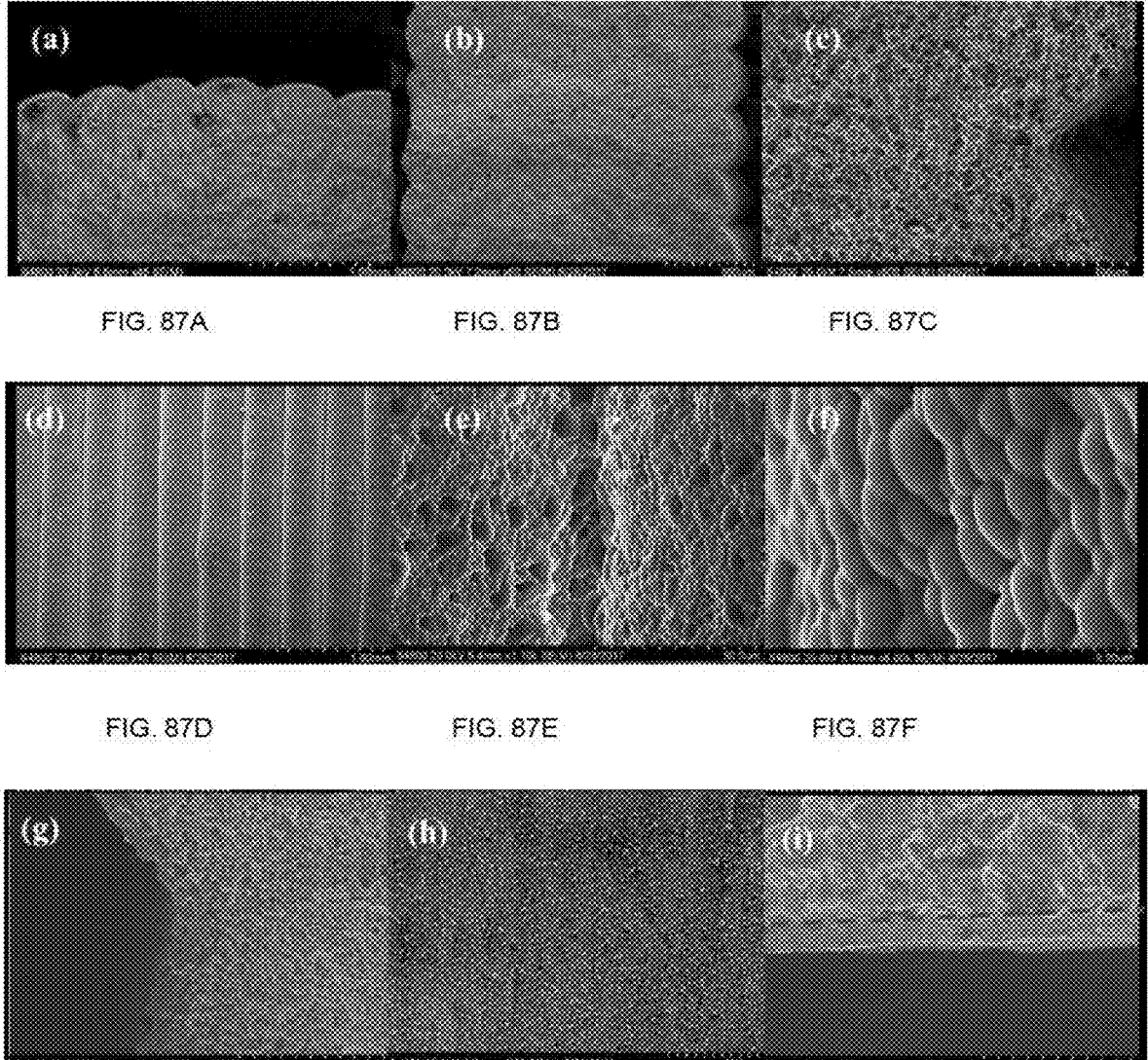

FIGS. 87A-87I illustrate the SEM characterization of green and sintered 40 wt % BZY20+60 wt % NiO tubes. FIG. 87A is cross-section of green tube, FIG. 87B is low, and FIG. 87C is high magnification images of the cross-sections of the sintered tube, FIGS. 87D-87F are the SEM images of the surface of the sintered tubes. FIG. 87G is the cross-section of half-cells coated on non-polished stage-surface, FIG. 87H is the smooth surface of the laser-polished green surface, and FIG. 87I is the cross-section of the half cell with homogenous electrolyte layer coated on the anode.

Figure 88:
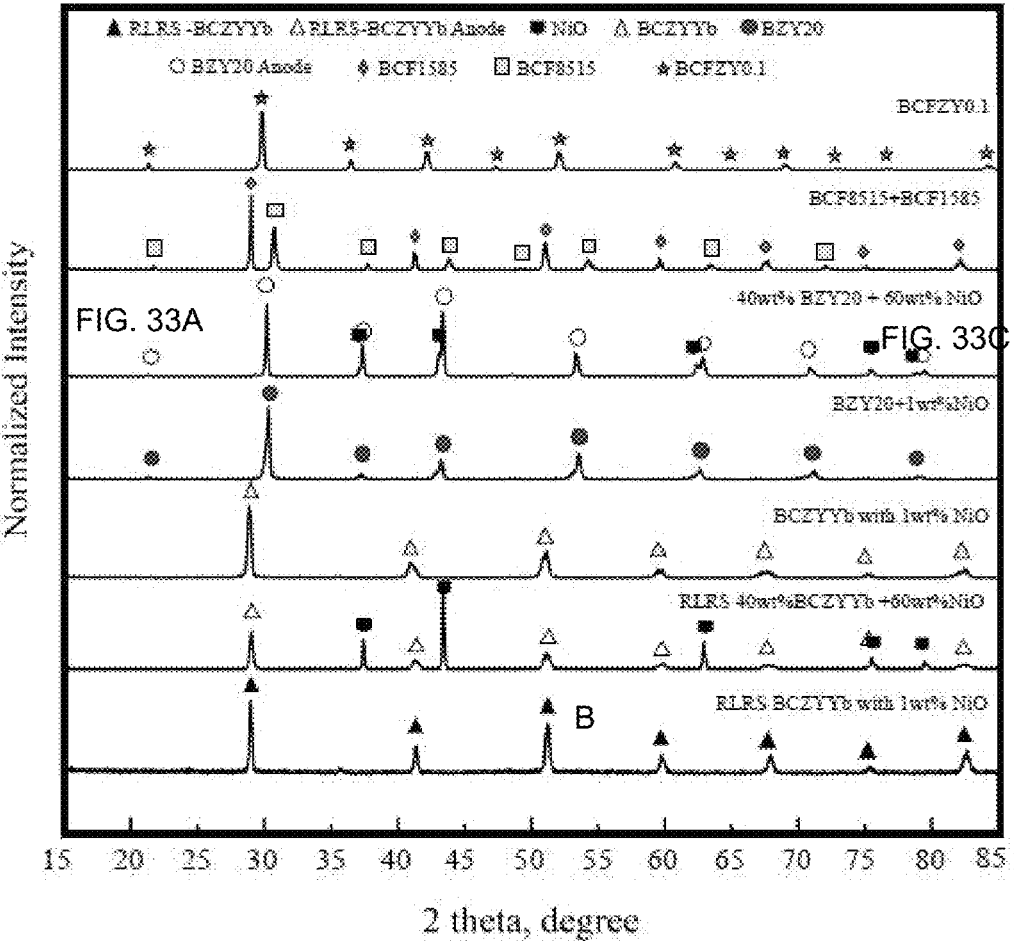

FIG. 88 is a chart showing the XRD characterization of all related materials in this work. RLRS BCZYYb with 1 wt % NiO is the rapid laser reactive sintered BCZYYb electrolyte layer from 3D printed green layer; RLRS 40 wt % BCZYYb+60 wt % NiO is the rapid laser reactive sintered BCZYYb anode layer from 3D printed green layer; BCZYYb with 1 wt % NiO is the SSRS furnace sintered BCZYYb electrolyte layer from 3D printed green layer; BZY20+1 wt % NiO is the SSRS furnace sintered BZY20 electrolyte layer from BZY20 electrolyte green layer; 40 wt % BZY20+60 wt % NiO is the SSRS furnace sintered BZY20 anode part from BZY20 3D printed green parts; BCF8515+BCF1585 is the SSRS furnace sintered BCF part from 3D printed BCF green parts; BCFZY0.1 is the SSRS furnace sintered BCFZY0.1 part from 3D printed BCFZY0.1 green parts.

FIG. 89 is a schematic of the ps laser system. The pico-second laser (Olive-1064-10, Attodyne, Inc. Toronto, Canada) with a wavelength of 1064 nm will do the 3D micro-machining. The laser beam was focused using a 5× lens. The spot size was ~18 μm at the focal point. The repetition rate of the laser was set at 10 kHz. The energy per pulse was 150 μJ at 100% output.

FIG. 90A is a cross-section view of part cut by Ps-laser with 100 Hz repetition rate, 50 mm/s cutting speed, repeat times with 1, 2, 3, 4 and 10 on each layer without z-axil feeding; FIG. 90B is a cross-section view of part cut by Ps-laser with 100 Hz repetition rate, 50 mm/s cutting speed, repeat times with 5 on each layer with different feeding distance on z-axil; FIG. 90C is a cross-section view of part cut by Ps-laser with 100 kHz repetition rate, 50 mm/s cutting speed, repeat times with 1, 2, 5 and 10 on each layer without z-axil feeding.

FIG. 91A illustrates surface morphology of part cut by Ps-laser with 10 kHz repetition rate, 50 mm/s cutting speed, 3 times cut each layer and 3 times z-axil feeding; FIG. 91B illustrates surface morphology of FIG. 91A after 1050° C. 12 hours pre-fired; FIG. 91C illustrates surface morphology of part cut by Ps-laser with 10 kHz repetition rate, 5 mm/s cutting speed, 3 times cut each layer and 3 times z-axil feeding; FIG. 91D illustrates surface morphology of FIG. 91C after 1050° C. 5 hours pre-fired.

FIGS. 92A-D illustrate green PC parts having further complex geometry fabricated by laser cutting assisted 3D printing. FIG. 92A illustrates a six-lobed 40 wt % BZY20+60 wt % NiO anode tube, in which the outer support body was taken off in half. FIG. 92B illustrates the outer support body (left), six-lobed NiO–BZY20 tube (center), and the inner support body (right). FIG. 92C illustrates BaCe0.85Fe0.15O3-δ-BaCe0.15Fe0.85O3-δ tube having six high-aspect-ratio lobes, and FIG. 92D illustrates its cross-section.

Figure 93A:
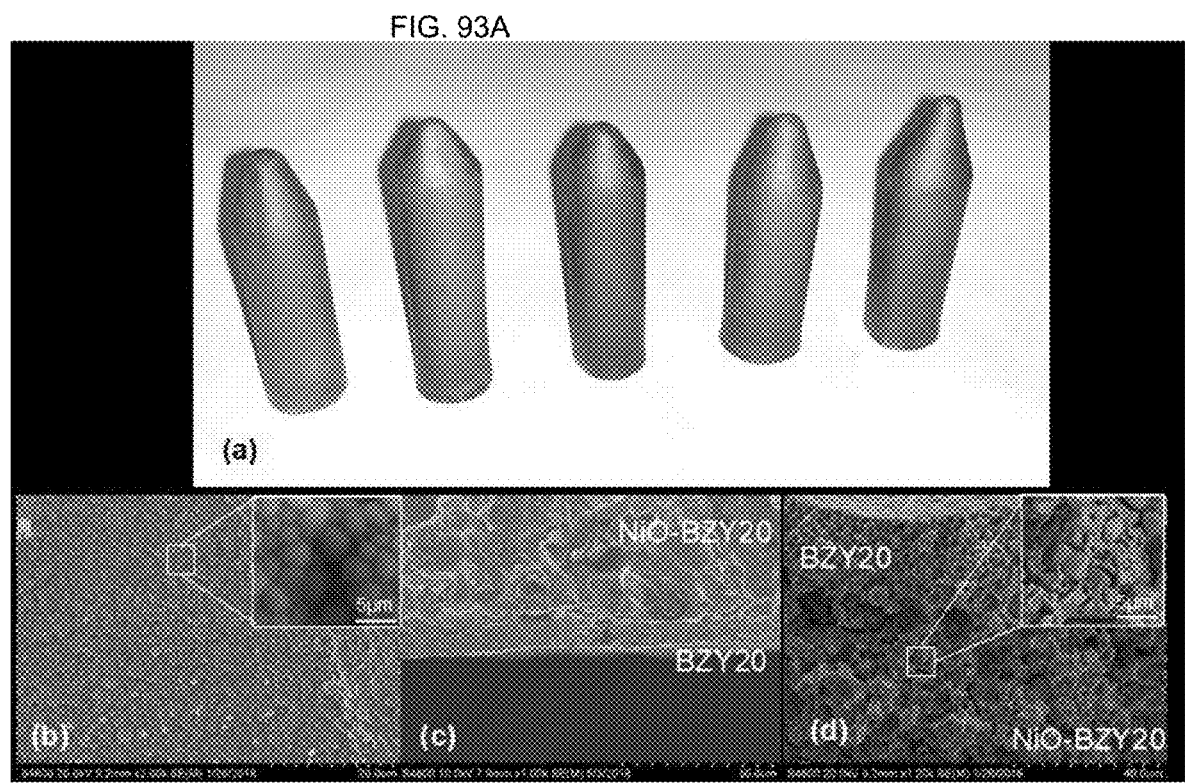

FIG. 93A illustrates the appearance of 40 wt % BZY20+60 wt % NiO|BZY20+1 wt % NiO tubular half cells, FIG. 93B illustrates their surface SEM image, FIG. 93C illustrates their cross-sectional SEM image, and FIG. 93D illustrates the cross-sectional SEM image of the reduced samples.

FIG. 94A illustrates the cross-section of the microchannels embedded in the BCFZY0.1 membrane, FIG. 94B illustrates the top view of the microchannels embedded in the BCFZY0.1 membrane, and FIG. 94C illustrates the microstructure of the microchannels embedded in the BCFZY0.1 membrane.

FIG. 95 is a schematic description of protonic ceramics. Route 1: Conventional ceramic processing method and Route 2: Rapid laser reactive processing method.

Figure 96:
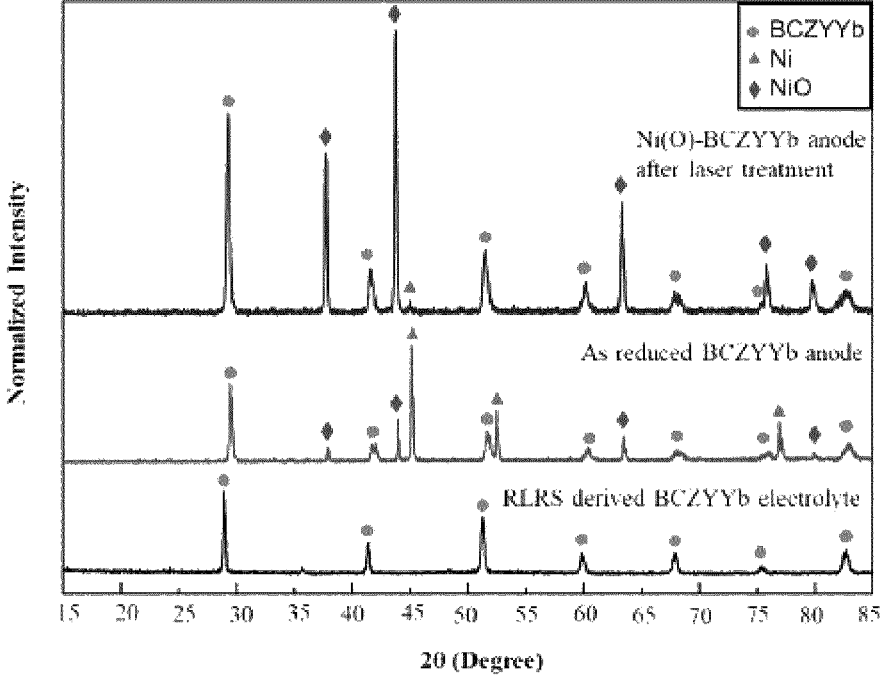

FIG. 96 is a chart illustrating XRD patterns of RLRS-derived BCZYYb+1 wt % electrolyte and the Ni(O)+BCZYYb anode substrates before (furnace-sintered) and after RLRS operation.

FIG. 97A us a photograph of RLRS-derived BCZYYb electrolyte on the Ni(O)–BCZYYb substrate; FIG. 97B is a low magnification surface SEM micrograph of RLRS-derived BCZYYb electrolyte FIG. 97C is a high magnification surface SEM micrograph of RLRS-derived BCZYYb; FIG. 97D is a high magnification cross-sectional SEM micrograph of RLRS-derived BCZYYb electrolyte; FIG. 97E is a cross-sectional SEM micrograph of RLRS-derived BCZYYb electrolyte on the Ni(O)–BCZYYb substrate.

Figures 98A, 98B, 98C:
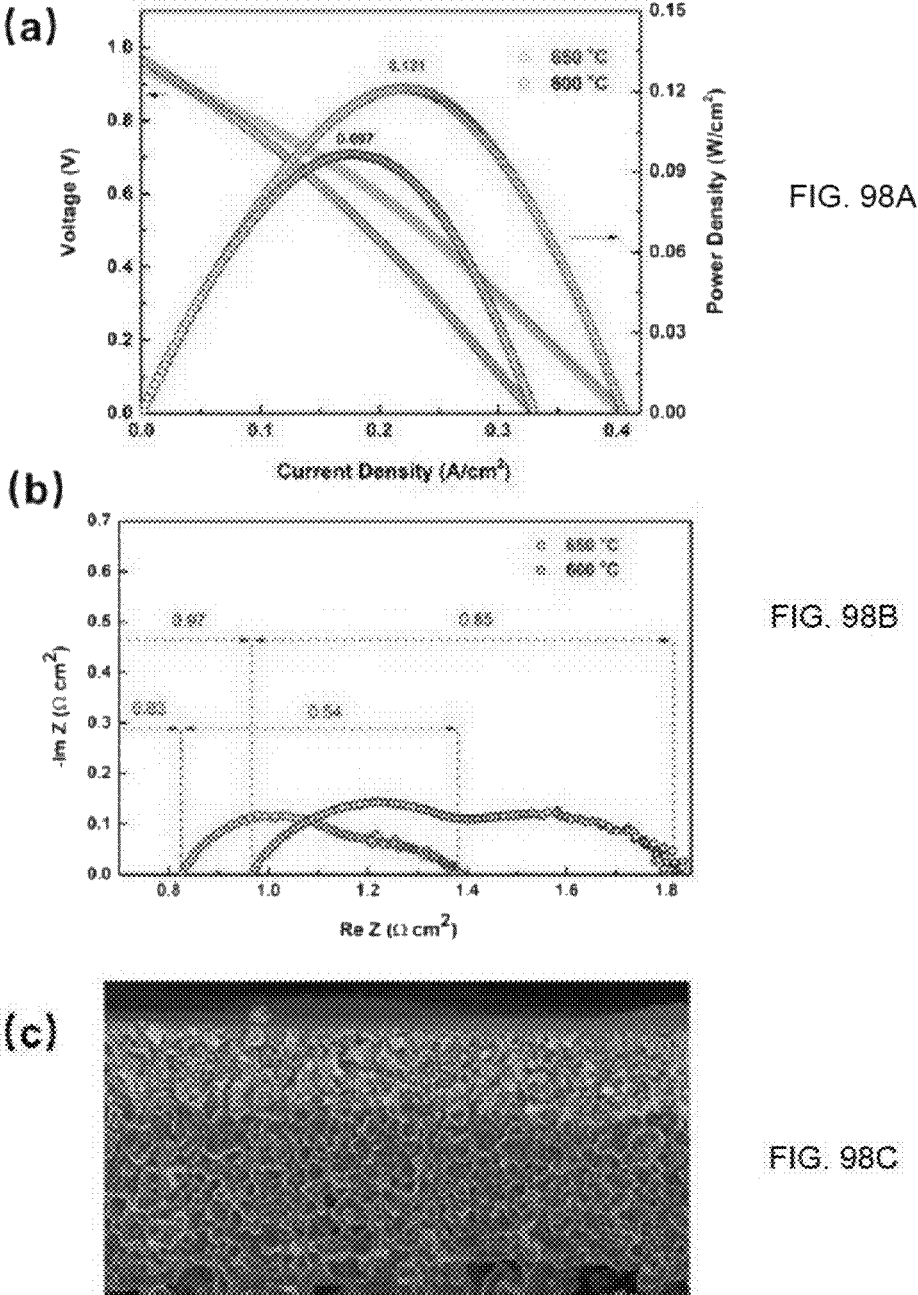

FIGS. 98A-98C are a characterization of BCFZY0.1|RLRS-BCZYYb|Ni-BCZYYb single cell. FIG. 98A is a chart showing I-V and I-P curves, FIG. 98B is a chart showing electrochemical impedance spectra, and FIG. 98C is an SEM micrograph of the cell cross-section.

Figure 99:
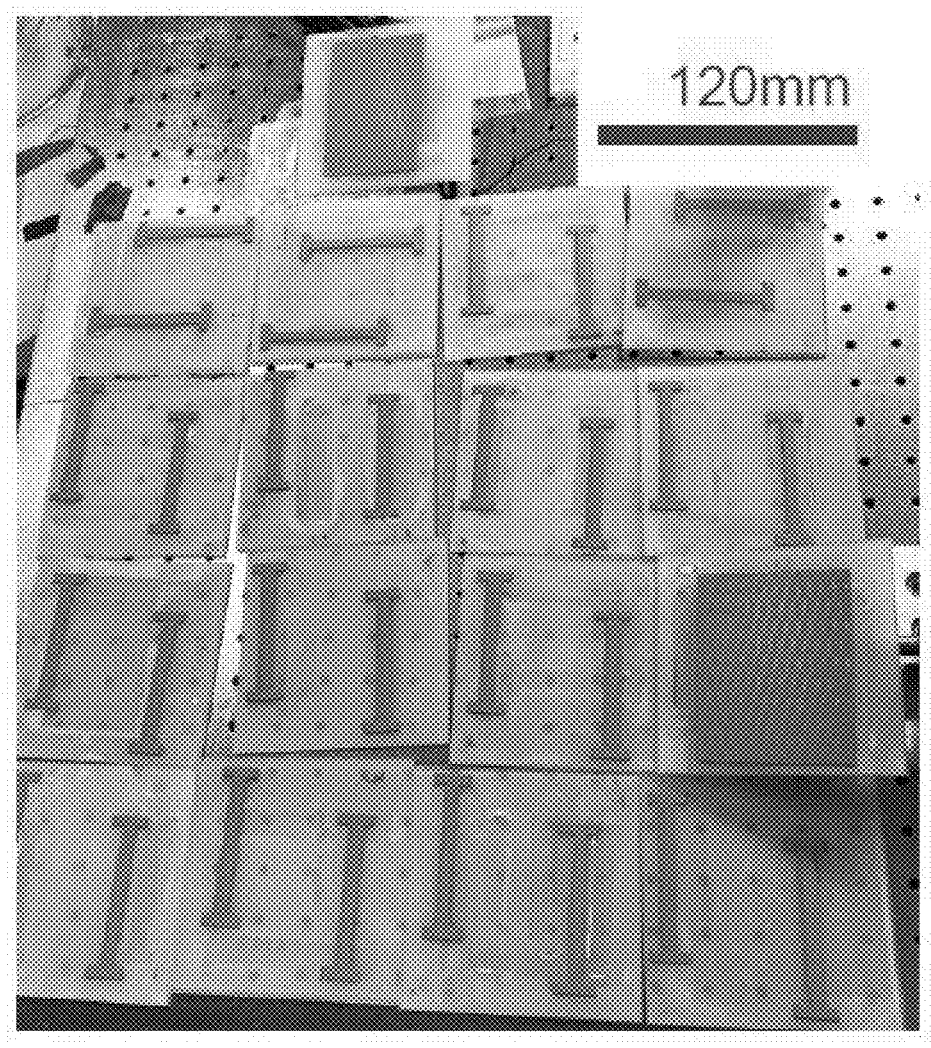

FIG. 99 illustrates 3D printed BCZYYb—NiO anode material onto fused silica with a thickness around 400 μm.

Figure 100:
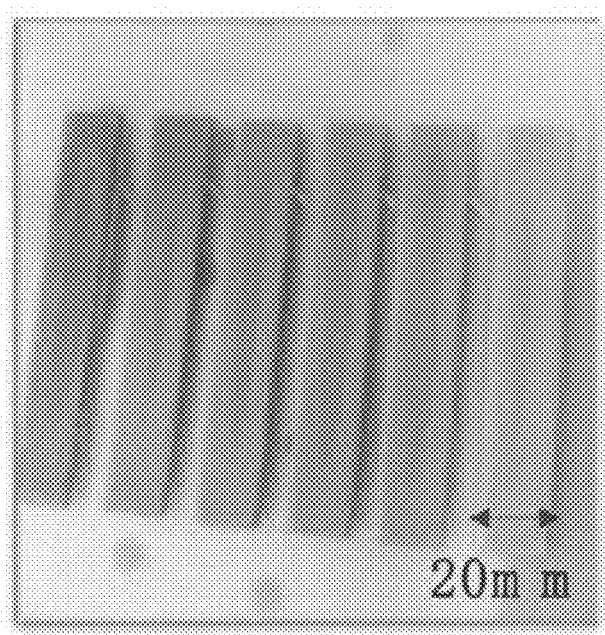

FIG. 100 illustrates gap forming due to the uniform drying condition in the in-plane directions.

Figure 101:
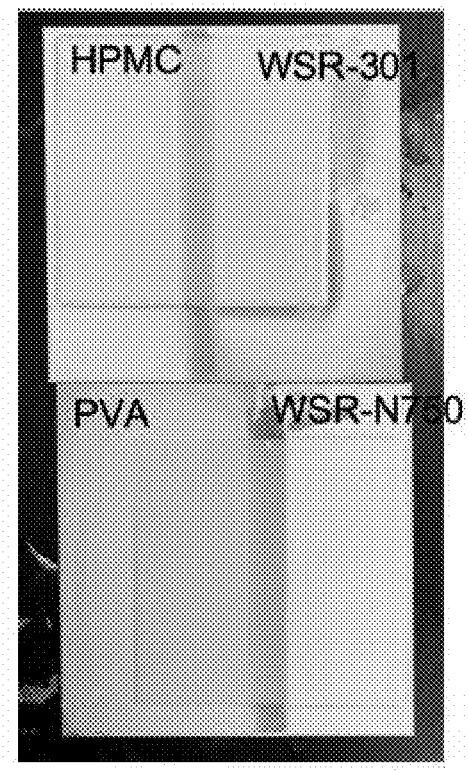

FIG. 101 illustrates the top view of the green layers with 4 BCZYYb slurry prepared by different binders after drying.

Figure 102:
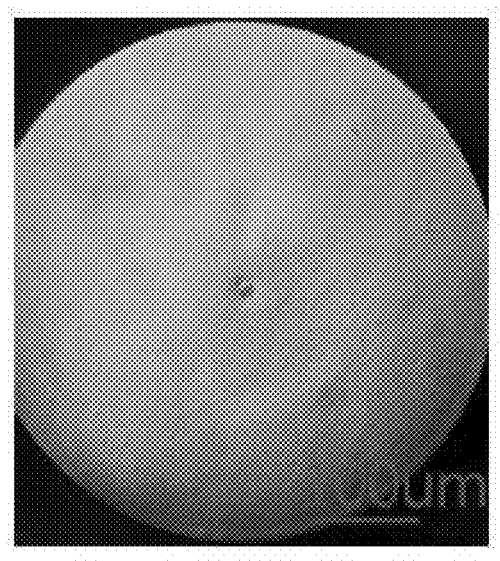

FIG. 102 illustrates surface morphology of the spray coating water-PVA system electrolyte layer with micro-crack.

Figure 103:

FIG. 103 illustrates green half-cell samples fabricated by 3D printed anode layer and spray coated electrolyte layer (acetone based recipe).

Figure 104:

FIG. 104 illustrates RLRS of green half-cell into desired crystal and microstructure half-cell by one-step co-sintering.

Figure 105:
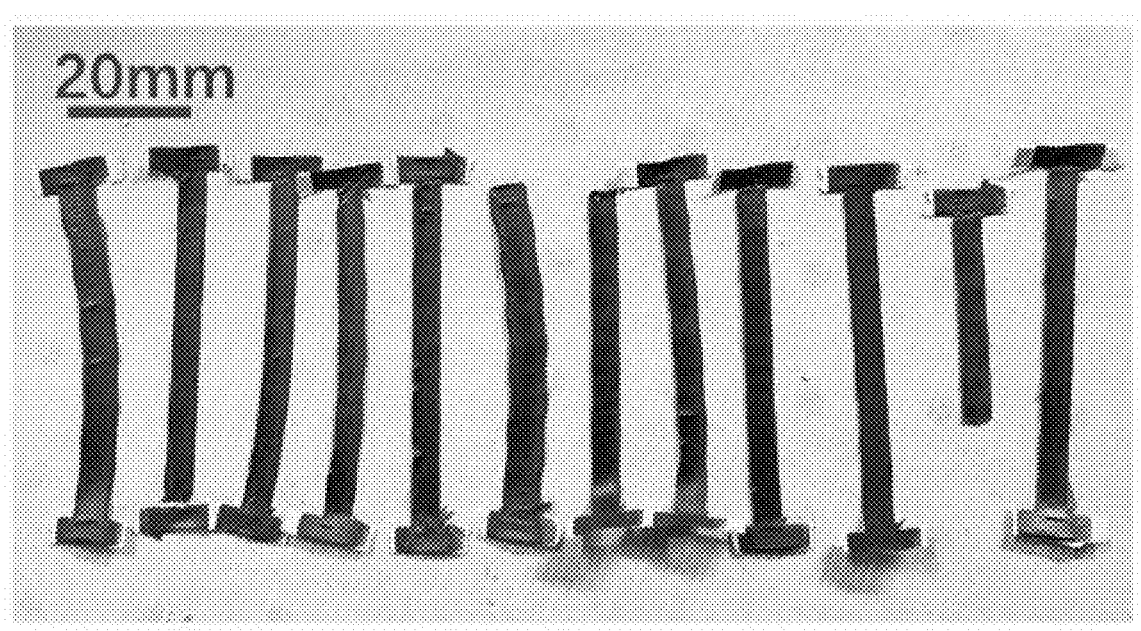

FIG. 105 illustrates RLRS one-step fabricated 40 wt % BCZYYb 60 wt % NiO|BCZYYb+1 wt % NiO half-cells.

FIG. 106 illustrates the cut button half-cell for easier performance measurement.

FIGS. 107A-107D illustrate the microstructure of one-step fabricated 40 wt % BCZYYb 60 wt % NiO|BCZYYb+1 wt % NiO half-cells. FIG. 107A is a cross-section view of the cell, with a porous anode and dense electrolyte; FIG. 107B is a scaled looked into the cross-section of the electrolyte; FIG. 107C is a detailed look of the top surface of the fabricated cell (electrolyte); FIG. 107D is a general view of the top surface, no micro-crack showed up.

Figure 108:
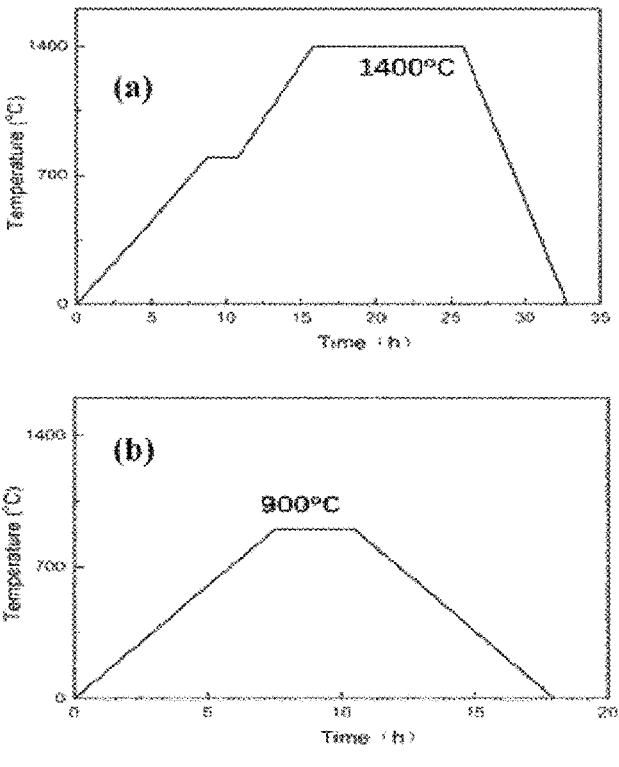

FIG. 108 illustrate the temperature programs for the fabrication of PCFC single cells using conventional furnace sintering methods. FIG. 108A is for co-firing anode supported electrolyte half-cells and FIG. 108B is for annealing cathode layer.

Figure 109:
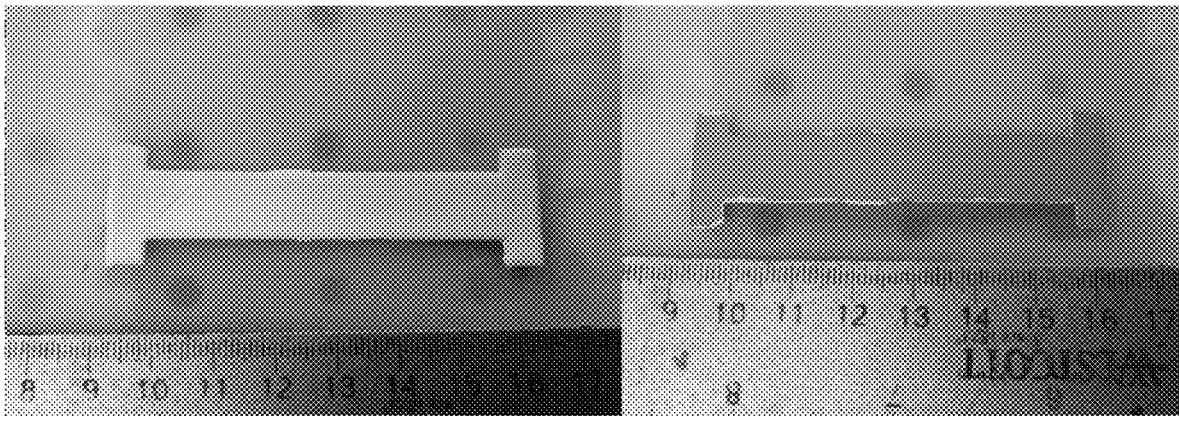

FIG. 109 illustrates free-standing green half-cell sample for furnace sintering as a compression.

Figures 110A, 110B, 110C, 110D:
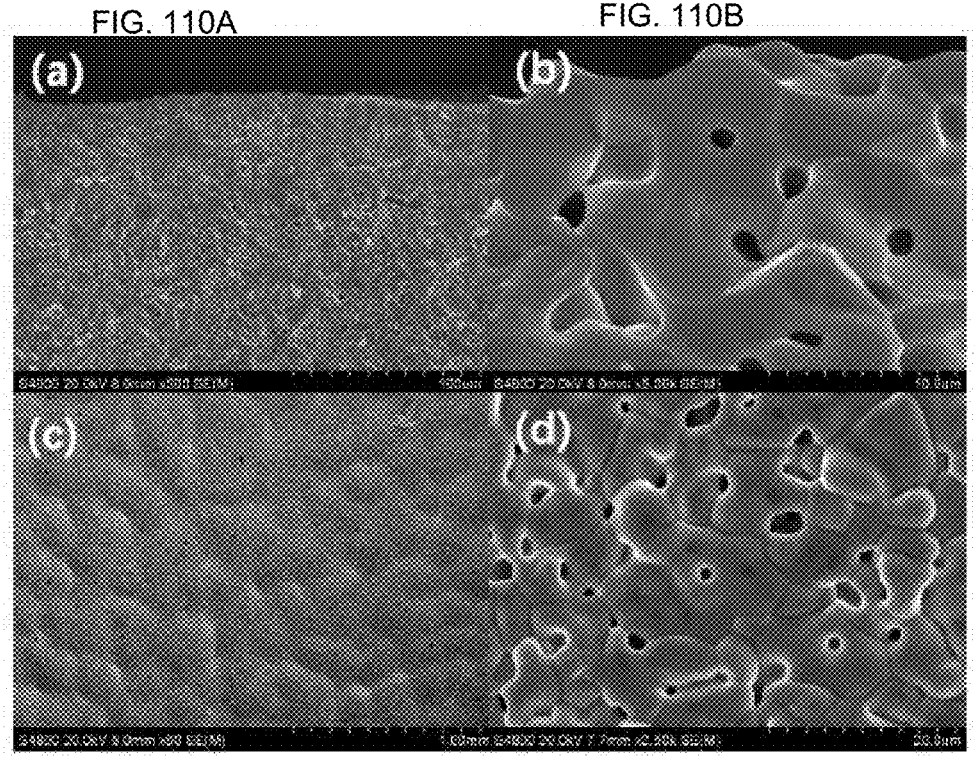

FIGS. 110A-110D illustrate the microstructure of conventional furnace sintered 40 wt % BCZYYb 60 wt % NiO|BCZYYb+1 wt % NiO half-cells. FIG. 110A is a cross-section view of the cell, with a porous anode and dense electrolyte; FIG. 110B is a scaled look into the cross-section of the electrolyte; FIG. 110C is a general view of the top surface, electrolyte layer;

FIG. 110D is a detailed look of the top surface of the fabricated cell (electrolyte).

FIG. 111 is a photograph of the 3 times RLRS of green half-cell.

Figure 112:
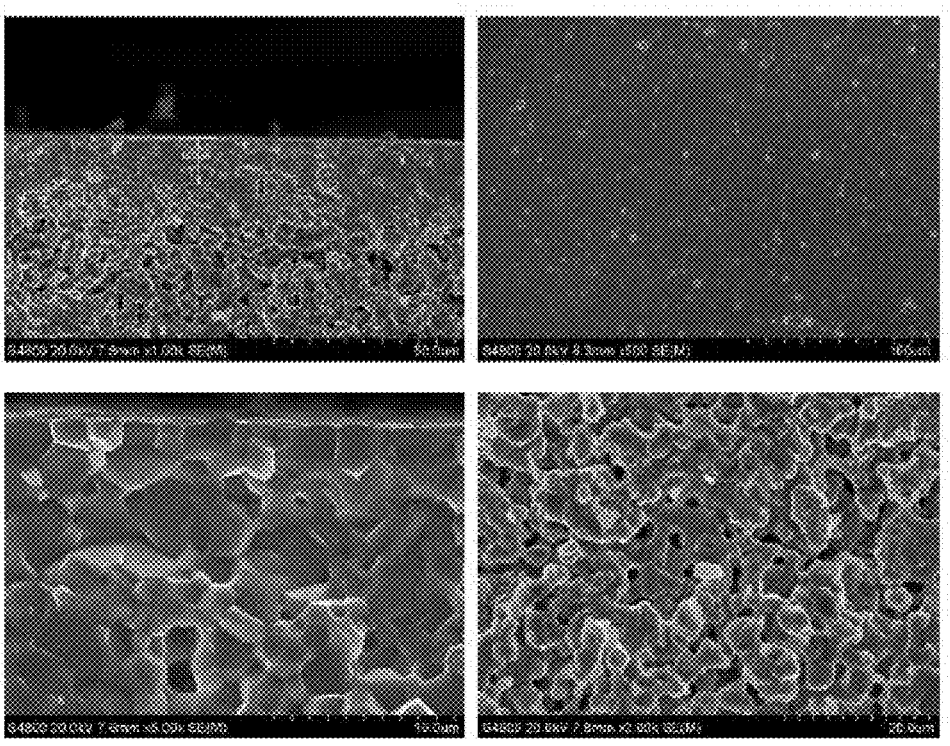

FIG. 112 includes SEM results of the multi-time RLRS treatment on the half-cell.

Figure 113:
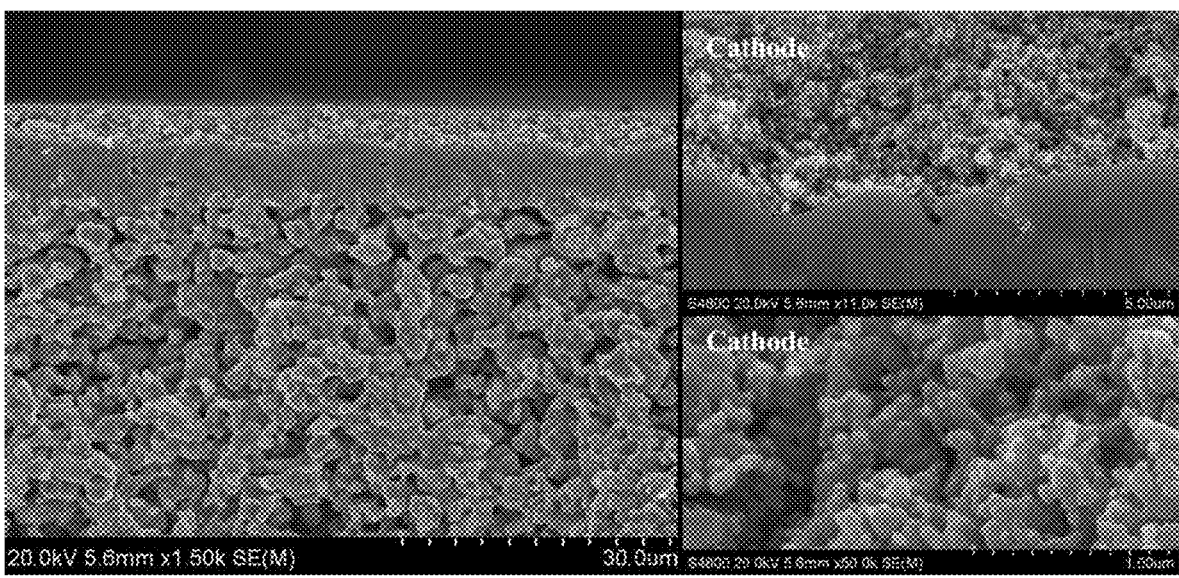

FIG. 113 illustrates fabricated single cell microstructure in cross-section view before performance measurement.

Figure 114:
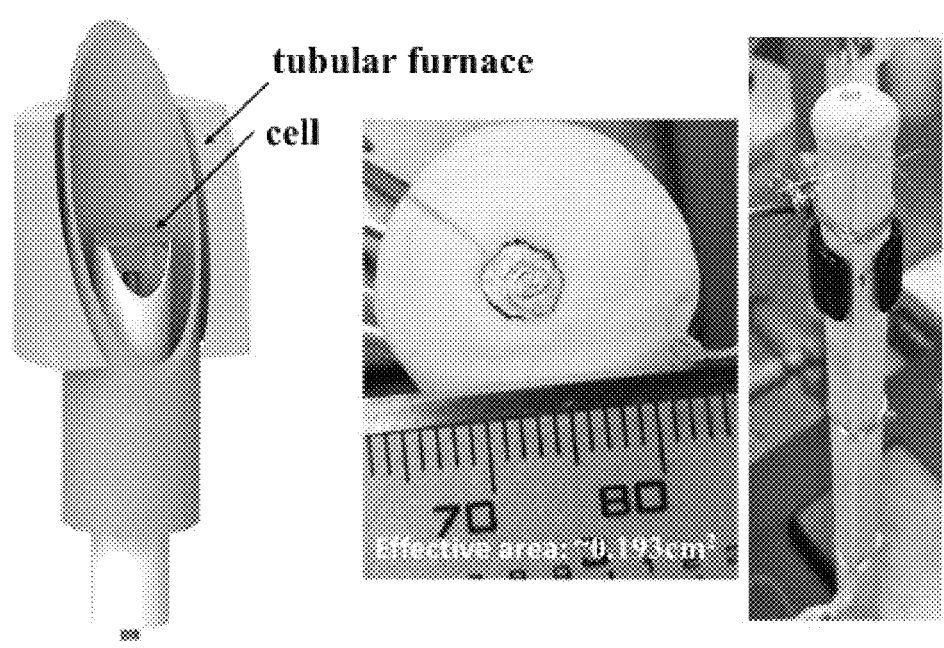

FIG. 114 illustrates a self-designed cell test station in general and top views.

Figure 115:
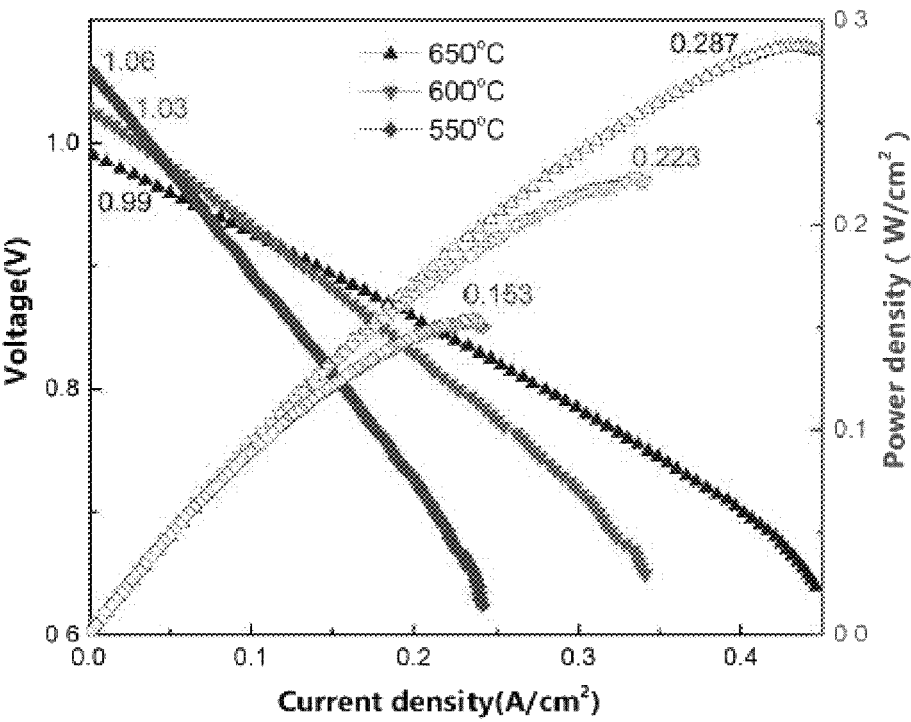

FIG. 115 is a chart including the C-V curve of the one-step RLRS half-cell with cathode deposited single cell under different temperatures.

FIG. 116 is a chart including the EIS of the one-step RLRS half-cell with cathode deposited single cells under different temperatures.

FIG. 117 includes the long-term stability test results of the one-step RLRS half-cell with cathode deposited single cell under 600° C.

Figure 118:
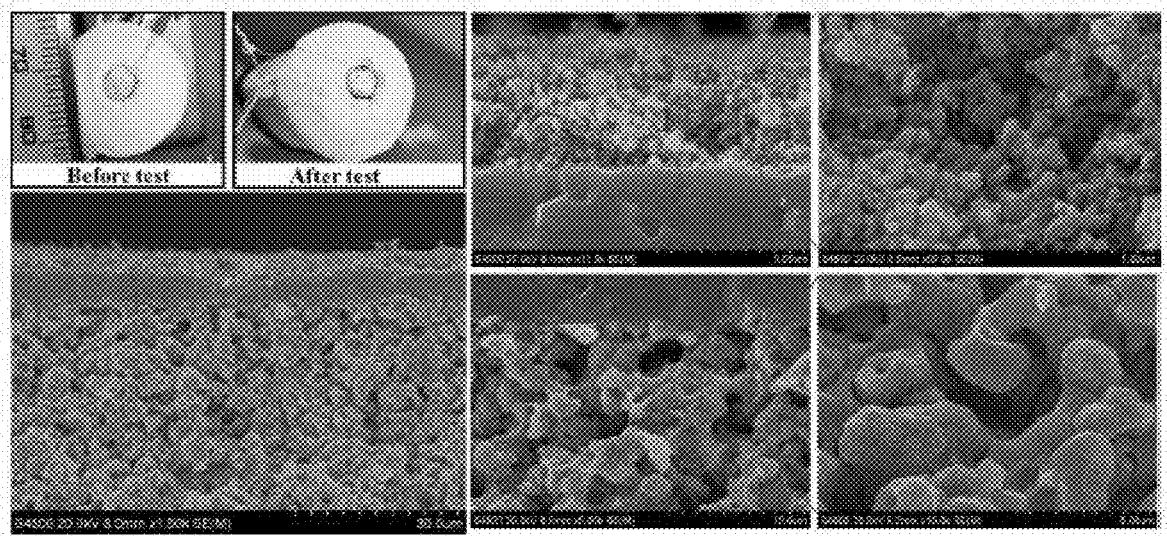

FIG. 118 illustrates the single cell microstructures in cross-section view after performance tests.

Figure 119:
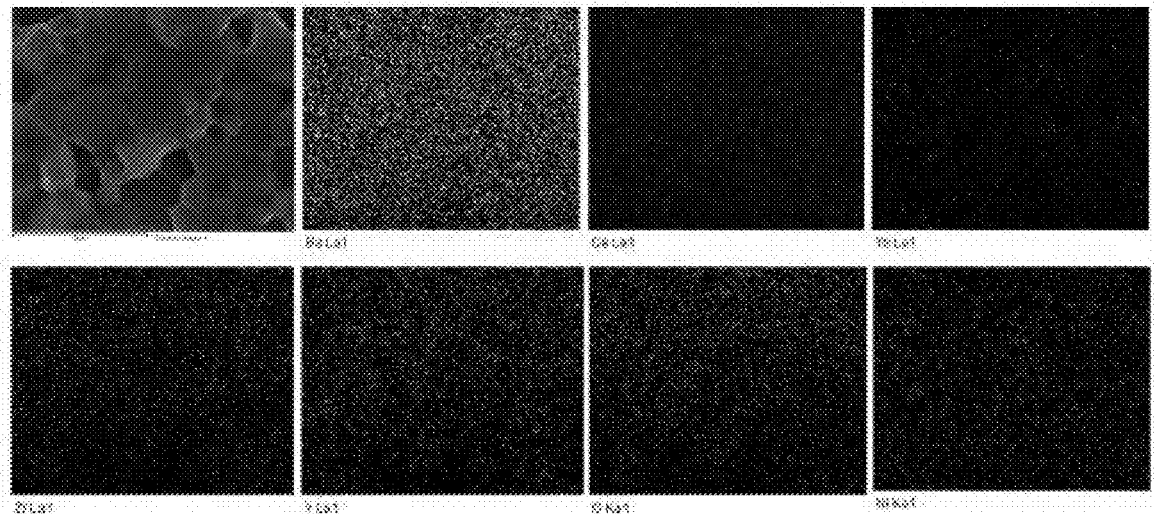

FIG. 119 includes the EDS results of the RLRS half-cell electrolyte layer.

Figure 120:
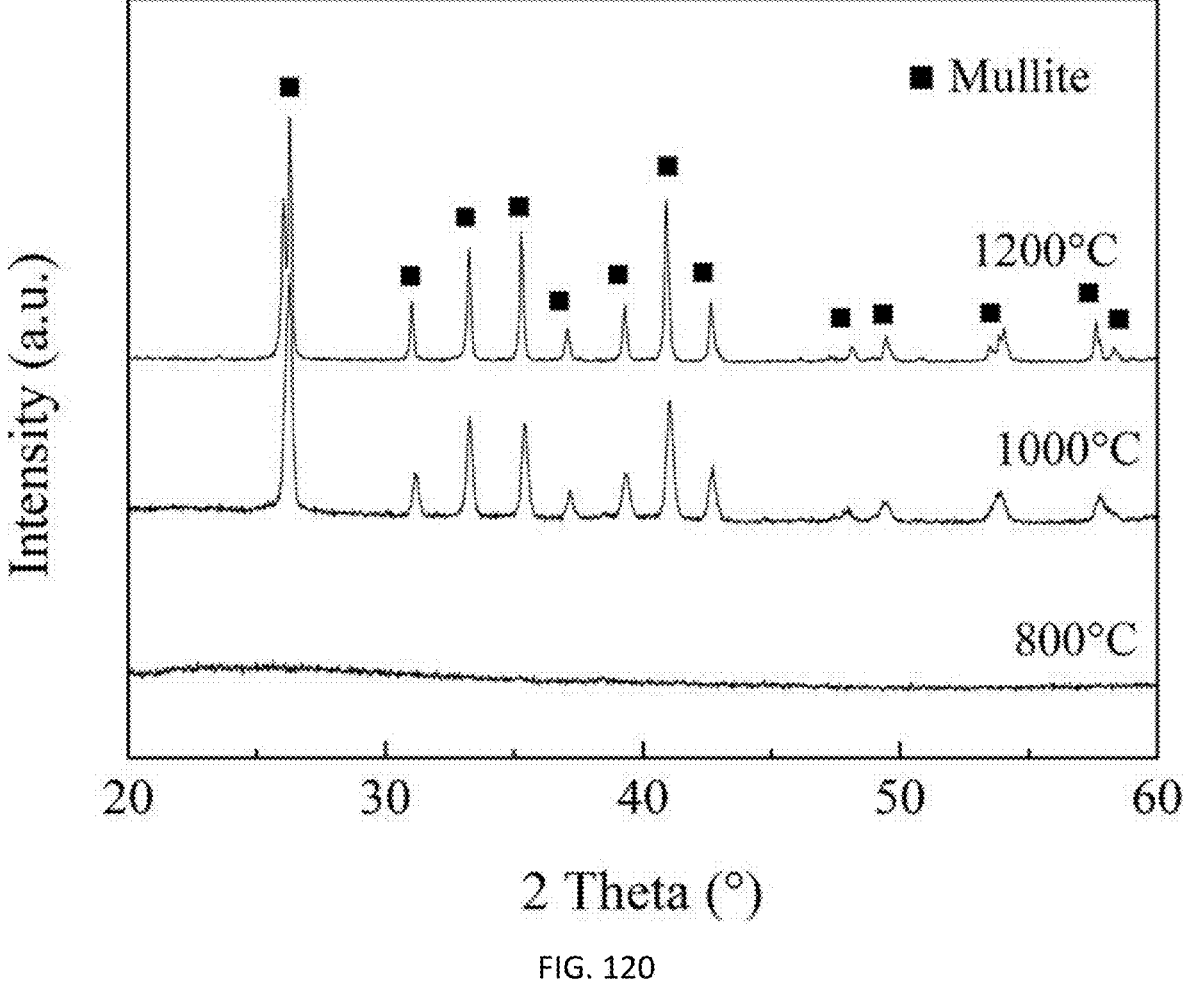

FIG. 120 is a chart showing the XRD traces of mullite powder calcined under 800, 1000, and 1200° C. for 2 h.

Figure 121:
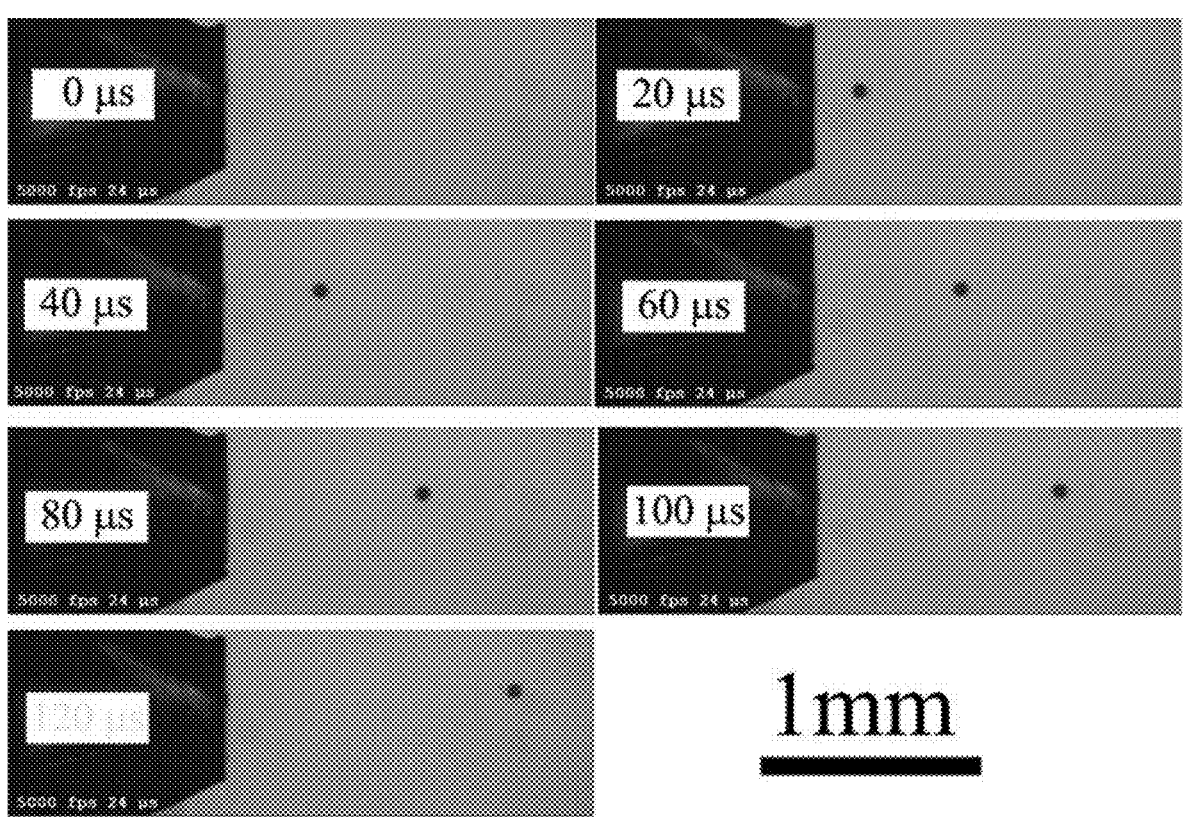

FIG. 121 includes a series of images taken by a high-speed camera during printing.

Figures 122A, 122B, 122C, 122D:
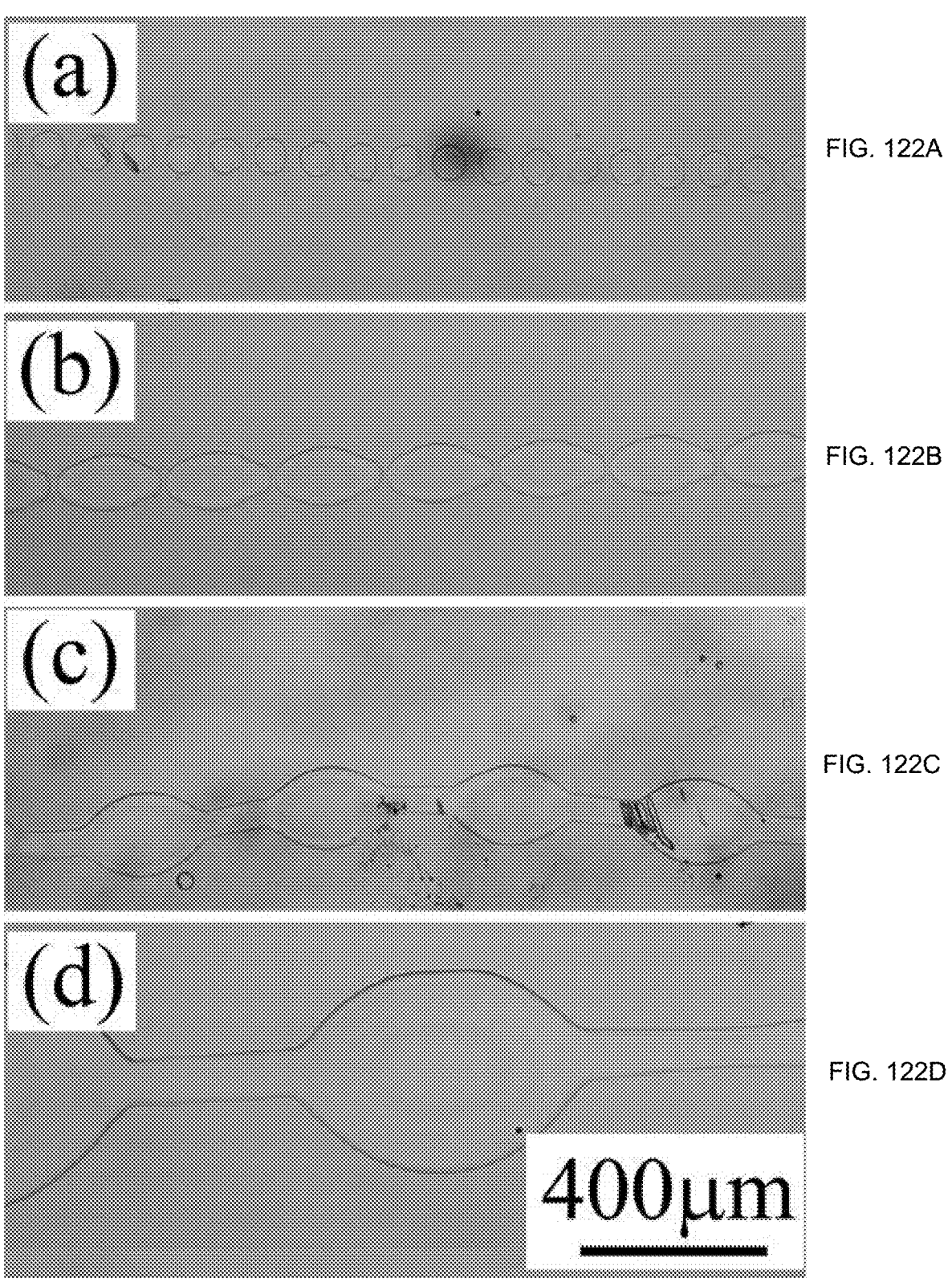

FIGS. 122A-D illustrate the effect of drop spacing on the microstructure of printed lines. The optical micrographs of printed lines after drying on the as-received substrates using the 30PVP ink printed with decreasing drop spacing (p). The drop spacings were: p=100 μm (FIG. 122A), p=50 μm (FIG. 122B), p=25 μm (FIG. 122C), and p=5 μm (FIG. 122D).

Figures 123A, 123B, 123C, 123D:
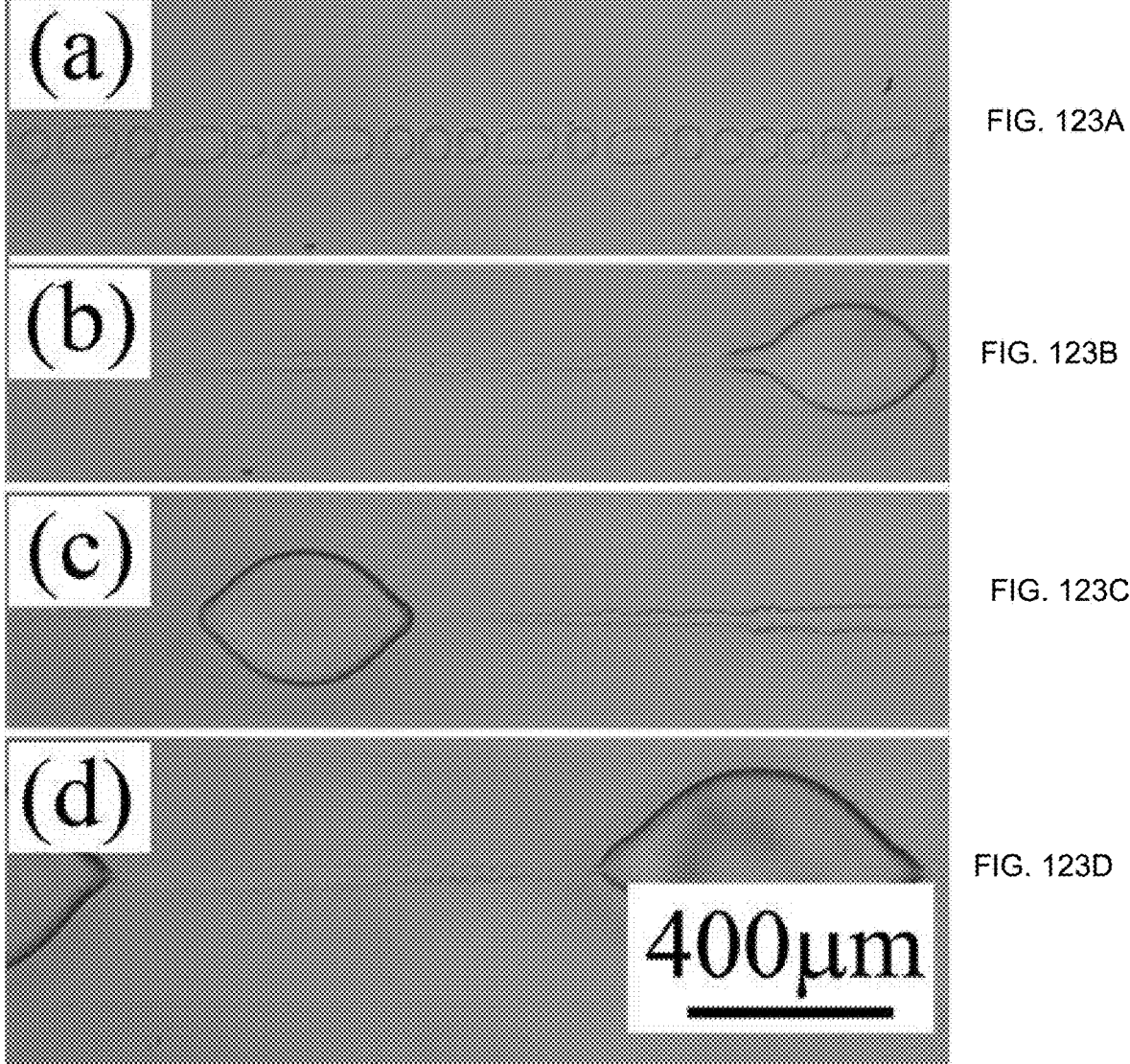

FIGS. 123A-123D illustrate the effect of drop spacing on the printed lines. The optical micrographs of printed lines after drying on PVB-coated substrates using the 30PVP ink printed with decreasing drop spacing (p). The drop spacings were: p=75 μm (FIG. 123A), p=50 μm (FIG. 123B), p=25 μm (FIG. 123C), and p=5 μm (FIG. 123D).

Figures 124A, 124B, 124C, 124D, 124E:
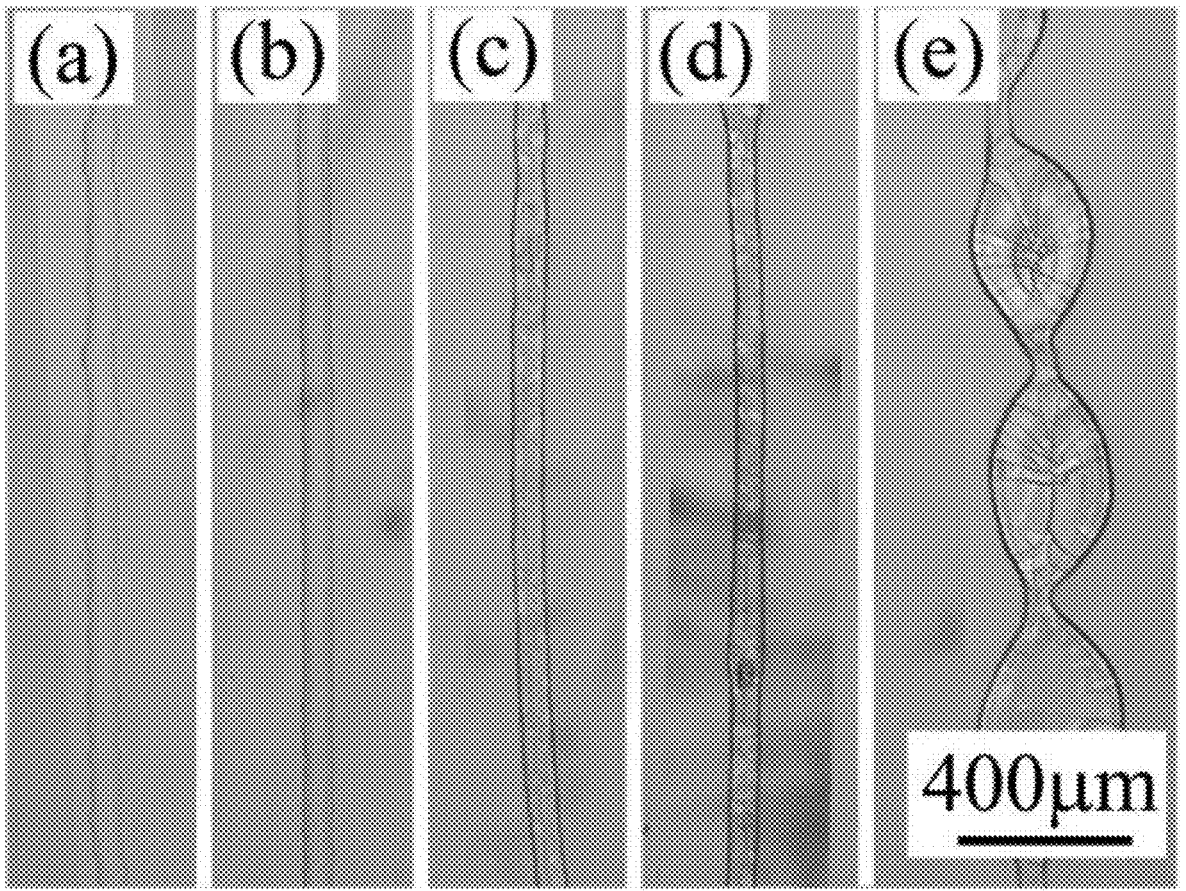

FIGS. 124A-124E illustrate the effect of drop spacing on the printed lines. The optical micrographs of printed lines after drying on hot as-received substrates (75° C.) using the 30PVP ink printed with decreasing drop spacing (p). The drop spacings were: p=75 μm (FIG. 124A), p=50 μm (FIG. 124B), p=15 μm (FIG. 124C), and p=5 μm (FIG. 124D).

Figures 125A, 125B, 125C, 125D, 125E:
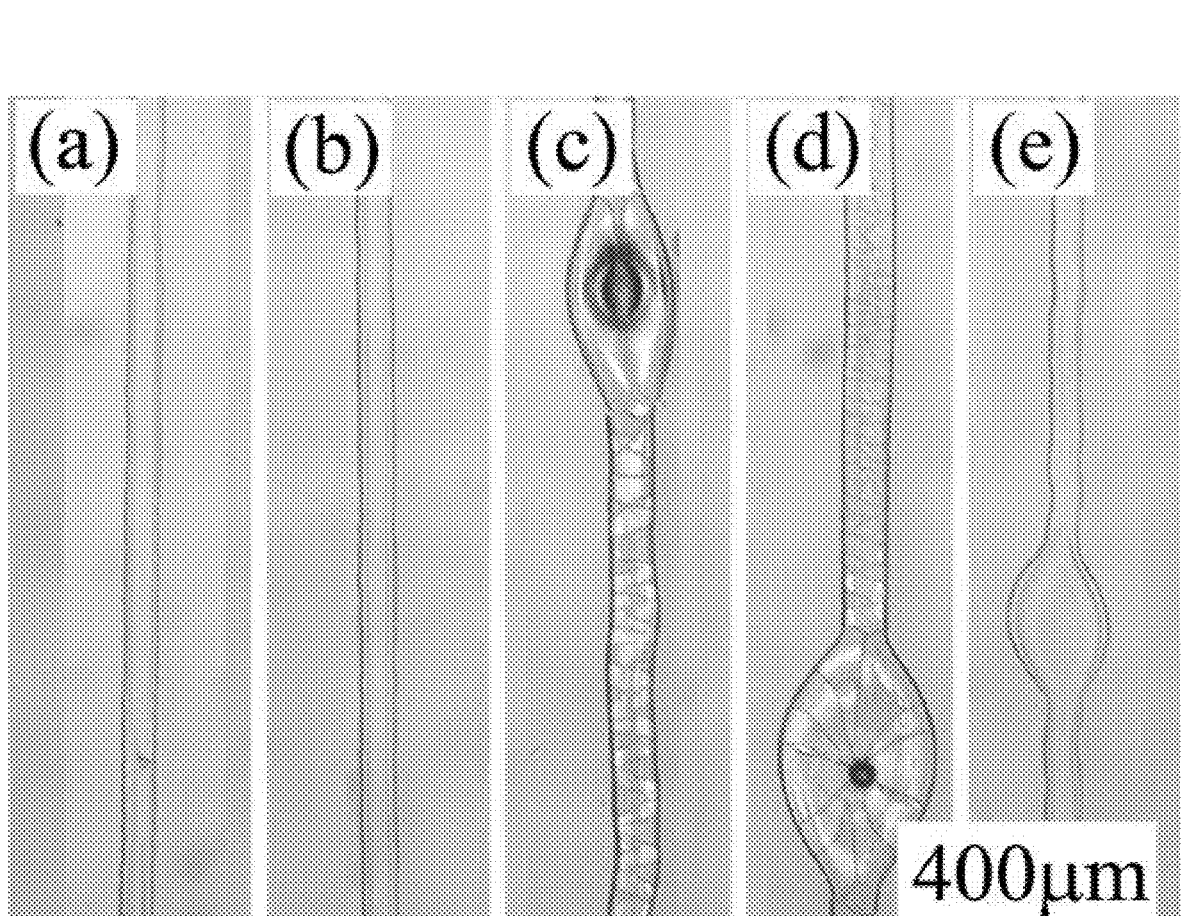

FIGS. 125A-125E illustrate the effect of drop spacing on the printed lines. The optical micrographs of printed lines after drying on hot as-received substrates (75° C.) using the 45 PVP ink printed with decreasing drop spacing (p). The drop spacings and frequencies were: p=50 μm and 200 Hz (FIG. 125A), p=25 μm and 200 Hz (FIG. 125B), p=15 μm and 200 Hz (FIG. 125C), p=5 μm and 200 Hz (FIG. 125D), and p=50 μm and 400 Hz (FIG. 125E).

Figures 126A, 126B, 126C, 126D:
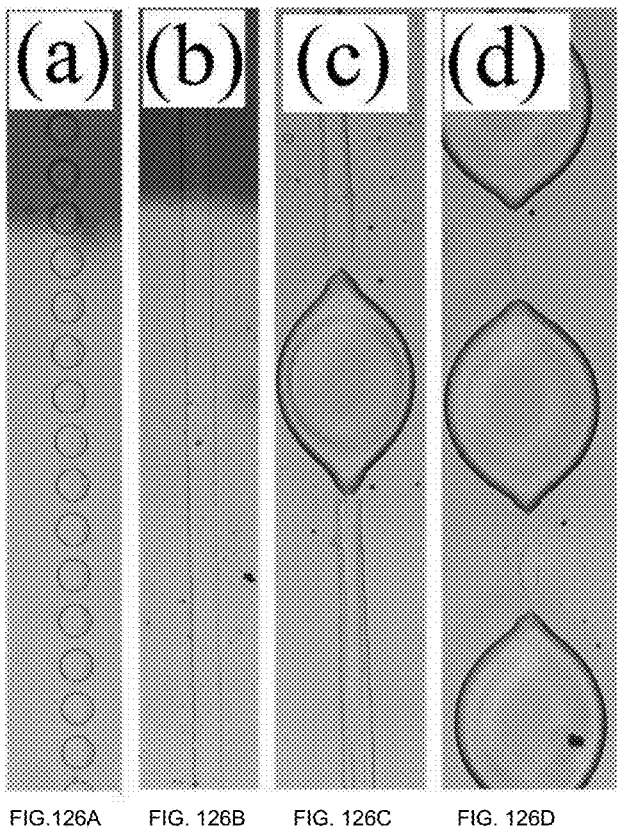
Figures 126E, 126F, 126G, 126H:
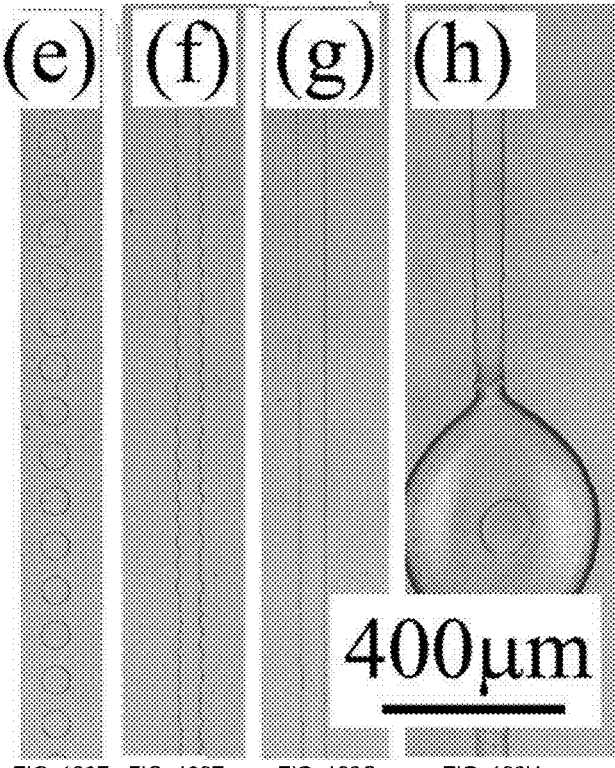

FIGS. 126A-126H illustrate the effect of drop spacing on the printed lines. The optical micrographs of printed lines after drying on PVB-coated substrates using the 30PVP ink printed with decreasing drop spacing (p). The drop spacings and substrate temperatures were: p=100 μm and 57° C. (FIG. 126A), p=50 μm and 57° C. (FIG. 126B), p=25 μm and 57° C. (FIG. 126C), p=5 μm 57° C. (FIG. 126D), p=100 μm and 75° C. (FIG. 126E), p=50 μm and 75° C. (FIG. 126F), p=25 μm and 75° C. (FIG. 126G), p=5 μm 75° C. (FIG. 126H).

Figures 127A, 127B, 127C, 127D, 127E:
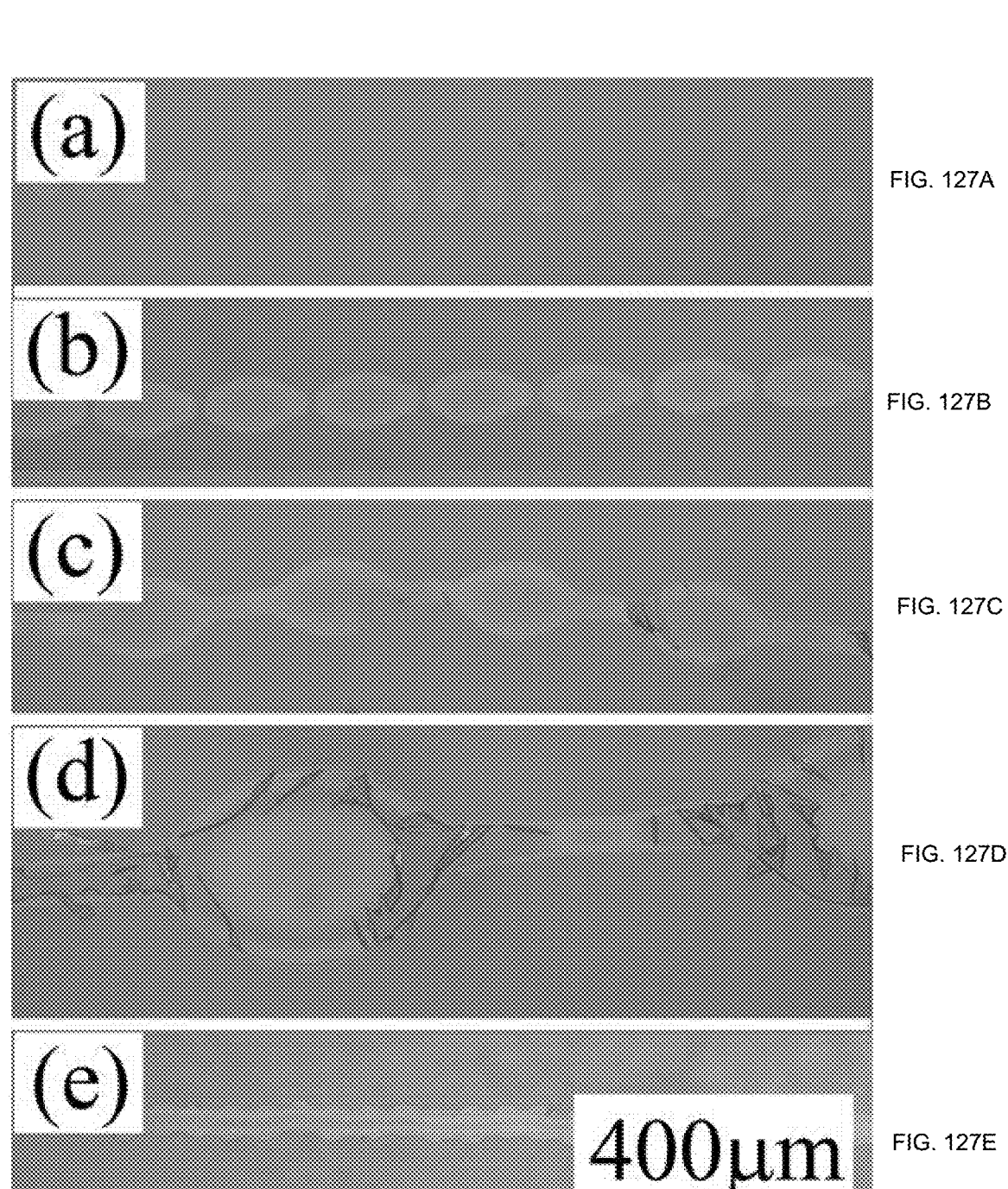

FIGS. 127A-127E illustrate the optical micrographs of printed lines on as-received substrates after firing using the 30PVP ink printed with decreasing drop spacing (p). The drop spacings and temperatures were: p=100 μm and room temperature (FIG. 127A), p=50 μm and room temperature (FIG. 127B), p=25 μm and room temperature (FIG. 127C), p=5 μm and room temperature (FIG. 127D), and p=75 μm and 75° C. (FIG. 127E).

Figures 128A, 128B, 128C, 128D:
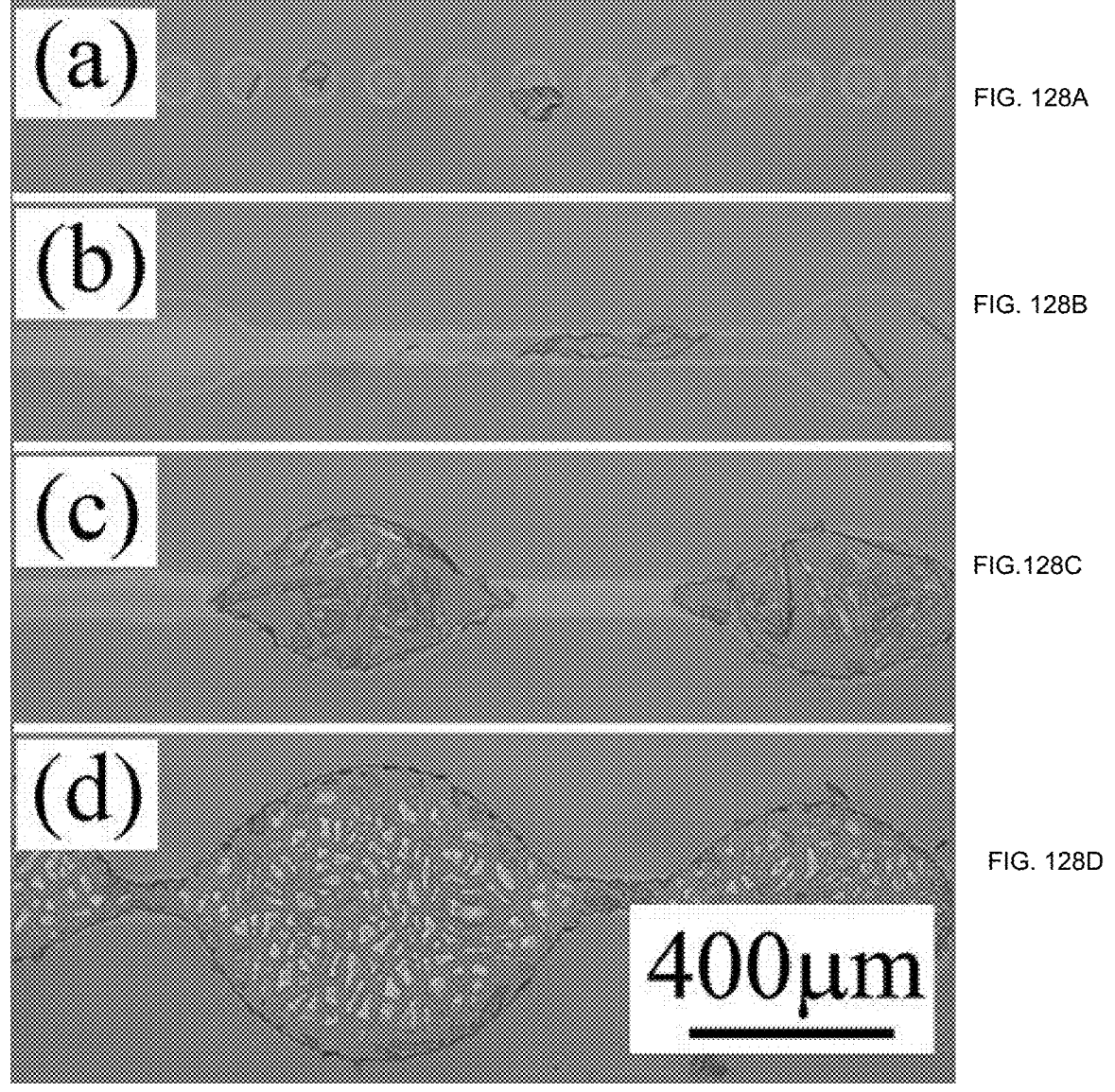

FIGS. 128A-128D illustrate the optical micrographs of printed lines on as-received substrates after firing using the 45PVP ink printed with decreasing drop spacing (p) at room temperature. The drop spacings were: p=100 μm (FIG. 128A), p=50 μm (FIG. 128B), p=25 μm (FIG. 128C), and p=5 μm (FIG. 128D).

Figure 129:
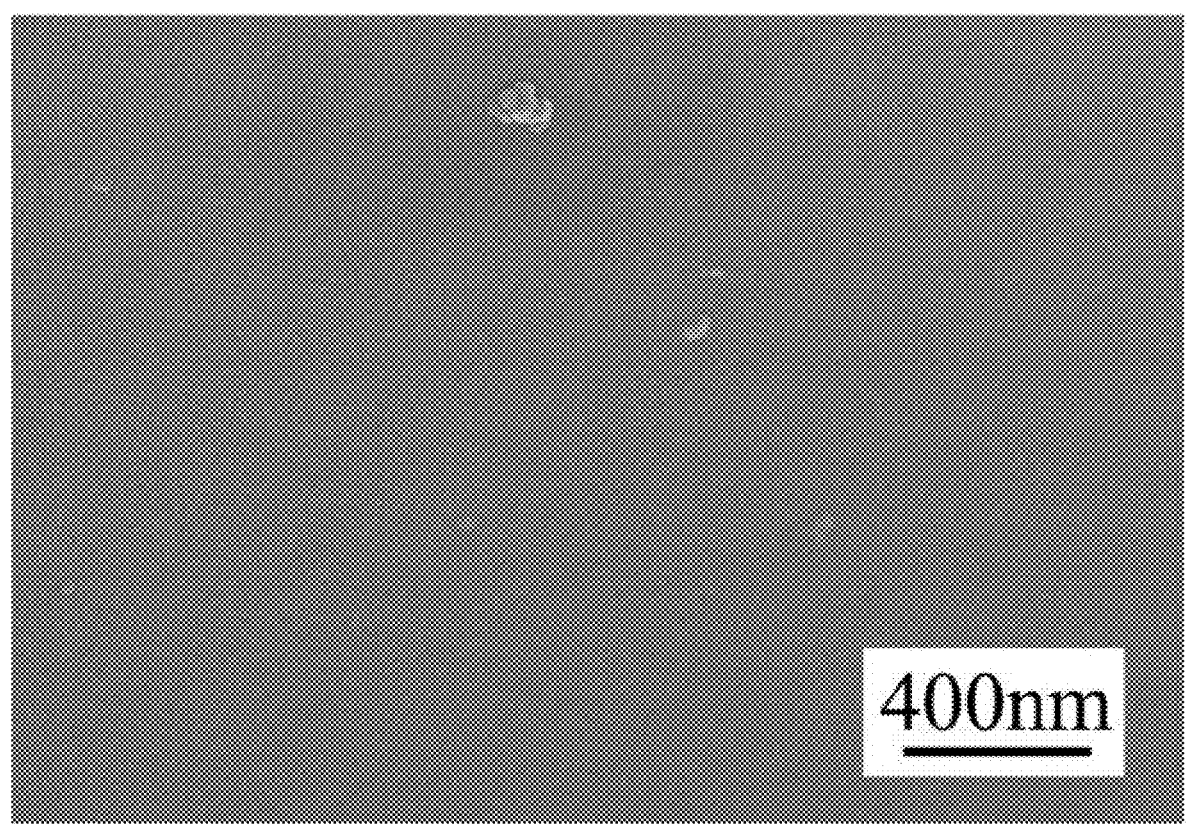

FIG. 129 illustrates that the surface morphology of the nano-ribbon after firing of the printed line of FIG. 128C is smooth and crack-free.

Figure 130:
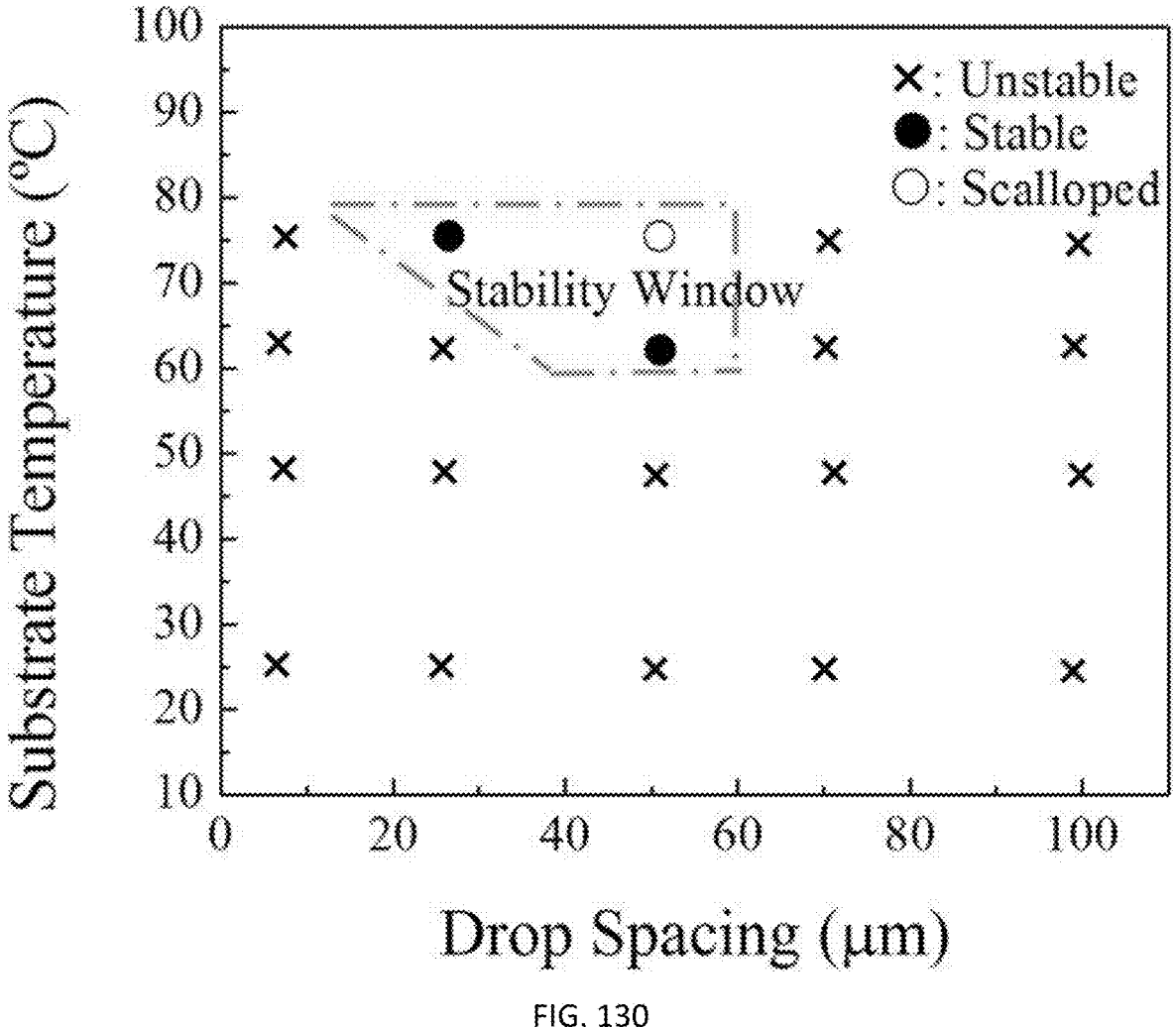

FIG. 130 is a chart illustrating a stability condition window of lines printed using the 30 PVP ink on the PVB-coated substrate.

FIG. 131 is a schematic of measuring surface tension at high temperature.

FIG. 132A is a chart illustrating surface tension of 30PVP and 45 PVP inks at different temperatures and FIG. 132B is a chart illustrating viscosity of 30PVP and 45 PVP inks at different temperatures.

Figures 133A, 133B, 133C:
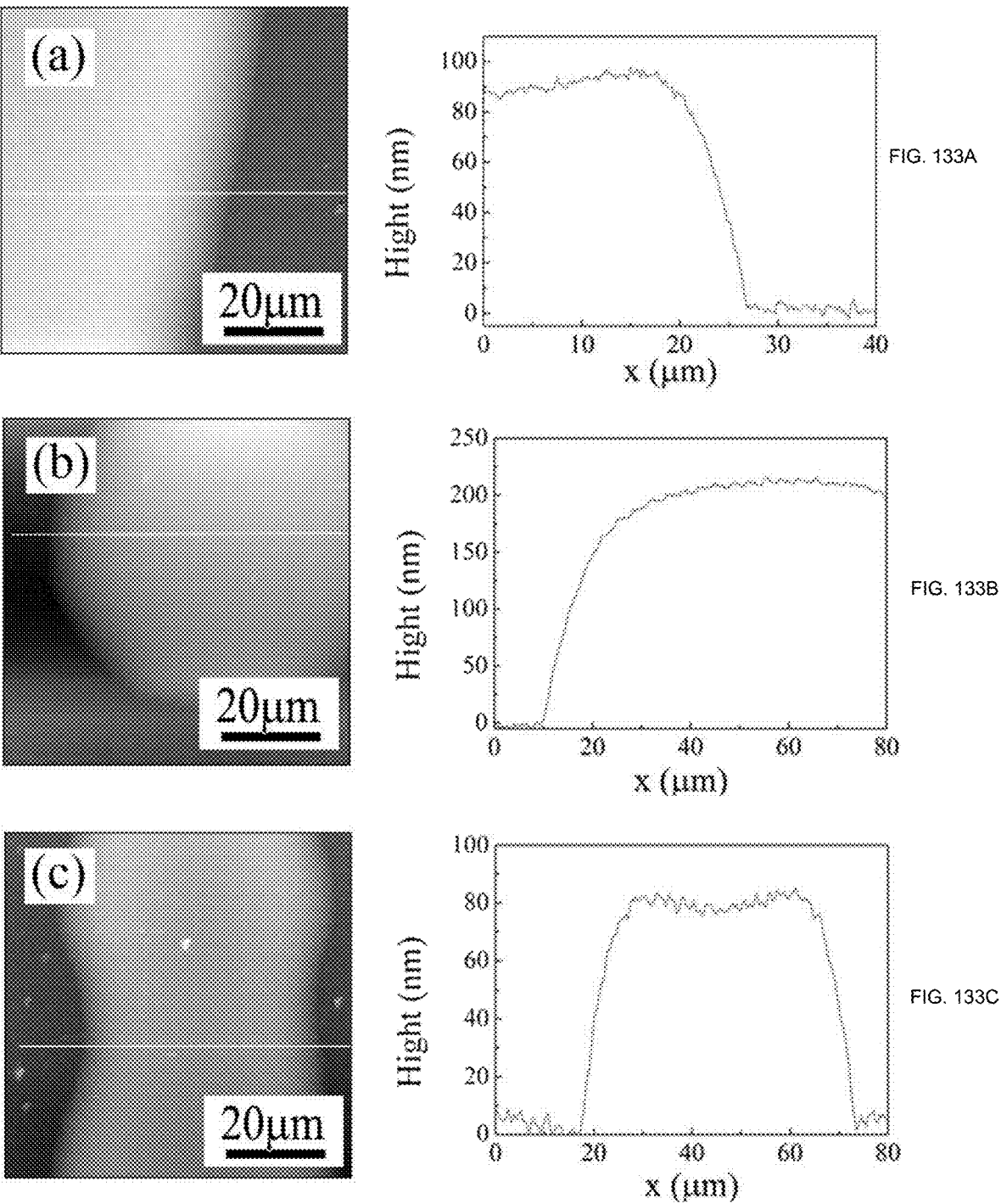

FIGS. 133A-133C include AFM images of printed ceramics after firing: a single drop printed by 30 PVP (FIG. 133A), a single drop printed by 45 PVP (FIG. 133B), and a line printed by 45 PVP, drop spacing p=75 μm (FIG. 133C).

FIG. 134 includes AFM images of printed line by 30PVP on hot silica substrate (75° C.) after firing, p=75 μm.

FIGS. 135A-135D includes images of protonic ceramics BCZYYb and BZY20 after RLRS by a CO2 laser with maximum power of 20 W. FIG. 135A is a photo of multiple strips (power 2.8 W, speed 1 mm/s, spacing 0.8 mm, spot size 1.2 mm (20 mm defocus), paste thickness 100 μm, and energy density 2.333 J/mm²). FIG. 135B is a low magnification micrograph of the strip cross-section (power 7 W, speed 1 mm/s, spot size 1.2 mm (20 mm defocus) paste thickness 100 μm, and energy density 5.833 J/mm²). FIG. 135C is a photo of spiral BZY20 strip (power 2.8 W, speed 1 mm/s, spacing 0.8 mm, spot size 1.2 mm (20 mm defocus), paste thickness 100 μm, and energy density 2.333 J/mm²). FIG. 135D is a photo of the squared BCZYYb thin film (power 2.8 W, speed 1 mm/s, spot size 1.2 mm (20 mm defocus), paste thickness 10 mm, and energy density 2.333 J/mm²).

Figure 136:
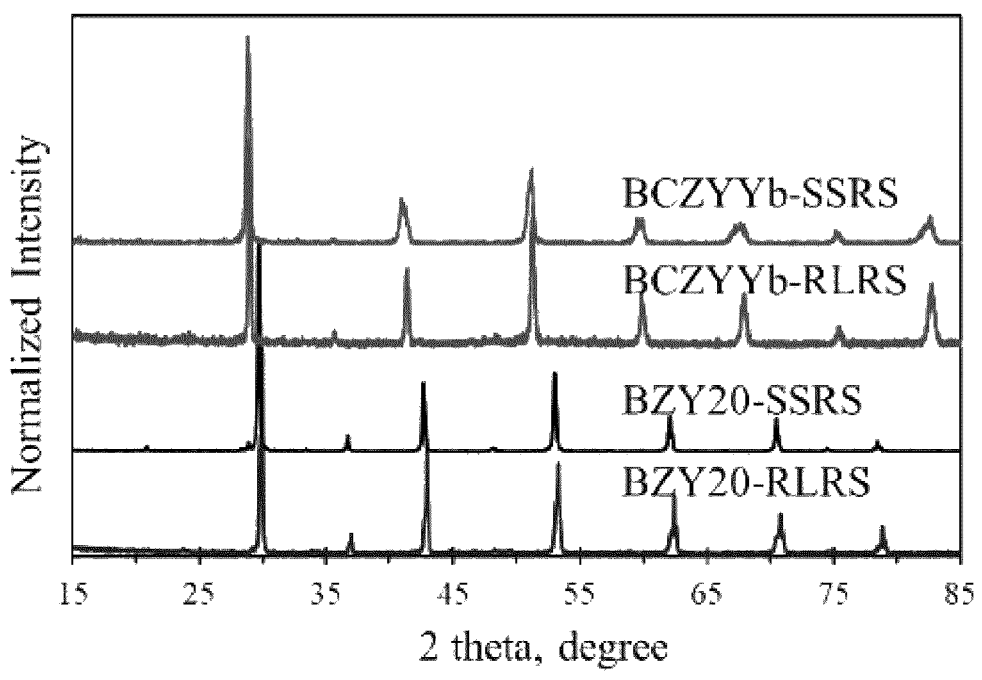

FIG. 136 is a chart showing XRD patterns of the protonic ceramic strips fabricated by rapid laser reactive sintering technology (<10 s), comparing with the protonic ceramic pellets fabricated by solid state reactive sintering (12 hours at 1400-1500° C.). The XRD samples were fine powders ground from respective strips and pellets.

Figure 137:
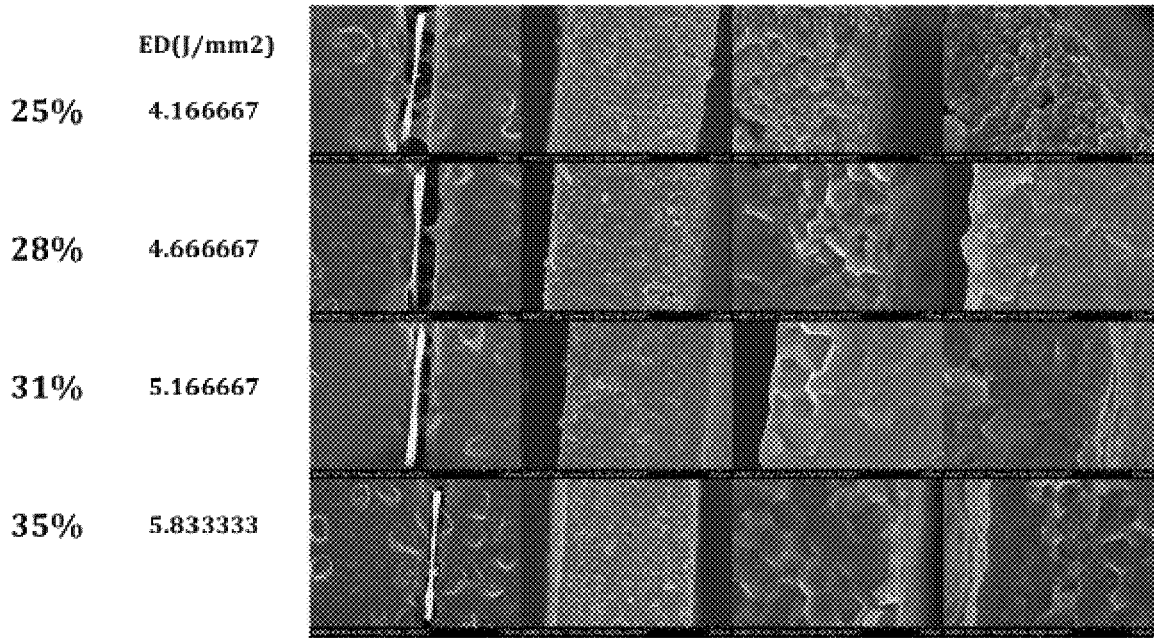

FIG. 137 is a cross-section view of RLRS BCZYYb electrolyte with different energy density (under 20 W $CO_2$ laser).

FIG. 138 is a top surface view of RLRS BCZYYb electrolyte with different energy density (under 20 W $CO_2$ laser).

FIG. 139 includes charts showing grain size distribution and grain size of RLRS BCZYYb electrolyte under different laser power (under 20 W $CO_2$ laser).

Figure 140:
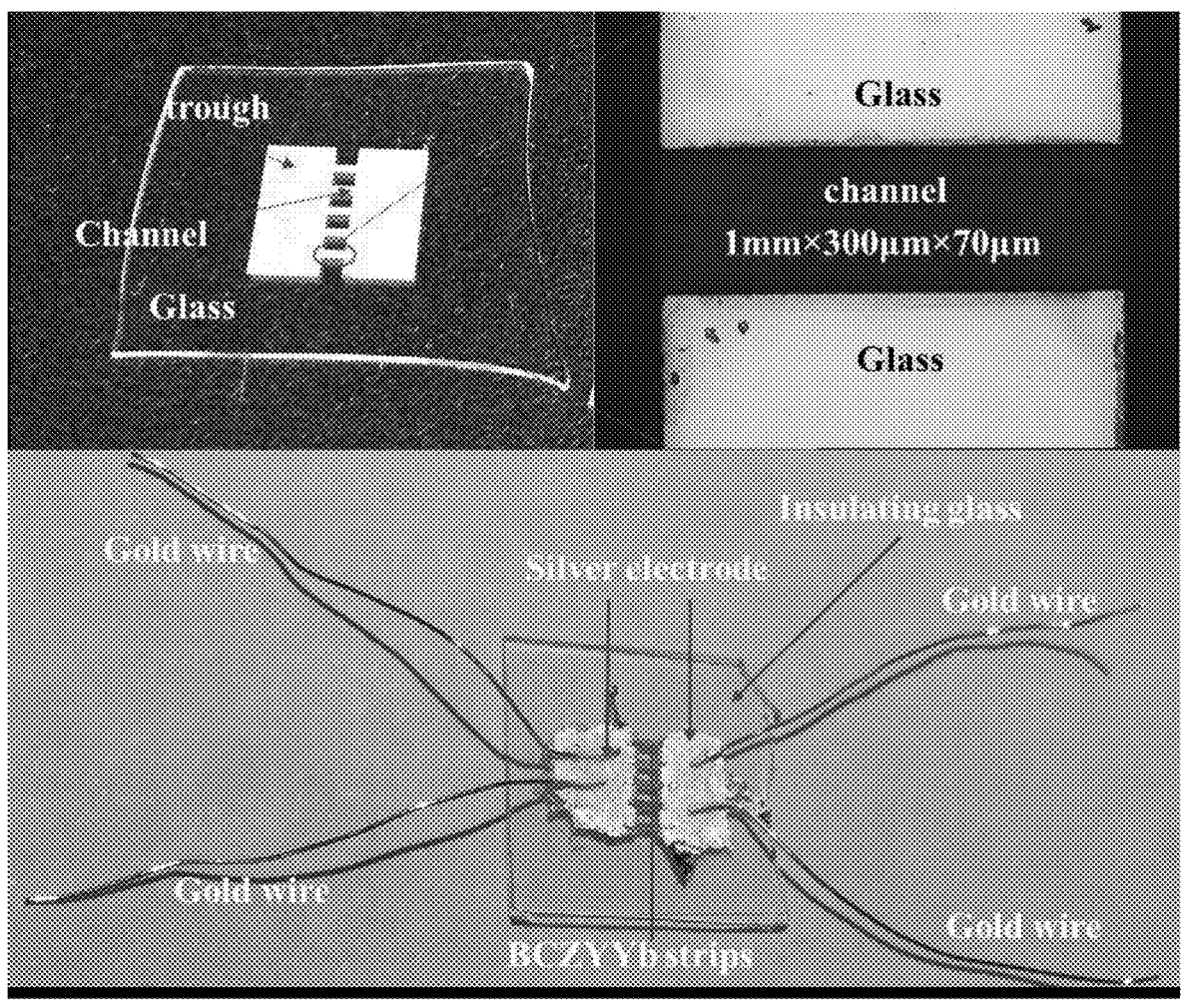

FIG. 140 illustrates five BCZYYb strips after the removal of the porous edges were assembled into five glass channels. The two bigger troughs were designed to connect the channel ends for introducing silver electrodes. The design provided a large cross-section area and enough mechanical strength for measuring conductivity using electrochemical impedance spectroscopy under different conditions.

Figure 141:
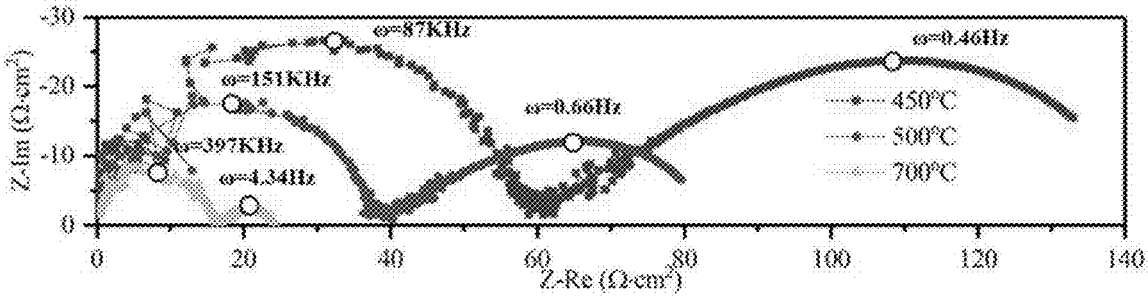

FIG. 141 is a Nyquist plot for electrochemical impedance spectroscopy for BCZYYb sample under wet 5% H2 balanced by Ar at different temperatures.

Figure 142:
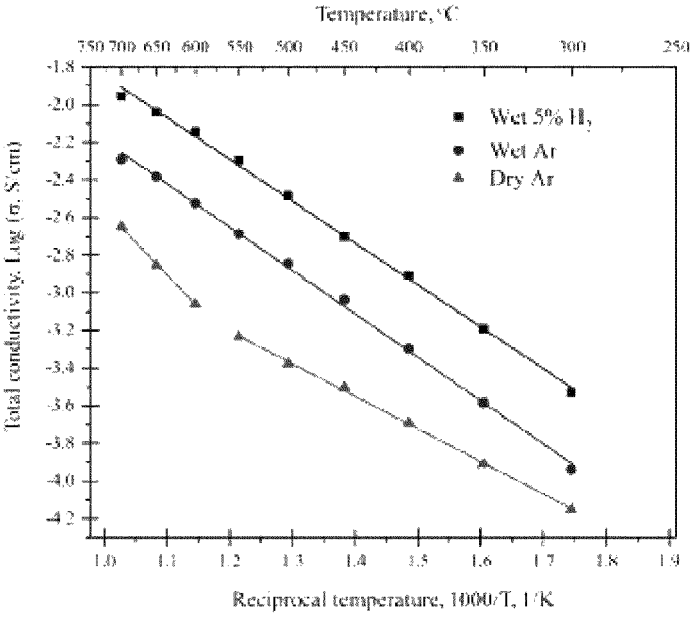

FIG. 142 is a chart illustrating total conductivities of five-strip dense BCZYYb samples measured by EIS at 300-700° C. under wet 5% H2 balanced by Ar, wet Ar, and dry Ar. The wet atmosphere was obtained by flowing through room temperature bubbler.

Figure 143:
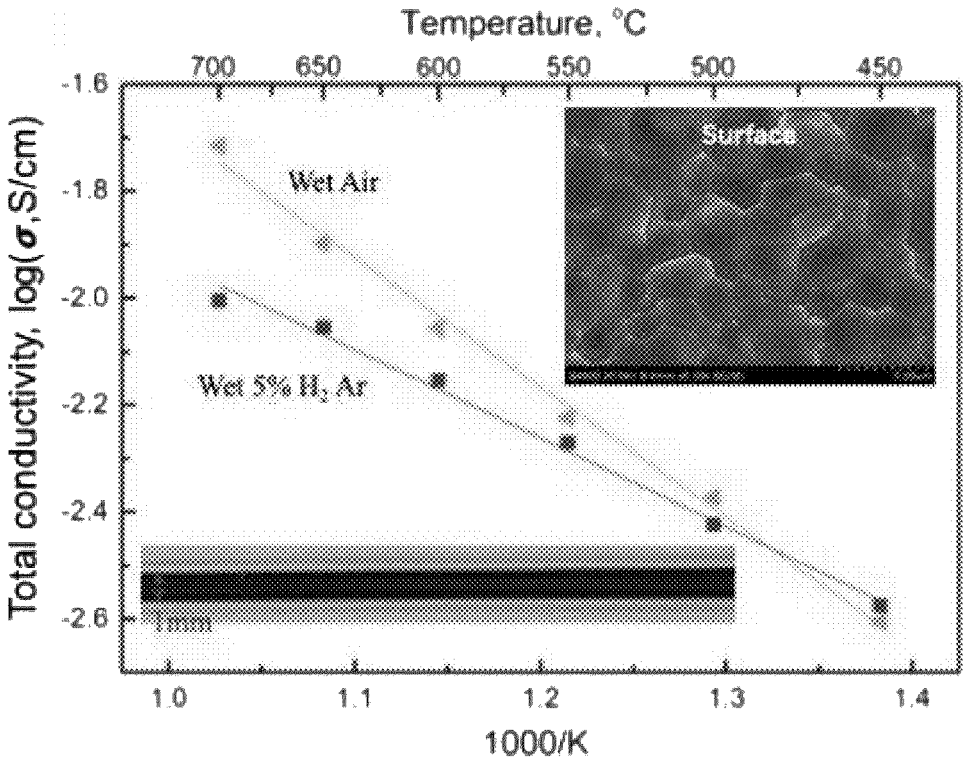

FIG. 143 provides the conductivity results of the RLRS BCZYYb electrolyte sample, with the morphology of the sample and microstructure of the sample in surface and cross-section view. The size of the sintered strip is 1 mm in width, 80 mm in length, and 0.16 mm thick. (The black part is the sintered BCZYYb electrolyte strip, and the white area is the non-sintered green layer.)

DETAILED DESCRIPTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "about" refers to numbers in a range of +/−10% or +/−20% of the noted value.

Embodiments of the present invention relate to integrated laser processing and additive manufacturing systems and methods for use with ceramic, glass, and carbide materials (e.g., SiC). The system can be used to make products including, but not limited to, fuel cells, electrolyzer, membrane reactors, batteries, heat exchangers, nuclear reactors, sensors, and glass products.

An integrated multi-laser 3D manufacturing system according to some embodiments includes a $CO_2$ laser heating system, a picosecond (ps) laser microfabrication system, a free-forming extrusion system, and ultrasonic spray coating system.

The system can be configured with additive manufacturing capability to 3D-print ceramics, glass, carbide materials, and/or composites. To in-situ process the printed materials, a laser such as a $CO_2$ laser is included in the system as a powerful heating source. In addition, the system is capable of high-resolution laser micromachining, e.g., ps laser micromachining. In this way, the additive and subtractive tools as well as in-situ material processing are integrated into one single system. Additional details of the system are set forth in Appendix A. A schematic of the integrated manufacturing system is provided at FIG. 1. A photograph of the integrated manufacturing system is provided at FIG. 2.

The system can be used for various ceramic, oxides, glass, and composite applications, as further described in the examples.

In some embodiments, the $CO_2$ laser processing parameters for ceramic applications are provided in Table 1 below.

TABLE 1 optimal $CO_2$ laser processing parameters (ceramic applications)

| | Point | Line |
|---|---|---|
| Laser power | 2-60 | 50-85 W |
| Laser scanning speed | 1 mm/sec (working range 0.75-2 mm/sec) | 1 mm/sec (working range 0.75-2 mm/sec) |
| Laser spot | Spot size at focusing position is 0.25 µm; focal length is 38.1 mm | Spot size at focusing position is 12 mm*0.25 mm |
| Laser melting position | Defocusing upward 5 mm (working range 5-30 mm) | Defocusing upward 15 mm (working range 5-30 mm) |
| Laser sintering paste thickness | 0.15 mm (working range less than 0.5 mm) | 0.35 mm (working range less than 0.5 mm) |

For the Galvo scanner, the spot size may be 15 mm defocus with 0.35 mm and the scanning speed may be 1 mm/sec to 5 m/sec for ceramic applications.

For the ps laser, the laser power may be 4-64 W, the scanning speed may be 5 mm/sec to 10 mm/sec, the repetition rate may be 10 kHz, and the spot size may be 0.018 mm at focus point for ceramic applications.

Optimal printing parameters for ceramic applications may be as follows: extrusion flowrate 200-500 µL/min, extrusion scanning speed 16-18 mm/sec, and layer step 0.1-0.5 mm. The ultrasonic spray coating may be used to introduce layers with thickness near to 5 µm to 100 µm.

The system can also be used for silicon carbide applications, as described in the examples.

The system can also be used to make (components for) protonic ceramic fuel cells, as described in the examples.

Some embodiments of the present invention are related to an advanced manufacturing technique, with integrated additive manufacturing and laser processing (e.g., laser drying, laser sintering, laser melting, laser cutting, laser polishing, etc.) for the rapid and cost-effective manufacturing of ceramic-based energy conversion/storage devices such as solid oxide fuel cells, solid oxide electrolysis cells, solid oxide membrane reactors, solid state batteries, solid state supercapacitors, solid oxide photoelectrochemical cells, microchannel heat exchangers, etc. The additive manufacturing based microextrusion, modified microextrusion by doctor blade smoothing, spray coating, and inkjet printing allow the manufacturing of thin layers with thickness from 5-1000 µm. The versatile geometries of tubes, cylinder, rings, lobed-tube, cones, films, heterogenous multilayers etc.

have been successfully printed. Combined with laser cutting, precise complex shapes can also be fabricated. The laser processing can make a fully dense membrane and/or a highly porous membrane from cost-effective raw materials of carbonates and oxides, etc. Proper sintering additives are the critical factor for achieving crack-free large-area parts by rapid laser sintering. Laser cutting of the green layers can be used which allows building microchannels with a width less than 50 µm. As shown in the examples, the laser processing also allows the manufacturing of half-cell (porous electrode supported with dense electrolyte) and single cells (two porous electrodes with dense electrolyte in between). The excellent performance of protonic ceramic fuel cells and electrolysis cells has been demonstrated.

The system can also be used to make (components for) glass objects such as glass sensors, as described in the examples.

The optimal laser processing parameters for glass applications may be as follows: laser power 15 W (working range 14-18 W), laser scanning speed 1 mm/sec (working range 0.75-2 mm/sec), laser spot size at the focusing position is 0.25 µm (focal length is 38.1 mm), laser melting position—defocusing upward 5.5 mm (working range 5-6 mm), and laser melting paste thickness 0.12 mm (working range less than 0.25 mm). The optimal printing parameters for glass applications may be as follows: extrusion flowrate 90-120 µL/min, extrusion scanning speed 12-14 mm/sec, and layer step 0.05-0.07 mm.

The following Examples are provided by way of illustration and not by way of limitation.

EXAMPLES

Example 1—Integrated Multi-Laser 3D Manufacturing System

As described above, an integrated multi-laser 3D manufacturing system may include four sub-systems: a $CO_2$ laser heating system, a picosecond (ps) laser microfabrication system, a free-forming extrusion system, and ultrasonic spray coating system.

Figure 3A:
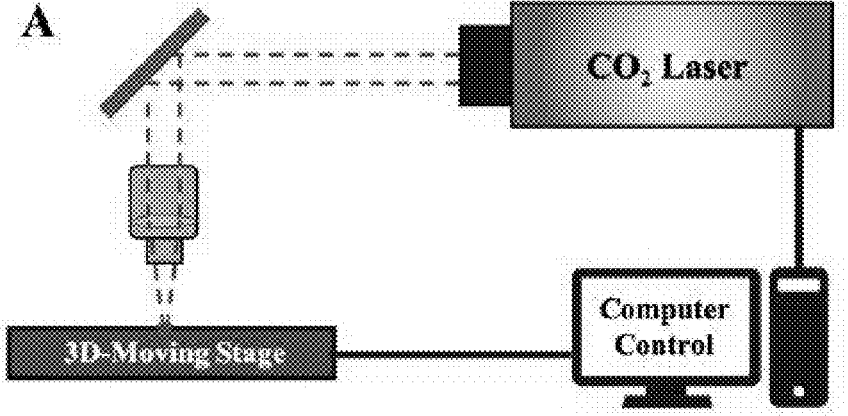
FIGS. 3A-B provide schematics of the $CO_2$ laser heating systems for the integrated laser 3D manufacturing system of FIG. 1.
Figure 3B:
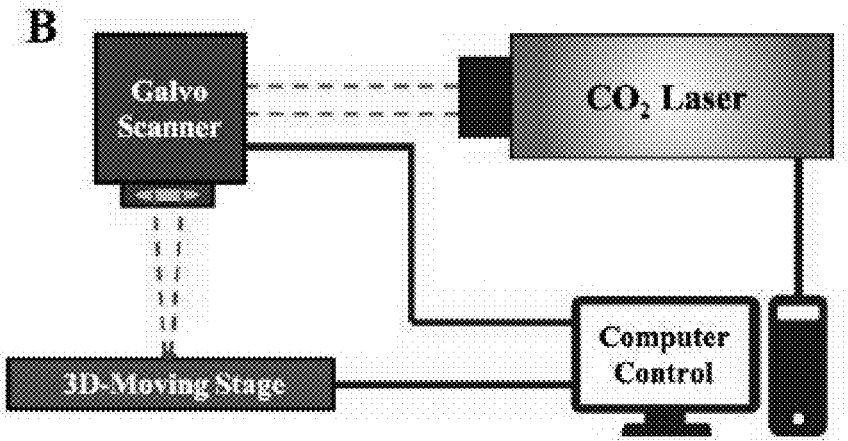

A schematic of the $CO_2$ laser heating system is shown in FIGS. 3A and 3B. In some embodiments, a water-cooled high-power $CO_2$ laser (Firestar ti100, SYNRAD Inc.) with a free space wavelength of 10.6 µm is used to perform the heating processing on materials.

As shown in FIG. 3A, the laser scanning may be controlled by a three-dimensional (three-axial) translation stage (e.g., IMS-V series, Newport Inc.). A ZnSe lens with a focal length of ~50 mm may be used to focus the $CO_2$ laser beam into a spot size (D) of ~220 µm. In some embodiments, during processing, the focused $CO_2$ laser beam irradiates on the material and the computer-controlled translation stage moves the material in the predesignated toolpath. By adjusting the working distance in z-direction, the materials can be processed either at the focal point or the defocusing positions. In some embodiments, the scanning speed of the stage can reach 1 m/s.

As shown in FIG. 3B, a two-axial Galvo scanner (e.g., intelliSCAN 14, SCANLAB) may be used to control the scanning of the laser beam in two dimensions. The Galvo scanner can be mounted on the z-axis of the stage so that the focusing position can be adjusted. The laser beam may be input from the side of the scanner and reflected downwards by the mirrors inside it. At the output of the scanner, a ZnSe f-Theta lens with a focal length of 200 mm may be used to focus the $CO_2$ laser beam into a spot size (D) of ~1 mm.

When controlled by the computer programming, the two axes move the laser beam to scan the designed patterns on materials. In some embodiments, the scanning speed of the Galvo scanner can be tuned from 0.1 mm/s to 2 m/s.

Figure 4:
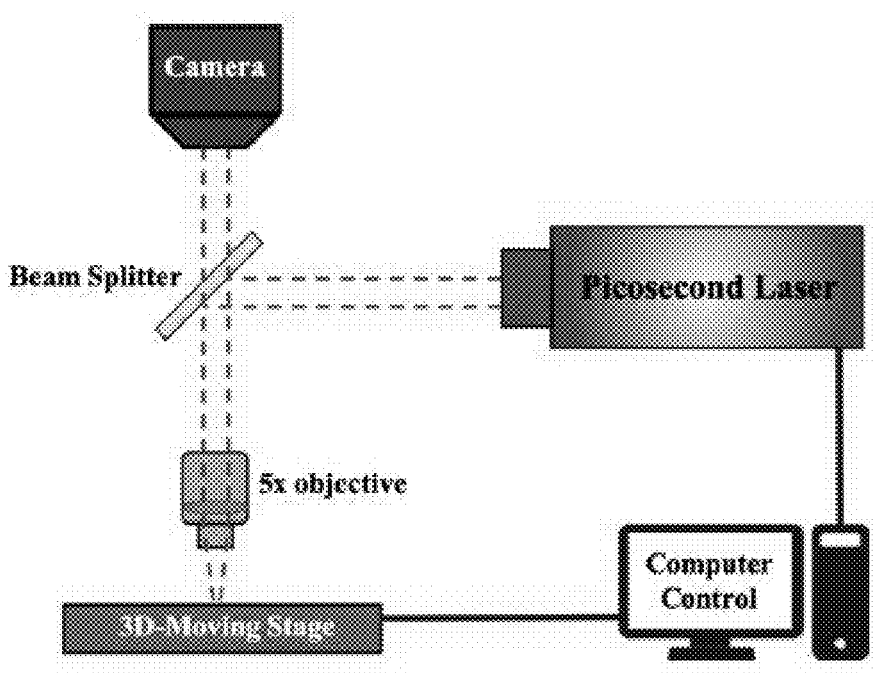
FIG. 4 is a schematic of the picosecond laser microfabrication system of the integrated laser 3D manufacturing system of FIG. 1.

A schematic of the picosecond laser microfabrication system is shown in FIG. 4. A ND:YAG picosecond laser (e.g., APL-4000-1064, Attodyne Inc.) may be used for high-resolution microfabrication on different materials. In some embodiments, the maximum pulse energy is obtained when the repetition rate is smaller than 10 kHz, while the output power become maximum at the repetition rate over 100 kHz. The Gaussian laser beam may be guided through a 5× objective lens (NA=0.13) to obtain a focusing beam with a spot size of ~20 µm and a working distance of ~11 mm. A CCD camera may be mounted on top of the objective lens to in-situ monitor the fabrication process. The laser beam may be moved by the three-axial translation stage under the computer control in predesignated toolpath with a speed up to 1 m/s.

Figure 5:
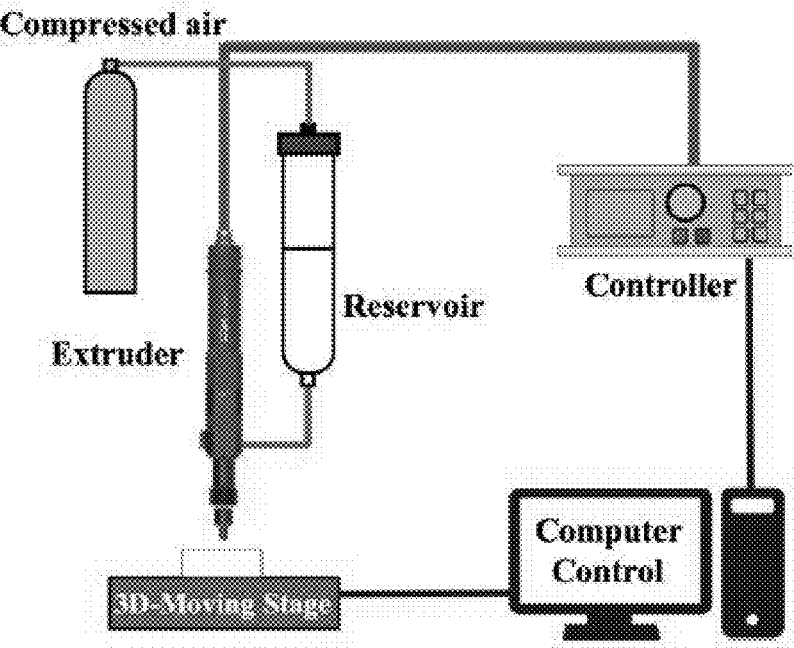
FIG. 5 is a schematic of the free-forming extrusion system of the integrated laser 3D manufacturing system of FIG. 1.

A schematic of the free-forming extrusion system is shown in FIG. 5. A micro-extruder (e.g., eco-PEN300, Preeflow by ViscoTec Inc.) may be used to deposit the materials at the desired locations. In some embodiments, the micro-extruder can cover a wide range of materials with a viscosity ranging from zero to over 1000 Pa×s. 3D printing is realized by programming the stage to draw the 3D model while the micro-extruder keeps extruding materials.

Figure 1:
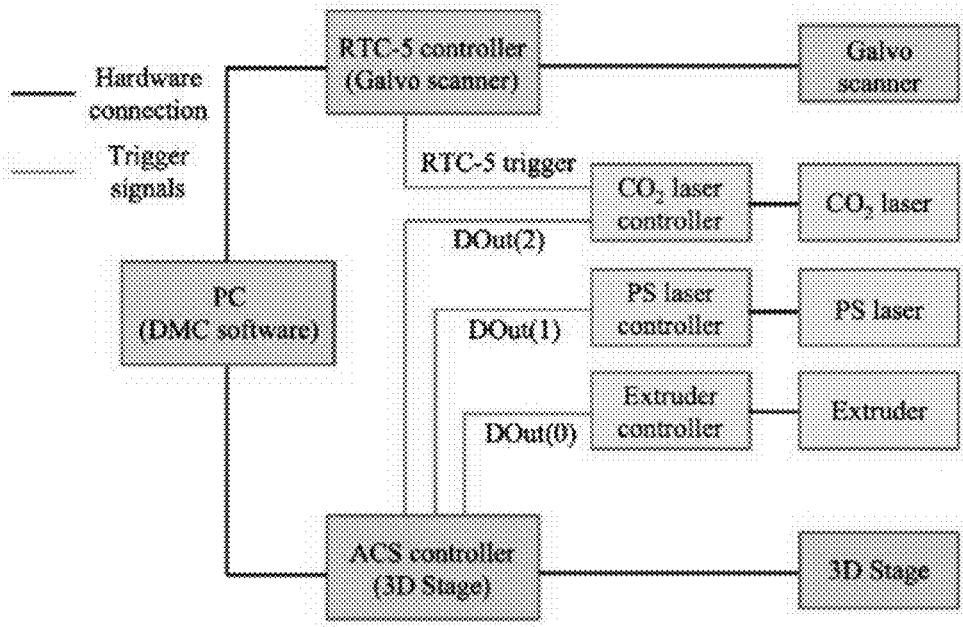
FIG. 1 is a schematic illustrating the configuration of an integrated laser 3D manufacturing system according to some embodiments.

To integrate the sub-systems for manufacturing, a control center can be used to control and coordinate all the hardware. FIG. 1 shows the configuration of the integrated system according to some embodiments. The controllers of the three-dimensional translation stage and the Galvo scanner may be connected to the control center and controlled by the Direct Machining Control software (e.g., DMC, Newport Inc.). In addition to move of the three-dimensional translation stage, the ACS controller can also provide a plurality of (e.g., ten) digital output (DOut) ports for external trigger control. When the lasers or extruder connect to these DOut ports, the ACS controller can send out a gate signal (e.g., 5V gate signal) to trigger the on/off status of the lasers or extruder. In the DMC software, this trigger signal can be programmed to send out at the start/stop position of the toolpath. In this way, the on/off of the devices can be automatically synchronized with the toolpath during manufacturing. Since every device is assigned a specific DOut port, devices can be accurately selected for processing without any confliction. Similarly, in some embodiments, the RTC-5 controller, which is used to control the movement of the Galvo scanners, also controls the on/off status of the lasers in the same way during laser scanning.

There are two ways to generate the toolpath in the DMC software. One is to draw the 2D patterns using the built-in drawing tools. The basic geometries like line, circle and rectangle can be easily created and every shape can be assigned one process. To generate a more complicated geometry, a unique 3D manufacturing function was enabled. Through inputting the CAD file designed in other software such as SolidWorks and AutoCAD, a 3D model can be generated in the DMC software. The input 3D model can be sliced into multiple layers with certain thickness in the DMC. At every layer, multiple processes can be assigned to process the material in designated sequence. In this way, the fabrication is completed layer-by-layer from bottom to top or from top to bottom.

Figure 2:
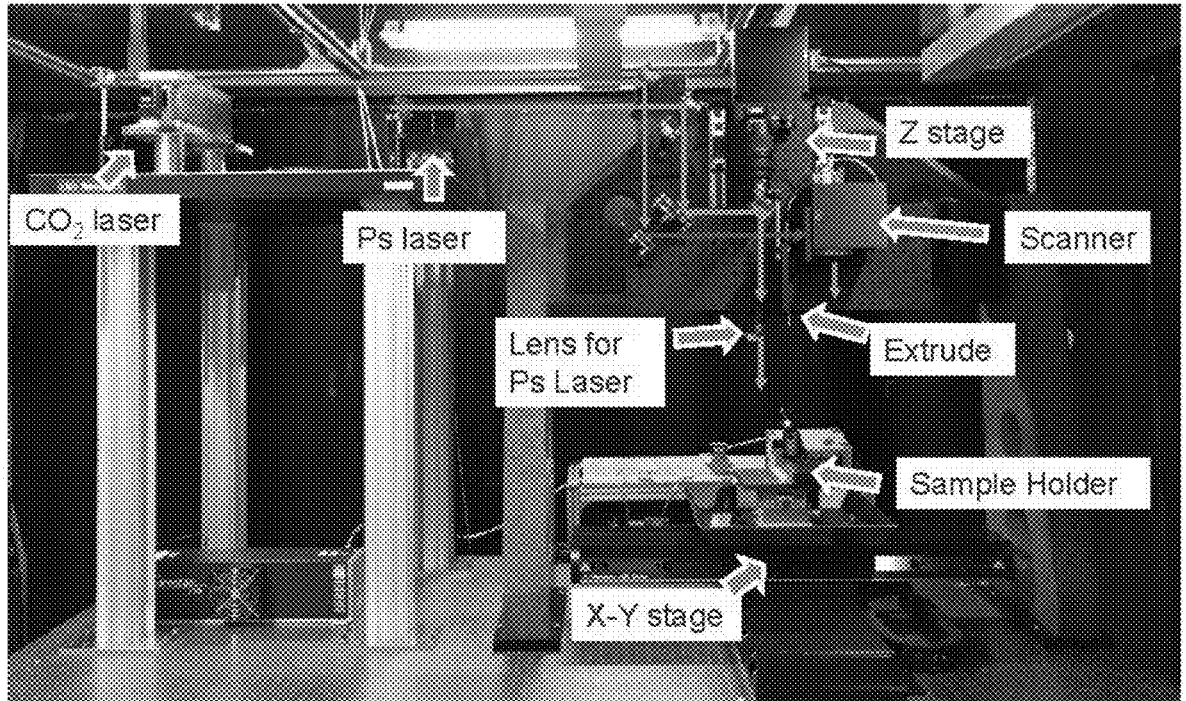
FIG. 2 is a photograph of the integrated laser 3D manufacturing system of FIG. 1.

The arrangement of the integrated manufacturing system according to some embodiments is shown in FIG. 2. The x- and y-stage are directly mounted on the optical table, while the z-stage is mounted on a gantry. The moving distance of the x-, y- and z-stage may be 600 mm, 600 mm and 300 mm, respectively. The laser heads are mounted outside the gantry and the laser beams are guided to the sample through the reflective mirrors.

Example 2—$CO_2$ Laser Sintering of Sol-Gel Deposition

Sol-gel process is a wet-chemical technique for fabricating solids through polymerization of small molecules. It has been widely used to fabricate ceramic materials such as silica, YSZ, mullite and alumina, since it requires mild synthesized conditions and delivers excellent composition controls. Normally, the sol-gel precursors are deposited as thin film and fired in electric furnace to obtain the pure ceramics. This conventional heating method makes it difficult to precisely pattern the films over a small local area, which hinders the fabrication of precise devices using the sol-gel method. Another challenge of sol-gel thin film deposition is the uncontrollable cracking when the thickness of the film exceeds the 'critical thickness', the thickness at which cracks start to occur during sintering, as the strain energy stored in the film exceeds the required energy for creating new cracks.

Laser processing of sol-gel films has been investigated to address the challenges of conventional sol-gel process. One of its advantages is that laser is capable of localized sintering within an ultra-short duration leading to precisely controlled geometries. This makes it become an attractive technology to be employed in manufacturing industries. Also, laser sintering demonstrates great potential in flexibly controlling the microstructure of materials, such as the porosity, by simply tuning the laser-operating parameters. In addition, laser sintering of the sol-gel precursor is a promising technology for additive manufacturing of advanced ceramics with high resolution. However, there are still challenges in the laser sintering of the sol-gel thin films. One is small critical thickness.

Usually, the critical thickness of the sol-gel thin films is about a few hundred nanometers. In most of the previous works, the thickness of the laser densified sol-gel thin films was less than 500 nm does limit its application. For example, the common optical devices such as waveguides need to have a size larger than the wavelength. Moreover, during laser processing of sol-gel films, the temperature distribution is essential for understanding the microstructural evolution of materials, since it triggers multiple thermally induced processes such as chemical reactions, sintering, and phase transformations. To better tune the physical and chemical properties of the resultant materials, it is therefore desirable to understand the temperature profile induced by pre-set laser-operating parameters and relate the microstructures of processed films with calculated temperature profiles.

As described below, a $CO_2$ laser was used to process a sol-gel derived silica films which were dip-coated on glass substrates. To demonstrate the versatility of this approach on control of the microstructure and properties, the laser output power was varied at a fixed scanning speed. The microstructure and shrinkage of the laser-sintered films were measured and compared with the films sintered in a furnace to evaluate the quality of the laser-sintered films. In this work, it will be demonstrated that the cracking of the sol-gel films, when the thickness exceeds the critical thickness, can be controlled using laser sintering. Using a finite element model (FEM), the temperature profile on the substrate during laser scanning was calculated and correlated with the dimensions of the laser sintered tracks. This calculation was also used to fabricate, pre-designed patterned silica films of high density using a galvo scanner.

Tetraethyl orthosilicate (TEOS, $Si(OC_2H_5)_4$, 98%, Acros Organics) and hexamethyldisiloxane (HMDS, $O[Si (CH_3)_3]_2$, 98.5%, Sigma-Aldrich) were used to prepare the precursor for silica. The composition of the precursor is 0.075 mol TEOS, 0.0125 mol HMDS, 0.1 mol $H_2O$, 21.0 g ethanol, ~4 drops $HNO_3$ (70%). TEOS and HMDS were mixed in ethanol at room temperature inside a glove box under flowing argon. Then, deionized water (DI-water) was added to this solution drop-wise by a syringe pump. Nitric acid ($HNO_3$, 70%, Sigma-Aldrich) was added to adjust the pH of the solution to about 2.0. Subsequently, the solution was hydrolyzed at 70° C. for 5 hours under vigorous stirring. The obtained solution was then kept in an oven at 80° C. for condensation until viscous sols were obtained. To adjust the viscosity of the sols for dip-coating and prevent crack formation, polyvinylpyrrolidone (PVP, Mw: 1,300,000, Sigma-Aldrich) was dissolved in ethanol with a weight ratio of PVP:ethanol=1:10, and then mixed with the sols using a high-intensity ultrasonic probe. The amount of added PVP was 50 wt. % of the weight of $SiO_2$ in the sols.

The obtained silica sols were deposited on fused silica substrates (500 μm in thickness) using the dip-coating method. The withdrawal velocity of the substrate in dip-coating was set at 40 mm/min. After dip-coating, the obtained samples were dried at room temperature for laser processing.

Figure 6:
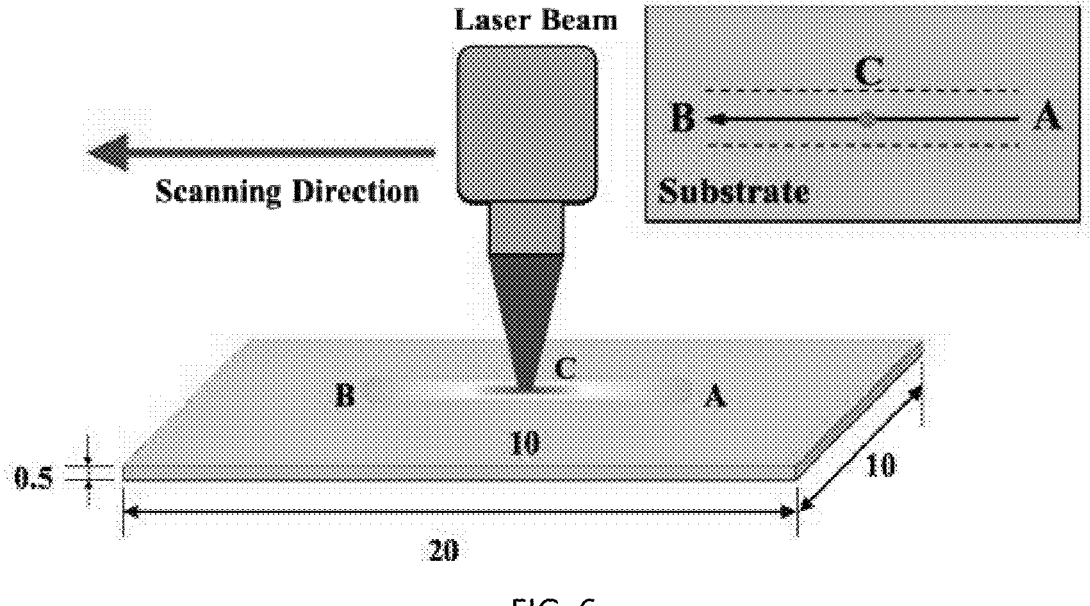
FIG. 6 is a schematic of the laser heating process (unit: mm); a coated fused silica substrate was heated with a laser beam which moves from A to B.
Figures 7A, 7B, 7C, 7D, 7E:
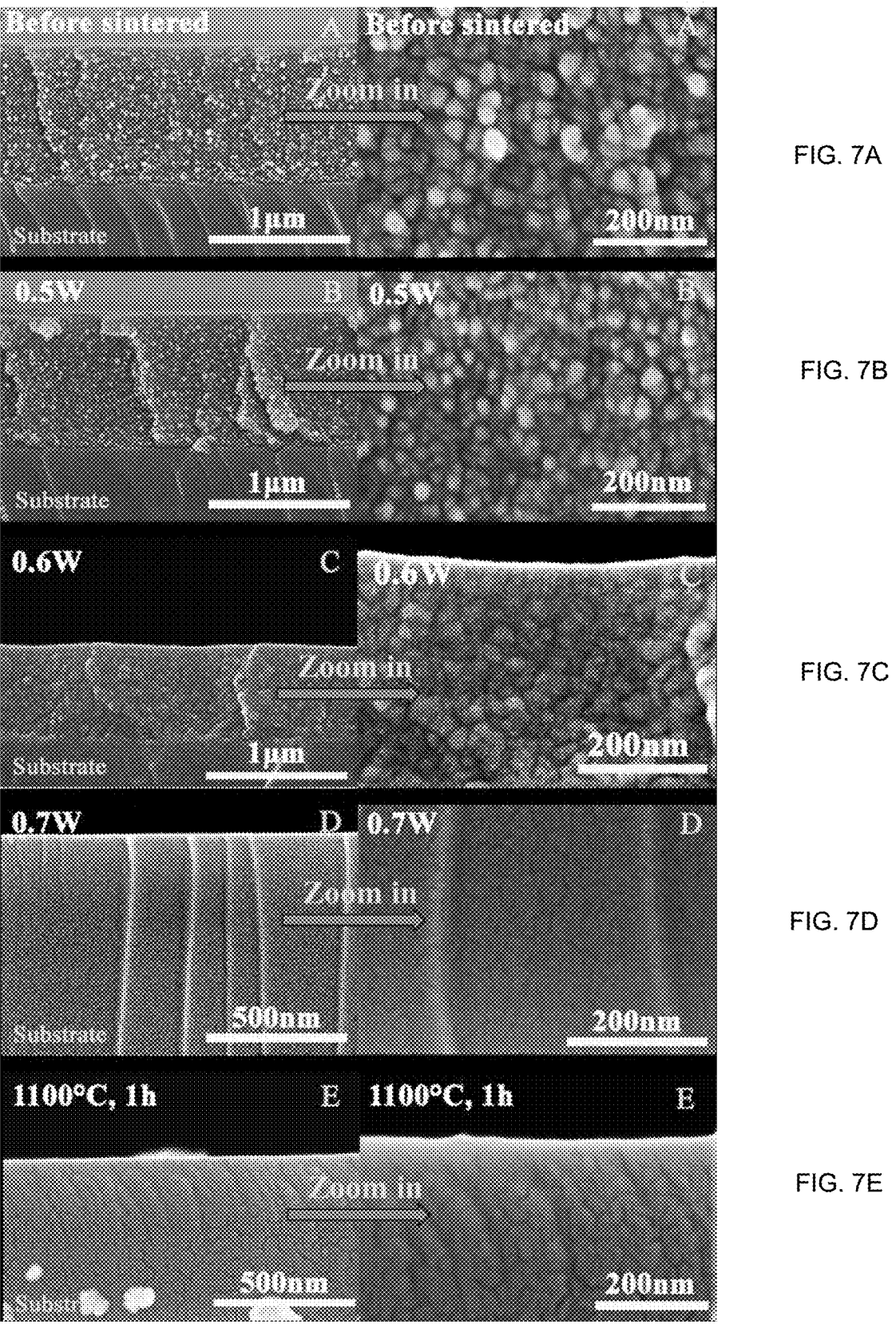
FIG. 7A is a SEM image of the sample before laser sintering.
FIGS. 7B-D are SEM images of the sample scanned by laser at 0.5 W, 0.6 W, and 0.7 W, respectively. All samples are scanned at the v=0.1 mm/s.
FIG. 7E is a SEM image of the sample sintered in a furnace at 1100° C. for 1 h.

As shown in FIG. 6, the $CO_2$ laser beam was focused on the top surface of a coated fused silica substrate and scanned along the path from A to B. Starting from 0.1 W, the lowest output power of the laser, samples were sintered at different laser power (P) with a fixed scanning speed (V) of 0.1 mm/s. The laser power density (W), defined as $W=4P/(\pi D^2)$, was calculated as the criteria to evaluate the sintering results. After a 10 mm track was scanned on the surface of the silica deposition, the substrate was washed by ethanol (EtOH) in an ultrasonic bath for 5 minutes. Since the silica precursor was EtOHbased, the regions without laser processing can be readily removed by EtOH. For reference and comparison, identical films were also sintered in a furnace. Films obtained using the same dip-coating conditions, were heated to 1100° C. with a heating rate of 5° C./min in a furnace and held at 1100° C. for 1 hour followed by furnace cooling to the room temperature.

The microstructures of the samples were characterized using an optical microscope (Olympus BX60, Olympus Crop.) and a scanning electron microscope (SEM, Hitachi S-4800, Hitachi Ltd.). To evaluate the shrinkage, density, and porosity of the silica thin film before and after laser processing, the thickness of the sintered thin films was measured using an atomic force microscope (AFM, Alpha300, Witec Instruments Corp.). Since the densification of the thin film was constrained by the substrate and the thickness of the film is much smaller than its in-plane dimension, it can be assumed that the silica thin film only shrank in the normal direction. Therefore, measuring the thickness before and after sintering is the common method to study the constrained sintering of the thin film. The shrinkage, density and porosity can be obtained through the thickness data. The shrinkage of the thin film after laser scanning can be calculated from the change of the thickness as the following equation:

$$Shrinkage = \frac{Thickness\ (before) - Thickness(after)}{Thickness\ (before)} \times 100\%$$

The fully dense thin film was defined where there was no microstructure difference between the film and substrate under SEM observation. Assuming that the thin films all have the same density before heat-treatment, the relative density was calculated based on the percent shrinkage difference between the observed film and fully dense film:

$$Relative\ density = \frac{1 - Shrinkage\ of\ fully\ dense\ film}{1 - Shrinkage\ of\ observed\ film} \times 100\%$$

The porosity of the thin film was calculated by the following equation:

$$Porosity = (1 - relative\ density) \times 100\%$$

To understand the temperature profile induced by the $CO_2$ laser, an FEM model was developed in COMSOL (COMSOL, Inc.) to simulate the laser heating process. Based on the schematic in FIG. 6, a $CO_2$ laser beam was simulated on the top surface of a fused silica substrate and moved from A to B. Since the thickness of the silica sol-gel deposition is much smaller than the thickness of the substrates, the laser spot size, and the laser wavelength, it was neglected in the simulation. The thermal properties of the fused silica substrate are shown in Table 2.

TABLE 2

| Thermal properties of fused silica | | | |
|---|---|---|---|
| Name | Symbol | Unit | Value |
| Heat capacity | $C_p$ | J/(kg · K) | 703 |
| Density | ρ | kg/m³ | 2203 |
| Emissivity | ☐ | — | 0.75 |
| Absorptivity | ☐ | — | 96% |
| Thermal conductivity at 20° C. | $k_r$ | W/(m · K) | 1.38 |
| Thermal conductivity at 1100° C. | $k_h$ | W/(m · K) | 2.1 |

The following conditions are assumed in the model:
The thermal conductivity (k) of the fused silica is temperature-dependent. For better estimating the temperature profile, upper and lower bounds of the values of k at different temperatures were used to calculate the temperature profiles. The lower bound is $k_r$=1.38 W/(m·K) which is the thermal conductivity at 20° C., and the upper bound is $k_h$=2.1 W/(m·K) which is the thermal conductivity at 1100° C.

Since the energy distribution of a laser beam is assumed as a Gaussian function, the following function was used to simulate a moving laser beam:

$$H(x, y) = Power \times g(x - w(t)) \times g(y)$$

where g is the standard Gaussian function with a standard deviation of 55 m and w is denoted as the position of the laser beam at a certain time. For a Gaussian beam, the Gaussian beam radius ($\omega_0$) is the radius at which the intensity decreases to $1/e^2$ of the peak value. At $2\omega_0$, the intensity is 0.0003 of the peak value, which indicates that at this point, most of the area under the Gaussian curve can be covered. Therefore, in this way, $2\omega_0$ can be assumed as $4\sigma$ (99.994% area). In our paper, $\omega_0=110$ μm, thus $\sigma=55$ μm.

The laser beam scans for one time from A to B. The length of AB is 10 mm.

A point probe was placed on point C, the center of AB, to obtain the temperature values at this point during laser scanning The input power was set at 0.7 W and the scanning speed was fixed at 0.1 mm/s.

Therefore, the duration of laser scanning was 100 s.

The ambient temperature (Tamb) is the room temperature (293.15K)

The heat transfer equations that were used for the calculation, in this case, are also listed below:

Time-dependent heat transfer equation:

$$k \cdot \nabla^2 T = \rho C_p \cdot \frac{\partial T}{\partial t}$$

Thermal radiation equation:

$$R = \varepsilon \sigma \cdot \left(T_{amb}^4 - T^4\right)$$

Thermal convection equation:

$$q = h_{air} \cdot (T_{ext} - T)$$

where Text represents the external temperature, which is equal to Tamb in this case After being processed by the laser power of 0.5, 0.6 and 0.7 W, silica thin films with different microstructures and thicknesses were obtained. FIGS. 7A-D show the cross-section SEM images of the silica thin films before and after laser scanning. Before sintering, round-shape particles with an average size of about 20 nm were observed. Slit like boundaries with size of about 1-2 nm were observed between the particles. After the film was scanned at the laser power of 0.5 W, the size of the particles decreased to about 10 nm and the gaps between the particles became smaller. When the film was processed at 0.6 W, the microstructure became appears sintered. Grains were observed and the boundaries between the grains were blurry. When the power increased to 0.7 W, the interface between the thin film and the substrate vanished.

At the laser power of 0.5 W, the decrease of particle size can be attributed to the elimination of polymer additives in the sol-gel film. But the temperature induced at this power was not enough to densify the film. As power increased, the porosity of the film decreased as the materials started to sinter. At 0.7 W, the disappearance of the interface between the film and the substrate was attributed to full densification of the silica film, which showed the same microstructure as the dense silica substrate. To measure the thickness after laser processing, the edges of the scratches were scanned using AFM to obtain the difference in height between the center of the surface of silica track and the substrate. FIG. 8 shows that the film had a thickness of ~944, ~733 and ~361 nm after being processed at 0.5, 0.6 and 0.7 W respectively.

The shrinkages calculated using the above equation of these three samples were shown in Table 3. The shrinkage increased from ~19% to ~68% as the power increased from 0.5 W to 0.7 W at a fixed scanning speed. As shown in the microstructure (FIGS. 7A-7E), the Films scanned at 0.7 W power sintered to full density. According to the above equation, the porosity for films sintered at different laser powers can be estimated. Table 3 showed that as the power increased from 0.5 W to 0.7 W at a fixed scanning speed, and the porosity could be controlled from ~60% to ~0%. Furthermore, the sample scanned using 0.7 W laser power showed almost the same percent shrinkage as the furnace-treated film (sintered at 1100° C. for 1 hour). These results reveal that the porosity of the laser-sintered materials film can be locally controlled by varying the operating parameters (e.g. laser power) during laser sintering. With this ability, many materials properties such as the dielectric constant, and mechanical performance, can be flexibly controlled. To evaluate the consistency of the laser sintering process, the same laser parameters were used to process the samples with different as-deposited thicknesses. As shown in Table 4, when using the same set of laser parameters, similar percent shrinkage at ~68% and porosity at ~0% can be obtained for all the laser-sintered samples. Therefore, the laser sintering process, in this case, showed great repeatability.

TABLE 3

Shrinkage, relative density, and porosity of the laser-sintered thin films under different laser parameters as well as the furnace sintered sample.

| Laser parameters | Before (nm) | After (nm) | Percent Shrinkage | Relative Density | Porosity |
|---|---|---|---|---|---|
| As-deposited | 1170 | — | 0% | ~31% | ~69% |
| 0.5 W, 0.1 mm/s | 1170 | 944 | 19.3% | ~38% | ~62% |
| 0.6 W, 0.1 mm/s | 1170 | 733 | 36.7% | ~50% | ~50% |
| 0.7 W, 0.1 mm/s | 1160 | 361 | 68.8% | ~100% | ~0% |
| 1100° C., 1 hour | 1160 | 308 | 68.2% | ~98% | ~2% |

TABLE 4

Microstructure consistency of the silica film using the same laser parameters.

| Laser parameters | Before (nm) | After (nm) | Percent Shrinkage | Relative Density | Porosity |
|---|---|---|---|---|---|
| 0.7 W, 0.1 mm/s | 556 | 175 | 68.5% | ~99% | ~1% |
| 0.7 W, 0.1 mm/s | 1170 | 733 | 68.9% | ~100% | ~0% |
| 0.7 W, 0.1 mm/s | 2231 | 361 | 68.4% | ~98% | ~2% |

Laser sintering technology has shown its advantage in controlling the cracking of the sol-gel derived thin film even when its thickness is over the critical thickness. FIG. 8 shows the optical images of the thick silica film (thickness: ~2.2 μm) treated by laser and furnace respectively. Obviously, while significant random cracking occurred when the silica film was treated in furnace at 1100° C. for 1 h (FIG. 9B), the laser sintered silica track remained crack-free and smooth (FIG. 9A). Since the laser can locally treat the materials, the heating area can be well controlled by the laser. When a track was scanned by the laser on the thin film, the cracks was guided to only propagate along the edges of the laser-treated zone. These results indicated that the cracking can be controlled to be a non-damaging factor with the laser sintering, even when the thickness of the sol-gel derived thin film is over its critical crack-free thickness. After laser sintering, the thickness of the track was reduced to ~704 nm when the laser power was 0.7 W, as shown in FIG. 10.

To verify the accuracy of the numerical FEM model, which is a numerical solution, a one-dimensional (1D) heat conduction model was firstly conducted using the FEM model and compared with the analytical solution. For a time-dependent 1D heat conduction model with constant surface heat flux as shown in FIG. 11A, the analytical equation can be solved from the following equation:

$$T(x, t) = \frac{2q_0''\left(\frac{\alpha t}{\pi}\right)^{1/2}}{k}\exp\left(\frac{-x^2}{4\alpha t}\right) - \frac{q_0''x}{k}\mathrm{erfc}\left(\frac{x}{2\sqrt{\alpha t}}\right) + T_i$$

where $q_0''$ is the constant surface heat flux, which is the intensity of the laser beam in this case, $\alpha = \rho/C_p$ is the thermal diffusivity of the materials, and $T_i$ is the initial temperature which equals to 298.15 K (assuming room temperature).

Using the thermal properties of the fused silica for the above equation, the temperature values along the x axis at different times can be plotted as shown in FIG. 11B. When the input constant heat flux was set at 10 W/mm², the calculated results of the FEM model well matched the analytical solution. The results indicate that the FEM model is accurate to predict the temperature profile induced by the laser beam.

FIGS. 12A-12D show the calculated temperature profiles on the surface of the silica substrate at 50 s during laser scanning with a laser power of 0.7 W. Since the scanning speed was slow, the temperature profile at certain moment can maintain a Gaussian distribution. The calculated temperature at the center position ($T_c$) along the sintered silica track was ~1754° C. for k=1.38 W/(m·K), while it was ~1131° C. for k=2.1 W/(m·K). Based on the width of the silica track sintered at 0.7 W, which was ~140 μm, the calculated temperature on the two sides of the sintered track (Ts) can be also evaluated from the model. The calculated Ts was ~1211° C. for k equaled to 1.38 W/(m·K), while it was ~779° C. when k was set at 2.1 W/(m·K).

When the thermal conductivity of the fused silica at the room temperature was used in the simulation, the calculated $T_c$ was more than 600° C. higher than the temperature that was used to obtain the fully dense silica thin film in the furnace (1100° C.). This temperature of 1754° C. is even larger than the typical softening point of the fused silica. So, this calculated temperature at the power of 0.7 W with k=1.38 W/(m·K) should be much higher than the actual temperature on the silica substrate. This apparent anomaly is resolved by noting that the thermal conductivity of the fused silica increases as the temperature increases. With higher thermal conductivity, more energy is needed to further raise the temperature, which will slow down the rise of the temperature during heating. To obtain a more realistic value of temperature, the thermal conductivity was modified to 2.1 W/(m·K) which is the thermal conductivity of the fused silica at 1100° C. The reason for using this value is because the fully dense silica thin films with similar microstructure and shrinkage ratio can be obtained both at 0.7 W with laser and 1100° C. with furnace. Indeed, the calculated $T_c$ was close to 1100° C. after this modification. Since the heating rate during laser processing is so high that less than ~1 s was needed to heat certain spot on the substrate from room temperature to the sintering temperature, the thermal conductivity of the silica substrate can be assumed to be constant. To compare the temperature profile induced by the laser with the experimental results as well as to further evaluate the scanning spacing effect of laser beam, the thickness profile across the laser-sintered track was measured by the AFM. Shown in FIG. 12B, the thickness variation at the cross section of the track has been obtained after the AFM tip was scanned across the track on the surface. Apparently, the thickness profile showed similar Gaussian distribution as the calculated temperature distribution as well as the laser beam profile. This indicated that the sintering of the thin film did depend on the temperature profile induced by the laser beam. In this way, a more realistic temperature profile has been obtained from this FEM model, which matched to the experimental observation of the resultant microstructure.

The thermal conductivity of silica kept changing during laser sintering for two reasons: (1) the intrinsic thermal conductivity of silica has a temperature dependence, and (2), porosity of silica also evolved during laser sintering. In our modeling, we found that only when the highest thermal conductivity was assumed (the k of fully dense silica at 1100° C.), we can have a good match between modeling and experimental observation. This led to our conclusion that the laser sintering can instantaneously heat the film and caused the sintering. Thus, the effects of thermal conductivity at low temperature and porosity were insignificant. Also, this thermal conductivity modification in the modeling suggested that using the same laser parameters, the induced temperature profile highly depended on the thermal conductivity of the materials. With smaller thermal conductivity, the heat generated by the laser energy will conduct slower within the bulk material so that higher temperature can be locally induced.

With the help of the galvo scanner, silica thin films with desired patterns can be obtained. The scanning of the laser beam was designed to follow the pattern line-by-line with a scanning speed between 0.1 mm/s and 2.0 m/s. By controlling the spacing between two scanning lines, the scanning speed and the laser power, the sol-gel deposition can be sintered in a two-dimensional continuous area instead of a single track. FIG. 13A shows the silica thin films sintered in the pattern of a "tiger paw". The power and the scanning speed was set at 0.7 W and 0.1 mm/s respectively, which were the same parameters under which dense silica track was obtained. The spacing between two scanning lines was set at less than 50 μm according to the FEM model as well as the experimental results to ensure the uniformity of the sintered surface. As seen from the results in FIGS. 12B and 12C, nonuniform surface was obtained by the single scanning. Especially within the width of ~50 μm, the thickness values varied about 80 nm. Therefore, to obtain the uniform surface, the spacing between two scanning lines should kept smaller than 50 μm to overcome the nonuniformity of the single track. In this way, crack-free dense silica thin films with designed patterns can be realized.

TABLE 5

| Comparison of the silica thin films sintered in different dimensions. | | | | |
| --- | --- | --- | --- | --- |
| Condition | Before (nm) | After (nm) | Shrinkage ratio | Porosity |
| Furnace sintered | 1160 | 368 | 68.2% | ~0% |
| Silica tracks | 1160 | 361 | 68.8% | ~0% |
| Silica thin film pattern | 1160 | 367 | 68.3% | ~0% |

In summary, it has been demonstrated that at a fixed scanning speed, the porosity of the silica thin films can be flexibly controlled from almost 0% to ~50% by changing the laser output power. Compared with the conventional sintering method, laser sintering technique can not only obtain the fully dense thin film with similar microstructures, but also flexibly manipulate the porosity and microstructures of the sintered bodies locally. In addition, sintering can be accomplished in a very short time. When the thickness of the film exceeded the critical thickness, laser sintering has the advantage of controlling the crack propagation direction to be along the edge of sintered track. This advantage of laser sintering ensured the crack-free tracks. To understand the thermal effect of laser sintering, an FEM was developed and confirmed by the analytical solution to calculate the temperature profile induced by the $CO_2$ laser. The FEM model shows that laser operating parameters can be mapped to correspond to the temperature profile on the substrates, which provides a good reference for the process control. Moreover, 2-D laser sintering has been realized using the galvo scanner. In this way, sintered silica thin films with designed patterns can be obtained.

Example 3—$CO_2$ Laser Melting of Ceramic Paste

Ceramic paste has shown great printability for different additive manufacturing technologies like SLS and FFE in fabricating ceramic components. By adjusting the rheology of the paste, the thickness of the paste deposition can be controlled from 20 μm to a thick layer in several millimeters. People have shown that the green body density can be much increased when the ceramic powder is deposited in the form of slurry rather than just the dried powder, which facilitates the sintering process.

In some additive manufacturing methods, lasers have been used to help the shaping of the ceramic paste. For example, in the indirect SLS, the low melting binder in the ceramic paste was melted by the laser so that the ceramic particles can glue with each other to form the green parts. Subsequent post-processing like cold-isostatic pressing and furnace sintering are necessary to sinter these green parts. Though 3D dense ceramics has been fabricated in this way, the direct approaches like the direct laser melting is still promising due to its possibility to fabricate complex dense ceramic parts without any post heat-treatments.

Since the melting point of the ceramic materials is usually very high, in order to facilitate the melting process, ceramics with multi-components were widely used for direct laser melting. $Al_2O_3$—$SiO_2$ ceramics with smooth surface and 92% relative density have been obtained using laser. In this case, the liquid phase formed by the laser-melted $SiO_2$, which has lower melting temperature than the $Al_2O_3$, facilitated the densification of the ceramic particles at temperature lower than its melting point [64]. In another case, fully dense $ZrO_2$—$Al_2O_3$ ceramic components, both of which have melting point over 2000° C., have been also obtained by direct laser melting. To both improve the melting process and avoid cracking, the material was preheated to at least 1600° C. during the whole building process.

For single component ceramics like high-density alumina, the direct laser manufacturing is more challenging. Alumina layers with 85% relative density was obtained by melting the powder layer with laser under elevated ambient temperature (up to 800° C.) for the whole manufacturing process. Cracks can be avoided in this way, but residual pores still existed in the final products. Though high temperature preheating can reduce cracks and defects, the fabrication under high ambient temperature really complicate the manufacturing setup and procedures.

Furthermore, people have seldom studied the effect of the laser operating parameters on the surface uniformity of the melted layer. When applying laser melting to additive manufacturing of ceramics, the surface smoothness of each layer should be a crucial requirement for the bonding between layers during stacking. Therefore, if the surface uniformity is controllable by the laser operating parameters like the scanning speed and line spacing under room temperature, it will be essential to simplify the laser-assisted manufacturing technology.

As described below, two kinds of single-component ceramic paste, alumina and fused silica, have been melted by the high-power $CO_2$ laser. In the first part, the flow behavior of the molten alumina and how this behavior affects the microstructures of the single-scanning tracks were studied. Then, based on the assumption of the flow behavior of the melted alumina, the line spacing of the line-by-line scanning strategy can be optimized to improve the surface smoothness of the melted layers. The thickness and microstructures of the uniform layer was also studied. In the second part, the developed strategy was applied to the laser melting of the fused silica paste. The difference between the crystalline alumina and the amorphous fused silica glass in the laser melting process has been discussed.

The ceramic paste was prepared by mixing the ceramic powder with the deionized water (DI-water) containing ammonium polyacrylate (Darvan 821A, Vanderbilt Minerals LLC.), which was used as a dispersing agent. The average particle size of the alumina powder (Purity: 99.8 wt %, A152SG, ALMATIS Inc.) and the fused silica powder (Purity: 99.9 wt %, US Research Nanomaterials, Inc.) are about 1.2 μm and 800 nm respectively. The volume ratio of the DI-water to the powder was kept at 1 for the optimal paste composition. Firstly, the Darvan 821A was dissolved in the DI-water with a weight ratio of Darvan 821A: H2O=0.5:99.5. Then, the obtained solution was mixed with the powder and ground vigorously under ball-milling for two days until the slurry paste was formed.

After that, to adjust the viscosity of the paste, 2-4 wt. % of hydroxypropyl methylcellulose (HPMC) to the $H_2O$ content in the mixture was added into the obtained mixture under mechanical stirring for 30 mins. The obtained alumina paste was deposited on an alumina substrate with a thickness of ~1 mm, while the fused silica paste was deposited on a fused silica substrate with a thickness of ~0.3 mm. The measured density of the dried alumina paste and fused silica paste is about 2.3 g/cm³ and 1.32 g/cm³, respectively, which is 58% of the theoretical density of $Al_2O_3$ ceramics and fused silica glass. Composition of the ceramic paste: 50 vol % powder, 50 vol % DI-water, ~0.5 wt % of $H_2O$ Dispersing agent, ~2-4 wt % of $H_2O$ HPMC.

In order to improve the surface uniformity of the laser-melted alumina layers, the alumina tracks processed by one-time laser scanning at different speeds was firstly studied to figure out the flow behavior of the melted materials during laser scanning. The laser power was fixed at 10 W and the length of the tracks was about 10 mm. FIGS. 14A-14F show the SEM images of the surface of the laser-processed alumina tracks. After scanned by the laser beam at 1.0 mm/s, melting pools with diameters of ~570 μm were formed along the scanning path (FIG. 13A). These melting pools were almost separated with each other. Voids with diameters of ~50 μm were formed at the center of the melting pools. When the scanning speed increased to 1.5 mm/s, the diameter of the melting pools reduced to ~520 μm and the melting pools started to overlap with each other while the voids still existed. As the speed kept increasing, the width of the alumina tracks decreased. The overlapping area between two adjacent melting pools became larger and larger, which made the edge of the tracks more and more straight with less fluctuation and the size of the voids became smaller and smaller. When the speed exceeded 3.0 mm/s, a relatively straight line was obtained and the voids were totally disappeared at the speed of 3.5 mm/s, though the shape of the melting pools can still be observed along the path. The cross-section images of the alumina tracks which were broken at the position of the voids are shown in FIGS. 15A-15F. At the cross sections, the melted tracks will shrink in an opposite bell shape which was caused by the Gaussian beam. For the scanning speed of 1.0, 1.5 and 2.0 mm/s, the depth of melting at the center of the beam was apparently penetrate through the deposition and formed the through voids. When scanned by 2.5 and 3.0 mm/s, the voids were closed at the bottom of the deposition with a depth of ~200 μm and ~150 μm respectively. At 3.5 mm/s, no voids can be found at the cross section.

Figures 14A, 14B, 14C, 14D, 14E, 14F, 15A, 15B, 15C, 15D, 15E, 15F:
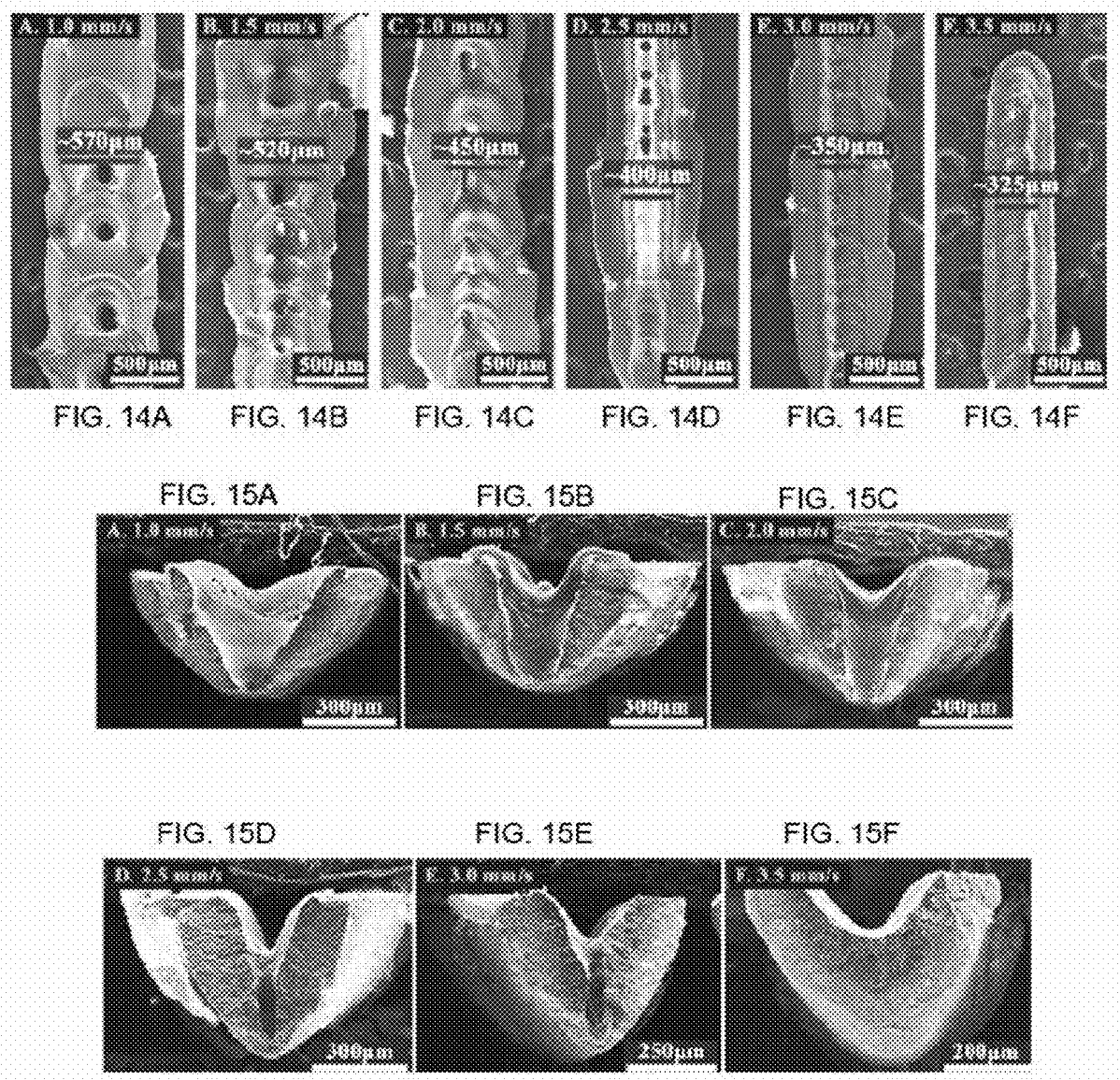
FIGS. 14A-14F are SEM images of laser processed alumina tracks with single line scanning at the speed of 1.0, 1.5, 2.0, 2.5, 3.0, and 3.5 mm/s, respectively (Laser power: 10 W).
FIGS. 15A-15F are SEM images of the cross section of the laser processed alumina tracks with single line scanning at the speed of 1.0, 1.5, 2.0, 2.5, 3.0, and 3.5 mm/s, respectively (Laser power: 10 W).
Figures 16A, 16B, 16C, 16D, 17A, 17B, 17C, 17D, 17E, 17F, 17G:
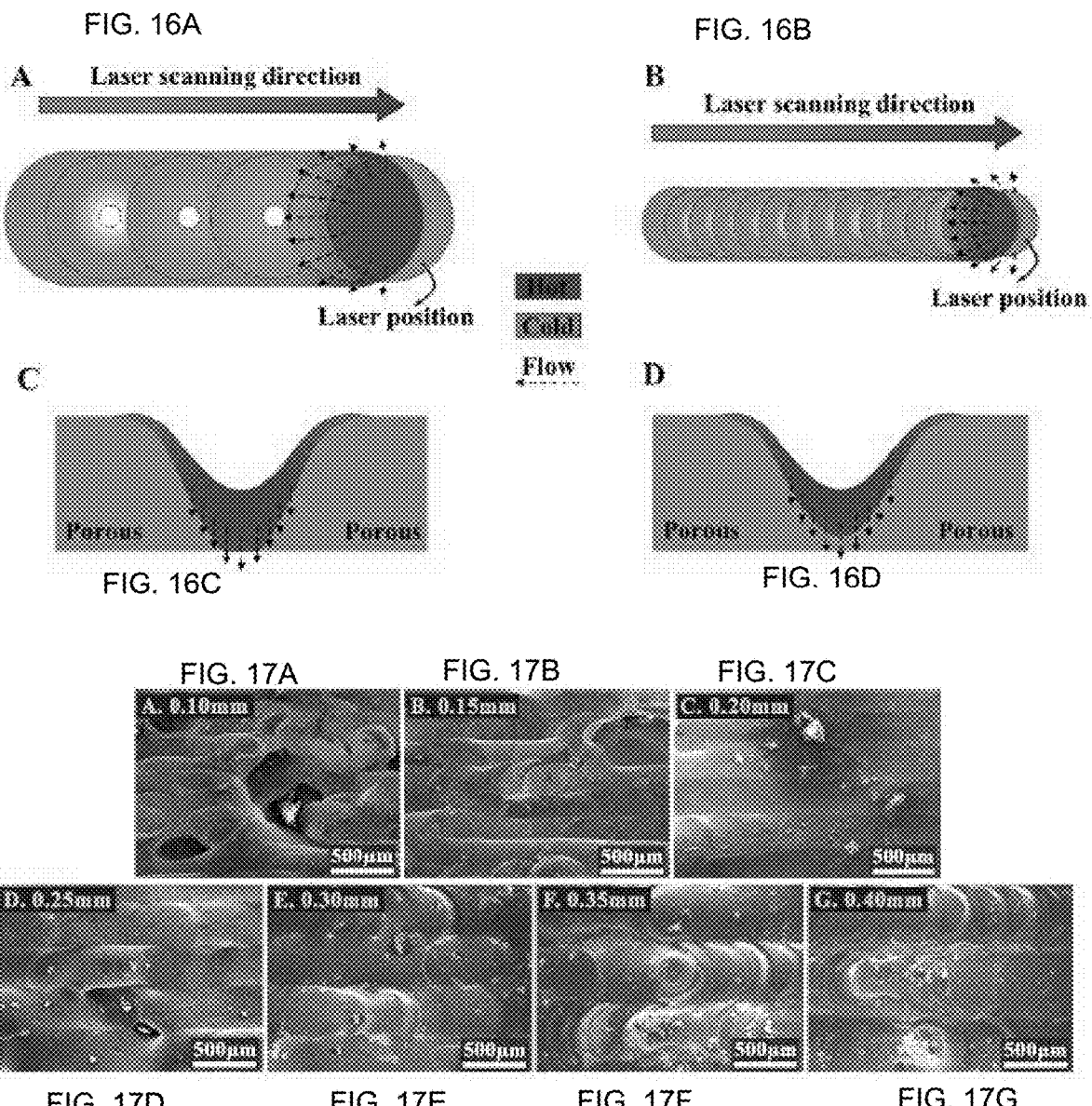
FIGS. 16A-16D are schematics of melted materials flowing along the tracks during laser scanning.
FIGS. 17A-17G are SEM images of the surface of the laser processed alumina layers scanned at different line spacing (Scanning speed: 1 mm/s, Laser power: 10 W).

Once the material on the surface of the paste deposition was melted, it will spread around the surface with zero contact angle due to the same composition (FIGS. 16A and 16B). Since the bottom part was still porous, beside spreading around the surface, the melted materials will also keep permeating downwards into the porous compact caused by the capillary force before it was solidified (FIG. 15C). The rate of permeating can be described by the Lucas-Washburn equation:

$$\frac{dL}{dt} = \frac{k}{\eta\phi} \times \frac{1}{L}(P_c + \rho g L)$$

where L is the depth of the permeating front at time t, k is the permeability, $\phi$ is the porosity of the paste deposition, Pc is the capillary pressure, $\eta$ and $\rho$ are the viscosity and density of the melted alumina, respectively, and g is the gravitational constant. The capillary pressure Pc can be calculated from the surface tension $\gamma$ and the pore size constant R that was related to the pores size of the porous compact using the Young-Laplace equation:

$$P_c = \frac{2\gamma}{R}$$

In this case, since the capillary pressure, which is the driving force, should be much greater than the hydrostatic pressure, the gravitational effects can be ignored. Therefore, the solution to the above equation can be simplified to $$L^2 = \frac{2P_c k}{\eta\phi} t$$

on one hand, for materials with the constant viscosity and density flowing into the same porous media, the square of permeating depth ($L^2$) should be proportional to the time t. The permeation time, t, should be related to the laser processing time because the material was only liquid when it was heated above the melting temperature by the laser beam. On the other hand, for materials with different viscosity, longer permeating depth, L, at the same duration will be expected for the lower viscosity. Therefore, the flow behavior of the melted alumina on the porous alumina layer during laser scanning can be explained as follow. For a single laser spot, due to its non-uniform energy distribution, the induced temperature profile should follow the Gaussian distribution. Since the viscosity of the melted alumina is inversely proportional to its temperature, the viscosity within a laser spot also has a distribution with the smallest viscosity at the center. Thus, when melted by the laser, the material at the center of the laser beam showed the highest permeating rate. For scanning speed lower than 3 mm/s, the time was long enough for the permeation of the melted materials to penetrate the deposition so that the through voids occurred. Lower scanning speed indicated longer melting time for the materials, which will enhance the flow of the melted alumina so that larger voids can be observed along the melted track. At the speed of 3.5 mm/s, the melting duration was limited for the flow of the melted materials, and thus improve the surface stability of the solidified lines.

To fabricate a whole layer through line-by-line scanning, the flow of the molten alumina can be adjusted by the line spacing between two scanning paths to obtain a flat surface. FIGS. 17A-17G show the SEM images of the surface of the laser-melted alumina layer fabricated by different line spacing from 0.10 to 0.40 mm. The scanning speed was set at 1 mm/s. Observed from the SEM images, a smooth and flat surface can be obtained with a line spacing of 0.20 mm. Aligned strips with a width of ~250 μm can be observed on the surface. For smaller line spacing, like 0.10 and 0.15 mm, the surface was rugged and without the pattern of organized strips which was showed in the sample of 0.20 mm. When the spacing was larger than 0.20 mm, the organized strips can still be observed but the surface became rugged again. As the spacing increased, the width of the scrips became larger and larger. The shape of the melting pools aroused on the strips when the spacing exceeded 0.30 mm.

Apparently, by optimizing the line spacing of laser scanning, the surface uniformity of the laser-melted alumina layers can be improved even at a slow scanning speed. Known from FIG. 17A, the width of the single scanning at 1 mm/s is about 500 μm, so the line spacing at the range of 0.10-0.40 mm should introduce overlap between two adjacent scans. With proper overlapping area between two scans, the newly melted flow can be just enough to refill the voids in the previous tracks and thus produce a smooth surface. As shown in FIG. 17C, the line spacing of 0.20 mm is the optimal condition to obtain a smooth surface for a scanning speed of 1 mm/s at 10 W laser power, which is about half of the width of the melting zone. If the line spacing was too small, nearly 70%-80% of the scanning path was overlapped with the previous one. In this situation, the surface roughness deteriorated due to the excessive flow during laser scanning since the area which was needed to refill was too small that the melted materials flew on the surface of the previously melted parts. When the line spacing was continued to increase, the overlapping between the solidified line became poorer and poorer. Though no voids can be observed, the surface was rough due to the inhomogeneous filling of the voids.

Along the strips of the sample processed with the line spacing of 0.20 mm, parallel traces with an angle of ~45° to the strip can be observed (FIG. 17C). Shown in the zoom-in images (FIGS. 18A and 18B), the traces were micro-cracks on the surface with an opening of ~1 μm, and the spacing between every two micro-cracks was ~150 μm. The length of the cracks was about 300 μm with a curved shape and little of them were connected with other cracks on the surface.

The orientation of the micro-cracks depended on the scanning direction of the laser beam. The formation of these micro-cracks can be attributed to the laser melting process. Since the alumina is a kind of crystalline material, the volume of the bulk material will suddenly expand or shrink at the melting point when phase change occurs. This quick volume change led to huge shrinkage when the melted alumina was solidified so that cracks are easily induced. In addition, the localized heating of the laser beam to over 2000° C. within ~1 s will produce large temperature gradient and thermal shock at the alumina layer, which causes large thermal stress and thus cracks the bulk material. The orientation of the micro-cracks was probably contributed by the line-by-line scanning strategy since the shape of the cracks was approximately a quarter of the melting pool. During laser scanning, the micro-cracks were easily form at the edge of the pools after the melted material was solidified. With the overlap between every two scanning, the melted material partially filled the cracks so that the micro-cracks were separated with each other. Therefore, thought the cracks occurred, the melted alumina layer can still keep integral with high smoothness.

To evaluate the microstructures of the alumina deposition after laser processing, the SEM images of the cross section of the alumina layers scanned with 1 mm/s were shown in FIGS. 19A-19C. Apparently, a dense-porous structure with different densities was obtained after laser scanning on the surface. In the top layer, the alumina was fully densified. No pores can be found at this zone and the grain size was much bigger than original paste. This microstructure indicates that the top of the alumina paste was totally melted and formed the big grains. The interface between the dense top layer and the porous bottom layer was so clear that almost no transition zone can be found at this area. The bottom layer was a partially-sintered porous layer.

This heterogeneous dense-porous dual-layered structure indicates that a large temperature gradient was induced inside the paste deposition by the laser beam. Therefore, when the laser beam heated the surface of the deposition, at the top layer, the temperature was high enough to melt and densify alumina quickly. Then, as the heat generated by the laser conducted inside at certain depth, the induced temperature was lower than the melting point of the alumina so that the materials was almost intact and remained porous in this short duration of heat-treatment. That's why the interface between these two layers was sharp without a clear transition zone.

Figure 20:
FIG. 20 includes SEM images of the cross section of the laser processed alumina squares in a wider range scanned with a scanning speed of 1 mm/s. (Laser power: 10 W).

When observed the cross section in a wider range as shown in FIG. 20, the thickness of the melted layer varied between ~90 μm and ~120 μm periodically. The distance between these minimum and maximum values was about 100 μm, which indicated that the period of this periodic variation is about 200 μm. This value is the same as the line spacing that was used for scanning this layer. This periodic thickness variation caused by the nature of the laser beam.

Figure 21:
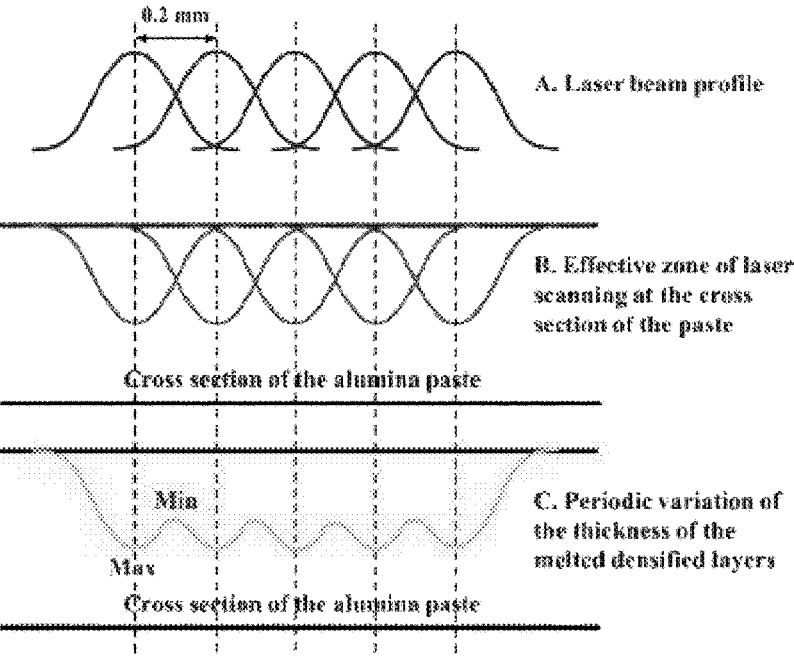
FIG. 21 illustrates schematics of the thickness variation of the laser densified layers with a line spacing of 0.2 mm (Laser power: 10 W, Scanning speed: 1 mm/s).

A simplified schematic in FIG. 21 was shown how the laser beam profile acted on the alumina deposition from the cross-sectional view. Since the energy distribution of the laser beam follows the Gaussian distribution, when it scans line-by-line with partly overlap between two adjacent scanning, the combined laser beam profile will not be even at the top and showed the fluctuation as FIGS. 18A and 18B. Correspondingly, at the cross section of the melted layers, the shapes of the effective area which was processed by the laser beam should show the similar bell shapes as the laser beam profile. Therefore, the periodic thickness variation can be observed at the cross section (FIGS. 18A and 18B).

After studying the laser-melted alumina layer, similar laser scanning strategy was applied to process the fused silica paste. FIGS. 22A-22D show the images of the fused silica layer melted by direct irradiation of the $CO_2$ laser. As shown in FIG. 22A, transparent fused silica glass can be obtained after laser melting with a laser power of 15 W, a scanning speed of 1 mm/s and a spot size of ~2 mm. The line-spacing was optimized to 0.5 mm, which was half of the melting width of the single laser scanning, to obtain a melted layer with a dimension of 10 mm 10 mm. Observed in the SEM images, the laser-melted layer has been fully densified without any micro-cracks on the surface and cross section. Though micro-pores with size in tens of microns were still existed, the laser-melted glass keeps high transparency. The fluctuation on the surface of the laser-melted layer caused by the overlap of the laser beam profile has been observed in the cross-section view (FIG. 22C), which matches the schematic shown in FIG. 21. The thickness of the layer varied periodically from ~100 to ~200 μm.

Apparently, the fused silica paste showed much better controllability than the alumina paste when the $CO_2$ laser interacted with the deposition. This improvement mainly due to the brilliant thermal properties and the amorphous nature of fused silica glass. As mentioned above, the localized and fast heating of the laser beam produce large temperature gradient and thermal shock at the ceramic paste layer, which causes large thermal stress. As shown in Table 6, the coefficient of thermal expansion (CTE) of the fused silica glass is more than 10 times smaller than that of the alumina ceramic. Therefore, when heated to similar temperature within short duration, the fused silica glass can survive the large thermal stress induced by the large thermal gradient at edge of the laser beam. And also, fused silica glass shows brilliant thermal shock resistance to the ultra-high heating/cooling rates of laser beam. Moreover, since glass is amorphous material, the materials properties of glass, such as volume and relative density, varies continuously as the temperature change. FIG. 23 shows the typical graph of specific volume of the glass and crystal varied by the temperature, respectively. A sudden drop of the specific volume of the crystalline materials occurs at the melting point during the bulk cools down from temperature higher than the melting point, while the volume of glass materials varies continuously with a smooth curve.

TABLE 6

Comparison of the properties of alumina and fused silica.

|  | $Al_2O_3$ | Fused silica |
| --- | --- | --- |
| Atomic structure | Crystalline | Amorphous |
| CTE ($10^{-6}$/° C.) | 7.2 | 0.55 |
| k at 20° C. (W/(m × K)) | 12 | 1.38 |

Dense alumina and fused silica have been fabricated using direct laser melting of the ceramic paste. Through studying the alumina tracks scanned at different scanning speed with a fixed laser power, it has been demonstrated that a faster laser scanning speed can reduce the flow of the molten alumina into the surrounding porous powder compact caused by the capillary force, and thus improve the surface stability of the solidified lines. For scanning a whole layer using the laser, the scanning line spacing between two scans needs to be approximately half of the width of melting zone. If the line spacing was too small, surface roughness deteriorated due to the excessive flow. Too large line spacing was not good either due to the poor overlapping between the solidified lines. At the optimal processing conditions, fully densified alumina layers with smooth surface were obtained on top of partly sintered porous alumina. The thickness at the cross section varied from ~90 μm to ~120 μm periodically due to the nature of the laser beam. Similar strategy has been applied to melt the fused silica paste using the $CO_2$ laser. Crack-free transparent fused silica layer was successfully achieved Due to the amorphous property and extremely low CTE, fused silica paste showed excellent controllability when melted by the high-power $CO_2$ laser.

Example 4—Thick Er-Doped Silica Films Sintered by $CO_2$ Laser for Scintillation Applications As demonstrated above, $CO_2$ laser is capable of sintering the sol-gel deposition within ultrashort duration. Compared with the conventional furnace heating process, laser shows great flexibility in porosity and microstructure control by simply varying the laser operating parameters. Also, the cracking can be guided by the laser scanning zone so that crack-free films can be obtained even when the thickness is over the so-called "critical thickness". Moreover, 2-D laser sintering has been realized using the galvo scanner. In this way, sintered silica thin films with designed patterns can be obtained.

This work focused on achieving photoluminescence activated coatings targeting on the fabrication of miniature silica-based scintillating devices using the developed laser sintering technology. The preparation method of the optically activated silica has been developed to dope the erbium ions into the silica gols that have been prepared as described above. The photo- and radio-luminescent properties of the Er-doped silica have been measured and discussed in this section. The obtained Er-doped silica sol-gel deposition was sintered by the $CO_2$ laser and similar fully dense films have been obtained. The microstructure of the laser sintered Er-doped silica films have been studied. The cracking control of the laser sintering technology was further studied by numerically modeling the stress distribution at the edge of the laser-scanned zone. The thickness of the Er-doped silica films has been enhanced to over 1 μm, which is essential for application in different optical devices.

To incorporate Er ions into the silica sol, erbium nitrate pentahydrate ($Er(NO_3)_3 \cdot 5H_2O$, Sigma-Aldrich) previously dissolved in ethanol was added into the TEOS solution after hydrolysis. The molar ratio of $SiO_2:Er_2O_3$ was set at 99.5: 0.5. To improve the solubility of the Er ions in the silica network to avoid concentration quenching, 1 mol. % of $Al_2O_3$ to $SiO_2$ was introduced by means of aluminum nitrate nonahydrate ($Al(NO_3)_3 \cdot 9H_2O$, Alfa Aesar) into the sol. After stirring at room temperature for 1 hour, the sol was refluxed again at 70° C. for another 5 hours under vigorous stirring. The final solution was kept in an oven at 80° C. until a viscous sol was formed. Part of the viscous sol was kept in the oven until total gelation occurred for thermal analyses. The solid gel was ground and then sintered at 1100° C. for 1 hour. The obtained powder was used for photoluminescence measurements.

In order to adjust the viscosity of the sols for dip-coating and to relax stress during firing, poloxamer 407 (Pluronic F127, Spectrum Chemical Mfg. Corp, CA, USA) solution was added into the condensed sol. Poloxamer 407 was dissolved in ethanol with a weight ratio of poloxamer 407:ethanol=1:9, and then mixed with the sol by high intensity ultrasonic sonication such that the amount of added poloxamer 407 was 50 wt. % of the $SiO_2$ weight in the sol until a homogeneous and transparent precursor was obtained.

The obtained Er-doped silica sols were coated on the fused silica substrate using the dip-coating method. The thickness of the coatings was controlled by tuning the substrate withdrawing velocity between 60 and 200 mm/min. After deposition, the coatings were dried at room temperature for 1 min.

The same laser-processing setup as shown in FIGS. 1-3B was used to process the Er-doped silica films.

The morphology of the sintered films was characterized by optical microscopy (Olympus BX60, Olympus Crop.) and scanning electron microscopy (SEM, Hitachi S-4800, Hitachi Ltd.). The thickness of the sintered films was measured by atomic force microscopy (AFM, Alpha300, Witec Instruments Corp.). In order to investigate cracking of the laser sintered coatings, the finite element (FEM) modeling software COMSOL Multiphysics was used to simulate the thermal stress distribution of the laser-sintered region. Photoluminescence spectra were obtained using a spectrofluorometer equipped with double monochromators for both excitation and detection, and a 450 W xenon lamp as the excitation source (Horiba Jobin Yvon Fluorolog 3). All measurements were carried out in ambient conditions with excitation set at 379 nm or monitored at 550 nm, and detection spectral resolution of 1 nm. Scintillation was evaluated by means of radioluminescence measurements under X-ray excitation using a custom-designed Lexsyg Research spectrofluorometer (Freiberg Instruments, Germany) equipped with a VF-50J Xray tube (Varian Medical Systems, UT) with a W target and operated at 40 kV and 1 mA, and a DU920P-BU Newton CCD camera (Andor Technology, UK). Spectra were not corrected for the spectral response of the system.

Figures 24A, 24B, 24C:
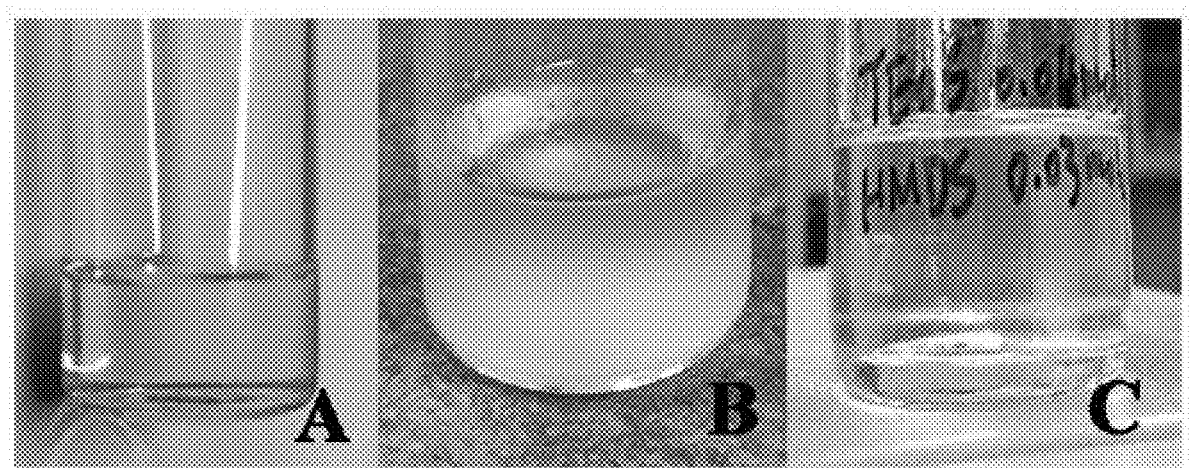
FIGS. 24A-24C are photographs of the Er-doped silica sols with different molar percentage of HMDS after thermal treatment in an oven at 80° C. (25%, 50%, and 60%, respectively).
Figures 25A, 25B:
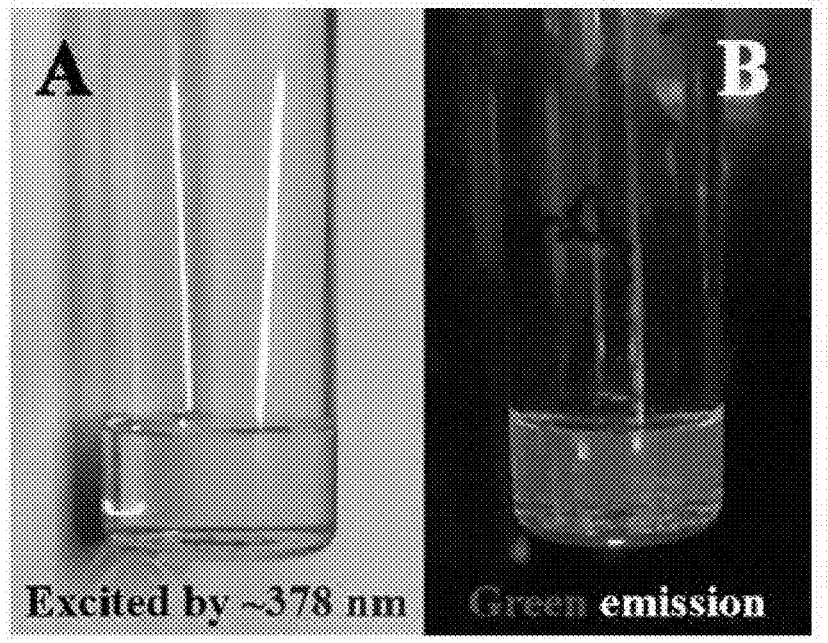
FIGS. 25A and 25B are photographs of an Er-doped silica gel before and after excitation by a ~378 nm LED.

In order to ensure efficient luminescence of the fired coating as well as to improve the coating ability of the sols, homogeneous sols that are gelable and present controllable rheology are required. Since the gelation process of the TEOS is usually very fast, HMDS was introduced to the sol precursors to slow down the gelation process for better control of the viscosity of the silica sol and to enhance Er dispersion. The compositions of the sol and the gelation behaviors are summarized in Table 7. As shown in FIGS. 24A-24C, homogeneous gel can be obtained with precise control of the hydrolysis and polycondensation processes, when the molar percentage of silicon in HMDS is 25% of the total amount of silicon in the solution. This way, the gelation time of the sols could be enhanced to about 24 hours, which was nearly 8 times longer than the time without HMDS. After gelation, the gel showed green emission visible to the naked eye when excited by a 378 nm LED (FIGS. 25A-25B), indicating that the silica sol-gel had been activated by Er ions and that the host was homogeneous at the atomic level. However, when the content of HMDS was increased, precipitation occurred during condensation, thus eliminating the luminescence of $Er^{3+}$ ions due to inhomogeneity of the host material (FIGS. 24B and 24C).

TABLE 7

| | | | | |
|---|---|---|---|---|
| Composition of TEOS-HMDS in the sol precursor and the gelation behaviors. | | | | |
| TEOS (mol) | HMDS (mol) | $Si_{(HMDS)}$:$Si_{(total)}$ | Gelation controllability | Gelation time |
| 0.1 | 0 | 0 | Controllable gelation | ~3 hours |
| 0.075 | 0.0125 | 0.25 | Controllable gelation | ~24 hours |
| 0.05 | 0.025 | 0.5 | Precipitation | — |
| 0.04 | 0.03 | 0.6 | Precipitation | — |

The use of dip-coating method to produce miniature scintillating devices based on silica films requires luminescence functionality. In this proof-of-concept work, luminescence was evaluated by means of photoluminescence, and scintillation by means of radioluminescence measurements. These measurements revealed emission lines corresponding to $Er^{3+}$4f-4f transitions, and intrinsic emission from the host as shown in FIGS. 26A-26E.

Figures 26A, 26B, 26C, 26D, 26E:
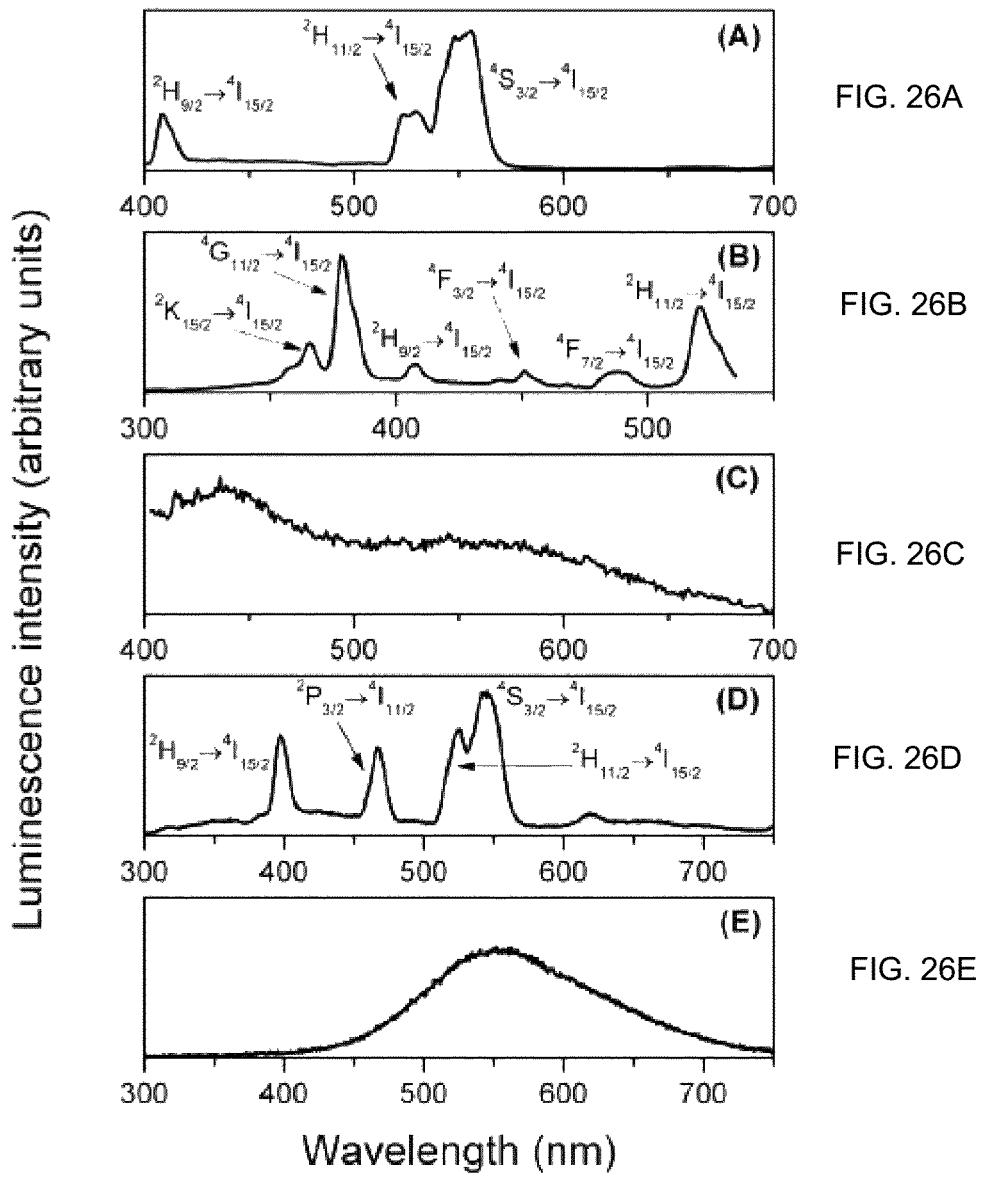
FIG. 26A is a graph showing the photoluminescence spectrum of Er:SiO2 under 379 nm excitation.
FIG. 26B is a graph showing the photoluminescence spectrum of Er:SiO2 monitored at 550 nm.
FIG. 26C is a graph showing the photoluminescence spectrum of SiO2 under 379 nm excitation.
FIG. 26D is a graph showing the radioluminescence spectrum of SiO2:Er.
FIG. 26E is a graph showing the radioluminescence spectrum of SiO2.

The photoluminescence spectrum of powder fired at 1100° C. for 1 hour is shown in FIG. 26A where a series of emission lines at 409, 524, and 548 nm were observed and assigned to the 2H9/2→4I15/2→2H11/2→4I15/2, and 4S3/2→4I15/2 transitions, respectively, together with a broad band within ~400-500 nm. The photoluminescence excitation spectrum monitored at 550 nm (FIG. 26B) shows a number of relatively narrow lines that matched the energy levels of the $Er^{3+}$ ion, thus confirming the nature of the luminescence center responsible for the observed emission spectrum obtained under excitation at 379 nm. Photoluminescence measurements of the undoped sample were also executed under 379 nm excitation to check for the contribution of the host to the luminescence signal. These results are shown in FIG. 26C where the presence of two broad bands centered at ~440 nm (2.82 eV) and ~550 nm (2.25 eV) were observed. These bands have been identified to be either from self-trapped excitons or defects like oxygen vacancy and the E' center.

FIG. 26D shows that the radioluminescence spectrum of the $SiO_2$:Er sample was dominated by the 2H9/2→4I15/2, 2P3/2→4I11/2, 2H11/2→4I15/2, and 4S3/2→4I15/2 transitions, as indicated in the figure, together with a broad contribution between ~300 and 500 nm. FIG. 24E shows the radioluminescence spectrum of the undoped sample that is composed of a broadband. The results of Gaussian deconvolution of this band (black line) are shown in the inset as a function of the photon energy and revealed the presence of two bands (blue lines) centered at 450 nm (2.75 eV) and 555 nm (2.23 eV), in good agreement with photoluminescence results shown in FIG. 26C and with the literature. Emission within about 400-550 nm was reported from $SiO_2$ prepared by sol-gel, and within about 350-450 nm from oxygen vacancies in thermally oxidized $SiO_2$ layers. It is noted that the emission line at 467 nm was assigned to the transition 2P3/2→4I11/2, in agreement with a cathodoluminescence investigation of YAG:Er.

The reason for this emission line to appear only in the radioluminescence spectrum is explained by the fact that the 2P3/2 energy level is inaccessible to the excitation used in the photoluminescence measurements (379 nm).

In summary, the strongest emission lines obtained under X-ray excitation match the range of maximum detection efficiency of photomultiplier tubes commonly used in scintillation applications. These results confirmed that silica could be activated by rare earths to produce efficient luminescence.

Coatings with thickness of ~0.9 μm and ~3 μm were obtained with substrate withdrawing velocities of 80 and 200 mm/min, respectively. Scratches were intentionally made perpendicular to the scanning path on the deposited films using a blade before laser scanning, as shown in FIG. 27A. FIGS. 27A-27D show optical images of the sample sintered under 7 W laser irradiation at a scanning speed of 1 mm/s. After scanning, a 10 mm track with a width of ~750 μm was observed. The scratches were still visible after laser sintering, which means that the film was not significantly ablated by the laser beam. SEM micrographs did not reveal the presence of cracks in the coatings after laser sintering for both the films.

In order to further confirm that the film was not removed by the laser beam as well as to measure its thickness, AFM measurements were carried out to image the edge of the scratch to obtain the height difference between the coating and the substrate. These results are shown in FIGS. 28A-28B. It is clear that the films stayed on the substrate for both cases. These results also revealed that the films shrank, consistent with sintering during laser scanning. Based on the thickness values before and after laser sintering, the shrinkage ratio of the coating was calculated (Table 8). Comparison of the shrinkage ratio of the laser sintered coating with the furnace sintered showed all these samples exhibited a similar shrinkage ratio of ~67%.

TABLE 8

| | | | |
|---|---|---|---|
| Shrinkage ratio of the thin films sintered at different conditions | | | |
| Condition | Before sintering (nm) | After sintering (nm) | Shrinkage ratio |
| Laser, 7 W, 1 mm/s | 914 | 300 | 67.2% |
| Laser, 7 W, 1 mm/s | 3080 | 1038 | 66.3% |
| Furnace, 1100° C., 1 h | 920 | 293 | 68.2% |

Figures 29A, 29B, 29C, 29D, 29E, 29F:
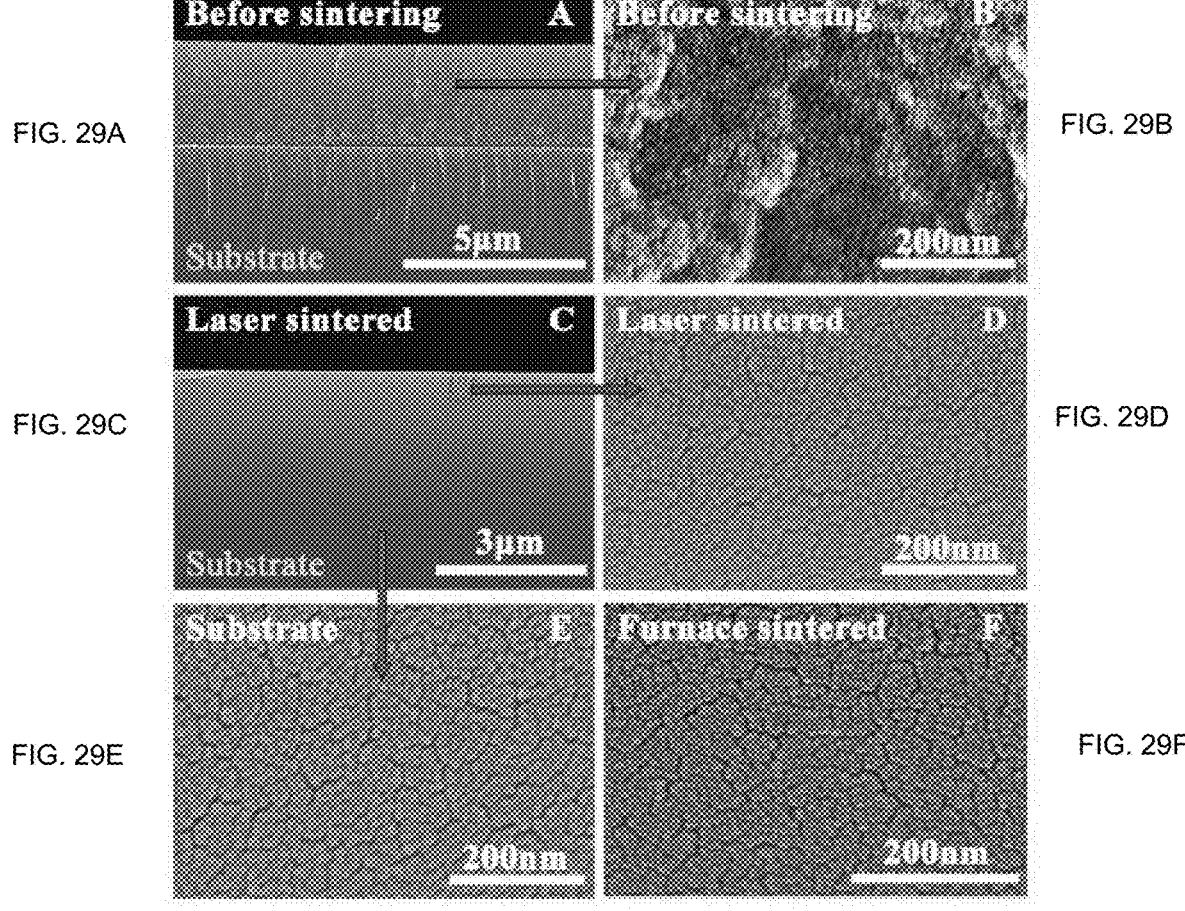
FIGS. 29A-29F are SEM images of the cross section of a silica coating that show the laser sintered silica film had the same microstructure as the furnace sintered sample.

The evolution of the morphology of the coatings before and after laser sintering, as well as the furnace sintered, was evaluated by SEM (FIGS. 29A-29F). As shown in FIG. 29B, there were many voids between the particles before sintering, and after laser sintering the film became denser (FIG. 29D). The interface between the substrate and the coating was hardly discernable. When compared with the high magnification image of the furnace sintered film and the silica substrate all of them showed similar morphologies. This indicated that >1 μm silica coatings can be densified to a similar level as it can be obtained by means of traditional furnace sintering.

FIGS. 30A and 30B present optical microscopy images of films thermally treated by laser beam and using a conventional furnace. FIG. 30A shows that in the central region that was thermally treated by the laser beam, no cracking occurred, while FIG. 30B shows that significant cracking and delamination occurred in the film treated in a furnace at 1100° C. for 1 hour. After imaging, the laser sintered film was heat-treated in a furnace at 1100° C. for 1 h. It was found that the area not sintered by the laser beam cracked with the spacing of the cracks being about 700 μm while the laser scanned region remained crack-free and smooth. These results show that for relatively thick sol-gel derived films (~1 μm), cracking and delamination can be prevented by laser sintering.

In order to understand the cracking control mechanism of laser sintering, a FEM model was developed to evaluate the stress distribution on the sol-gel derived film during laser sintering.

Figure 32A:
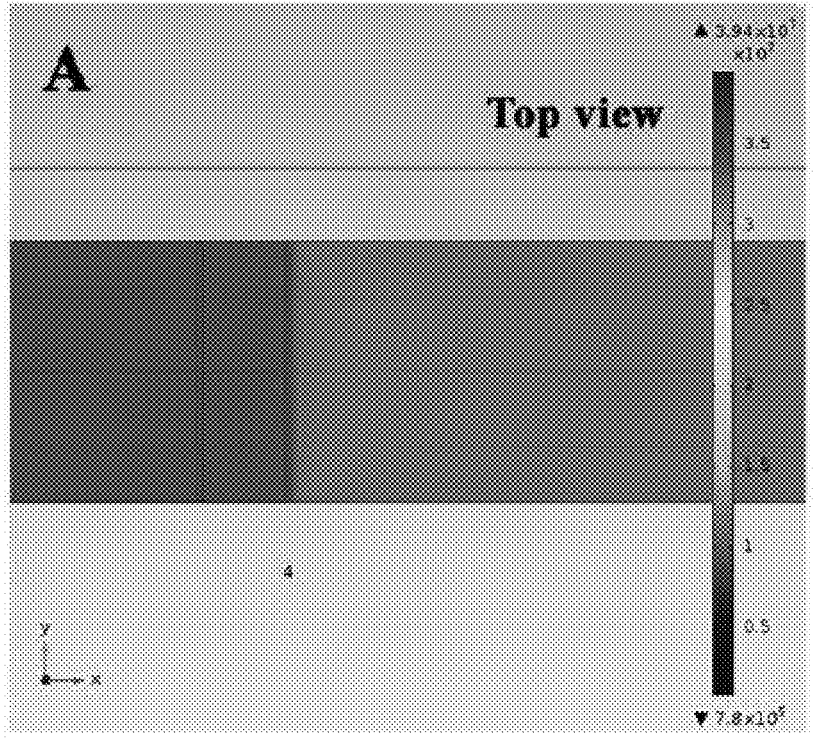
FIG. 32A illustrates the calculated stress distribution of the top surface of the laser sintered film.
Figure 32B:
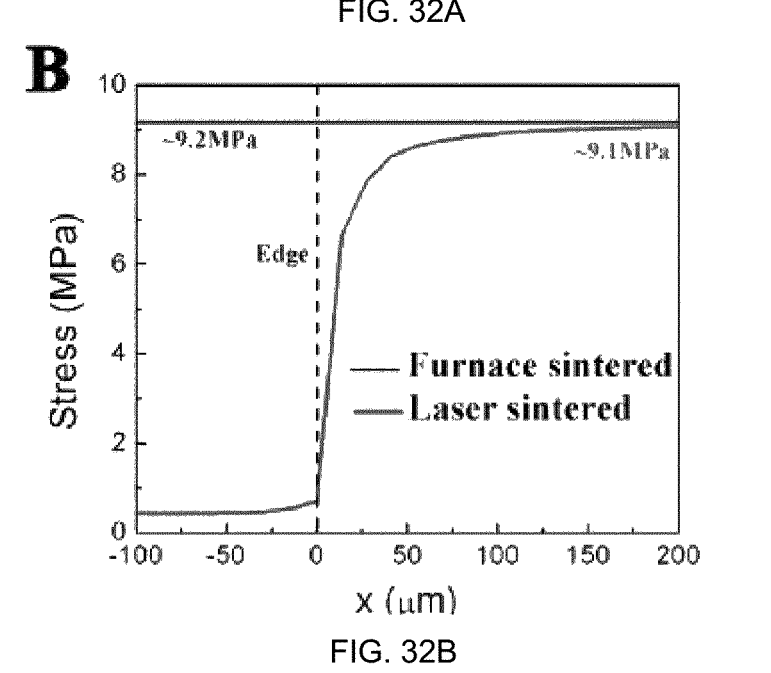
FIG. 32B illustrates the stress distribution along the x direction at the interface between the laser sintered zone and the un-sintered part.

The simulation concept is similar to the 'strained substrate model' developed by Crosskreutz and McNeil, and further expanded by Evans and his coworkers. Due to symmetry considerations, it is possible to consider stress to be one-dimensional. The simulation schematic is shown in FIG. 31A-31C and the relevant parameters are listed in Table 9. In the model, the thin film was coated on a silica glass substrate. Since a polymer additive was added into the sols before dip-coating, after deposition on the substrate and drying, the coating was much softer than the substrate. Consequently, the Young's modulus of the coating before sintering was assumed to be close to the polymer additive estimated to be 2 GPa. When treated in a furnace, the film was heated homogeneously such that the whole film was converted to glass at the same time. On the other hand, due to the localized nature of the laser beam, sintering occurred in a small spot of the film while the rest of the area of the film remained at room temperature. Therefore, two stress models were set based on these two different heating situations. A fixed tensile strain was applied at one end of the substrate along the x direction to simulate the thermal stress induced by heating process of the coating, while the opposite end was fixed. For the laser sintering case, the strain was only applied to the substrate underneath the laser sintered area, but not to the rest of the film, since only the laser sintered region suffers shrinkage. The stress distribution results of the FEM calculations are shown in FIGS. 32A and 32B. In the case of laser sintered, the induced stress was found to be about 9.1 MPa homogeneously in the sintered region. However, at the edge of the sintered region, the induced stress is dramatically decreased close to zero. On the other hand, in the case of furnace sintered films, a constant stress of about 9.2 MPa was found within the whole coating. Due to the large difference between the Young's modulus of the "hard" silica and the "soft" non-sintered film, the thermally induced stress can be relaxed by the surrounding non-sintered film.

Cracking of the films induced by the heating process is related to the total volume of the heating zone. When the heating volume exceeds certain value, cracks will occur on the surface of the films. For a fixed film thickness, the area sintered by the laser beam can be used to estimate the spacing between the cracks. If the dimension of the heating area is larger than the critical spacing of the cracks, cracking will occur. Since the dimension of the heating area cannot be controlled in furnace sintering, cracking will occur whenever the thickness of the film exceeds a certain value, the so-called critical thickness. On the other hand, laser sintering allows for precise control of the heating area. Consequently, as long as the laser sintered area is smaller than the predicted spacing between the cracks, cracking can be prevented even when the film exceeds the critical thickness. The spacing between the cracks was determined to be about 700 μm after furnace heating (FIGS. 32A-32B), which is similar to the width of the laser beam track thus effectively preventing cracking to occur during laser sintering (FIG. 32A).

TABLE 9

| Parameters of simulation | | | |
| --- | --- | --- | --- |
| Parameter | Symbol | Unit | Value |
| Young's Modulus of silica | $E_s$ | GPa | 73.1 |
| Young's Modulus of soft gels | $E_g$ | GPa | 2 |
| Applied strain | $\varepsilon_x$ | — | 0.013% |

In conclusion, erbium-doped silica films were deposited by the dip-coating method from sol precursors and sintered by laser scanning and using a furnace. The shrinkage ratio of the sintered films was found to be about the same for both sintering methods. SEM imaging suggested the laser sintered film to have achieved a density similar to that of the fused silica substrate. Importantly, it was shown that laser scanning sintering is able to suppress cracks during sintering in relatively thick films (sintered thickness greater than 1 μm). A FEM model was developed to analyze the thermal stress distribution induced by sintering. The model showed that due to the localized sintering of the laser beam, sintering mismatch stresses are localized resulting in stressed volume being below the critical volume needed for cracking. Photoluminescence and radioluminescence results on powders derived from doped gels confirmed that silica could be activated by rare earths to produce efficient luminescence.

Example 5—High-Resolution Laser 3D Printing of Transparent Fused Silica Glass

Fused silica glass has been widely used in optical components and optoelectronic devices for its excellent optical, thermal and mechanical properties. However, the manufacturing of the fused silica glass is still difficult since it always requires high-temperature melting and casting processes, which are usually operated over 2000° C. Additive manufacturing (AM), the so-called 3D-printing, has been developed since the 1980s. It becomes promising both in industry and academia due to its capability of rapid-prototyping and freedom in geometry design. Recently, some AM technologies, such as stereolithography (SLA) and direct ink-jet writing (DIW), have been developed for printing the fused silica glass with high dimensional resolution. In these cases, the polymer-silica composite was prepared for the printing process and the obtained green part was needed to go through a series of post-heat-treatments toward the transparent structures.

Besides, some direct AM methods were also developed for AM of glass through introducing the in-situ heating process during printing. The soda-lime glass has been printed by a modified fused deposition modeling (FDM) method. The glass powder was heated to around 1000° C. by an integrated heater before the nozzle, and then the melted glass was extruded by the nozzle to draw the 3D objects. In another case, a manually fed soda lime glass wire was melted by a $CO_2$ laser and deposited layer-by-layer to form the 3D structures. However, the obtained products in these works were coarse with high surface roughness and defeats. And they are difficult to melt the high purity silica glass since the fabricating temperature is normally more than 2000° C.

Demonstrated above, transparent fused silica glass layer has been fabricated by direct laser melting of the fused silica paste. In this section, by integrating the materials extrusion and the direct laser processing, a direct method for 3D printing of transparent fused silica glass without any post-heat-treatment is developed. The effect of laser parameters like laser output power on the density control of the laser-melted glass is investigated. The optical transmission of the 3D-printed fused silica glass from ultraviolet (UV) to infra-red (IR) region is characterized to evaluate the transparency. By compared to the transparency of the commercial fused silica substrates, the laser 3D-printed fused silica glass shows comparable transparency with the commercial products, indicating that the 3D-printed glass is suitable for various optical applications.

The process flow for laser 3D printing of fused silica glass is shown in FIGS. 33A-33C. The CAD model of the printed object was generated in SolidWorks and input into the DMC software, which sliced the CAD model into a bunch of 2D-patterned layers with designated thickness (FIG. 33A). In every layer, two processing technologies were applied to build the patterns. Firstly, a precise micro-dispenser (eco-PEN300, Preeflow by ViscoTec) was used to deposit the fused silica paste based on the toolpath of the sliced 2D pattern. After the deposition of each layer, a high-power $CO_2$ laser (Firestar ti100, SYNRAD Inc.) was applied to melt the paste. With laser melting, the fused silica particles can be quickly fused both in plane and with the adjacent layer (FIG. 33B). These two actions repeated layer-by-layer in the sequence from bottom to top and the 3D CAD model is directly printed out as a fused silica glass part without any post-heat-treatment. (FIG. 33C). Through optimizing the laser operating parameters such as the laser output power, scanning speed and spot size, the transparent fused silica glass can be directly obtained.

FIG. 34 shows the curved thin wall structures fabricated by the laser 3D printing process. Only one track of paste with varied curvature was extruded and melted in every layer. By stacking and fusing the tracks layer-by-layer, thin wall with thickness in the range from 0.3 to 0.8 mm can be easily obtained, while it is difficult to shape using the conventional methods. The thickness of the as-printed paste for every layer is controlled to be ~100 μm. After melted by the laser, the thickness of the printed layer shrinks to ~60 μm with a shrinkage ratio of 40% in the thickness direction. By adjusting the focusing position of laser beam, the melting depth can be well controlled in the range of 100-200 μm so that both the as-printed paste and top layer of the dense part can be melted by the laser beam, resulting in the fusing of materials both in plane and with the previously printed part. Since the width of the wall is much smaller than the dimension of the printed object and only a thin paste is processed for every layer, nearly no deviation between the CAD model and the finished parts can be observed.

Figures 35A, 35B:
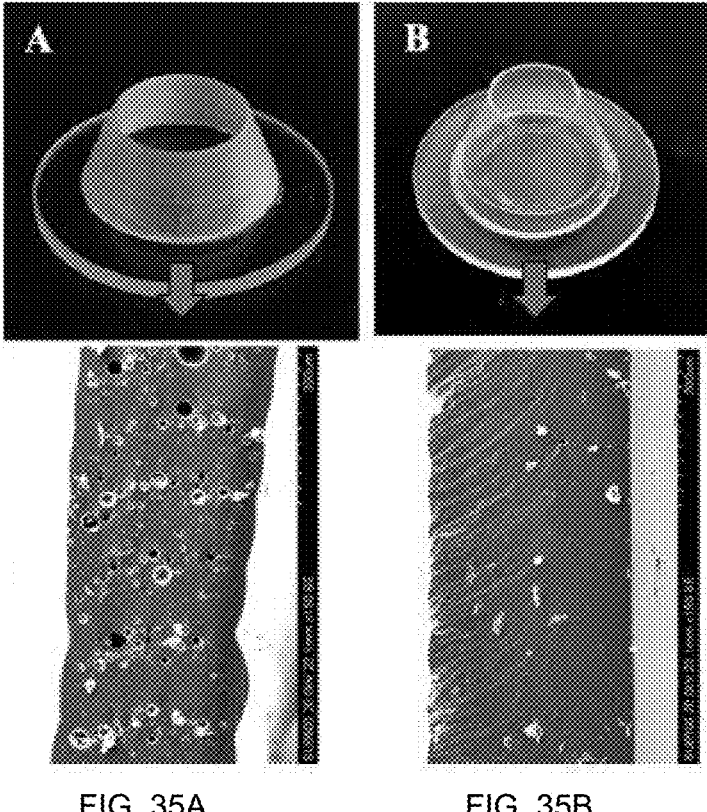
FIGS. 35A and 35B are pictures of the 3D printed fused silica glass and their related SEM images of the cross section view of the thin wall melted by 12.5 W laser power and 15 W laser power, respectively. (Scanning speed: 1 mm/s, Spot size: ~2 mm).

The transparency of the laser-melted fused silica glass can be improved by tuning the laser operating parameters. As shown in FIGS. 35A and 35B, the transparency of the laser-melted fused silica can be much improved by tuning the laser output power while other parameters were fixed. Observed from the cross-section SEM images of the samples, the increase of the laser output power reduced the porosity of the laser-melted materials, resulting in the improvement of the transparency. In this way, laser shows its unique capability to flexibly modify the materials properties during the manufacturing process.

The optical transmission of the 3D-printed fused silica glass in the wavelength ranging from 200 nm to 2000 nm was evaluated. As shown in the inset B of FIG. 36, the surface of the 3D-printed fused silica glass with a thickness of 1.5 mm was polished to optical finishing before measuring the transmission spectrum. Two kinds of commercial fused silica glass substrates: a fused silica substrate with similar $SiO_2$ purity (99.9%) to the 3D-printed one and the classic Corning 7980 substrate were measured in the same optical range for comparison.

Figures 36, 37A, 37B, 37C:
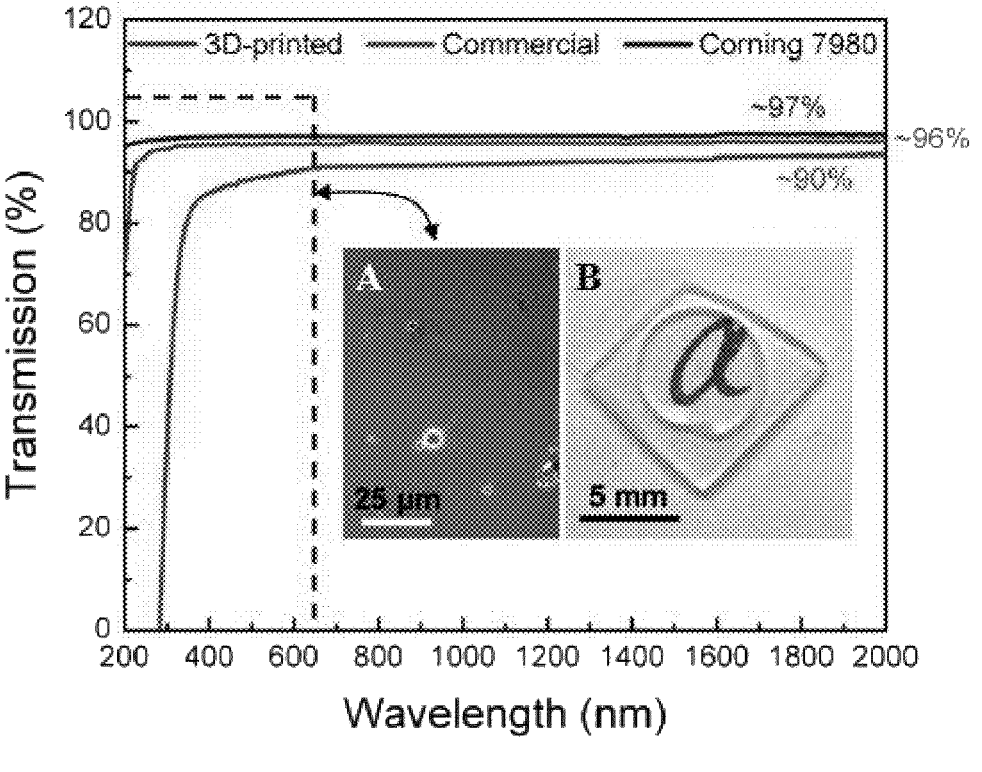
FIG. 36 illustrates the optical transmission spectra between 200 nm and 2000 nm of the 3D printed fused silica glass, the commercial fused silica substrate with silica content 99.9%, and the Corning 7980 fused silica glass, respectively. The inset shows (A) cross section SEM image of the 3D printed fused silica substrate and (B) picture of the 3D printed fused silica glass substrate.
FIGS. 37A-37C are schematics of the process flow for embedding the optical fibers into the ceramic substrate.

As shown in FIG. 36, the optical transmission of the 3D-printed fused silica glass reaches 90% when the wavelength is larger than ~650 nm. In the region from 200 to 650 nm, the transmission of the 3D-printed glass decreases dramatically while the transmission of the commercial substrates keeps over 90%. The optical loss in the UV to visible region is probably caused by the micro-pores in the 3D-printed glass as shown in the inset A of FIG. 36, which scattered the light at this wavelength range. The 3D-printed glass shows comparable optical transmission to the commercial fused silica glass products, especially in the red-IR region, indicating that the 3D-printed fused silica glass is suitable for various optical applications.

In summary, high-resolution laser 3D printing of transparent fused silica glass has been accomplished without any post-treatments by integrating materials extrusion and direct laser processing in an integrated system. The curved thin wall glass structures with a wall thickness of 0.3-0.8 mm are fabricated, which are difficult to shape using the conventional methods. By adjusting the laser processing parameters like the laser output power, the density of the laser-melted glass can be flexibly controlled, resulting in the control of the transparency. The optical transmission of the 3D-printed fused silica glass from 200 to 2000 nm has been evaluated. Over 90% optical transmission can be obtained when the wavelength is larger than ~650 nm, while the optical loss increases at the short wavelength region. By compared to the transmission of the commercial fused silica substrates, the 3D-printed fused silica glass in this case shows comparable transparency with the commercial one in the red-IR region, indicating that the 3D-printed glass is suitable for optical applications.

Example 6—Laser-Assisted Embedding of all-Glass Optical Fiber Sensors into Bulk Ceramics for High Temperature Applications Due to their brilliant mechanical and thermal properties, ceramic materials have been widely used as the critical components of systems working in high temperatures, such as energy production systems, high-temperature heating equipment, and aerospace facilities. Since these systems normally work under extremely harsh conditions for a long period, the evaluation of their structural health is necessary for system maintenance and optimization. An embedded sensor is one of the effective ways to accomplish this objective. The real-time information of the part, such as temperature and strain, can be continuously collected through in-situ monitoring of the embedded sensors during the system is operating.

All-glass optical fiber sensors are among the promising candidates for structural status monitoring under harsh environment. In addition to the well-known advantages such as compact size, high spatial resolution, fast response and immunity to electromagnetic interference, the all-glass optical fiber sensors are robust to survive and operate under high temperature. For example, the optical fiber Fabry-Perot interferometer has shown great long-term stability up to 1100° C. In addition, since the optical fiber intrinsic Fabry-Perot interferometer (IFPI) sensor is highly sensitive to the tensile stress applied to the optical fiber, this sensor is capable of sensing the thermal strain of the components if the fiber is well attached to the parts.

In general, the fabrication of the optical fiber sensor embedded component is required to attach the sensor to the part without damaging the optical fiber. One of the common methods is to mount the fiber sensors on the surface of the finished parts with protectors. This technique has been proposed for years to monitor the health status of concretes. However, since the sensors are packaged with protectors, the poor attachment between the sensors and the components probably leads to offset between the sensor response and the real variation of the part like the temperature and strain. In addition, for harsh environment applications, the sensors are usually mounted far away from the operating points to avoid damage to the optical fiber. In this way, the sensor only detects the variation of the part indirectly with low spatial and temporal resolution. Additive manufacturing (AM) has been developed to embed the optical fiber sensors into the bulk materials during the part is being fabricated. In this way, the optical fibers are buried inside the components, which significantly improves the attachment between the sensor and parts to fabricate the so-called "smart structure". However, it is still quite difficult to embed the all-glass optical fiber sensors into the high-temperature ceramics such as $Al_2O_3$ and YSZ using the AM, since the glass optical fiber cannot survive the post-sintering process of the ceramic green parts. Sapphire optical fiber has been successfully embedded into the alumina ceramics using the AM method, but the high optical transmission loss of the sapphire optical fiber limits it for high-performance sensing applications.

Recently, laser processing has shown its unique capability for high-resolution processing of ceramic materials. The ultrafast laser has been developed for micromachining of fine structures like microchannels on bulk ceramics with a resolution up to several microns. Since the pulse duration is shorter than the typical thermalization time of materials, the ultrafast lasers can machine the materials without thermally degrading the mechanical strength of the parts. In addition, fast, localized and flexible heat treatment to ceramic materials has been realized using the CO2 laser. The laser heating zone can be precisely controlled in three dimensions with ultrahigh heating and cooling rate, and the material properties, such as density and cracking propagation, can be flexibly controlled by adjusting the laser parameters. Both of these laser processing technologies are promising to overcome the challenge to embed the all-glass optical fiber sensors into the bulk ceramics.

Here we propose a laser-assisted sensor embedding process to embed the all-glass optical fiber sensors into bulk ceramics. A specially designed two-step microchannel was machined on an $Al_2O_3$ substrate for sensor embedment using a picosecond (ps) laser. An optical fiber IFPI sensor was embedded at the bottom of the microchannel and covered by the $Al_2O_3$ slurry. The filled $Al_2O_3$ slurry was subsequently sintered by a $CO_2$ laser to seal the sensor inside the part. The design of the two-step microchannel was based on the shape of the optical fiber and the heating depth of the $CO_2$ laser. During the laser sealing process, the spectrum of the optical fiber IFPI sensor was in-situ monitored to ensure the survival of the sensor and optimize the laser sintering parameters. The microstructure of the sensor-embedded $Al_2O_3$ substrate was presented to evaluate the laser sealing quality. By heated in the furnace through high temperature, the high-temperature stability and response of the embedded optical fiber IFPI sensor were both investigated.

FIGS. 37A-37C schematically illustrate the process flow to embed the all-glass optical fiber sensor into the $Al_2O_3$ substrate. A microchannel with a two-step structure was machined on a commercial $Al_2O_3$ ceramic substrate (AO96, MTI Corporation) by a ps Nd:YAG laser (APL-4000, Atto-dyne Inc.). The ps laser firstly focused on the top surface of the substrate and did raster scanning in the predesignated dimension to fabricate a groove. As the material was removed from the part, the focusing position of the laser beam was moved downwards to keep focusing on the laser-ablated surface to dig the groove into the designated depth. A narrower groove was machined inside the top-layer one with a similar shape of the optical fiber to host the sensor (FIG. 37A).

To bury the sensor inside the $Al_2O_3$ substrate, the $Al_2O_3$ slurry, which is high-temperature alumina filled ceramic adhesives (Ceramabond 503, Aremco Inc.), was applied to cover the sensing fiber by the on-demand slurry dispensing process. The flow rate, thickness and width of the dispensing line were controlled by a micro-dispenser (eco-Pen 300, Preeflow), which is capable of filling the microchannel with precise location and slurry quantity control (FIG. 37B).

After the filled $Al_2O_3$ slurry completely dried in air, a $CO_2$ laser (Firestar v20, SYNRAD Inc.) was used to scan along the channel to densify the filled $Al_2O_3$ slurry and seal the sensor inside the $Al_2O_3$ substrate. Before laser sintering, the $Al_2O_3$ slurry was preheated by fast $CO_2$ laser scanning at low laser power density for 1 minute. Subsequently, the $CO_2$ laser scanned the preheated $Al_2O_3$ slurry with higher laser power density and slower scanning speed for laser sintering. The spectrum of the sensor was in-situ monitored by an optical spectrum analyzer (OSA, AQ6370D, Yokogawa) during the whole laser heating process (FIG. 37C).

The ceramic parts with embedded optical fiber IFPI sensor were heated inside an electric furnace from room temperature to 800° C. The spectrum of the IFPI was collected every 100° C. by an optical spectrum analyzer (OSA) during both the heating and cooling process. The ceramic parts were kept at a certain temperature for 15 min to before the spectrum was recorded. To evaluate the effect of the laser heating process on stabilization of the embedded optical fiber under high temperature, the embedded ceramic part without laser heat treatment was also heated in the furnace under the same conditions for comparison.

To firmly attach the optical fiber to the ceramic substrate, the microchannel needs to have a similar shape to the optical fiber to host the fiber without gaps at the bottom. In addition, to protect the optical fiber during the laser sealing process, the distance between the top of the optical fiber and the surface of the substrate should be slightly larger than the sintering depth of the $CO_2$ laser on the $Al_2O_3$ slurry, which is about 100 μm as reported previously. Since the diameter of the standard optical fiber is 125 μm, the depth of the microchannel is designed as ~250 μm in this case to both sinters the slurry and protect the fiber. However, due to the cone shape of the focused ps laser beam, it is difficult to precisely control the shape of the microchannel when its depth is larger than the opening width.

In this case, a two-step microchannel was adopted to facilitate the microchannel fabrication. As shown in FIG. 38A, the top layer of the microchannel was fabricated with an opening width of 350 μm and a depth of 125 μm, and a narrower channel was machined inside this top layer with a width of 150 μm and a depth of 125 μm. The wider top layer decreases the general aspect ratio of the microchannel, resulting in more precise control on the shape of the bottom channel which hosts the optical fiber. Moreover, due to the cone shape of the ps laser beam, the laser-machined microchannel becomes a bell shape as the channel depth increases. As shown in FIG. 38B, the homogeneous bright part under the optical fiber after it was placed on the bottom of the narrower channel indicates that the curved bottom of the bell-shaped channel well fits the optical fiber without large gaps between the fiber and the substrate.

To seal the sensor inside the substrate, the $CO_2$ laser sintering process is applied to densify the $Al_2O_3$ slurry without damaging the embedded sensor. The sensor spectrum was in-situ monitored during the laser sealing process to ensure the survival of the optical fiber sensor. With a fixed scanning speed at 1 mm/s and fixed spot size at 1 mm, the $CO_2$ laser scanned the slurry with different laser power to optimize the laser sealing parameters. The sample was cooled down to room temperature before scanned by a different power value. The laser kept scanning the slurry until the interference spectrum is slightly affected by certain laser power, which is considered to be the optimal laser sealing parameter.

When starting from the laser power of 1 W, the optimal laser power was obtained at 9 W. FIG. 39 shows the spectrum of the embedded optical fiber IFPI sensor before and after laser scanning at 9 W laser power. A clean interference pattern was maintained with no loss after laser sealing. The spectrum shifted ~0.5 nm to the longer wavelength region, indicating that slight tensile stress was applied on the optical fiber after laser sealing. This tensile stress is probably caused by the sintering of the $Al_2O_3$ slurry around the embedded optical fiber. Due to the short processing time and high heating/cooling rates of laser sintering, thermal stress was induced in the laser-sintered $Al_2O_3$ slurry. Since the optical fiber directly contacts with the laser-sintered $Al_2O_3$ slurry, part of the thermal stress would apply on the optical fiber after laser sintering, which affects the spectrum of the IFPI sensor.

To further evaluate the sealing quality, the scanning electron microscope (SEM) images of the sensor-embedded substrate are presented in FIG. 40A-40D. As shown in the top-view images (FIGS. 40A and 40B), the ceramic slurry was fully densified by the $CO_2$ laser without any cracks. The densified track showed exactly the same width as the opening of the microchannel, indicating that the sensor was firmly sealed at the surface of the part. Observed from the cross-section images in FIGS. 40C and 40D, no gaps can be found between the optical fiber and the filled $Al_2O_3$ slurry.

To demonstrate the effect of $CO_2$ laser sealing on improving the high-temperature stability of the embedded optical fiber, the fiber-embedded ceramic parts with and without laser sealing were heated to 800° C., respectively, to evaluate the transmission of the embedded optical fibers. As shown in FIG. 41A, when the temperature increased to 400° C., huge fiber loss was observed at the part without laser sealing. As the temperature kept increasing, ripples occurred on the spectrum until the temperature reached 800° C. On the contrary, the transmission spectrum of the embedded optical fiber in the laser-sealed ceramic part was much more stable with only 5 dB loss at 800° C. The inset of FIG. 41A shows that the $Al_2O_3$ slurry in the component without laser sealing was de-bonded with the substrate and the optical fiber after heated to a high temperature. Since the $Al_2O_3$ slurry was not pre-sintered by the laser, the reactions such as polymer burnout and ceramic sintering would occur as the temperature increased. Both of these reactions caused microbending on the optical fiber, resulting in huge loss and distortion on the optical signal. Therefore, $CO_2$ laser sealing is necessary to improve the high-temperature stability of the embedded optical fiber.

The sensor-embedded ceramic substrate was tested in an electric furnace from room temperature to 800° C. to investigate the high-temperature response of the embedded sensor. As the temperature increased, the interference spectrum of the optical fiber IFPI sensor was shifted to the shorter wavelength region. The spectral shift as a function of temperature change is plotted in FIG. 42A. Linear regression was used to fit the response curve and the slope was estimated to be −11.2 pm/° C., which is considered as the sensor sensitivity in terms of wavelength shift versus temperature. The linear response indicates that there was no microbending contribution to the sensor spectrum during the furnace heating, however, the spectrum shifted to the opposite direction of the typical optical fiber IFPI sensor response to the rising temperature. The deviation in the temperature response is probably caused by the residual stress from the laser-sintered $Al_2O_3$ slurry. As the temperature increased, the residual stress was released and applied to the sensing fiber, resulting in the deviation in the sensor response.

To eliminate the deviation effect of the residual stress, a dummy fiber was placed between the $Al_2O_3$ slurry and the sensing fiber to take the released stress from the laser-sintered $Al_2O_3$ slurry. FIG. 42B plots the temperature response of the optical fiber IFPI sensor after the dummy fiber was co-embedded. The temperature sensitivity of the embedded sensor is estimated to be 13.8 pm/° C. As reported previously, the spectral shift of the IFPI interference signal as a function of temperature can be calculated as:

$$\Delta\lambda_0/° \text{ C.} = (\alpha_{CTO} + \alpha_{CTE})\lambda_0$$

where $\alpha_{CTO}$ ($8.3\times10^{-6°}$ C.$^{-1}$) and $\alpha_{CTE}$ ($0.55\times10^{-6°}$ C.$^{-1}$) are the thermal-optic coefficient (CTO) and thermal expansion coefficient (CTE) of fused silica glass, respectively, and $\lambda0$ is the characterized spectrum position which is used to monitor the spectral shift. When $\lambda_0=1563$ nm, the calculated temperature sensitivity is 13.83 pm/° C. which agrees well with the estimated value, indicating that the deviation effect was eliminated by the dummy fiber.

The cooling process of the dummy fiber co-embedded component was also recorded and shown in FIG. 40B. As the part was cooled down, the spectrum moved back toward the shorter wavelength direction with a higher sensitivity of 24.5 pm/° C. The increased sensitivity in the cooling stage is probably contributed by the thermal shrinkage of the ceramic substrate. Since the typical CTE of $Al_2O_3$ ceramic ($8.1\times10^{-6°}$ C.$^{-1}$) is larger than fused silica glass, the ceramic substrate would firmly attach to the optical fiber in the heating process due to thermal expansion. Therefore, in the cooling stage, the ceramic substrate shrinks and applies tensile compression to the sensing fiber. Based on the above equation, the $\alpha_{CTE}$ in the cooling stage should be contributed by the combined effect of the shrinkage of the optical fiber and ceramic substrate, resulting in the increasing of sensitivity. When $\lambda0=1563$ nm, the calculated sensitivity of the sensor in the cooling stage is 26.34 pm/° C., which is close to the estimated value of 24.5 pm/° C. This result demonstrates that the embedded sensor is capable of simultaneously monitoring the temperature and thermal strain of the ceramic substrate when the fiber is firmly attached to the part.

In summary, an all-glass optical fiber IFPI sensor was successfully embedded into a commercial $Al_2O_3$ ceramic substrate using the developed laser-assisted sensor embedding process. The two-step structure effectively reduces the general aspect ratio of the laser-machined microchannel to provide precise control on the channel shape, which is essential to fit the optical fiber inside the ceramic substrate. After sealed by the $CO_2$ laser sintering, the high-temperature stability of the embedded optical fiber is dramatically improved, while the part without laser sealing shows huge fiber loss at high temperature. By testing from room temperature to 800° C., the embedded optical fiber IFPI sensor shows a linear response, indicating that no microbending effect occurred on the interferometer signal. To further improve the performance of the embedded sensor, a dummy fiber was co-embedded between the $Al_2O_3$ slurry and the sensing fiber, which takes the released residual stress from the laser-sintered $Al_2O_3$ slurry to eliminate its deviation on the sensor response. In the cooling stage of the dummy fiber co-embedded component, both the temperature and the thermal shrinkage of the ceramic substrate can be monitored by the embedded optical fiber IFPI sensor.

Example 7—SiC Applications

Figure 43:
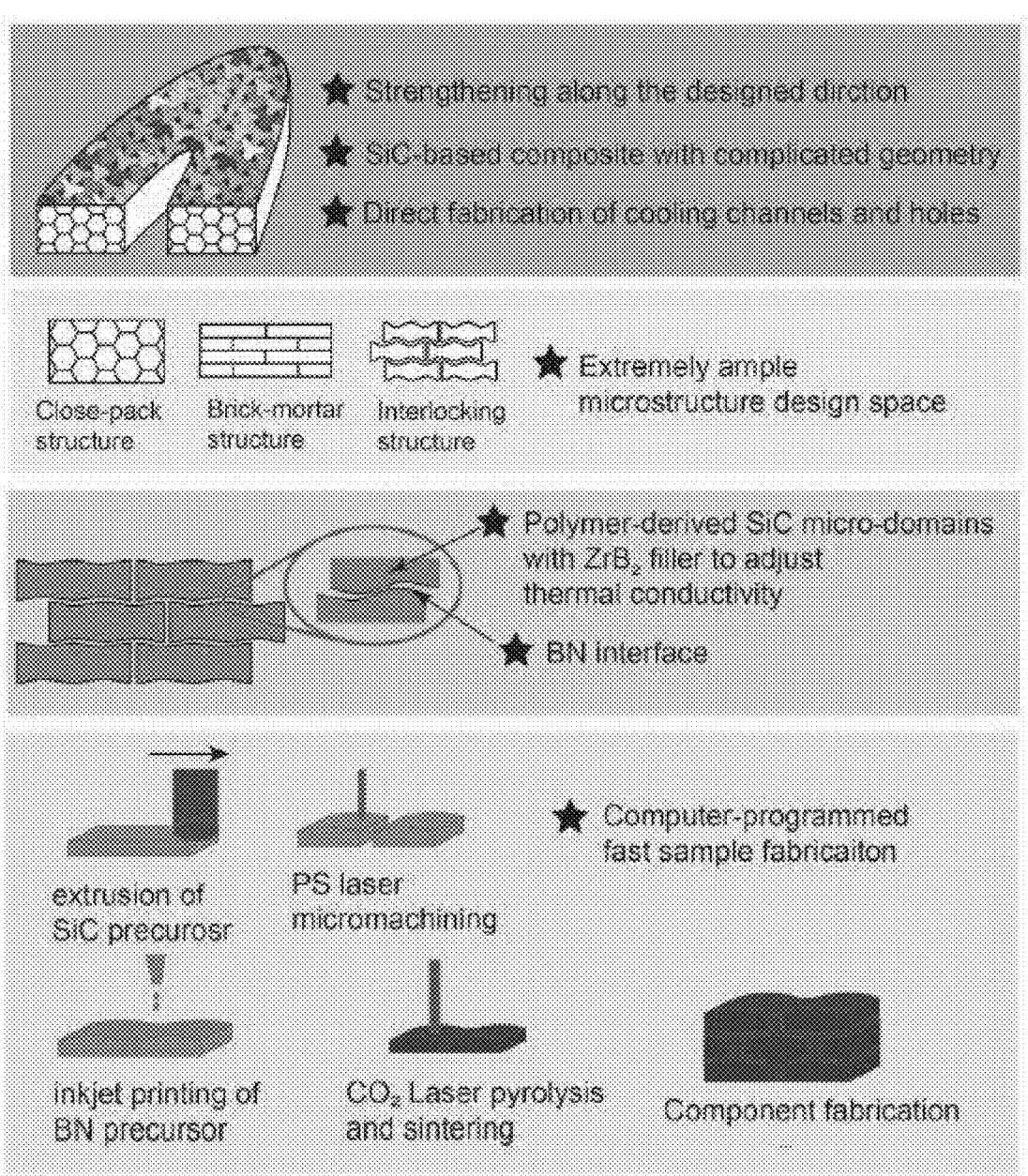
FIG. 43 is a schematic illustrating the systems described herein allow the fabrication of SiC-based composites with unique features such as strengthen along a designed direction, sharp curvature, and in-situ fabricated cooling channels and cooling holes. The systems also allow vastly wide design space of microstructure and allows various toughening mechanisms as well as excellent thermal properties.

As shown schematically in FIG. 43, the unique capability of the integrated additive/subtractive manufacturing (IASM) platform at Clemson University enables new possibilities for manufacturing SiC-based composites that can have adjustable strengthening directions depending on the local stress distribution and tunable thermal conductivity at the locations where the highest heat flux occurs. Meanwhile, this advanced manufacturing allows the components with complicated geometries and the in-situ fabrication of cooling channels and cooling holes without the risk of material damage caused by machining. The IASM also allows unprecedented flexibility in microstructural and spatial compositional variation. In the literature, it has been shown that the toughness of the brittle ceramics can be significantly improved by using lattice-like microstructures of different geometries, such as "close-pack hexagons", "brick-mortar", and "interlocking" structures. IASM allows the fabrication of these geometries and will lead to the determination of the effect of geometry on the toughness. In addition, we will modulate the local thermal conductivity to control the temperature and heat-flux distribution within the composites.

Figure 44:
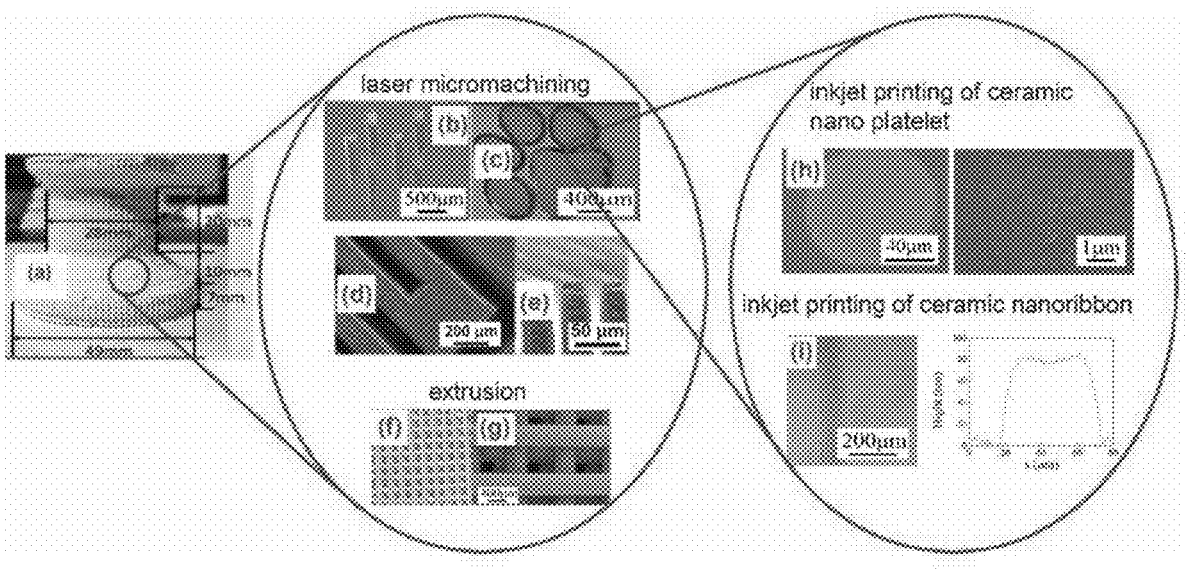
FIG. 44 illustrates the systems described herein enable the 'design-based' fabrication of 3D heterogeneous microstructures. Demonstrated are versatile ceramic green parts by 3D printing; highly dimension-accurate microchannels obtained by PS laser micromachining of ceramic green body with post-sintering; crack-free ceramic woodpile lattice structure before and after sintering. The ceramic nanoplatelet can be printed using inkjet printing at the desired location. The continuous, smooth and stable ceramic nanoribbon can be printed using inkjet printing at desired location. AFM showed that the ceramic nanoribbon had a thickness of about 100 nm.

To fabricate the novel SiC-based composites that contain heterogeneous micro-domains, as illustrated in FIG. 43, we need a special tool that not only builds the material in the additive manufacturing fashion but also locally adjusts the composition and microstructure as needed. Recently, at Clemson, we established a unique IASM system, which is a sophisticated additive manufacturing platform that combines multiple fabrication methods in a real-time fashion. FIGS. 1 and 2 show the house-made IASM equipment developed by our team. This platform hosts integrated inkjet printing and slurry extrusion systems and multiple laser sources capable of laser sintering and precise laser micromachining. It has an X-Y stage with a travel distance of 500 mm and a position accuracy of 1 μm, and a Z stage with a travel distance of 300 mm and a position accuracy of 0.1 μm. The IASM makes it possible to precisely engineer local heterogeneous domains in a lattice-like composite ceramic microstructure to achieve superior thermal and mechanical performances in high-temperature, high-stress environments (FIG. 44). Each micro-domain primarily consists of dense SiC as the load-bearing constituent, and a small amount (i.e., thin layers) of BN, as the compliant constituent. These micro-domains and interfaces have high-temperature stability but very different mechanical and thermal properties. We will precisely distribute the two high-contrast constituents at the micro-domain scale and create lattice-like microstructure, and thus create SiCmicro-domain/BNinterface/SiCmicro-domain composites with precisely engineered thermomechanical properties.

Additive manufacturing (AM), a process for fabricating parts layer-by-layer directly from a 3-D digital model, has tremendous potential for producing highly heterogeneous microstructure. A recent paper published in Science has demonstrated the AM of SiC with lattice structures that have similar densities to the ceramic foams but much better mechanical strengths. However, this AM approach does not satisfy the requirements for the manufacturing of SiC-based composite as proposed in FIG. 43. Without the integration of laser micromachining and laser sintering, it is difficult to fabricate the micro-domains as designed. It is also difficult to use other additive manufacturing methods to fabricate the BN interface.

In this study, we will use the SiC polymer derived ceramics (PDCs) for the micro-domains. The PDCs are the most commonly used materials in SiCf/SiC CMCs for the fibers and, sometimes, the matrix. The polymer precursors (i.e. polycarbosilane) of stoichiometric SiC PDCs are very friendly for extrusion because these polymers, when dissolved can have a wide range of adjustable viscosity. Due to its adjustable rheology, polycarbosilane has been routinely used as the precursor for dry spinning of SiC fibers. Although there is no report on the PS laser micromachining of polycarbosilane, as a general rule, polymer materials are very easy to be micromachined using PS laser to achieve highly precise, smooth grooves of a few micrometers in width.

Figures 45A, 45B, 45C:
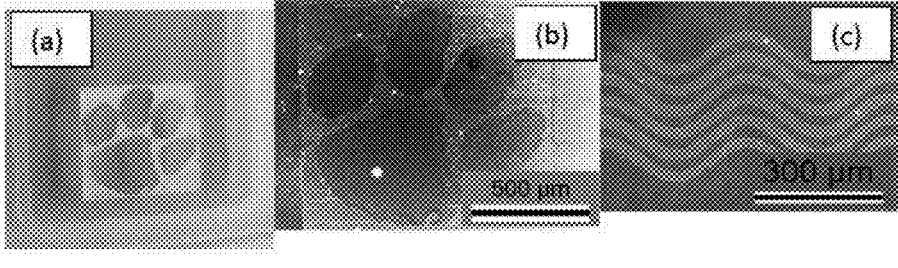
FIGS. 45A-45C illustrate crack-free dense SiC with designed microstructure. The SiC precursor was first deposited on a substrate, followed with ps laser micromachining as shown in FIG. 45A. A CO2 laser was then used for pyrolysis and sintering.

Our preliminary results show that the designed SiC microstructure can be precisely fabricated. In FIGS. 45A-45C, we demonstrate high-resolution SiC fabrication. The patterns were fabricated using a PS laser. After $CO_2$ laser heat-treatment, dense and crack-free SiC microstructure can be well controlled based on CAD model. As shown in FIGS. 45A-45C, we can straightforwardly achieve the microstructure precision on the scale of 1-10 μm.

The BN precursor is also needed for this project because BN is a typical compliant interface material between the SiC fiber and matrix. In this project, BN will be used as the interface material between the micro-domains. It has been reported that polyaminoborane or polyborazylene can be used as the high-quality precursors of BN. We have reliable access to high-quality polymer precursors for different Si/C/B/N systems, as well as mature in-house recipes of cross-linking, pyrolysis, and consolidation of different PDC systems. The PDCs that we obtained in our previous studies demonstrated exceptional composition and microstructural adjustability, and thermal and mechanical performances.

Another important material that we will study is $ZrB_2$ because it has very good thermal conductivity beyond 2000° C. (e.g. ~100-70 W/m·K from room temperature to 2000° C. as reported by the PI and others), as shown in FIG. 46. The main purpose of $ZrB_2$ is to be used as an additive to adjust the local thermal conductivity of SiC micro-domains. In addition, $ZrB_2$ also has high-temperature strength (e.g. >450 MPa at 1600° C.), and a moderate thermal expansion coefficient (CTE~7×10$^{-6}$ K$^{-1}$ that is slightly smaller than typical oxides such as $Al_2O_3$). In this propose the $ZrB_2$ submicrometer particles or fibers will be used to tune the thermal conductivity, elastic modulus, mechanical strength, and toughness of the SiC micro-domain.

Improving the power generation efficiency and life cycle energy benefits of advanced energy systems, including gas turbines, boilers, gasifiers, nuclear reactors, concentrated solar stations, etc., demands novel ceramic composites with superior thermal and mechanical performances, and hence prolonged durability in harsh environments. The harsh environments imposed on the structural materials is the manifestation of high temperatures and/or mechanical loads often in combination with aggressive chemical environments. The SiCf/SiC ceramic matrix composites (CMCs) have been broadly considered as the next-generation structural materials for the above-mentioned harsh environments. However, the current manufacturing method cannot engineer the local composition and microstructure based on the component geometry and specific local mechanical and thermal loads.

The key innovation is that the information-centered IASM of SiC-based composites will provide the solution to fabricate SiC-based composites with locally engineered composition and microstructure driven by the information of component geometry and the local mechanical and thermal loads. The success of this project will provide the critically important manufacturing approach that can locally engineer the composition and microstructure of SiC-based composites for the improved efficiency of the power generation systems.

The overall goal of this project is to research a holistic and intelligent approach for the advanced manufacturing of SiC-based composites that can locally adjust materials' microstructure and properties to satisfy the complex requirements imposed by the harsh environments. The overall objective is to investigate, manufacture, characterize, and test innovative ceramic composites with SiC micro-domains and BN interface using our IASM and processing physics and material kinetics of the heterogenous micro-domains in lattice-like hierarchical microstructure for the SiC micro-domains and BN interface.

The uniqueness of the IASM platform is that it integrates multiple manufacturing methods together, including free-form extrusion, picosecond (PS) laser micromachining, ink-jet printing and $CO_2$ pyrolysis and sintering. The overall fabrication strategy is illustrated in FIG. 43. The main goal of this task is to achieve high precision during fabrication and eliminate defects at each stage of fabrication. Another goal is to validate the modeling of the effect of $CO_2$ laser processing parameters on the micro-domain microstructure.

We will mix the PDC with different amounts of $ZrB_2$ particles and appropriate solvent (e.g. toluene) as the extrusion paste. The $ZrB_2$ additive is to adjust the thermal conductivity of the micro-domains. As illustrated in FIG. 43, the freeform extrusion is the first step of micro-domain fabrication. The BN interface can be introduced between layers along the Z-axis and PS laser micro-machined grooves in the X-Y plane.

There are two typical defects in the freeform extrusion of the polymer ceramic precursors with the $ZrB_2$ particle additives. One is the gap between the adjacent filaments, and the other is the distortion, warping and sagging of the extruded filaments. In our previous study, we demonstrate that using the extrusion needle tip to press the paste during extrusion can eliminate the gaps between the filaments.

The other type of defect is the warping or sagging of the filament or the whole green body, caused by gravity. The PDC precursor paste that is fed to the extruder needs to have a relatively low viscosity (e.g. <1000 poise) for stable and continuous extrusion. However, low viscosity of the extrusion paste often causes another problem, which is the warping or sagging of the filament or the whole green body, caused by gravity. To overcome this challenge, we demonstrated that using a $CO_2$ laser to track the extrusion path can instantly dry and solidify the filament and prevent sagging (FIGS. 47A-47C). This allows highly precise three-dimensional extrusion of 3D structure that has an excellent geometrical fidelity to the CAD design model. With precise debinding, pyrolysis, and sintering, high-density ceramics lattice structure can be achieved without any distortion, warping or sagging (FIG. 47C).

The purpose of PS laser micromachining is to achieve the specific size and geometry of the micro-domains. We have demonstrated the effectiveness of using PS laser machining to fine-tune the microstructures during the extrusion of each layer in our previous study (as shown in FIGS. 48A-48D). With this capability, we can create the microchannels both on the X-Y plane and Z direction. Specifically, we can use the PS laser to control the surface curvature and smoothness.

There is a balance between laser micromachining efficiency and quality. For example, a higher laser power results in a fast cutting rate. However, too high laser power can damage the wall of the microchannel (as shown in FIG. 48B). During this sub-task, we must avoid the defects during PS laser micromachining of SiC polymer precursor: rough surfaces caused by excessive laser power. However, we have shown that a proper choice of laser processing parameters can mitigate these defects.

Another goal is to use the inkjet printing method to deposit a thin layer, about 100 nm-1 μm thickness, of BN precursor in the grooves fabricated using PS laser micromachining, during the extrusion of each layer, as the interface coating between the SiC micro-domains.

The most important topics in inkjet printing of liquid ceramic precursor is to form a uniform coverage on the surface. Often, the defects are caused by the instability of the printed liquid. In fact, all liquids tend to bulge, driven by the surface tension. In our previous studies, we have demonstrated the effectiveness of accelerated solvent evaporation on the pseudo-stability of the printed liquid tracks. We discovered that the accelerated solvent evaporation, caused by heating the substrate, can practically "freeze" the flow in the printed track because of the exponential increase of viscosity during evaporation. We demonstrated that uniform ceramic nanoribbons with a thickness of ~100 nm could be achieved with appropriate processing parameters. Thus, we will study the effect of solvent evaporation on the viscosity change of the BN precursor ink.

Thus, we will use a $CO_2$ laser to track the printed BN precursor track to accelerate evaporation. The exponentially increasing viscosity can suppress the relaxation of the thin BN liquid deposition and ultimately achieve conformal decomposition on the surface of the extrusion layer and within the micro-grooves between the microdomains in the X-Y plane. We will carry out our study, based on the same characterization described above, of the viscosity increase of the boron nitride liquid precursor solution during solvent evaporation.

The microstructure integrity should be ensured of the obtained SiC-based micro-domain composites during the pyrolysis and consolidation. Our previous study shows that the geometry of the micro-grooves was well-preserved during sintering, as shown in FIGS. 49A and 49B. Thus, we expect that the geometry of the SiC micro-domain structure will be preserved during firing. In FIGS. 45A-45C, we also demonstrate the crack-free PDC deposition that was pyrolyzed and then sintered using $CO_2$ laser scanning.

However, there are two potential defects that could be introduced during the heat-treatment. One of the defects could be the rupture of the BN interface coating during the pyrolysis and consolidation process due to the different shrinkage of SiC and BN polymer precursors during firing. The other possible defect is that the BN interfacial coating disappears during the inter-diffusion between SiC and BN polymer precursors during heat-treatment. After the SiC and BN ceramics were formed during pyrolysis at high temperatures, we, in general, do not concern about the diffusion between these two ceramic phases. The BN interface plays a pivotal role in crack defection and micro-domain sliding and pullout and must be intact during firing.

The non-uniform shrinkage of the SiC and BN precursors during pyrolysis and consolidation may result in cracking or debonding at the BN interface. In this subtask, we will characterize the shrinking behavior of the SiC and BN polymer precursors during pyrolysis and consolidation. High-temperature dilatometry and TGA analyses will be carried out for both SiC and BN polymer precursors to determine the shrinkage and decomposition kinetics upon heat-treatment. The microstructure of the ceramics at different heat-treatment temperature will be examined using SEM after the sample is quenched from a high temperature of interest to room temperature.

Our previous study shows that in-plane stress in a thin film of the ceramic precursor can be significantly reduced during heat-treatment if a small amount of polymer is doped in the precursor. This doped polymer acted as a stress relaxation agent when the temperature is heated above the glass transition temperature ($T_g$). If we do observe the cracking and rupture of the BN interface, we will explore the effect of doping of polymers in the BN or SiC precursors on preventing such defects. There are many possible polymer dopant candidates, such as polybutadiene. The polybutadiene can be easily dissolved in the SiC and BN precursor solutions. This polymer has a low Tg (e.g. ~170° C.), but high decomposition temperature (e.g. >400° C.) and is very suitable to be used as a stress relaxation agent during heat-treatment.

The other type of potential defect is the disappearance of the BN interface during the heat-treatment, caused by the diffusion. Once SiC and BN are converted to ceramics from their polymer precursors, in general, we will not worry about the disappearance of the BN interface because the diffusion between SiC and BN is not severe to cause such a problem. However, there is a risk of diffusion of the SiC and BN polymer precursors before they are converted to ceramics. If this is the case, the BN interface will disappear during pyrolysis and consolidation.

We will use microscopy, such as SEM and TEM, to observe the microstructure of the SiC micro-domain preforms to ensure the integrity of the BN interface. If we observe any disappearance of the BN interface caused by the inter-diffusions of the polymer precursors, we will intentionally increase the thickness of the BN interface so that after pyrolysis and consolidation, there will still be a BN interface. In fact, limited diffusion between the SiC and BN polymer precursors can improve the bonding between the SiC phase and BN phase by giving a diffused interphase, and thus benefit the mechanical properties.

Example 8—3D Printing of all-Glass Fiber-Optic Pressure Sensor for High-Temperature Applications In this example, a fiber-optic pressure sensor is fabricated by three-dimensional (3D) printing of glass using the direct laser melting method. An all-glass fiber-housing structure is 3D printed on top of a fused silica substrate, which also serves as the pressure sensing diaphragm. And an optical fiber can be inserted inside the fiber housing structure and brought in close proximity to the diaphragm to form a Fabry-Perot interferometer. The theoretical analysis and experimental verification of the pressure sensing capability are presented.

Pressure monitoring is of great interest in various important applications where the pressure of the environment usually provides real-time information to understand and control the processes, such as oil and gas pipelines pressure metering, turbines and downhole pressure monitoring. Pressure monitoring, in many cases, is under harsh environments, like, high temperature, time-varying aqueous environments. As such, it is desirable in harsh environments for pressure sensors to be capable of operating at high temperatures (e.g., 500_C) and immune to surrounding environments. Optical fiber sensors have been widely investigated over the last several decades for pressure sensing. Over the years, various optical fiber sensors have been proposed and demonstrated for pressure sensing, such as fiber interferometers, fiber Bragg gratings, whispering gallery mode optical resonators, and micro-bending sensors. Generally, these optical devices have a compact size, high sensitivity, fast response, immunity to electromagnetic interference (EMI), and promising broad applications. Fiber-optic extrinsic Fabry-Perot interferometer (EFPI) is among the popular choices for pressure monitoring, owing to its advantages of high spatial resolution and independence to polarization changes. A typical EFPI pressure sensor uses a diaphragm as the sensing element. Pressure-induced diaphragm deformation generates the change of the interferometer's optical path difference (OPD). And the change of OPD is monitored by the interferometer with high sensitivity and high resolution. In recent years, both fiber inline EFPI sensors and assembly-based EFPI sensors have been reported for pressure monitoring. In general, the sensitivity and pressure range of assembly-based sensors is easy to be adjusted by tuning the dimension of the diaphragm. While at the same time, typically, there exists a mismatch of coefficients of thermal expansion (CTE) between different materials (e.g., glass and bonding materials), resulting in the large temperature cross-sensitivity and sometimes limitations in working temperatures. Comparatively, Assembly-free fiber inline EFPI sensors have a compact size and improved mechanical robustness, thanks to various micromachining techniques. In our previous work, an all-glass fiber inline EFPI pressure sensor was fabricated by a femtosecond laser, which was capable of working at high temperatures up to 700° C., with small temperature cross-sensitivity. However, the pressure sensitivity was relatively low because of the dimension of the diaphragm. Therefore, generally, there are trade-offs between high-pressure sensitivity, low-temperature cross-sensitivity, high-temperature operating point and mechanical robustness.

Recently, three-dimensional (3D) printing technology has been demonstrated as a powerful approach for the fabrication of sensors. This technique offers great flexibility and simplicity to produce desired 3D structures. Meanwhile, the 3D printing process can incorporate with other processes to realize an integrated smart structure. Various 3D printed sensors have been proposed and demonstrated. In general, 3D printed structures serve as a sensing part or mechanical supporting platform. However, due to the properties of the printing materials, which are typically polymer or metal materials, 3D printed sensors rarely survive in high-temperature environments. Recently, a 3D printed ceramic part with embedded sapphire optical fiber has been reported for high-temperature applications. And a fused silica additive manufacturing method, proposed by Kotz et al, was successfully applied to create transparent fused silica components. Components created from both printing processes show high thermal resistance. However, 3D printed fused silica/ceramic parts with high-temperature sensing capabilities have not been reported yet.

Herein we present an all-glass EFPI pressure fabricated by three-dimensional (3D) printing of fused silica technique. In our previous work, we reported the extrusion-based 3D printing of ceramics and glass techniques. And in this work, the extrusion-based 3D printing of transparent glass assisted with $CO_2$ laser direct melting fabrication process is employed to fabricate sensing structures. The 3D printing of glass technique allows rapid fabrication of a fiber housing and diaphragm integrated part with flexible dimension tuning capability. Optical fiber is brought in close proximity to the diaphragm to form the FPI cavity. And optical fiber is fixed with the help of $CO_2$ laser irradiation. Simulation and pressure tests of the sensor are presented. Meanwhile, the temperature dependence of the all-glass sensor is studied.

FIG. 50A schematically illustrates the structure of the proposed sensor. The proposed sensor is composed of a fiber housing structure on top of a diaphragm and a single-mode fiber (SMF). To fabricate the sensor, 3D printing of glass process is conducted for a fiber housing structure printing. The fiber housing structure consists of a cone shape and a tube structure on its top. Firstly, a cone structure is printed on a thin fused silica substrate (Corning 7980, with a dimension of 10×10×0.5 mm), which also serves as the pressure sensing diaphragm. During the printing process, the cone shape structure is printed until the decreasing radius is small enough for a glass tube to be inserted and fixed. Then printing process continues with the fixed radius to form a tube structure. The cone structure enhances the flexibility for diaphragm dimension tuning, to help realize sensors with adjustable pressure measurement sensitivity and range. And the tube structure makes the perpendicular alignment of the glass tube to the diaphragm easy. After the printing of the fiber housing structure, the inner surface of the diaphragm is gold coated with the help of a sputter coating machine for the diaphragm's optical reflection enhancement. Then, the glass tube is inserted, and the gap between the tube and fiber housing structure is filled with fused silica paste, which is melted by $CO_2$ laser processing.

Besides, optical fiber is inserted into the glass tube and brought in proximity to the diaphragm to form the Fabry-Perot cavity. Finally, $CO_2$ laser irradiation is conducted for tube and optical fiber fixing. During the 3D printing process, for each printing layer, fused silica paste is extruded at controlled flowrate through an extruder (eco-Pen300, Preeflow) with circular nozzle first. And $CO_2$ laser irradiation (with a wavelength of 10.6 µm, ti100 W, Synrad) is used to heat the paste with optimized output power, spot size and scanning speed. With the help of laser processing, fused silica paste is quickly melted and fused both in the printing layer and between the adjacent layers. FIG. 50B shows the extrusion trace and $CO_2$ laser irradiation trace. It is noticed that the extrusion trace is in a spiral shape. Considering the extruded paste width, each adjacent trace of the spiral is separated with the same distance 1 to avoid paste overlaps or paste gaps. After 40 seconds time delay, $CO_2$ laser irradiation follows the same trace as the extrusion trace. In addition, an extra path is designed for the irradiation process, as shown in FIG. 50B. With this optimized laser irradiation trace setting, fused silica pastes at the starting and ending point of the spiral will be under the same heating profile from $CO_2$ laser irradiation as the pastes in the middle of the spiral. The next printing layer will be processed 40 seconds after the laser heating process. With this setup for each printing layer, FIG. 50C shows the printing model of the fiber housing structure. 1, d1, d2 and h1, h2 represents the separation between two traces, diameters of the bottom and top layer, heights of the hollow cone and tube structures, respectively. And the values were optimized and set to be 0.4 mm, 7.3 mm, 4.2 mm, 1.5 mm, and 3 mm, respectively.

Figures 51A, 51B, 51C:
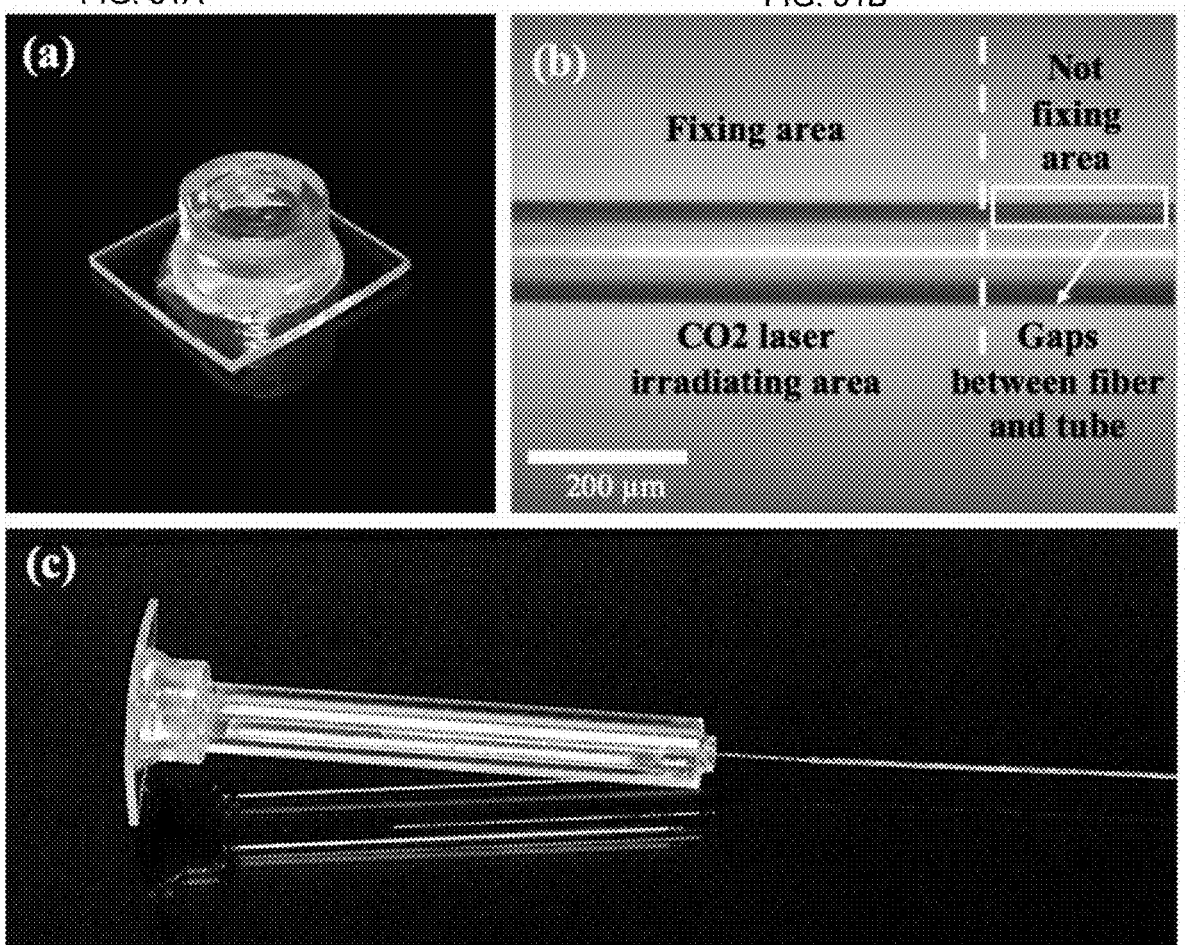
FIG. 51A is a photo of the 3D printed fiber housing structure.
FIG. 51B is a microscope image showing that optical fiber is fixed inside the tube with the help of CO2 laser irradiation through cylindrical lens. No gap can be found at the laser irradiation area.
FIG. 51C is a photo of the assembled all-glass pressure sensor.

FIG. 51A shows the printed transparent fused silica fiber housing structure on top of a fused silica substrate. The substrate, which also performed the pressure sensing function, was fused together with the printed glass to form an integrated part, ensuring the good mechanical robustness of the structure.

Besides, gold sputter coating (Desk V, Denton) was deposited onto the inner surface of the diaphragm with a thickness of ~20 nm to enhance the light reflection as well as the immunity of the sensor to variations in surrounding media. Additionally, a fused silica tube with an outer diameter (OD) of 4 mm was inserted into the printed structure and the gap between them was filled with fused silica paste. Laser irradiation was in progress for paste melting and fusing. Finally, a cleaved single-mode fiber (SMF) was inserted into the tube and brought into the designated position to form the FPI. During this process, a monitoring system was used to acquire the spectra, which consisted of an optical spectrum analyzer (AQ6370D, Yokogawa), fiber coupler and broadband light source (Agilent 83437A). Then $CO_2$ laser irradiation with ZnSe cylindrical lens was processed to deform the tube and eliminate the gap between the tube and optical fiber. The $CO_2$ laser was set to 30 W and scanned one time with a speed of 2 mm/s in a direction perpendicular to the fiber placement. As shown in FIG. 51B, no gap existed in the laser irradiation area (left part of FIG. 51B). Moreover, gaps between tube and SMF are clearly shown in the unirradiated area (right part of FIG. 51B). FIG. 51C shows the assembled all-glass pressure sensor.

Figure 52A:
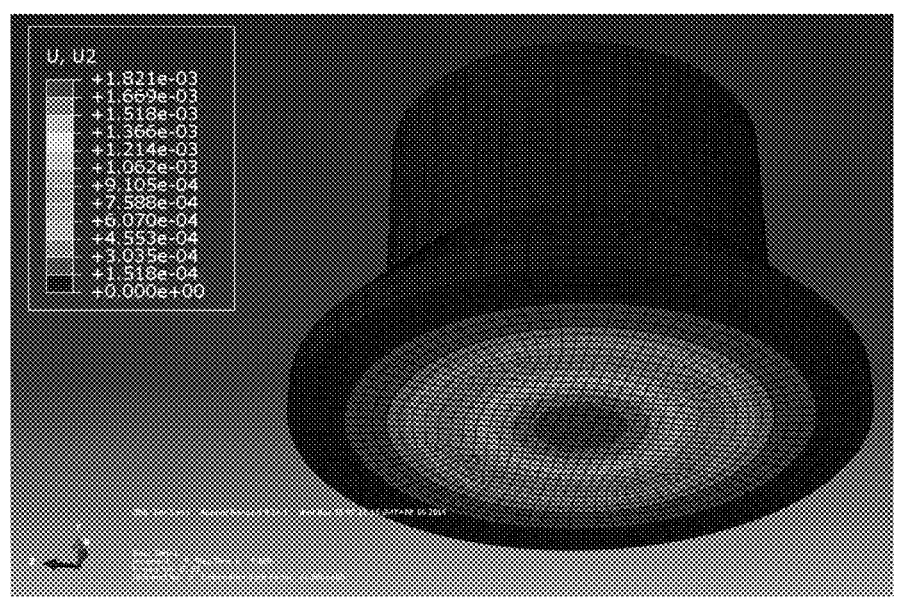
FIG. 52A illustrates simulation results from Abaqus showing the deflection distribution of the fiber housing structure under external pressure of 0.5 MPa.

When the sensor is exposed to external pressure, deflection of the fiber housing structure can be modeled and analyzed using a finite element method, with the parameters set the same as the parameters shown in FIG. 50C. FIG. 52A shows the deflection distribution of the proposed structure in Abaqus when it is under the external pressure of 0.5 MPa. The majority of the simulated structure is in blue, indicating that no deflection is observed. And the largest deflection (in red) is located at the center of the diaphragm, which is 1.821 µm.

Figure 52B:
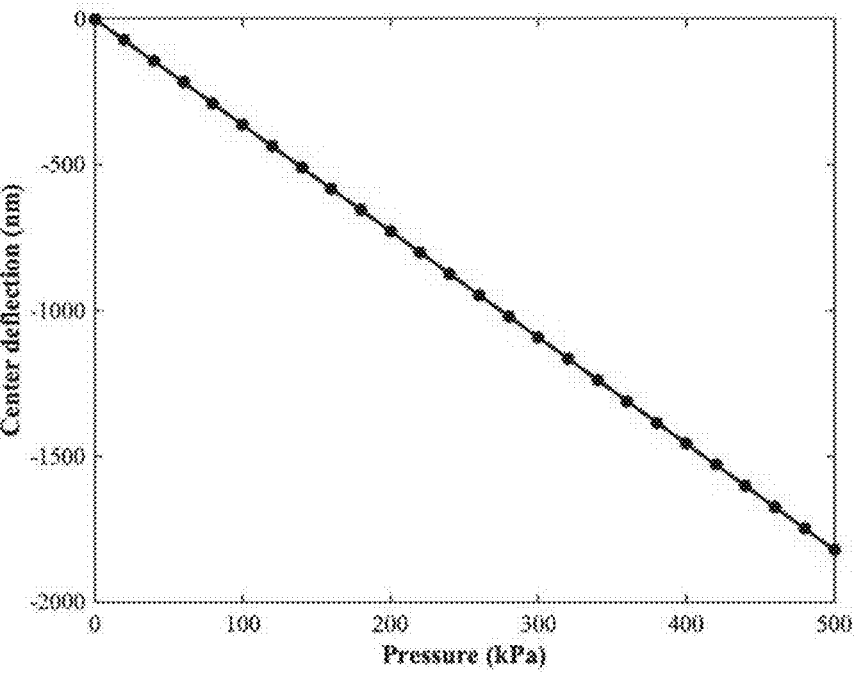
FIG. 52B is a graph showing the center deflection of the diaphragm in response to external pressure change.

FIG. 52B shows the center deflection under pressure change. A linear relationship is observed, and the slope of the fitted line is calculated as the simulated pressure sensitivity, which is estimated as 3.6 nm/kPa.

Through the simulation, the only diaphragm is sensitive to external pressure change. As such, the pressure sensitivity for a circular diaphragm can also be described as:

$$S = \frac{3(1-\mu^2)a^4}{16Eh^3}(\mu m/Pa)$$

where a and h are the radius and thickness (in µm) of the diaphragm. E and µ are the Young's modulus and Poisson's ratio of the diaphragm. When the diaphragm is exposed to external pressure P, the deflection of the diaphragm is given by:

$$\Delta d = \frac{3(1-\mu^2)a^4}{16Eh^3}P(\mu m)$$

Figure 53:
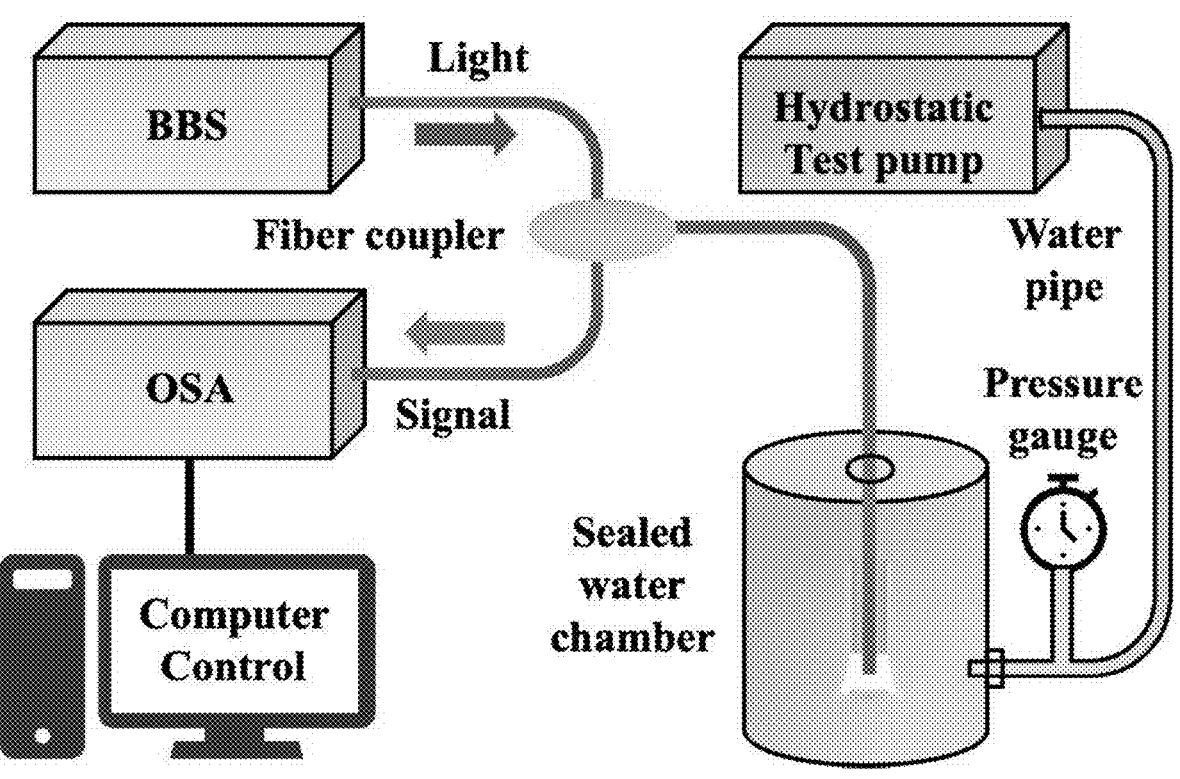
FIG. 53 is a schematic of the experimental setup to test the pressure measurement capability of the all-glass FPI sensor.
Figure 54A:
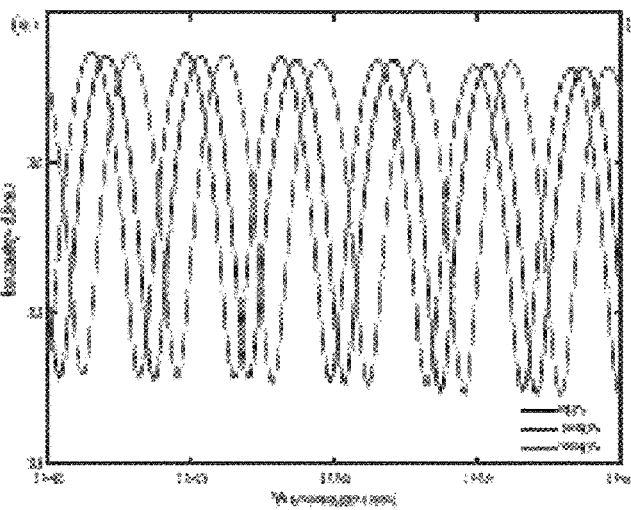
FIG. 54A is a graph showing the spectra shift in response to external pressure changes.

The pressure sensitivity of the fabricated sensor was characterized. As shown in FIG. 53, the sensor was sealed in a sealed water chamber, where the hydrostatic pressure was supplied using a hydrostatic test pump and monitored with a commercial pressure gauge (with 0.5% measurement accuracy). The light from a broadband light source was injected into the sensor through a fiber coupler and reflected interference spectra were detected via the OSA and recorded for every 20 kPa increment from 0 to 0.5 MPa. FIG. 54A shows the spectra of the sensor when exposed to external pressures of 0 kPa, 200 kPa and 500 kPa, respectively.

Figure 54B:
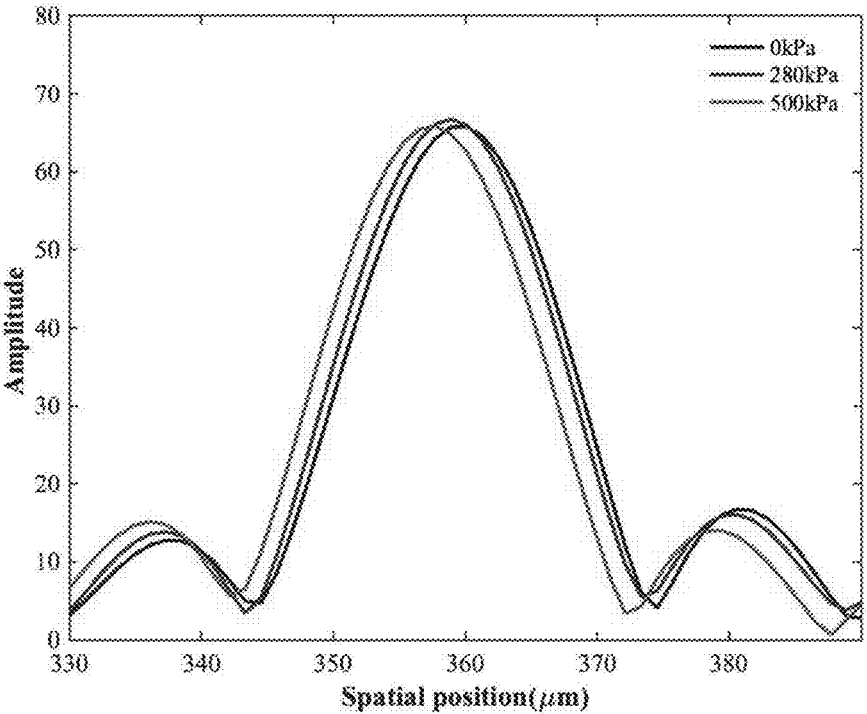
FIG. 54B is a graph showing FFT results of the sensor spectra. When external pressure increased, the cavity length decreased.
Figure 55:
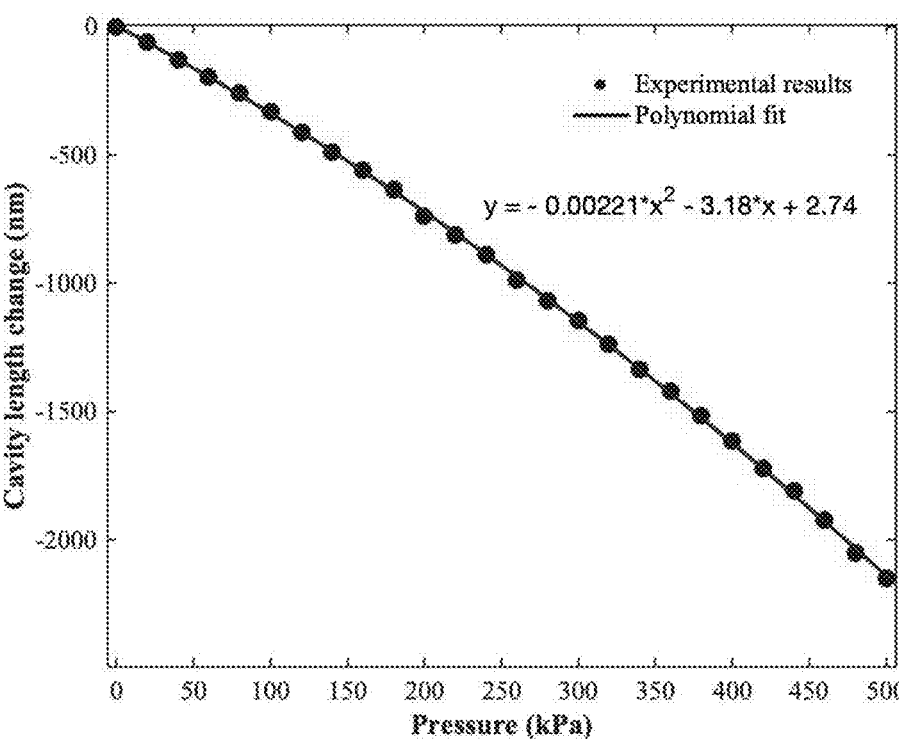
FIG. 55 is a graph showing the pressure-induced cavity length change of the pressure sensor.

FIG. 54B plots the FFT of the spectra in 54A. Three main frequency components with different spatial positions are represented by three peaks in FIG. 54B. When the pressure increased, the peak position shifted left, meaning that the cavity length decreased, which agreed well with the simulation results. And the cavity length change of the sensor as a function of the external pressure was plotted in FIG. 55. Under 0.5 MPa pressure change, a cavity length change of 2148.7 nm was observed. The response curve shown in FIG. 55 was nonlinear in the large pressure range. As such, a second-order polynomial fit was used to correlate the relation between the cavity length change and applied pressure. It is noticed that the linear term coefficient is much larger than the coefficient of the second-order term. Therefore, the linear term dominated, and the coefficient of the linear term was calculated as the averaged pressure sensitivity, to be 3.18 nm/kPa. Additionally, considering the changing slope in the large pressure test range, the cavity length change in relation to pressure variation was plotted into three separated small pressure ranges, which were 0 to 160 kPa, 180 to 340 kPa and 360 to 500 kPa, respectively, as shown in the insets of FIG. 55. A linear fit was applied to the three separated regions and sensitivities were calculated to be 3.52 nm/kPa, 4.30 nm/kPa and 5.22 nm/kPa, with the coefficients of determination (or the R-squared values) of the curve fittings being 0.998, 0.999 and 0.998, respectively. The sensitivity showed the trend of improvement when the sensor was exposed to larger external pressures.

Figure 56A:
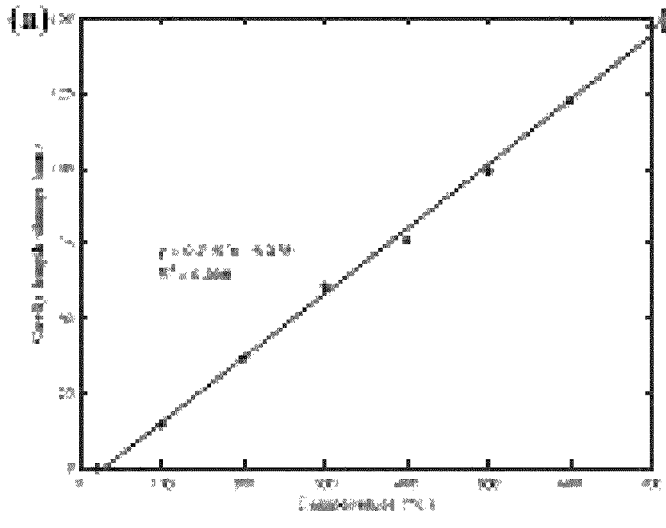
FIG. 56A is a graph showing the cavity length change with respect to temperature change.

Besides, the radius of the diaphragm could be calculated from the cavity length change using the equation above. The calculated diaphragm radius was 3.80 mm, which was close to the proposed radius of 3.65 mm. The small difference between experimental results and simulation results was related to the sensor fabrication process. As shown in FIG. 1(*b*), during the 3D printing process, for each printing layer, due to the spiral-shape extrusion process, the area inside the printing trace was not a perfect circle. While in equation calculation and model simulation, the radius applied was the value of R1 in FIG. 50B. But the size of the printed diaphragm should be in the range of a circle with a radius between R1 and R2, which was 3.65 mm and 3.85 mm. As such, the printed structure matched the designed model in dimensions, showing the small shrinkage of the all-glass part fabricated by this 3D printing of glass based on the direct laser melting method. To demonstrate the feasibility as a high temperature pressure sensor and study its temperature dependence, the pressure sensor was measured in an electrical tubular furnace and the interference spectra were monitored as the temperature varied programmatically from room temperature 20° C. to 700° C. As the temperature increased, the cavity length increased, as shown in FIG. 56A. Linear regression was applied to fit the response curve and the slope was calculated as the temperature sensitivity, which was estimated to be 0.215 nm/° C. And the cavity length change was mainly induced by the thermal expansion of the cavity. Taken the sensor's cavity length of 359386.0 nm into consideration, the thermal expansion ratio of the cavity was calculated to be $5.9824 \times 10^{-7}/°$ C., which was close to the thermal expansion coefficient (CTE) of fused silica glass of $5.5 \times 10^{-7}/°$ C. The difference between the two values could be related to the sealed air cavity expansion under higher temperature environments, and slightly porous glass structure during 3D printing process. Nevertheless, the sensor showed the low-temperature dependence and its capability of working in high-temperature environments. Based on the measurement results, the temperature-pressure cross-sensitivity is found to be 67.6 Pa/° C.

Figure 56B:
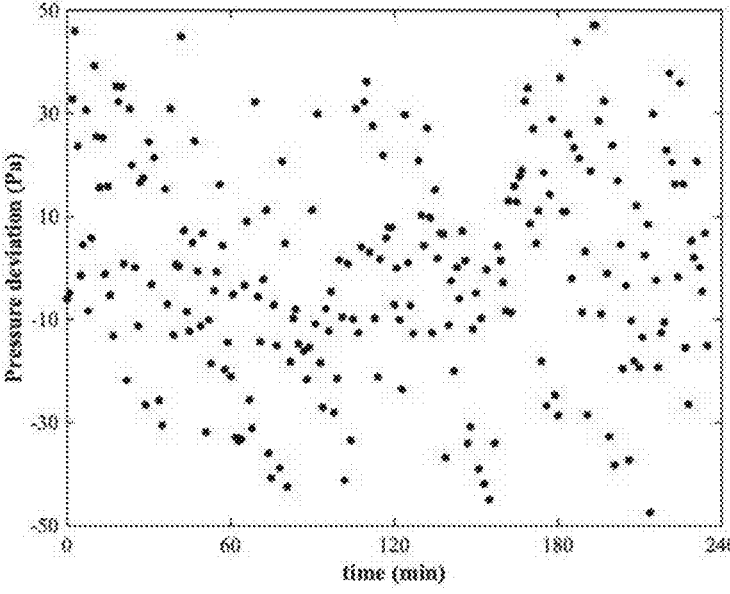
FIG. 56B is a chart showing measured pressure deviation in a period of 240 mins.

The stability of the pressure sensor was measured by continuously recording the sensor's cavity length for a period of 4 hours. To eliminate the influence of environmental changes, the sensor head was put in the sealed water chamber at room temperature, as shown in FIG. 53. The results are plotted in FIG. 56B. The standard deviation of the data within this period was found to be $\sigma=22.17$ Pa. The resolution of the sensor was estimated to be $2\sigma=44.34$ Pa, which is equivalent to 95% confidence.

In summary, an all-glass fiber-optic pressure sensor was fabricated by 3D printing based on direct laser melting method. The pressure sensor was made of fused silica material, and its fiber housing structure was fabricated by direct three-dimensional (3D) printing of glass on top of a fused silica substrate, which also served as the pressure sensing diaphragm. A cleaved single-mode fiber (SMF) fixed inside a glass tube was inserted into the fiber housing structure and brought in proximity to the diaphragm to form the FPI. $CO_2$ laser irradiation was applied in the optical fiber fixing process. Test results showed that the pressure sensitivity and resolution were 3.18 nm/kPa and 44.34 Pa, respectively, which agreed well with the simulated results, showing that the printed sensor matched the 3D model, small shrinkage was observed, and the accuracy and precision of this 3D printing of glass method were high. Moreover, the temperature dependence of the sensor has been tested up to 700° C. with low-temperature sensitivity of 0.215 nm/° C., corresponding to the temperature-pressure cross-sensitivity of 67.6 Pa/° C. Based on this 3D printing of glass method, the diaphragm thickness and diameter can be designed to adjust the sensitivity and measurement range. Besides, the sensor can work in high-temperature environments. It is believed that this all-glass fiber-optic pressure sensor is potentially useful for pressure measurement in high-temperature harsh environments.

Example 9—Laser-Assisted Embedding of all-Glass Optical Fiber Sensors into Bulk Ceramics for High-Temperature Applications In this example, we develop a laser-assisted sensor embedding process to embed all-glass optical fiber sensors into bulk ceramics for high-temperature applications. A specially designed two-step microchannel was fabricated on an $Al_2O_3$ substrate for sensor embedment using a picosecond (ps) laser. An optical fiber Intrinsic Fabry-Perot Interferometer (IFPI) sensor was embedded at the bottom of the microchannel and covered by $Al_2O_3$ slurry which was subsequently sintered by a $CO_2$ laser. The sensor spectrum was in-situ monitored during the laser sintering process to ensure the survival of the sensor and optimize the laser sintering parameters. By testing in the furnace through high temperature, the embedded optical fiber shows improved stability after $CO_2$ laser sealing, resulting in the linear temperature response of the embedded optical fiber IFPI sensor. To improve the embedded IFPI sensor for thermal strain measurement, a dummy fiber was co-embedded with the sensing fiber to improve the mechanical bonding between the sensing fiber and the ceramic substrate so that the thermal strain of the ceramic substrate can apply to the sensing fiber. The response sensitivity, measurement repeatability and high-temperature long-term stability of the embedded optical fiber IFPI sensor were evaluated.

Due to their brilliant mechanical and thermal properties, ceramic materials have been widely applied as the critical components of systems working in high temperatures, such as energy production systems, high-temperature heating equipment, and aerospace facilities.

Since these systems normally work under extremely harsh conditions for a long period, the evaluation of their structural health is necessary for system maintenance and optimization. An embedded sensor is one of the effective ways to accomplish this objective. The real-time information of the part, such as temperature and strain, can be continuously collected through in-situ monitoring of the embedded sensors during system operation.

All-glass optical fiber sensors are among the promising candidates for structural status monitoring under harsh environment. In addition to the well-known advantages such as compact size, high spatial resolution, fast response and immunity to electromagnetic interference, the all-glass optical fiber sensors are robust to operate under high temperature. For example, the optical fiber Intrinsic Fabry-Perot interferometer (IFPI) has shown great long-term high-temperature stability up to 1100° C. for over 1200 h. Since the optical fiber IFPI sensor is highly sensitive to the tensile stress applied to the optical fiber, this sensor is capable of sensing the thermal strain of the components if the fiber is well attached to the parts.

In general, attaching the sensor to the part without damaging the optical fiber is crucial in the fabrication of the optical fiber sensor embedded components. One of the common methods is to mount the fiber sensors on the surface of the finished parts with robust protectors. This technique has been proposed for years to monitor the health status of concretes. However, the surface-mounted method usually results in poor attachment between the sensors and the components, leading to offset between the sensing signals and the real variation of the part. In addition, for harsh environment applications, the sensors are usually mounted far away from the operating points to avoid damage on the optical fiber. In this way, the sensor only detects the variation of the part indirectly with low spatial and temporal resolution.

Additive manufacturing (AM) has been developed to embed the optical fiber sensors into the bulk materials during the part fabrication. In this way, the optical fibers are buried inside the components, which significantly improves the attachment between the sensors and parts and protects the sensors under a harsh environment. AM methods have been developed to embed the glass optical fiber sensors into the metallic components for high-temperature applications. The main challenge for this internal sensor embedding process is the thermal expansion mismatch between the glasses and the metals. At rising temperatures, a large thermal strain applied on the optical fiber from the metallic parts will delaminate the fibers from the components and degrade the performance of the embedded sensors. In addition, the AM methods are only suitable to embed the glass optical fiber sensors into the materials whose melting point is lower than the working temperature of the fused silica glasses. It is still quite difficult to embed the all-glass optical fiber sensors into the high-temperature ceramics, such as Al2O3 and yttria-stabilized zirconia (YSZ), using the AM methods, since the glass cannot survive the sintering temperature of most ceramics.

Recently, sapphire optical fiber has been successfully embedded into the alumina ceramics using the AM method. Since the melting point of single crystal sapphire is over 2000° C., sapphire optical fibers can survive the post-sintering process of the 3D-printed alumina ceramics and have potential to work on temperature over 1500° C. However, due to the lack of cladding layers, the sapphire optical fibers are normally multi-mode fibers with large modal volume, which complicates the interrogation of sapphire optical fiber sensors. In addition, the high optical loss of the sapphire fibers also limits it for high-performance sensing applications.

Compared to the AM methods, laser processing technologies are promising to overcome the challenge of embedding the all-glass optical fiber sensors into the high-temperature ceramics. Laser has shown its unique capability for high-resolution processing of ceramic materials. Ultrafast laser has been developed for machining microstructures like microchannels on bulk ceramics with a resolution of up to several microns. Since the pulse duration is shorter than the typical thermalization time of materials, the ultrafast lasers can machine the materials without thermally degrading the mechanical strength of the parts. In addition, fast, precise and flexible heat treatment on ceramic materials has been realized using the $CO_2$ laser. The laser heating effective zone can be precisely controlled in three dimensions with ultra-high heating and cooling rate. The material properties, such as density and cracking propagation, can be flexibly fine-tuned through adjusting the laser processing parameters. Both of these laser technologies are promising to accomplish embedding glass optical fiber sensors into finished ceramic products, resulting in the improvement of flexibility and efficiency in the fabrication of sensor-embedded smart ceramic components.

Herein we propose a laser-assisted sensor embedding process to embed the all-glass optical fiber sensors into bulk ceramics. A specially designed two-step microchannel was machined on an $Al_2O_3$ substrate for sensor embedment using a picosecond (ps) laser. An IFPI sensor, which was fabricated on a glass single-mode optical fiber by the femtosecond (fs) laser irradiation, was embedded to the bottom of the microchannel and covered by the $Al_2O_3$ slurry. The filled $Al_2O_3$ slurry was subsequently sintered by a $CO_2$ laser to seal the sensor inside the part. The design of the two-step microchannel was based on the shape of the optical fiber and the heating depth of the $CO_2$ laser. During the laser sealing process, the spectrum of the optical fiber IFPI sensor was in-situ monitored to ensure the survival of the sensor and optimize the laser sintering parameters. The microstructure of the sensor-embedded $Al_2O_3$ substrate was presented to evaluate the laser sealing quality. By high-temperature measurement in a furnace, the high-temperature response, repeatability and long-term stability of the embedded optical fiber IFPI sensor were investigated.

Figure 57:
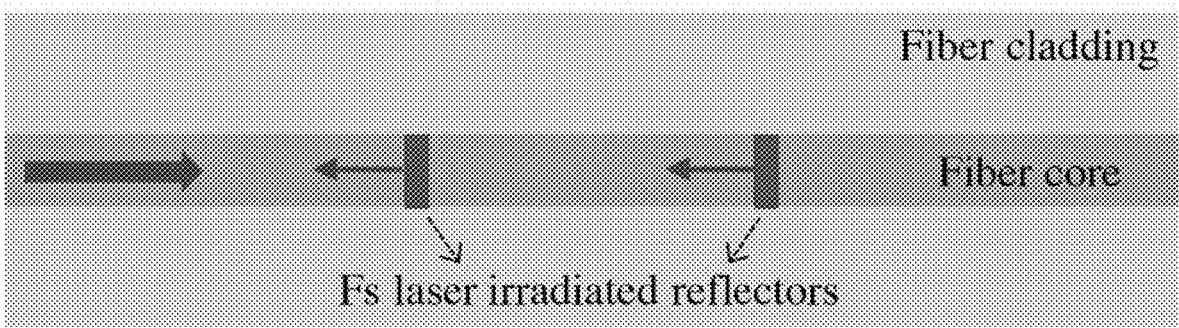
FIG. 57 is a schematic of the optical fiber IFPI sensor fabricated by the femtosecond (fs) laser irradiation.

The schematic of the optical fiber IFPI sensor was shown in FIG. 57. The IFPI sensor was formed by two internal partial reflectors created by a femtosecond (fs) laser at the core of a single-mode glass optical fiber (SMF-28, Corning Inc.). Owing to the non-linear effect of the ultrashort laser pulses, the fs laser can locally modify the refractive index of the optical fiber at the focused laser spot. The spot size of the focused fs laser beam is ~1 μm, which is smaller than the diameter of the fiber core (8.2 μm), so that the reflectors can be exactly fabricated within the core area. The detail of the manufacturing technique has been described in our previous publication.

Figures 58A, 58B, 58C:
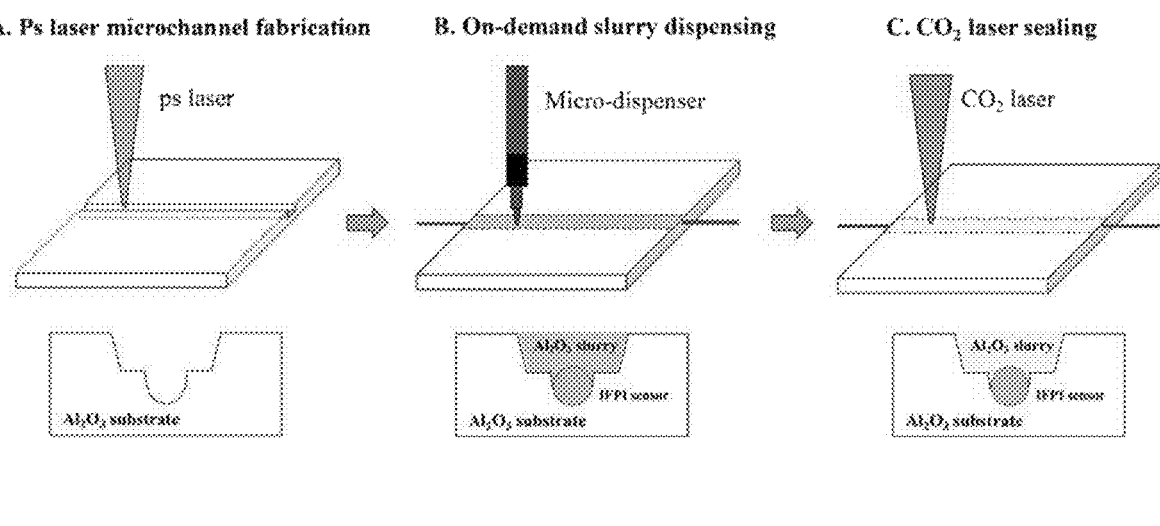
FIGS. 58A-C include schematics of the process flow to embed the all-glass optical fiber sensors into the $Al_2O_3$ ceramic substrate assisted by multiple laser processing techniques.

FIGS. 58A-58C schematically illustrate the process flow to embed the all-glass optical fiber IFPI sensor into the $Al_2O_3$ substrate. A microchannel with a two-step structure was machined on a commercial $Al_2O_3$ ceramic substrate (AO96, MTI Corporation) by a ps Nd:YAG laser (APL-4000, Attodyne Inc.). The ps laser firstly focused on the top surface of the substrate and did raster scanning in predesignated dimensions to fabricate the first-step groove. Upon completion of the first step, the laser beam was moved downward to focus on the surface of the first-step groove to machine a narrower groove inside it, which has the similar shape of the optical fiber for sensor housing (FIG. 58A). To bury the sensor inside the $Al_2O_3$ substrate, the Al2O3 slurry, which is high-temperature alumina filled ceramic adhesives (Ceramabond 503, Aremco Inc.), was applied to cover the sensing fiber by the on-demand slurry dispensing process. The flow rate, thickness and width of the dispensing line were controlled by a micro-dispenser (eco-Pen 300, Preeflow), which is capable of filling the microchannel with precise location and slurry quantity control (FIG. 58B). After the filled $Al_2O_3$ slurry completely dried in air, a $CO_2$ laser (Firestar v20, SYNRAD Inc.) was used to scan along the channel to densify the filled $Al_2O_3$ slurry and seal the sensor inside the $Al_2O_3$ substrate. Before laser sintering, the $Al_2O_3$ slurry was preheated by fast $CO_2$ laser scanning at low laser power density for 1 min. Subsequently, the $CO_2$ laser scanned the preheated $Al_2O_3$ slurry with the higher laser power density and slower scanning speed for laser sintering. The spectrum of the sensor was in-situ monitored by an optical spectrum analyzer (OSA, AQ6370D, Yokogawa) during the whole laser heating process (FIG. 58C).

To firmly attach the optical fiber to the ceramic substrate, the microchannel needs to have a similar shape to the optical fiber to host the fiber at the bottom. In addition, to protect the optical fiber during the laser sealing process, the distance between the top of the optical fiber and the surface of the substrate should be slightly larger than the sintering depth of the $CO_2$ laser on the $Al_2O_3$ slurry, which is about 100 μm as reported previously. Since the diameter of the standard optical fiber is 125 μm, the depth of the microchannel is designed as 250 μm to ensure that the $Al_2O_3$ slurry filled on top of the embedded optical fiber can be sintered by the $CO_2$ laser and the embedded fiber can survive the laser sintering process. However, due to the cone shape of the focused ps laser beam, it is difficult to precisely control the shape of the microchannel when its depth is larger than the opening width.

In this case, a two-step microchannel was adopted to facilitate the microchannel fabrication. As shown in FIG. 59A, the top layer of the microchannel was fabricated with an opening width of 350 μm and a depth of 125 μm, and a narrower channel was machined inside the top layer one with a width of 150 μm and a depth of 125 μm. The laser parameters such as the output power, repetition rate, spot size and scanning speed for the micromachining process were set at 4 W, 10 kHz, 20 μm and 15 mm/s, respectively. The spacing of raster scanning was set at 15 μm to ensure the overlaps between the adjacent laser scanning lines. The depth of the groove was controlled by the times of raster laser scanning on the substrate. For every raster laser scanning, the depth of the groove increases about 20 to 30 μm on the ceramic substrate. After 5 times laser scanning, a groove with a depth of ~125 μm was obtained. Upon the completion of the first-step groove, the laser beam was focused on the surface of the first-step groove and scanned another 5 times to fabricate the narrower inner groove to form the two-step microchannel structure.

The wider top layer decreases the general aspect ratio of the microchannel, resulting in more precise control on the shape of the bottom channel which hosts the optical fiber. Moreover, due to the cone shape of the ps laser beam, the laser-machined microchannel becomes a bell shape as the channel depth increases during laser machining. As shown in FIG. 59B, the homogeneous bright part under the optical fiber after the fiber was placed on the bottom of the narrower channel indicates that the curved bottom of the bell-shaped channel well fits the optical fiber without large gaps between the fiber and the substrate.

To seal the sensor inside the substrate, $CO_2$ laser sintering process is applied to densify the filled Al2O3 slurry. The sensor spectrum was in-situ monitored during laser sealing to ensure the embedded optical fiber IFPI sensor survives the process. To optimize the laser parameters for the sealing process, the $Al_2O_3$ slurry was processed by different laser power with a fixed scanning speed of 1 mm/s and a fixed spot size of 1 mm. The optimization process was started from a laser power of 1 W, and the power value kept increasing for every next scanning until the interference spectrum was distorted. The sample was cooled down to room temperature before scanned by a different power value.

FIG. 60A shows the spectra of the embedded IFPI sensor after scanned by different laser power in the optimization process. As the laser power increased from 1 W to 8 W, no apparent variation was observed on the interference spectrum after every laser scanning. When the laser power reached 9 W, the interference spectrum shifted ~1 nm to the shorter wavelength region after laser scanning, while the interference pattern kept clean with neglectable loss. The Finesse factors of the interference spectra before and after laser sealing at 9 W laser power were calculated to evaluate the integrity of the IFPI. As shown in FIG. 60A, the small difference of the Finesse factors indicates that the integrity of the IFPI maintained without distortion though the spectrum shifted. After the laser power increased to 10 W, the interference pattern was completely distorted with a huge loss in the fringe visibility, indicating that the reflectors of the IFPI was damaged by this power value. Therefore, the laser power for the sealing process in this case was optimized to 9 W. The spectrum shift after laser scanning at 9 W laser power is attributed to the sintering and shrinkage of the $Al_2O_3$ slurry around the embedded optical fiber, resulting in the slight compression effect on the IFPI cavity.

The cavity length variation of the embedded IFPI sensor during the laser sealing process was recorded to further investigate the effect of laser on the embedded sensors. As shown in FIG. 60B, the cavity length increased as the laser beam passed the embedded sensor position, and quickly recovered to the original value when the sensor cooled down. Larger variation in the cavity length was observed at higher laser power, indicating that the higher temperature was induced as the laser power increased.

To evaluate the laser sealing quality, the scanning electron microscope (SEM) images of the sensor-embedded ceramic substrate are presented in FIGS. 61A-61D. As shown in the top-view images (FIGS. 61A and 61B), the $Al_2O_3$ slurry was fully densified by the $CO_2$ laser without any cracks. The densified track showed exactly the same width as the opening of the microchannel, indicating that the sensor was firmly sealed at the surface of the part. Observed from the cross-section images in FIGS. 61C and 61D, no gaps can be found between the optical fiber and the filled $Al_2O_3$ slurry.

To demonstrate the effect of $CO_2$ laser sealing on improving the high-temperature stability of the embedded optical fiber, standard-optical-fibers-embedded ceramic substrates with and without laser sealing were both heated to 800° C. to evaluate the transmission of the embedded standard optical fibers. As shown in FIG. 62A, when the temperature increased to 400° C., huge fiber loss was observed at the part without laser sealing. As the temperature kept increasing, ripples occurred on the spectrum until the temperature reached 800° C. On the contrary, the transmission spectrum of the embedded optical fiber in the laser-sealed ceramic part was much more stable with 5 dB loss and smaller ripples at 800° C. (FIG. 62B).

The ripples and fiber loss on the transmission spectra are caused by the microbending effect of the embedded optical fiber during the high-temperature measurement. As the temperature increased, the ceramic substrate thermally expanded and perturbed the embedded optical fiber due to thermal expansion mismatch. Since the surface of the micro-channel is rough after laser machining, the perturbation to the optical fiber at the contact points between the optical fiber and the substrate resulted in the microbending effect.

In the part without laser sealing, since the $Al_2O_3$ slurry was not pre-sintered by the laser, some additional reactions such as polymer burnout and ceramic sintering occurred as the temperature increased, causing additional perturbation on the embedded optical fiber to induce huge optical loss. In addition, as shown in the inset of FIG. 62A, the filled $Al_2O_3$ slurry in the part without laser sealing was delaminated with the ceramic substrate after heating through high temperature. Therefore, the laser sealing process can effectively improve the high-temperature stability of the embedded optical fiber through pre-sintering the filled $Al_2O_3$ slurry and fusing it to the ceramic substrate.

The sensor-embedded ceramic substrate was tested in an electric furnace from room temperature to 800° C. to investigate the high-temperature response of the embedded optical fiber IFPI sensor. As the temperature increased, the interference spectrum of the IFPI sensor shifted to longer wavelength region. The spectral shift as a function of temperature change is plotted in FIG. 63A. Linear regression was used to fit the response curve and the slope was estimated as 14.95 pm/° C., which is considered as the sensor sensitivity in terms of wavelength shift versus temperature. The obtained temperature sensitivity agrees with the typical temperature response of the bare optical fiber IFPI sensor as reported in. When the part was cooled down to room temperature, a similar temperature sensitivity of 14.94 pm/° C. was obtained, indicating that only the temperature variation of the ceramic substrate was responded by the embedded IFPI sensor. Due to the large thermal expansion mismatch and weak mechanical bonding between the optical fiber and ceramic substrate after laser sealing, the embedded optical fiber was de-bonded with the ceramic substrate at the rising temperature so that the thermal strain effect of the substrate was not able to apply on the optical fiber.

Figures 63A, 63B, 64, 64A, 64B:
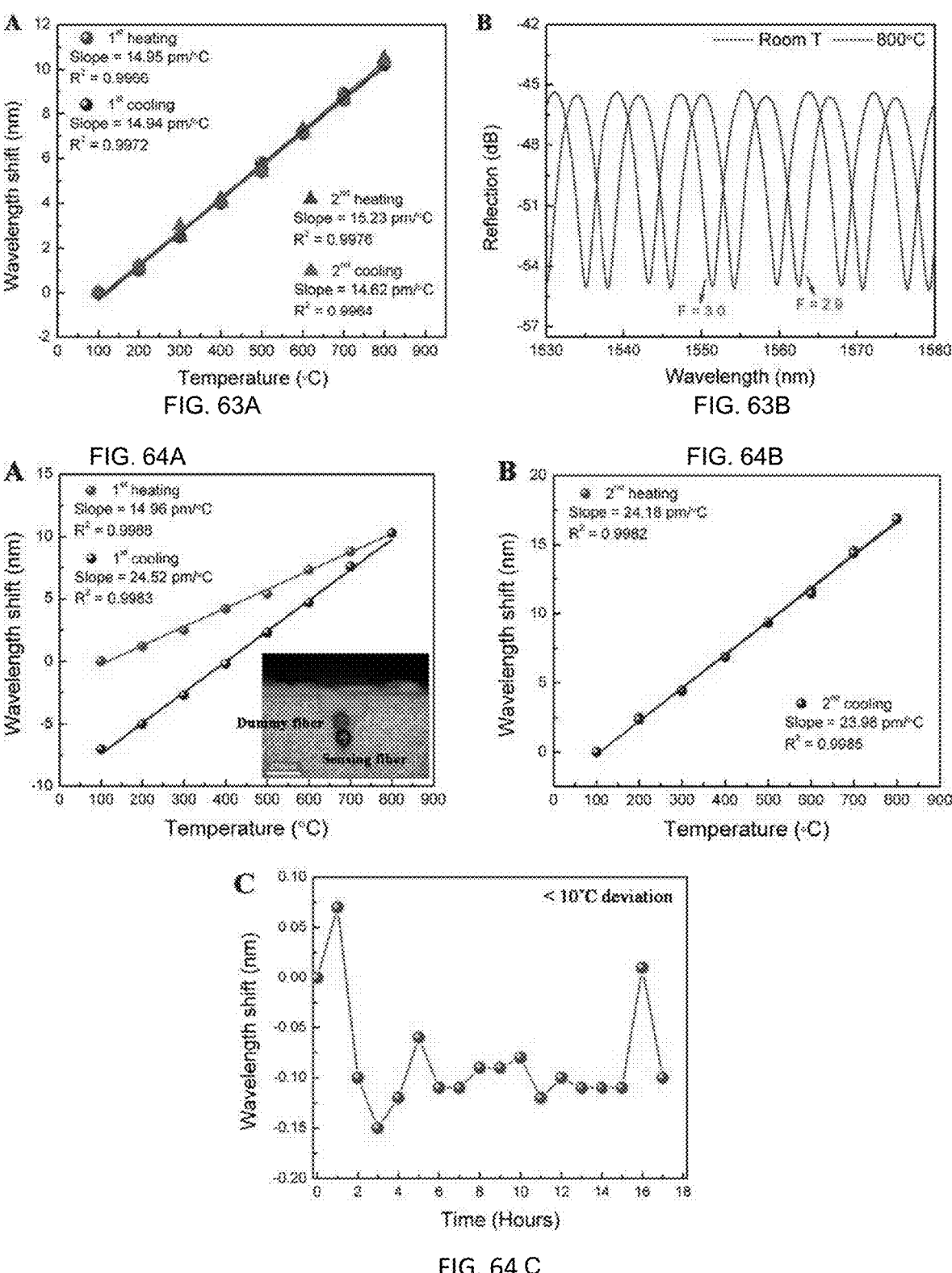
FIG. 63A is a graph showing the temperature response of the embedded optical fiber IFPI sensors in two heating-cooling cycles.
FIG. 63B is a graph showing the spectra of the embedded IFPI sensor at room temperature and 800° C.
FIG. 64A is a graph showing the temperature response of the dummy fiber co-embedded component in the first heating and cooling process. The inset shows a cross section optical microscope image of the dummy fiber co-embedded component.
FIG. 64B is a graph showing the temperature response of the dummy fiber co-embedded component in the second heating and cooling process.

To estimate its repeatability and stability in the temperature response, two cycles of heating and cooling processes were performed on the IFPI sensor-embedded ceramic substrate. As shown in FIG. 63A, similar temperature sensitivity was obtained in the second heating-cooling cycle, indicating that the embedded sensor shows good repeatability for high-temperature monitoring of the ceramic components. FIG. 63B shows the spectra of the embedded IFPI sensor at room temperature and 800° C. The calculated Finesse factor of the spectrum kept almost intact after heating to high temperatures, indicating that the embedded IFPI sensor is stable at high temperatures without apparent optical loss and distortion on the interference spectrum.

To improve the embedded IFPI sensor for thermal strain measurement, a dummy fiber was co-embedded with the sensing fiber to strengthen the mechanical bonding between the sensing fiber and the ceramic substrate (inset of FIG. 64A). FIG. 64A plots the temperature response of the optical fiber IFPI sensor after the dummy fiber was co-embedded. In the first heating process, the sensor sensitivity still shows the typical temperature response of the bare optical fiber IFPI sensor, suggesting that the firm mechanical bonding between the fiber and the substrate was not accomplished during the first heating process. However, in the subsequent cooling process, the interference spectrum moved back toward the shorter wavelength direction with a larger slope of 24.52 pm/° C.

The increase in sensitivity during the cooling stage is probably contributed to by the thermal shrinkage of the ceramic substrate. Typically, the spectral shift of the IFPI interference signal as a function of temperature can be calculated as:

$$\Delta\lambda_0/° \text{ C.} = (\alpha_{CTO} + \alpha_{CTE})\lambda_0$$

where $\alpha_{CTO}$ ($8.3\times10^{-6°}$ C.$^{-1}$) is the thermal-optic coefficient of fused silica glass, and $\alpha_{CTE}$ is the thermal expansion coefficient (CTE), which should be affected by both the optical fiber and the embedded environment for the cases of embedded sensors. $\lambda_0$ is the characterized spectrum position which is used to monitor the spectral shift. In this case, when $\Delta\lambda_0$ is 24.5 pm/° C. at $\lambda_0$=1551 nm, the calculated $\alpha_{CTH}$ is ~$7.35\times10^{-6°}$ C.$^{-1}$. Since the optical fiber will also thermally expand as the temperature increases, part of the $\alpha_{CTE}$ should be contributed to by the CTE of fused silica glass ($0.55\times$ $10^{-6°}$ C.$^{-1}$). Therefore, the CTE of the ceramic substrate is calculated as ~$6.8\times10^{-6°}$ C.$^{-1}$, which is close to the typical CTE of pure alumina ($8.0\times10^{-6°}$ C.$^{-1}$). This result evidences that after the first heating, the mechanical bonding between the optical fiber and the ceramic substrate was effectively improved, so that the thermal strain of the ceramic substrate was able to apply on the optical fiber and detected by the embedded IFPI sensor. The improvement in the mechanical bonding is attributed to the firm contact between the sensing fiber and the dummy fiber, which effectively stabilized the sensing fiber after the first heating process.

As shown in FIG. 64B, similar temperature response as the first cooling process was obtained at the second heating-cooling cycle of the dummy fiber co-embedded component, which indicates that the embedded IFPI sensor shows good repeatability in temperature and thermal strain measurement for the ceramic components. Furthermore, the high-temperature long-term stability of the dummy fiber co-embedded component was also evaluated. As shown in FIG. 64C, the embedded IFPI sensor shows good high-temperature long-term stability with <10° C. deviation when heated at 800° C. for 17 h.

In summary, an all-glass optical fiber IFPI sensor was successfully embedded into a commercial $Al_2O_3$ ceramic substrate using the laser-assisted sensor embedding process. The two-step structure effectively reduces the general aspect ratio of the laser-machined microchannel to provide precise control on the channel shape, which is essential to fit the optical fiber inside the ceramic substrate. After sealing by the $CO_2$ laser sintering, the high-temperature stability of the embedded optical fiber is dramatically improved, while the part without laser sealing shows huge fiber loss at high temperature. By testing from room temperature to 800° C., the embedded optical fiber IFPI sensor shows a linear temperature response, which agrees with the bare optical fiber IFPI sensor. By co-embedding a dummy fiber between the $Al_2O_3$ slurry and the sensing fiber, the mechanical bonding between the sensing fiber and the ceramic substrate was effectively improved after the first heating process, resulting in the detection of the thermal strain of the ceramic component through the embedded IFPI sensor. The embedded optical fiber IFPI sensor shows good repeatability in both temperature and thermal strain monitoring and long-term stability with <10° C. deviations at 800° C. for 17 h.

Example 10—Rapid Laser Reactive Sintering of $BaCe_{0.7}Zr_{0.1}Y_{0.1}Yb_{0.1}O_{3-\delta}$ Electrolyte for Protonic Ceramic Fuel Cells In this example, the state-of-the-art protonic ceramic electrolyte $BaCe_{0.7}Zr_{0.1}Y_{0.1}Yb_{0.1}O_{3-\delta}$ (BCZYYb) dense films were successfully deposited on the pre-sintered Ni(O)|BCZYYb anode substrate by recently developed rapid laser reactive sintering (RLRS) method. The separation of the deposition of dense electrolyte from the preparation of porous anode makes it possible to manufacture protonic ceramic fuel cells (PCFCs) with more desirable electrolyte and anode microstructures. The PCFC single cells prepared after introducing the cathode thin film $BaCo_{0.4}Fe_{0.4}Zr_{0.1}Y_{0.1}O_{3-\delta}$ (BCFZY0.1) showed OCVs of 0.94-0.97V and peak power densities of 97 mW/cm$^2$ at 600° C. and 121 mW/cm$^2$ at 600-650° C. under Air/H$_2$ gradient. The proton conductivity of the BCZYYb film in the RLRS-derived single cell showed a moderate proton conductivity of $3.7 \times 10^{-3}$ S/cm at 600° C. The higher PCFC performance can be expected by further optimization of the thickness, compositions, and/or microstructures of the component layers.

Protonic ceramics show high ionic conductivities at intermediate temperatures (300-600° C.) because of their low activation energy for proton transportation. This unique property makes them promising electrolytes for solid oxide electrochemical devices such as protonic ceramic fuel cells (PCFCs), electrolysis cells, reversible PCFCs, and membrane reactors. However, to prepare the fully densified protonic ceramic electrolyte membranes having a high proton conductivity, the sintering at high temperature (1600-1700° C.) for a long time (>10 h) is generally required since the state-of-the-art protonic ceramics of the acceptor-doped barium zirconate-cerate is very refractory. This long-term and high-temperature sintering usually is a problematic process, especially for the commonly used co-firing method, which has been extensively used for the fabrication of solid oxide fuel cells, including PCFCs. To achieve a fully densified electrolyte thin membrane, the dual green layers of electrolyte and anode have to be sintered at high temperature (1400-1600° C. for a long time (>10 h), which makes it impossible to get a well-controlled nanoporous microstructure for high-performance anodes. The challenge is going to be more severe when operating the fuel cells with non-hydrogen fuels (e.g., hydrocarbons). Recently, several creative techniques for lowering the sintering temperature and shorting the sintering time have been reported. The solid state reactive sintering (SSRS) method could lower the sintering temperature to ~1400° C. However, the sintering time longer than 10 h was still required to ensure the desired crystal and microstructure of electrolytes. Therefore, although the conflict between the nanoporous anode and the fully densified electrolyte was mitigated a little bit due to the decrease in sintering temperature, the temperature of 1400° C. is still very high to achieve a nanoporous anode.

It is out of the question that the best way to achieve a nanoporous anode and fully densified electrolyte is to fire the two layers separately. The physical vapor deposition and chemical vapor deposition have been used to deposit the dense electrolyte layers on the pre-sintered anode substrates. However, the complicated procedures, expensive equipment, and limitation to sample size made them impractical for large-scale fabrication of PCFCs. We recently developed rapid laser reactive sintering (RLRS) for the advanced manufacturing of protonic ceramic. The rapid scanning of the high-energy $CO_2$ laser beam allowed the rapid manufacturing of protonic ceramic with the desired crystal structure and microstructure. The RLRS has been proved to be much faster and more cost-effective than the SSRS method. The ceramic densification rate is comparable to the ultrafast sintering of ceramic reported by Wang et al. We fulfilled the fabrication of PCFC single cells in three separate steps to provide the freedom to control each component's microstructure layer independently. The RLRS showed many advantageous characteristics, such as quickness and ease to operate, no need for complicated procedures, less energy consumption, and controllable microstructure. The anode pellets of 40 wt % BCZYYb+60 wt % NiO(Ni(O)|BCZYYb) were prepared first by the conventional SSRS method and reduced in the hydrogen atmosphere. Then the dense BCZYYb electrolyte layer was deposited on the top of the as-prepared anode substrate by RLRS. After introducing BCFZY0.1 cathode thin film, the PCFC single cells were obtained, which were characterized for both electrochemical and physical properties.

The fabrication of PCFC single cells was performed according to the following process (1) preparation of anode substrate; (2) coating of electrolyte precursor thin film; (3) deposition of the dense electrolyte by the RLRS method to form half-cell; (4) the deposition of porous cathode layer to form single cells. The anode pellet substrates consisted of Ni(O)|BCZYYb were prepared using the SSRS method. The stoichiometric amounts of $BaCO_3$, $CeO_2$, $ZrO_2$, $Y_2O_3$, $Yb_2O_3$, NiO, and 30 wt % starch (pore former) were ball-milled for 48 h using 3 mm YSZ grinding media in isopropanol. The ball-milled powder was pelletized into green pellets with a 1-inch diameter and 5 mm thickness. The green pellets were then fired in the furnace at 1450° C. for 18 h, followed by reduced in 5% H$_2$+95% Ar at 650° C. for 20 h.

A green BCZYYb thin layer was cast on the reduced porous Ni(O)+BCZYY anode substrate by a doctor blade. The green BCZYYb paste for casting BCZYYb green films was prepared using the procedure described elsewhere. The BCZYYb+1 wt % NiO precursors of $BaCO_3$, $CeO_2$, $ZrO_2$, $Y_2O_3$, $Yb_2O_3$, and NiO with stoichiometric amounts were mixed by the ball-milling process. The ball-milled BCZYYb+1 wt % NiO electrolyte precursor powder was mixed with de-ionized water, dispersant (DARVAN), and binder (HPMC) to the printable paste. The doctor-blade casting was conducted at a 200 μm gap between the frame and the blade, resulted in approximately 150 μm thick after drying at room temperature in the open air for 24 h. The prefered anode substrates were reduced before the laser treatment is aiming to generate more pores in the substrate and reduce the NiO to Ni. The porous structure can avoid the cracking issue of the anode pellets during the laser treatment, as the porous structure can provide anti-crack ability. While the Ni in the substrate can conduct the heat faster to avoid the thermal stress generated by the huge temperature gradient.

The RLRS experiment was performed using a $CO_2$ laser ($\lambda$=10.6 $\mu$m, Ti100 W, Synrad). The samples were preheated to 500° C. on a hot plate heated at 500° C. to mitigate thermal shock. The laser beam was focused not by general spherical lenses but by a cylindrical lens (focal length 1 inch, diameter 19.05 mm, Laser Mechanisms, Inc.) to increase the sintering area. The laser parameters of defocus distance, laser energy, and scan speed were set to be 20 mm, 95 W, and 0.1 mm/s, respectively, which resulted in a laser beam width of approximately 8 mm for scanning of the samples.

The BCFZY0.1 cathode powder was synthesized by a modified Pechini method as described elsewhere. The detailed procedures for preparing the BCFZY0.1 was shown in the supplementary materials. The as-prepared BCFZY0.1 powder was mixed with the binder (Heraeus V006), and dispersant (solsperse 28000 (Lubrizol)) prepared into a paste. The cathode paste was brush painted onto the obtained half-cell and then fired in the air by a furnace at 900° C. for 2 h. The PCFC single cells BCFZY0.1|BCZYYb+1 wt % NiO|Ni(O)–BCZYYb were prepared by depositing BCFZY0.1 cathode thin film on the half cells fabricated by the RLRS by the conventional screening printing followed by 900° C. furnace treatment for 2 h. A silver paste (T18F014) was used as a current collector. A ceramic bond (552-1219) was used to mount and seal the single cell on an alumina tube. The active area of the single-cell was approximately 0.18 cm². The PCFC single cell was first heated to 100° C. at a rate of 1° C./min and held for 1 h, then heated to 300° C. at the same ramp rate and held for another 1 h to cure the sealant. After that, the cell was increased to 600 at a ramp rate of 1.5° C./min. Both the anode and cathode were exposed to stagnant air during the heating process. 5% $H_2$ (balance with Ar) with 20 ml/min was fed into anode for the first 6 h, then switched to pure hydrogen for cell testing. Air was swept in the cathode with 150 ml/min. Its I-V characteristic and electrochemical impedance spectra were corrected using a potentiostat (Gamry Reference 3000) at different temperatures. The impedance frequency was ranged from 0.05 to $10^6$ Hz with an amplitude of 10 mV. The temperature rate was controlled at 2° C./min in this process. The crystal structure of the samples was characterized using X-ray diffraction (XRD). A Rigaku Ultima IV diffractometer with monochromatic Cu-K$\alpha$ radiation was used. The XRD pattern was recorded at a rate of 1°/min in the range of 15-85°. The microstructure of the fabricated cells was observed by a scanning electron microscope (SEM Hitachi 4800).

Figure 65:
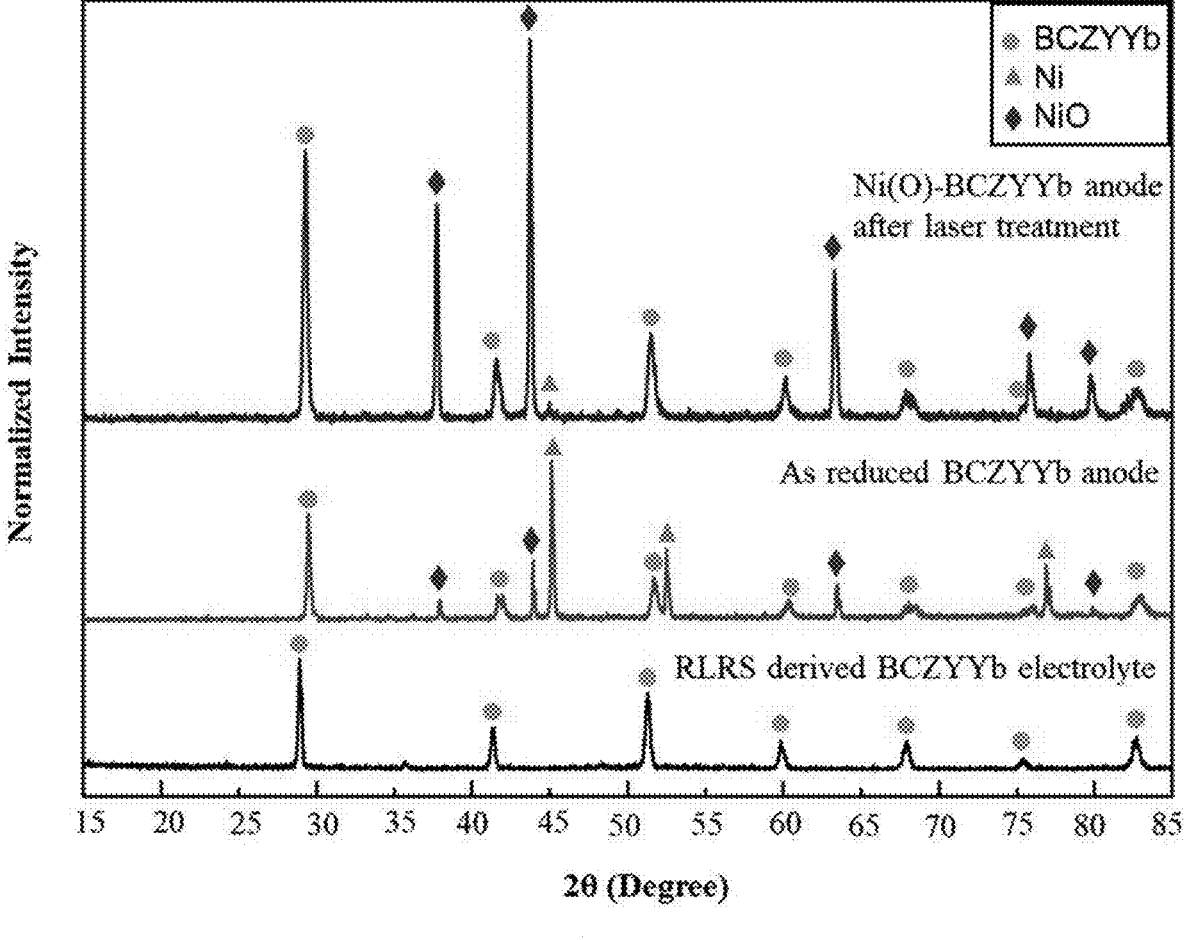
FIG. 65 is a chart showing the XRD patterns of RLRS-derived BCZYYb+1 wt % NiO electrolyte and the Ni(O)–BCZYYb anode substrates before (furnace-sintered) and after RLRS operation.
Figures 66A, 66B, 66C, 66D, 66E:
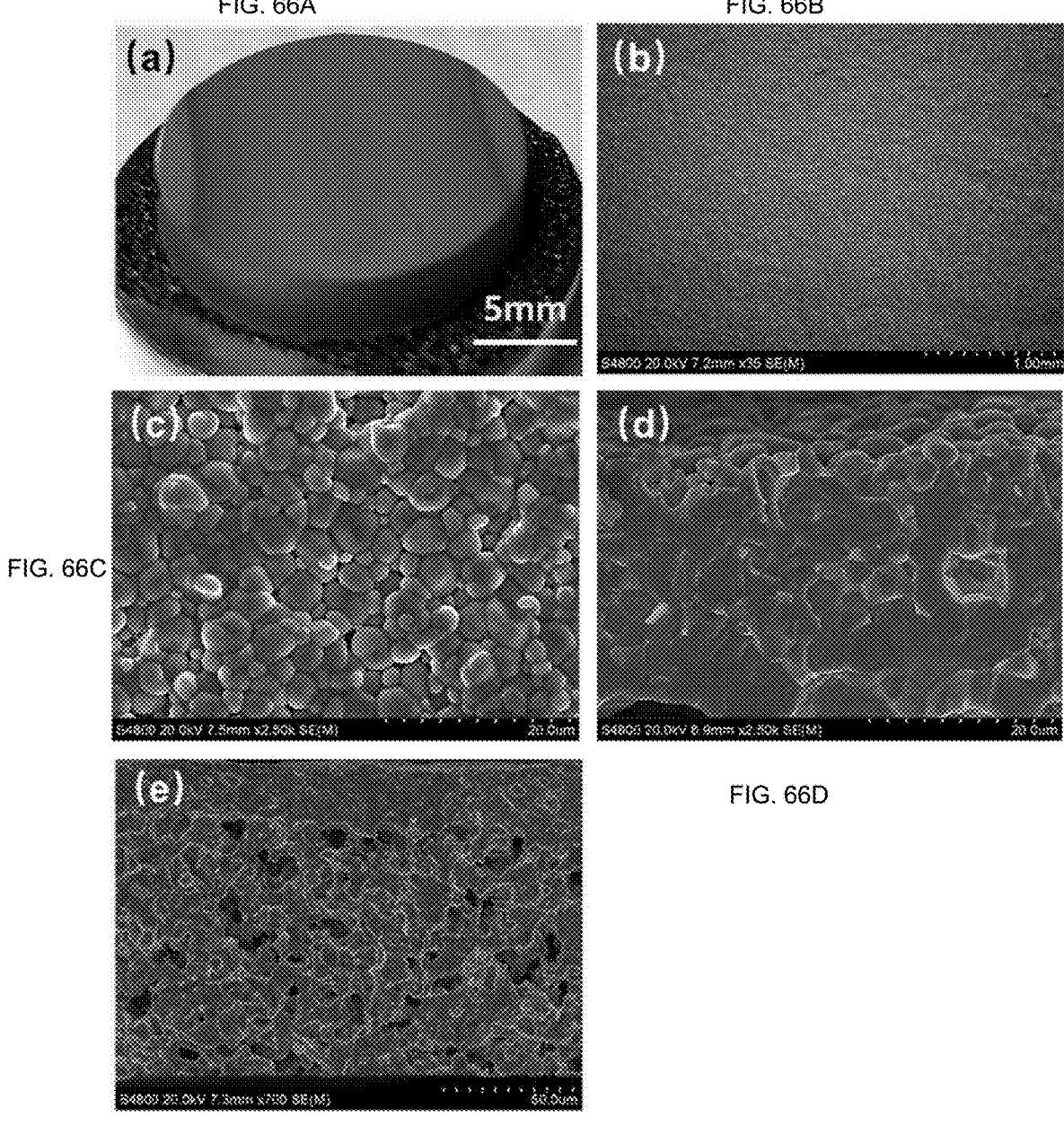
FIG. 66A is a photograph of the RLRS-derived BCZYYb+1 wt % NiO electrolyte on the Ni(O)–BCZYYb substrate.
FIG. 66B is a low magnification surface SEM micrograph of the electrolyte of FIG. 66A.
FIG. 66C is a high magnification surface SEM micrograph of the electrolyte surface of FIG. 66A.
FIG. 66D is a high magnification cross-sectional SEM micrograph of the electrolyte of FIG. 66A.
FIG. 66E is a cross-sectional SEM micrograph of the electrolyte and substrate of FIG. 66A.

The XRD pattern of the RLRS-derived BCZYYb+1 wt % NiO electrolyte (FIG. 65) shows that the phase-pure perovskite crystal structure was formed, which is the same as the one obtained by the SSRS method. By comparing the XRD patterns (FIG. 65) for Ni(O)–BCZYYb anode substrates after and before the RLRS operation, it can be found that the RLRS did not cause a significant phase composition change in the anode composites, which are still comprised of BCZYYb, NiO, and Ni phases. However, the deeper observation indicated that the amount of NiO increased in the anode composite after the RLRS operation, which, however, did not affect the final performance of PCFC single cells since the NiO was reduced in-situ when operating the fuel cells. The formation of NiO in the anode composite could explain the excellent bonding (will be shown in FIGS. 66A-66E) between the electrolyte and the anode layer. Therefore, we can conclude that after the RLRS deposition of BCZYYb+1 wt % NiO electrolyte on the reduced Ni(O)–BCZYYb anode substrate, the desired crystal structures for electrolyte and anode were either achieved or kept successfully. However, the reoxidation of Ni to NiO might result in an effect on the durability of the PCFCs. We are currently trying to quantify the amount of Ni reoxidation and figure out its effect on the PCFC's performance and stability. We hope to be able to report the Ni reoxidation soon. Indeed, the deposition of cathode might result in Ni reoxidation too, which is also under our current study now.

The photograph (FIG. 66A) of the RLRS-derived BCZYYb+1 wt % NiO electrolyte on the Ni(O)–BCZYYb substrate shows that no visible macrocracks can be observed on the surface of the electrolyte layer supported on Ni(O)–BCZYYb anode substrate. The low-magnification SEM micrograph (FIG. 66B) of the electrolyte further shows no microcracks can be observed. The high-magnification SEM micrograph (FIG. 66C) of the electrolyte surface indicates that the electrolyte film is completely defect-free and was fully densified. This grain size (2-5 $\mu$m) is comparable to that prepared by the SSRS operation in a furnace. The SEM micrograph (FIG. 66D) of the cross-section of RLRS-derived BCZYYbp1 wt % NiO electrolyte further confirmed that the RLRS-derived electrolyte was fully densified and the grain boundary distance was decreased significantly. The SEM micrograph (FIG. 66E) of the cross-section of half cells with electrolyte supported on anode substrate shows that the anode is still porous after the RLRS operation, which can ensure enough porosity after a further in-situ reduction during fuel cell operation. It can also be clearly seen that the bonding between the electrolyte and anode layer is excellent. No discontinuity was found at the interface between anode and electrolyte. We can conclude that after the RLRS deposition of BCZYYb+1 wt % NiO electrolyte on Ni(O)–BCZYYb anode substrate, the desired dense microstructure electrolyte was obtained and the desired porous anode microstructure was kept. The RLRS mechanism for achieving crack-free, fully densified electrolyte on pre-sintered anode substrate is still under investigation. The best assumption here is that the RLRS sintering involved the liquid phase sintering, like what we have observed during the study of the SSRS mechanism. The liquid phase sintering is supposed to be able to remove the stress and allow the only Z-direction shrinkage. In addition, the RLRS method is still relatively new, in which the sintering temperature still cannot easily and accurately be measured. The accurate temperature measurement during the RLRS is still under development.

Figures 67A, 67B, 67C:
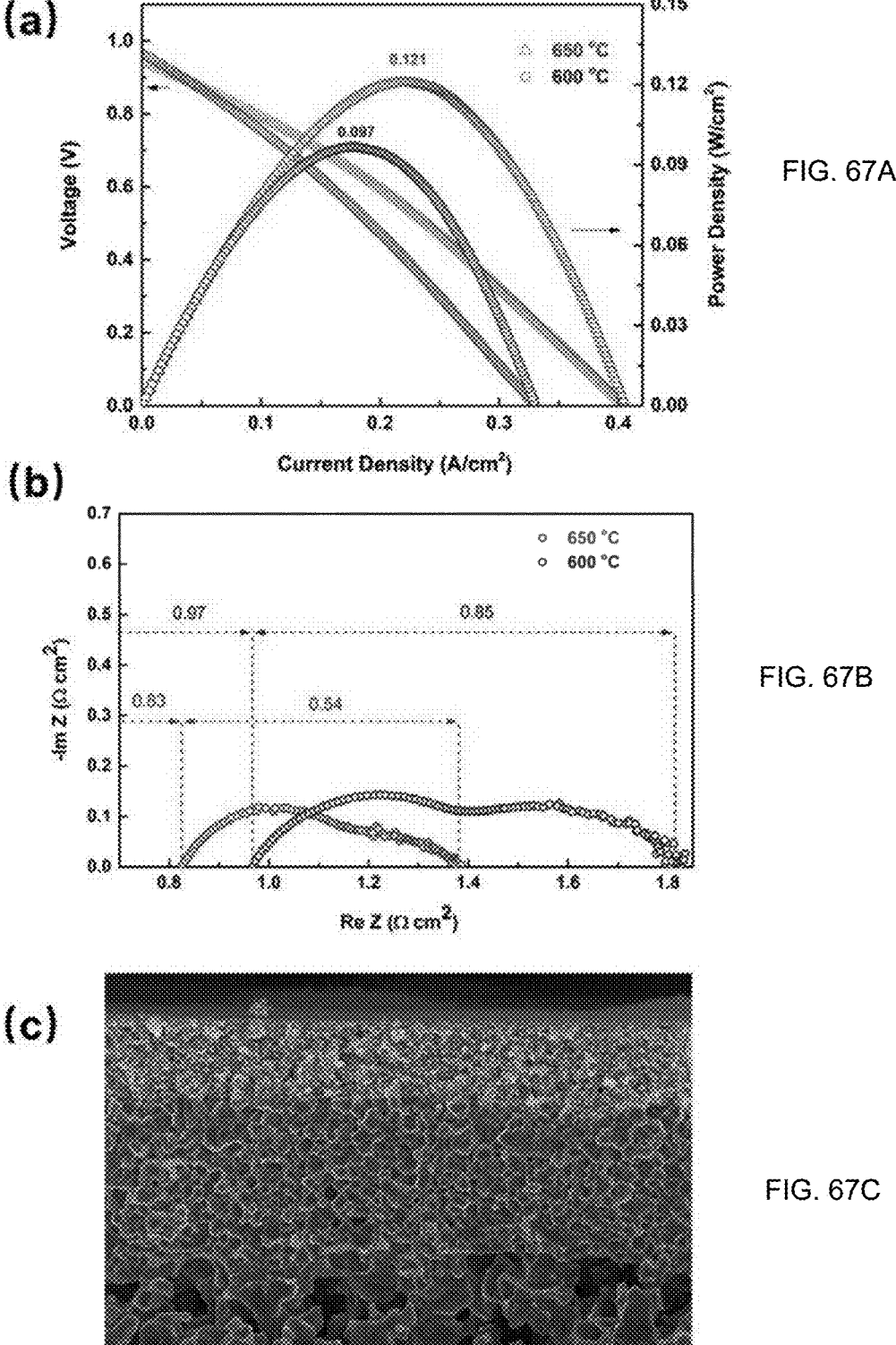
FIGS. 67A-67C show the characterization of the BCFZY0.1|RLRS-BCZYYb|Ni(O)–BCZYYb single cell.

After deposition of BCFZY0.1 cathode thin film, the RLRS-derived half cells were made into BCFZY0.1|RLRS-BCZYYb|Ni(O)–BCZYYb single cells, which was measured under Air/H2 gradient at 600-650° C. The I-V and I-P curves (FIG. 67A) of a single cell show that the open-circuit voltages (OCV) of 0.97 V and 0.94 V were obtained at 600° C. and 650° C., respectively, which are comparable values comparing with those measured for the furnace-sintered PCFC single cells but are still 0.10-0.15V lower than the theoretical values. The sealing leakage was thought to be the main reason for the lower OCV because the separation of the sealant from electrolyte was observed after testing, while the microstructure of the single cells was kept well after testing. The peak power densities of the RLRS-derived single cell are 97 mW/cm² at 600° C. and 121 mW/cm² at 650° C., which are not as high as the peak power density obtained for the state-of-the-art PCFC single cells fabricated by the SSRS method. The reason for the relatively low power density of the RLRS-derived single cell was analyzed by electrochemical impedance spectroscopy (EIS). The EIS spectra of the RLRS-derived single cell at 600° C. and 650° C. are shown in FIG. 67B. The ohmic resistance ($R_o$) and polarization resistance ($R_p$) were subtracted as follows: $R_o$=0.97 $\Omega$cm$^2$ and $R_p$=0.85 $\Omega$cm$^2$ at 600° C., and $R_o$=0.83 $\Omega$cm$^2$ and $R_p$=0.54 $\Omega$cm$^2$ at 650° C. Both the electrolyte resistance and the electrode resistance are relatively high. However, the SEM image (FIG. 67B) of this single cell after testing indicates that the electrolyte thin film has a thickness of ~36 $\mu$m, which resulted in a proton conductivity of $3.7\times10^{-3}$ S/cm for the RLRS-derived BCZYYb electrolyte, which is a moderate proton conductivity values comparing the BCZYYb electrolytes obtained by conventional methods. Therefore, the decreasing thickness of the electrolyte can result in high single-cell performance. Therefore, we can conclude that the PCFC single cells prepared by the RLRS method still have significant space to be further improved, and the RLRS is a promising fabrication method to allow independently adjust the electrolyte, anode, and cathode for achieving better PCFC performance. The rapid densification of protonic ceramic electrolyte and excellent bonding between electrolyte and electrode also can contribute to the rapid manufacturing of protonic ceramic energy devices using the newly developed integrated additive manufacturing and laser processing technique. Furthermore, the microstructure of the tested BCZYYb electrolyte did not show an obvious difference from the fresh BCZYYb just after the RLRS, which indicates that the RLRS has good microstructure stability.

The state-of-the-art protonic ceramic electrolyte BaCe$_{0.7}$Zr$_{0.1}$Y$_{0.1}$Yb$_{0.1}$O$_{3-\delta}$ (BCZYYb) dense films were successfully deposited on as-prepared Ni(O)–BCZYYb anode substrate by recently developed rapid laser reactive sintering method. The separation of the preparation of dense electrolyte and porous anode makes it possible to manufacture protonic ceramic fuel cells (PCFCs) with more desirable electrolyte and anode microstructures. The PCFC single cells prepared after introducing the cathode thin film BaCo$_{0.4}$Fe$_{0.4}$Zr$_{0.1}$Y$_{0.1}$O$_{3-\delta}$ (BCFZY0.1) showed OCVs of 0.94-0.97V and peak power densities of 97 mW/cm$^2$ at 600° C. and 121 mW/cm$^2$ at 600-650° C. under Air/H$_2$ gradient. The proton conductivity of the BCZYYb film prepared by the RLRS technique showed a moderate proton conductivity of $3.7\times10^{-3}$ S/cm at 600° C. The higher PCFC performance can be expected by decreasing electrolyte film thickness and optimizing electrode microstructure.

Example 11—Rapid Laser Reactive Sintering for Sustainable and Clean Preparation of Protonic Ceramics One of the essential challenges for energy conversion and storage devices based on protonic ceramics is that the high temperature (1600-1700° C.) and long-time firing (>10 h) are inevitably required for the fabrication, which makes the sustainable and clean manufacturing of protonic ceramic devices impractical. This study provided a new rapid laser reactive sintering (RLRS) method for the preparation of nine protonic ceramics [i.e., BaZr$_{0.8}$Y$_{0.2}$O$_{3-\delta}$ (BZY20), BZY20+1 wt % NiO, BaCe$_{0.7}$Zr$_{0.1}$Y$_{0.1}$Yb$_{0.1}$O$_{3-\delta}$ (BCZYYb), BCZYYb+1 wt % NiO, 40 wt % BCZYYb+60 wt % NiO, BaCe$_{0.85}$Fe$_{0.15}$O$_{3-\delta}$—BaCe$_{0.15}$Fe$_{0.85}$O$_{3-\delta}$ (BCF), BaCo$_{0.4}$Fe$_{0.4}$Zr$_{0.1}$Y$_{0.1}$O$_{3-\delta}$ (BCFZY0.1), BaCe$_{0.6}$Zr$_{0.3}$Y$_{0.1}$O$_{3-\delta}$ (BCZY63), and La$_{0.7}$Sr$_{0.3}$CrO$_{3-\delta}$ (LSC)] with desired crystal structures and microstructures. Following this, the dual-layer half-cells, comprising the porous electrode and dense electrolyte, were prepared by the developed RLRS technique. After applying the BCFZY0.1 cathode, the protonic ceramic fuel cell (PCFC) single cells were prepared and tested initially. The derived conductivity of the RLRS electrolyte films showed comparable proton conductivity with the electrolyte prepared by conventional furnace sintering. The initial cost estimation based on electricity consumption during the sintering process for the fabrication of PCFC single cells showed that RLRS is more competitive than the conventional furnace sintering. This RLRS can be combined with the rapid additive manufacturing of ceramics for the sustainable and clean manufacturing of protonic ceramic energy devices and the processing of other ceramic devices.

The refractory nature of ceramics is beneficial to use them as structural materials; however, it is sometimes recognized as an encumbrance when using them as functional materials. A typical case is the protonic ceramics used for energy conversion and storage devices (e.g., fuel cells, electrolyzers, membrane reactors). The electrolyte and interconnect involved in protonic ceramic energy devices require to be fired at temperatures as high as 1700° C. for longer than 10 h to achieve high relative density. These high-temperature and long-time processes have been abhorred, not only for their energy and time consumptions but also for the volatilization of the materials, leading to poor performance. Moreover, when fabricating the devices (i.e., single cells and stacks), the refractory nature becomes a more severe problem because the dense electrolyte and interconnect must be integrated with the porous electrode layers, which need to have an excellent nanoporous structure for ensuring enough surface area for excellent electrocatalytic fuel oxidation or oxygen reduction reactions. The conventional method for manufacturing protonic ceramics with desired crystal structures and microstructures is described by route 1 in FIG. 68. The primary four steps of (a) mixing raw powders of each material by ball milling, (b) calcination of each material, (c) shape formation by pelletizing (bulks) or tape casting (films), and (d) sintering are needed. The calcination step usually is performed at a temperature higher than 900° C. for more than 10 h to obtain phase-pure ceramic powders. Sometimes, the particular wet-chemistry method is used to obtain pure-phase nanopowder for better controlling the microstructure during sintering, which inevitably results in more expensive precursors and much longer preparation time (e.g., a week or so is needed to prepare fine BaZr0.8Y0.2O3-δ (BZY20) powder through the modified Pechini method). The conventional sintering of protonic ceramics (e.g., BZY20) is performed at 1600-1700° C. for more than 10 h in a protecting powder bath, comprising 90 wt % BZY20 and 10 wt % BaCO$_3$ under a pure oxygen atmosphere. However, the high-temperature sintering of BZY20 directly disqualified it for preparing single cells or half-cells for protonic ceramic devices. Several research groups investigated many promising ceramic sintering methods for densifying ceramics. The primary purpose of these methods was to reduce the fabrication temperature, time, and cost. The two-step sintering was proven to reduce the sintering time at peak temperature into several minutes, followed by a lower temperature step for some hours. This method can reduce Ba loss and control the grain size while achieving the desired relative density at the same time. Spark plasma sintering reduced the sintering time to several minutes by densifying the pellets in the die with the proper pressure and electric field. Flash sintering is another promising ceramic sintering method, which can achieve high relative density within several seconds. However, most of these sintering methods require specific equipment, high power consumption, and pressure assistance, which significantly limited the geometry flexibility of the sintered ceramics. Recently, solid-state reactive sintering (SSRS) has been discovered by Tong et al., which allows the fabrication of protonic ceramics, even single cells/half-cells in one-step with the help of sintering aids while sintering at a moderate temperature (e.g., 1400-1500° C.). However, the long-term sintering at least 12 h must be satisfied for achieving the desired crystal structure and microstructure. Furthermore, the SSRS method still has to face the challenge of integrating a fully densified electrolyte or interconnect with porous electrodes.

In our previous work, a rapid laser reactive sintering (RLRS) technique was initially discovered for rapid sintering 3D printed electrolyte green layers of protonic ceramic electrolytes, BZY20 and BCZYYb, into dense films to develop integrated additive manufacturing and laser processing of protonic ceramic electrolyzer stacks. The comin Table 10, are displayed in FIG. 69. In general, although the interaction between the laser beam and the materials was only around several seconds, it was enough to form the desired crystal structures for all the samples. As for the BCZYYb, BCZYYb+1 wt % NiO, BZY20, BZY20+1 wt % electrolytes, the LSC interconnect, the BCFZY0.1 electrode, and the BCZY63 electrode scaffold (the thin film of BCZY63 was deposited on the BCZYYb electrolyte pellet, which resulted in the existence of BCZYYb peaks), the phase-pure perovskite structure was obtained. Furthermore, the cermet hydrogen electrode based on BCZYYb electrolyte and NiO also showed the desired crystal structures of BCZYYb and NiO. There are no other peaks ascribed to impurities found. BCF is a complicated dual-phase material system comprising a cubic perovskite ($BaCe_{0.85}Fe_{0.15}O_{3-\delta}$, BCF8515) and an orthorhombic perovskite ($BaCe_{0.15}Fe_{0.85}O_{3-\delta}$, BCF1585) for using as a mixed protonic and electronic-conducting hydrogen permeation membrane, which usually is synthesized by using the modified Pechini method with extended processing time. Therefore, we can conclude that the RLRS method can achieve the desired crystal structure for extensive protonic ceramic component materials.

TABLE 10

| | | | | | Laser operation parameters for sintering protonic ceramic components | | | | |
| --- | --- | --- | --- | --- | --- | --- | --- | --- | --- |
| | BZY20 | BZY20 + 1 wt % NiO | BCZYYb | BCZYYb + 1 wt % NiO | 40 wt % BCZYYb + 60 wt % NiO | BCZY63 | BCFZY0.1 | LSC | BCF |
| Laser power (W) | 7 | 7 | 2.8 | 2.8 | 100 | 10 | 70 | 85 | 10 |
| Moving speed (mm/s) | 1 | 1 | 1 | 1 | 0.2 | 1 | 0.5 | 01 | 1 |
| Defocus (mm) | 20 | 20 | 20 | 20 | 30 | 20 | no lens | 20 | 10 | bination of rapid heating and instant solid state reaction allowed the fast phase formation and the densification of BZY20 and BCZYYb. This RLRS technique is schematically described by route 2 in FIG. 68, which can be divided into three steps: paste preparation, 3D printing, and laser reactive sintering. A much more controllable and rapid 3D printing was added while the time and energy-consuming calcination and sintering steps were replaced by a fast and straightforward, cost-effective laser scanning step. In the present work, the RLRS technique was extensively used for processing the protonic ceramics of electrolytes, hydrogen electrodes, oxygen electrodes, oxygen/hydrogen electrode scaffolds, interconnects, and mixed conducting dual-phase composites for fulfilling the rapid integrated additive and laser processing of protonic ceramic energy devices sustainably and cleanly. Not only the desired crystal structures but also the desired microstructures (e.g., fully dense or highly porous structures) were obtained by the RLRS method. The fabrication of half-cells and single cells was demonstrated. The conductivity of the electrolyte derived for the single-cell measurement showed comparable values to those obtained by the furnace sintering method. The RLRS provided a corner-stone knowledge for rapid integrated additive manufacturing and laser processing of protonic ceramic energy devices and other ceramic devices.

Figures 70A, 70B, 70C, 70D, 71A, 71B, 71C:
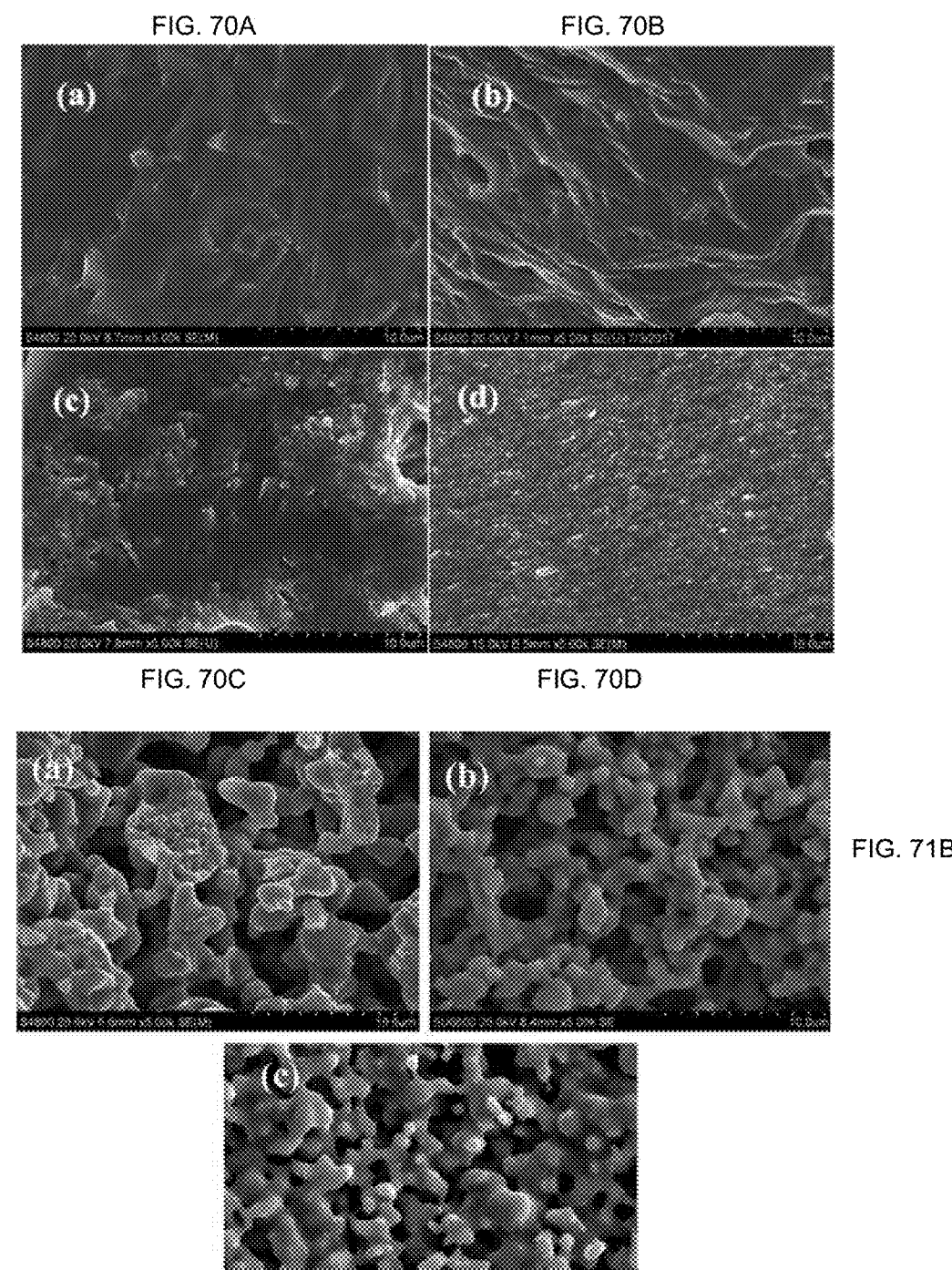
FIGS. 70A-70D include SEM images of dense protonic ceramic component films obtained by RLRS.
FIGS. 71A-71C include SEM images of the porous protonic ceramic components obtained by RLRS.

The X-ray diffraction (XRD) patterns of all the protonic ceramic component films prepared by the RLRS method under the optimized laser operation condition, summarized FIGS. 70A-70D provide the SEM characterization of BCZYYb+1 wt % electrolyte, BZY20+1 wt % NiO electrolyte, LSC 98.9%. LSC is the state-of-the-art interconnect for solid oxide fuel cells, which, however, is very difficult to be densified too. For example, the sintering at 1550° C. for 10 h usually only gets a relative density of ~80% by the conventional method, as described in route 1 in FIG. 68. FIG. 70C provides the LSC's SEM image after RLRS for a couple of seconds, from which it can be clearly seen that the LSC has been fully densified already. The relative density is around 98.7%. The BCF composite was recently reported to be a hydrogen-permeable membrane, comprising $BaCe_{0.85}Fe_{0.15}O_{3-\delta}$ and $BaCe_{0.15}Fe_{0.85}O_{3-\delta}$, which usually needs to utilize the improved Pechini method to achieve the desired phase composite. FIG. 70D shows that our newly developed RLRS method can fully densify the composite BCF films for hydrogen permeation. The BCF membrane showed a relative density of ~93%.

FIGS. 71A-71C provides the SEM characterization results of porous protonic ceramic components of 40 wt % BCZYYb+60 wt % NiO hydrogen electrode, BCFZY0.1 oxygen electrode, and BCZY63 scaffold. It is evident that by optimizing the laser operation parameters, the highly porous microstructures of these three protonic ceramic component films were obtained successfully, which proved that the RLRS could also achieve porous protonic ceramic component films for working as the electrode or electrode scaffold. FIG. 71A further indicates that a half-cell comprising 40 wt % BCZYYb+60 wt % NiO hydrogen electrode and a BCZYYb+1 wt % NiO electrolyte was obtained by one-step laser scan, which proved that the RLRS could even make half-cells of the protonic ceramic device. FIG. 71B shows that a defect-free half-cell with an active area of ~5 cm$^2$ was obtained. The obtained half-cell is nearly flat with less than a 1° angle curve-up from the side to the center.

The proton conductivity of the protonic ceramic is the essential property. We screen-printed a state-of-the-art cathode BCFZY0.1 on the top of an RLRS half-cell (BCZYYb+1 wt % NiO|40 wt % BCZYYb+60 wt % NiO). Under open-circuit voltage conditions (air/H$_2$), the ohmic resistance of the single cells and the conductivity were measured and calculated using the thickness obtained by SEM characterization after measurement.

FIG. 73 provides the proton conductivity of the BCZYYb electrolyte at temperatures from 450 to 650° C. The activation energy is around 30 KJ/mol, which is comparable to the one reported for protonic ceramics. The conductivity for the RLRS BCZYYb electrolyte is around 5.3×10$^{-3}$ S/cm at 600° C., which is also comparable to the one reported in the literature. Therefore, we can initially conclude that the RLRS method can obtain protonic ceramics with desired properties too.

The cost of the RLRS and the conventional furnace sintering method was initially compared based on the laboratory-scale fabrication of protonic ceramic fuel cell (PCFC) planar single cells. The cost was estimated mainly based on electricity consumption for fabricating twenty PCFC single cells with an area of 10×10 cm$^2$. For the RLRS, the electricity consumed by the CO$_2$ laser scanning of anode-supported electrolyte half-cells and the laser scanning of cathodes was included in the cost estimation. For conventional furnace sintering, the two temperature programs were used to calculate the electricity consumption during the sintering process. The energy cost for the RLRS method is only ~34% of the energy cost for the conventional furnace sintering method.

The newly developed RLRS method was proven to be able to fabricate the electrolytes, electrodes, interconnect, gas-permeation composite, and half-cells for protonic ceramic energy devices with nine compositions. The XRD and SEM characterization showed that the desired crystal structures and microstructures for these protonic ceramic component films could be achieved. The initial conductivity measurement of protonic ceramic electrolytes prepared by RLRS showed comparable values to those obtained by the furnace sintering method. The cost estimation based on the electricity consumption for the fabrication of PCFC single cells indicated that the RLRS method is more competitive than the conventional furnace sintering method. Therefore, the RLRS method can be used for the fabrication of protonic ceramics. The RLRS is expected to be able to rapidly sinter other ceramics with controllable microstructures, desired crystal structures, and properties. The instantaneous, controllable, and cost-effective advantages of the RLRS method allow it to be integrated with additive manufacturing for rapid processing of ceramics, which can open up a new avenue for advanced manufacturing of ceramics.

The state-of-the-art protonic ceramic components of dense electrolytes (BCZYYb+1 wt % NiO, BCZYYb, BZY20+1 wt % NiO, and BZY20), porous electrodes/electrode scaffolds [40 wt % BCZYYb+60 wt % NiO, BaCo$_{0.4}$Fe$_{0.4}$Zr0.1Y$_{0.1}$O$_{3-\delta}$ (BCFZY0.1) BaCe$_{0.6}$Zr$_{0.3}$Y$_{0.1}$O$_{3-\delta}$ (BCZY63)], dense interconnect (La$_{0.7}$Sr$_{0.3}$CrO$_{3-\delta}$/LSC), and dense mixed protonic and electronic-conduction composite (Ba—Ce$_{0.85}$Fe$_{0.15}$O$_{3-\delta}$—

BaCe$_{0.15}$Fe$_{0.85}$O$_{3-\delta}$/BCF) were chosen as model materials for the study of the RLRS processing of protonic ceramics. Green pastes of these protonic ceramic component precursors were prepared by ball-milling the raw materials of oxide and carbonate powders [e.g., BaCO$_3$ (Alfa Aesar 99.8%), Fe$_2$O$_3$ (Alfa Aesar 99.9%), CeO$_2$ (Alfa Aesar 99.9%), ZrO$_2$ (Alfa Aesar 99.7%), La$_2$O$_3$ (Alfa Aesar 99.9%), Cr$_2$O$_3$ (Alfa Aesar 99%), SrCO$_3$ (Alfa Aesar 99.9%), NiO (Alfa Aesar Ni 78.5%), Y$_2$O$_3$ (Alfa Aesar 99.9%), and Yb$_2$O$_3$ (Alfa Aesar 99.9%)] for 48 h in the stoichiometric ratio, followed by mixing of the ball-milled powder with water, dispersant, and binder. The green films of the component precursors were prepared either by micro-extrusion-based 3D printed or simple drop-coating on substrates of alumina plates and fused silica or sintered BCZYYb electrolyte pellet. The thin films with a usual thickness of ~150 μm were deposited and dried in the ambient atmosphere for 24 h. The CO$_2$ laser (Firestar TI100, wavelength 10.6 μm) was used to perform the RLRS. The laser was scanned across the green films by placing the films on a 3D-printing stage with X-Y motions to control scan speed and a Z-direction motion to control the degree of laser beam focus. The detailed laser operation parameters of laser power, scanning speed, and defocus distance are summarized in Table 10 for each protonic ceramic component film.

The crystal structure of each protonic ceramic component film prepared by RLRS was characterized by XRD (Rigaku Ultima IV). The laser-irradiated films were ground into powder. The XRD patterns were obtained by monochromatic Cu Kα radiation from 20 to 80° with 1°/min. The microstructures of representative protonic ceramic component films were observed by a scanning electron microscope (SEM, Hitachi S4800, Hitachi, Ltd., Tokyo, Japan). The relative densities of the protonic ceramics were analyzed from multiple SEM images using the ImageJ software. The SEM images were imported into the ImageJ software for relative density calculation. By changing the black/white contrast (threshold) of the images, the pores can be automatically identified with significant color/contrast difference to the crystal grain/dense area. By counting the pixels of the areas of the pores and grains, we calculated the percentage of the pores and then relative densities. Each sample's relative density was measured by this method five times to achieve average values.

In summary, the proton conductivities for the cell prepared using RLRS were analyzed by electrochemical impedance spectroscopy of the single cells. The half-cell was achieved by one-step sintering of the 3D-printed 40 wt % BCZYYb+60 wt % NiO as the anode layer and spray-coating the BCZYYb electrolyte layer together. Then, the BCFZY0.1 cathode layer was screen-printed on the half-cells' electrolyte surface fabricated by the RLRS method. The silver paste was applied to the two electrodes as current collectors. Silver wires were used to extend electrodes to the external conducting wires. Gamry Reference 600 plus was used for electrochemical impedance data recording with a perturbation voltage of 10 mV in the frequency range of 0.005 Hz to 5 MHz at temperatures of 450-650° C., under open-circuit voltage conditions with UHP air (150 mL/min) on the cathode side and UHP H$_2$ (20 mL/min) on the anode side without humidification.

Example 12—Rapid Laser Processing of Thin Sr-Doped LaCrO$_{3-\delta}$ Interconnects for Solid Oxide Fuel Cells Rapid laser reactive sintering (RLRS) is an additive manufacturing process that enables the quick and efficient fabrication of a wide range of ceramic-based cells with various geometries and microstructures. Herein, the preparation of $La_{0.8}Sr_{0.2}CrO_{3-\delta}$ interconnects by RLRS for solid-oxide fuel/electrolysis cells (SOFC/ECs) is demonstrated. Uniform perovskite structure without residual intermediate phases can be achieved by $CO_2$ laser irradiation at 103 W with a scanning speed of 0.07-0.10 mm s$^{-1}$. Narrowing the width of the underlying MgO substrate and deposition of a terpineol-based slurry with a solid loading level of less than 4 g m$^{-2}$ are found to be critical parameters to avoid cracking and delamination. The optimum laser conditions balance Cr loss and densification of $La_{0.8}Sr_{0.2}CrO_{3-\delta}$ resulting in an 11-$\mu$m-thick RLRS-derived $La_{0.8}Sr_{0.2}CrO_{3-\delta}$ film having a high relative density of 80-95% with low area-specific resistance (ASR) of 0.003 (2 cm$^2$ at 600° C. This ASR is more than 30 times lower than that of furnace-sintered $La_{0.8}Sr_{0.2}CrO_{3-\delta}$ in the same thickness range. The RLRS technique is promising for quick and efficient preparation of dense and thin $La_{0.8}Sr_{0.2}CrO_{3-\delta}$, which are key components for highly compact SOFC/SOECs.

Solid-oxide fuel cells (SOFCs) and their reverse operation, solid-oxide electrolysis cells (SOECs), are a crucial technology for highly efficient electricity and hydrogen generation. The cells are composed of an electrolyte and two electrodes exposed to oxidizing/reducing gases and are electrically connected by an interconnect material. A large body of work has been established around these four components for almost five decades to discover the best materials and processing techniques. For the interconnect material, perovskite-type acceptor-doped lanthanum chromite $(La_{1-x}M_xCrO_{3-\delta})$ has been a primary material of focus because of following three reasons: sufficient electronic conductivity ($10^{-2}$-$10^2$ S cm$^{-1}$), chemical stability over a wide oxygen partial pressure range from $10^{-21}$ to $10^0$ atm, and compatibility of the thermal expansion coefficient (TEC) of ~1×10$^{-5}$ K$^{-1}$ with that of the underlying SOFC/EC electrodes. Ca or Sr are often selected as the acceptor dopant on the La site, leading to thermally activated hopping conduction of small p-type polarons. Although several alloys have attracted interest as an interconnect material due to lower operating temperature for SOFC/ECs, $LaCrO_3$ has retained the leading role as the interconnect material of choice due to its appropriate conductivity, stability, and TEC.

The $LaCrO_3$ interconnect must be dense and thin to separate the oxidizing and reducing gases while minimizing the resistance between components. However, it is well-known that $LaCrO_3$ has very poor sinterability due to its high melting point (2465° C.) and the evaporation of $CrO_3$ during sintering. In conventional solid-state sintering, Mori et al. has reported that the relative density of lanthanum chromite is less than 70% even after sintering at 1600° C. for 20 h. To improve the sinterability, the following techniques can be used: sintering under a reducing environment, adding sintering aids or eutectic forming compounds, using fine powder derived from metal nitrates, and using sacrificing Cr sources. However, multiple firing steps and high temperatures around 1600° C. for long durations are still generally needed even with these techniques. In addition, sintering aids have been shown to increase the TEC, and the use of costly nitrate precursors have proven problematic for practical applications.

This study focuses on a rapid laser reactive sintering (RLRS) technique as a new method to prepare dense and thin acceptor-doped $LaCrO_{3-\delta}$ interconnect materials. RLRS is a part of an additive manufacturing process using scanning lasers, which can quickly give thermal energy required for phase formation and sintering of ceramics. RLRS combined with computer-aided 3D printing will enable the fabrication of highly compacted multilayered structures with the complicated geometric configuration of planar and tubular micro-SOFC/EC. The authors' group recently demonstrated that RLRS could prepare dense films of $BaZr_{0.8}Y_{0.2}O_{3-\delta}$ and $BaCe_{0.7}Zr_{0.1}Y_{0.1}Yb_{0.1}O_{3-\delta}$, which are well-known proton-conducting SOFC/EC electrolytes with poor sinterability. $LaCrO_3$ also has poor sinterability due to evaporation of the Cr oxide during high-temperature and long-duration sintering; therefore, RLRS is an ideal technique to prepare dense and thin $LaCrO_3$. This study presents phases, microstructure, and electrical properties of RLRS-derived Sr-doped $LaCrO_{3-\delta}$ films as a function of laser conditions.

The RLRS mechanism relies on the introduction of thermal energy by a $CO_2$ laser; therefore, it is reasonable that laser conditions (e.g., power, scanning speed, defocus distance) and substrate properties (e.g., geometrical dimension, heat transfer coefficient, temperature) have significant effects on the properties. This study investigated appropriate ranges of the laser power and scanning speed for the RLRS of 7.5±1.5 mg green $La_{0.8}Sr_{0.2}CrO_{3-\delta}$ slurry deposited on MgO pellets (ø14 mm, 2 mm thick) at fixed defocus distance (5 mm) and substrate temperature (550° C.) (The details are described below). FIG. 74A shows samples appearance after the laser irradiation at various power and speed (70 W and 0.01 mm s$^{-1}$, 76, 82, 87, 92, 96 W and 0.10 mm s$^{-1}$, 100 W and 0.30 mm s$^{-1}$). At 0.10 mm s$^{-1}$, the sample color was changed from green to black as laser power was increased from 76 to 96 W, which indicates perovskite-type $La_{0.8}Sr_{0.2}CrO_{3-\delta}$. The formation of the perovskite-type $La_{0.8}Sr_{0.2}CrO_{3-\delta}$ was confirmed by X-ray diffraction (XRD) patterns, as shown in FIG. 74B. The black-colored samples' XRD patterns are attributed to $La_{0.8}Sr_{0.2}CrO_{3-\delta}$, $MgCr_2O_4$, and MgO substrate. The predominant phase is $La_{0.8}Sr_{0.2}CrO_{3-\delta}$, with the second phase of $MgCr_2O_4$. The lattice parameter of the cubic-perovskite phase $La_{0.8}Sr_{0.2}CrO_{3-\delta}$ was calculated as 3.887 Å, which is within 0.01% deviation from the reported value of furnace-sintered $La_{0.8}Sr_{0.2}CrO_{3-\delta}$. Very weak XRD peaks (suggested with * in FIG. 74B) are attributed to $La_{4.67}[SiO_4]_3O$, which indicates a small amount of agate was contaminated during the ball-milling stage. These XRD patterns suggest that RLRS can prepare Sr-doped $LaCrO_{3-\delta}$ in a few minutes without residual intermediate phases (e.g., $SrCrO_4$, $LaCrO_4$).

It is worthwhile to identify a processing window of RLRS for $La_{0.8}Sr_{0.2}CrO_{3-\delta}$ because ultimately, RLRS of the electrolyte, electrodes, and interconnect will be performed sequentially during device fabrication. The RLRS of $La_{0.8}Sr_{0.2}CrO_{3-\delta}$ was attempted under conditions of weaker laser power and slower scanning speed (70 W and 0.01 mm s$^{-1}$) and stronger laser power and faster scanning speed (100 W and 0.30 mm s$^{-1}$), respectively. However, the weaker and slower laser irradiation resulted in white-colored samples (FIG. 74A) presumably due to the diffusion of Cr to MgO during long-time laser irradiation. This idea is supported by the XRD pattern of this sample showing the preferential formation of $MgCr_2O_4$ (FIG. 74C). $LaCrO_4$ was also identified in this sample, indicating that thermal energy given by the laser irradiation at this condition is insufficient for the decomposition of $LaCrO_4$ to $LaCrO_3$. Likewise, the stronger and faster laser condition was unsuitable for the RLRS of $La_{0.8}Sr_{0.2}CrO_{3-\delta}$ because the sample color changed only nearby the ending part of laser scanning (scanning was conducted from right to left). This is most likely because the laser heating was not sufficient at the beginning due to heat dissipation and became sufficient near completion of the scan by heat accumulation. Taking these results and the basic principle that stronger laser power and slower scanning speed gives greater thermal energy into consideration, this study proposes the processing window shown in FIG. 74A. The RLRS of $La_{0.8}Sr_{0.2}CrO_{3-\delta}$ can be realized in the region of high power (>85 W) and moderate scanning speed (~0.10 mms$^{-1}$).

RLRS of $La_{0.8}$ $Sr_{0.2}CrO_{3-\delta}$ was demonstrated as mentioned earlier; however, cracking of the samples was problematic. As the cracking is generally initiated by huge thermal gradient between laser irradiated/nonirradiated regions, the width of the MgO substrate was reduced by polishing to be narrower than the laser beam width (~10 mm). FIG. 75A shows the picture of the $La_{0.8}Sr_{0.2}CrO_{3-\delta}$ film on the 6.5-mm-width MgO bar after RLRS at 100 W and 0.10 mm s$^{-1}$. The cracking was successfully avoided using the 6.5-mm-width MgO bars as substrate. It is noted that the $La_{0.8}Sr_{0.2}CrO_{3-\delta}$ films delaminated from the MgO bars after RLRS regardless of the laser conditions when the green $La_{0.8}Sr_{0.2}CrO_{3-\delta}$ slurry deposited more than 4 gm$^{-2}$ (4 mg for the MgO bars), as shown in FIG. 75B. This is likely due to the lack of penetration by the $CO_2$ laser through the $La_{0.8}Sr_{0.2}CrO_{3-\delta}$ layer deposited at solid loadings in excess of 4 gm$^{-2}$. On the MgO bar, the sample color turned uniformly black after the RLRS at 100 W and 0.10 mm s$^{-1}$ (FIG. 75A); however, the sample contains the residue intermediate phase of $LaCrO_4$, as shown in FIG. 75C. RLRS of $La_{0.8}Sr_{0.2}CrO_{3-\delta}$ with no intermediate phases was achieved above 103 W at 0.10 mm s$^{-1}$ (FIG. 75C). This power value is higher than the value utilized for MgO pellets (87 W, FIG. 74), which is reasonable due to the width of the MgO bar as compared to the laser beam width.

In general, $LaCrO_3$-based materials have poor sinterability due to the evaporation of $CrO_3$ during sintering at high temperatures for a long duration. However, the high relative density can be expected for the RLRS-derived $La_{0.8}Sr_{0.2}CrO_{3-\delta}$ films because the RLRS process is completed in a few minutes without residual intermediate phases shown earlier. FIGS. 76A-77E shows surface morphology of the $La_{0.8}$ $Sr_{0.2}CrO_{3-\delta}$ films on the MgO bars after the RLRS at a) 98 W and 0.10 mm s$^{-1}$, b) 100 W and 0.10 mm s$^{-1}$, c) 103 W and 0.10 mm s$^{-1}$, d) 103 W and 0.08 mm s$^{-1}$, e) 103 W and 0.07 mm s$^{-1}$. Through an increase in the laser energy input from 98 W at 0.10 mm s$^{-1}$ to 100 W at 0.10 mm s$^{-1}$, the morphology was drastically changed from a network structure (FIG. 76A) to a micrograin-agglomerated structure (FIG. 76B). This change was accompanied by the formation of the $La_{0.8}Sr_{0.2}CrO_{3-\delta}$ phase. Indeed, the micrograin-agglomerated structure is typical in acceptor-doped $LaCrO_{3-\delta}$. Through the further increase in the laser energy input (FIGS. 76C-E), the phase formation was completed, as shown in FIG. 76C. In the samples prepared over these ranges of the laser conditions, no clear dependence of the grain size (1-3 μm) on the laser energy input was found, and their relative densities were varied.

To analyze the relative density in detail, image analysis was conducted by GIMP and ImageJ. A location dependence of the relative density due to the Gaussian distribution of the laser beam intensity was assumed as shown in FIG. 77A. The relative density of the samples was analyzed as a function of the location by taking surface scanning electron microscopy (SEM) images at the center of the samples while changing location (d) perpendicular to the laser scanning direction. FIG. 77B shows the distribution of the relative density and its Gaussian curve fittings. It is noted that the mismatch of the sample center and the center of the density distribution originates from errors in sample alignment (sample manually aligned). It was revealed that with increased laser power the relative densities of the samples were decreased (from 100 to 103 W at 0.10 mm s$^{-1}$), followed by an increase (from 0.10 to 0.08 mm s$^{-1}$ at 103 W), and were then subsequently decreased (from 0.08 to 0.07 mm s$^{-1}$ at 103 W). It is believed that this behavior is a result of phase conversion of a $LaCrO_4$ phase to the $LaCrO_3$-based phase (see FIG. 76C), the densification of the $LaCrO_3$-based phase, and Cr sublimation (explained below), respectively. The phase conversion from $LaCrO_4$ to $LaCrO_3$ can lead to a decrease in the relative density because $LaCrO_4$ occupies 1.29 times more space than $LaCrO_3$ (cf. theoretical density of $LaCrO_4$ and $LaCrO_3$ are 5.00 and 6.46 g cm$^{-3}$). Using this data, the relative density distribution of the samples having no $LaCrO_4$ phase was schematically depicted as FIG. 77C. The highly densified regions become the widest at 0.08 mm s$^{-1}$ (approximately 3.5 mm for >90%, 5.7 mm for >85%, and 7.2 mm for >80% of relative density). This degree of densification is higher than the relative density of the $La_{0.8}Sr_{0.2}CrO_{3-\delta}$ films sintered using furnaces at 1400° C. in the air (60-70%).

The decrease in the relative density by slowing the scanning speed from 0.08 to 0.07 mm s$^{-1}$ is most likely due to Cr loss. FIGS. 78A-78B shows cross-sectional SEM images and their energy dispersive spectrometer (EDS) mapping of Mg and Cr for the $La_{0.8}Sr_{0.2}CrO_{3-\delta}$ films on the MgO bars prepared at a) 0.08 mm s$^{-1}$ and b) 0.07 mm s$^{-1}$. These SEM images were taken at their highly densified regions (>90%). In these regions, both $La_{0.8}Sr_{0.2}CrO_{3-\delta}$ films were well-densified in the thickness (~11 μm) direction as well as the surface direction. Their EDS mappings of Mg indicates that both $La_{0.8}Sr_{0.2}CrO_{3-\delta}$ films contain a certain amount of Mg; however, the Mg content is overestimated in these mapping images because of peak overlapping with La. FIG. 5 shows the Cr content which was higher in the $La_{0.8}Sr_{0.2}CrO_{3-\delta}$ films prepared at a) 0.08 mm s$^{-1}$ than at b) 0.07 mm s$^{-1}$. There are two possible reasons for this Cr loss: 1) diffusion of $Cr_3$ and $Mg_2$ between the deposition and the MgO substrate, and 2) volatilization of $Cr_3$. The former reason is the most likely because higher Mg content in the sample prepared at 0.07 mm s$^{-1}$ was suggested by XPS (4.5 and 8.4% Mg for 0.08 and 0.07 mm s$^{-1}$). As this Cr loss and the densification of the $La_{0.8}Sr_{0.2}CrO_{3-\delta}$ are balanced, the laser-operation condition of 103 W and 0.08 mm s$^{-1}$ results in a $La_{0.8}Sr_{0.2}CrO_{3-\delta}$ film with the highest relative density.

Low area-specific resistance (ASR) is required for the $La_{0.8}Sr_{0.2}CrO_{3-\delta}$ interconnect performance; otherwise, the ohmic loss of the SOFC/EC is increased, resulting in decreased energy conversion efficiency. As ASR is given by thickness divided by conductivity, high conductivity and small thickness are important parameters that determine ASR. The conductivities of the RLRS-derived $La_{0.8}Sr_{0.2}CrO_{3-\delta}$ films are shown as an Arrhenius-type plot in FIG. 79A. They show an explicit negative linear relationship, which is consistent when conduction is due to a thermally activated hopping mechanism as reported. The increase in the conductivity at increased laser power from 98 to 103 W (with 0.10 mm s$^{-1}$) is due to the enhanced formation of the targeted $La_{0.8}$ $Sr_{0.2}CrO_{3-\delta}$ phase. The conductivity was further increased and then decreased by slowing the scanning speed down to 0.08 and 0.07 mm s$^{-1}$ (with 103 W). This is because the relative density reaches a maximum (80-95%, FIGS. 77A-77C) at 0.08 mm s$^{-1}$. As shown in FIG. 79B, the lowest activation energy (0.35 eV) can also be obtained at 0.08 mm s$^{-1}$. These values of conductivity are approximately 102 lower than those of highly densified (~95% relative density) $La_{0.8}Sr_{0.2}CrO_{3-\delta}$ pellets sintered using the furnace in a controlled environment. This difference is most likely as a result of that, for the RLRS-derived $La_{0.8}Sr_{0.2}CrO_{3-\delta}$ films, the density has in-plane variations perpendicularly to the laser scanning direction (80-95% from edge to center in the case at 0.08 mm s$^{-1}$ with 103 W, FIG. 77C) and the Cr site are partially (4.5%) substituted by less conductive Mg.

FIG. 79C shows the relation between ASR and sample thickness. ASR of the furnace-sintered $La_{0.8}Sr_{0.2}CrO_{3-\delta}$ was collected from the literature. Ideally, ASR can be decreased by decreasing the thickness. However, data from furnaceon real SOFC/EC electrodes including exploring the use of diffusion blocking materials to passivate inter-diffusion between the $La_{0.8}Sr_{0.2}CrO_{3-\delta}$ and the electrode materials during RLRS. The RLRS technique is a promising technique for quick and efficient preparation of dense and thin $La_{0.8}Sr_{0.2}CrO_{3-\delta}$, which are key components for highly compact SOFC/ECs. It is expected that the RLRS technique will be useful for the preparation of a wide range of ceramic-based films. The process is fundamentally able to densify thin-film materials containing volatile elements due to the rapid nature of the process.

TABLE 11

Process and property comparison between laser/furnace-sintered $La_{0.8}Sr_{0.2}CrO_{3-\delta}$ and coated alloy. Data in references were used. ASR was calculated using thickness and conductivity.

| Materials | Process | Sintering time | Thickness (μm) | Conductivity (600° C.) [S cm$^{-1}$] | ASR (600° C.) [Ω cm$^2$] | TEC ($\times 10^{-6}$) [K$^{-1}$] |
|---|---|---|---|---|---|---|
| La0.8Sr0.2CrO3−δ | Laser sintering | ~3 min (for 14 mm long) | 11 | $3 \times 10^{-1}$ | $3 \times 10^{-3}$ | — |
| La0.8Sr0.2CrO3−δ | Furnace sintering (1900° C.) | 1 h | 500 | $4 \times 10^{1}$ | $1 \times 10^{-2}$ | 9.9 |
| Coated ferritic stainless steel | Furnace sintering (800° C.) | 100 h | 11 (coating) | $1 \times 10^{4}$ (steel) $2 \times 10^{1}$ (coating) | $6 \times 10^{-5}$ | 11.4 | sintered $La_{0.8}Sr_{0.2}CrO_{3-\delta}$ reveal the opposite trend. The origin of this phenomenon is believed due to increased specific surface area in thinner samples resulting in enhanced Cr volatilization. The ASR of the 11-μm-thick RLRS-derived $La_{0.8}Sr_{0.2}CrO_{3-\delta}$ film prepared at 103 W and 0.08 mm s$^{-1}$ is $3 \times 10^{-3}$ $\Omega$cm$^2$ was more than 30 times lower than that of the furnace-sintered $La_{0.8}Sr_{0.2}CrO_{3-\delta}$ in the same thickness range. In other words, the thinly made $La_{0.8}Sr_{0.2}CrO_{3-\delta}$ prepared by the RLRS method shows more than 30 times lower ASR than samples prepared using conventional furnace sintering. This is believed due to the rapid laser sintering processing, which can minimize Cr volatilization.

In addition, the ASR of the RLRS-derived interconnect is also 25-30 times lower than the values for the state-of-the-art SOFC/EC electrodes and electrolyte.

In Table 11, the RLRS-derived $La_{0.8}Sr_{0.2}CrO_{3-\delta}$ is compared with currently widely accepted two interconnect materials, the furnace-sintered $La_{0.8}Sr_{0.2}CrO_{3-\delta}$ and ferritic stainless steel coated with a conductive passivation layer, in terms of process and properties. The furnace-sintered $La_{0.8}Sr_{0.2}CrO_{3-\delta}$ has been intentionally studied due to its conductivity and compatible TEC compared to other SOFC/EC components. The alloy system has received increased attention in recent years as the working temperature of SOFC/EC has decreased SOFC/EC and composition-controlled ferric stainless steels coated with Mn and Co-based spinels have been found as an interconnect material showing excellent ASR and relatively low TEC among metals. However, a long-duration aging treatment is required to manipulate the metal-oxide interface and delamination from the SOFC/EC electrodes has been reported due to its high TEC as compared to ceramics. The laser sintering process paves the way for the preparation of dense and thin $La_{0.8}Sr_{0.2}CrO_{3-\delta}$ beyond the current thickness limitation by virtue of its rapid processing. The authors are actively engaged in trials on the preparation of thin $La_{0.8}Sr_{0.2}CrO_{3-\delta}$ by RLRS RLRS of $La_{0.8}Sr_{0.2}CrO_{3-\delta}$ films on MgO was demonstrated using a $CO_2$ laser. Uniform perovskite structure with no delamination and no residual intermediate phases was achieved in the range of 0.10-0.07 mm s$^{-1}$ at 103 W by narrowing the substrate width to a thickness less than the laser beam width (10 mm) and by deposition of the terpineol-based green $La_{0.8}Sr_{0.2}CrO_{3-\delta}$ slurry at solid loading levels less than 4 g m$^{-2}$. The optimum laser condition balanced densification and Cr loss, resulting in the 11-μm-thick RLRS-derived $La_{0.8}Sr_{0.2}CrO_{3-\delta}$ film showing high relative density of 80-95% and low ASR of 0.003 $\Omega$cm$^2$ at 600° C. This resistance is more than 30 times lower than that of the furnace-sintered $La_{0.8}Sr_{0.2}CrO_{3-\delta}$ in this thickness range. As the evaporation of $CrO_3$ can be minimized by the RLRS technique, high-performing $LaCrO_3$-based materials may soon become the interconnect materials of choice for next-generation SOFC/EC devices.

The laser sintering apparatus is schematically shown in FIG. 80A. $CO_2$ laser ($\lambda$=10.6 μm, Ti100W, Synrad) was reflected by gold mirrors (reflectance >99% at $\lambda$=10.6 μm, NB1-L01, Thorlabs, Inc.) twice to be directed to samples perpendicularly. A cylindrical focal lens (focal length 25.4 cm, diameter 19.05 mm, Laser Mechanisms, Inc.) was utilized to increase laser beam width. The focal lens was placed at a 5 mm defocus position, resulting in approximately 10 mm of laser beam width. Samples were preheated to 550° C. by a hot plate to mitigate thermal shock during RLRS. Actual laser power as a function of laser-controlling power percentage was measured in this configuration. As shown in FIG. 80B, the percentage, x, can be converted to laser power, p, by the following equation:

$$p = -7.5 \times 10^{-5}\ x^3 + 4.9 \times 10^{-3}\ x^2 + 1.34x$$

US 12,654,356 B2

77

The error bar in FIG. 80B, which is ±5% of the power, represents the fluctuation of laser power and accuracy of a power meter (PW-250, SYNRAD, Inc.). One-line scanning was conducted at several speeds. RLRS of 20 mol % Sr-doped $LaCrO_{3-\delta}$ ($La_{0.8}Sr_{0.2}CrO_{3-\delta}$) was performed on MgO substrate. MgO was chosen because it is an electrical insulator and is compatible with $La_2O_3$. Although MgO reacts with $Cr_2O_3$, forming Cr-substituted MgO and spinel-type $MgCr_2O_4$, these reactions are practically limited during RLRS of $LaCrO_3$ because of the limited solubility of $Cr^{3+}$ in MgO (~2 mol % even at its eutectic point) and the high melting point of $MgCr_2O_4$ (2405° C.). RLRS of $LaCrO_3$ had also attempted on 3 ($La_2O_3$)·$WO_3$, which has been reported as compatible with $LaCrO_3$ by Polfus et al.; meanwhile, intense chemical reaction between 3($La_2O_3$)·$WO_3$ and $Cr_2O_3$ was confirmed during RLRS of $LaCrO_3$. A 2-mm-thick MgO substrate was prepared by pelletizing MgO powder (Across Organics, purity 99.99%) at 188 MPa by a uniaxial pressing machine followed by sintering at 1500° C. for 10 h. This condition gives relative density higher than 94%. On the MgO substrate, terpineol-based green $La_{0.8}Sr_{0.2}CrO_{3-\delta}$ slurry was deposited by drop coating. The slurry was prepared by a planetary ball milling of the stoichiometric amount of $La_2O_3$ (Tokyo Chemical Industry Co., Ltd., purity >99.9%), $Cr_2O_3$ (Alfa Aesar, purity 99.97%), and $SrCO_3$ (Sigma Aldrich, purity ≥99.9%) with α-terpineol (Across Organics, purity >97%) at 400 rpm for 12 h using agate jars and balls. The weight ratio of the ceramic powders and terpineol was controlled to 1:6 for uniform deposition by drop coating. The authors attempted to use water-based slurry; however, $La_2O_3$ turned into $La(OH)_3$ by the chemical reaction with water, which led to delamination of the $La_{0.8}Sr_{0.2}CrO_{3-\delta}$ layer, most likely due to significant volume change during RLRS (cf. $La_2O_3$ and $La(OH)_3$ are 40.2 Å$^3$ and 71.2 Å$^3$ per La atom). The authors also attempted to use $La_2(CO_3)_3$ and Cr metal instead of $La_2O_3$ and $Cr_2O_3$. However, $La_2(CO_3)_3$ reacted with air moisture and then resulted in delamination (cf. $La_2(CO_3)_{3-}$$_\delta H_2O$ and $LaOHCO_3$ are 365.8 Å$^3$ and 76.7 Å$^3$ per La atom), and the slurry consisting of Cr metal could not be heated well as compared to $Cr_2O_3$ due to the higher reflectance of as compared to oxides at the wavelength of the $CO_2$ laser. After drop coating, the specimens were dried at 150° C. for 15 min using a hot plate.

Phases of the samples were analyzed by XRD (Mini-Flex600, Rigaku). XRD patterns were collected by θ-2θ continuous scans using Cu-Kα radiation (λ=1.5406 Å). Microstructure of the samples was observed by field emission scanning electron microscope (FE-SEM) combined with EDS (S-4800, Hitachi). Pt was coated on the samples by DC sputtering (Hummer 6.2, Anatech Ltd.) for 2 min under 80 mTorr to prevent charging during SEM observation. Mg content in the samples was analyzed by X-ray photoelectron spectroscopy (XPS, PHI 5000 VersaProbe III, ULVAC-PHI, Inc.) XPS peak positions were corrected using a carbon 1 s reference set at 284.80 eV. Mg 1 s and Cr 2p spectra were used for compositional analysis. The temperature dependence of four-probe DC resistivity was measured using a multimeter (Model 2001, Keithley Instruments, Inc.). The configuration of the four probes is schematically shown in FIG. 81. The direction of current flow was in the longitudinal direction of the samples. The distance between the inner two probes was measured by the image analysis in each sample. Ag paste (T-20GM, Heraeus) and Ag wire (ø0.1 mm, Alfa Aesar) were utilized as a current corrector and lead connection between the samples and the multimeter. The samples were heated up to 800° C. and then were stepwisely cooled down by 50° C. The resistivity was measured after maintaining the samples at each temperature for 30 min.

Example 13—Integrated Additive Manufacturing and Laser Processing for Protonic Ceramic Energy Devices (PCEDs)

Recently, the PCEDs represented by PCFCs based on the protonic ceramic (PC) electrolytes with lower ion transport activation energies demonstrated highly promising performance at intermediate temperatures (400-700° C.). The button cells fabricated by dry pressing and cofiring processes showed the peak power density as high as 455 mW/cm$^2$ t and the long-term stable operation longer than 1400 h under $H_2$/Air gradient at 500° C. The development of the new solid state reactive sintering (SSRS) sintering technique and the discovery of new triple conducting (proton, oxide-ion, and electron) cathode materials were recognized as the reasons for the high excellent PCFC performance. Therefore, PCEDs became the most popular energy conversion and storage devices. However, the high performance of PCEDs usually was demonstrated using small button cells, which need to devote significant effort to the manufacturing of PCEDs for the practical application of PCEDs.

In general, when we have a design, the raw materials are needed to go through different materials processing, geometry shaping, and consolidation toward the final product. The manufacturing process of PCEDs usually includes material deposition, geometry fashion, sintering/synthesis, and even micro-machining. Different operations usually need to be performed by specific machines in different locations. Thus, the idea of integrating all these manufacturing functions into one advanced manufacturing system for the cost-effective and rapid manufacturing of PCEDs becomes the next generation of manufacturing technologies for ceramic-based energy devices.

Furthermore, the manufacturing of ceramic devices using conventional methods usually have to face many challenges, including massive waste, long machining time, long design cycle, expensive tools and molds, and hard to produce complex geometries. For example, the tape casting, paste extrusion, and slip casting can only fabricate protonic ceramic membrane reactors (PCMRs) with simple geometries (e.g., planar and tubular membrane), which usually has a tiny effective membrane area per unit volume of the membrane reactor. Furthermore, the fabrication cycle involving furnace sintering is long, and it is hard to in-situ control the product properties.

Besides, the pursuit of highly compact ceramic devices with high volumetric power represents the most promising design of ceramic-based energy devices, allowing high conversion efficiencies and portable size or weight. The multilayer design of the PCED stacks (FIG. 82) can achieve high compactness and sizeable effective area per unit volume of mass. The four different layers of the fuel electrode, oxygen electrode, electrolyte, and interconnect should have different compositions, crystal structures, and microstructures. It is clear that this kind of multilayer design comprised of heterogeneous layers cannot be successfully manufactured by the conventional manufacturing method. Therefore, the advanced manufacturing technique (e.g., additive manufacturing and laser processing) needs to be developed for the cost-effective and rapid manufacturing of PCEDs with the desired designs.

This study developed a new integrated additive manufacturing and laser processing (I-AMLP) method by integrating digital micro-extrusion-based 3D printing and rapid and precise laser processing (drying, sintering, cutting, and polishing). We showed that the I-AMLP method could manufacture PCs with desired complex geometries, crystal structure, and microstructures. We further demonstrated the success of manufacturing PC parts such as pellets, cylinders, cones, films, straight/lobed tubes with sealed endings, microchannel membranes, and half cells for assembling PCEDs.

The I-AMLP system is the same or substantially the same as the system described above with regard to FIGS. 1 and 2. The I-AMLP system includes X-Y and Z stages, micro-extruders (preeflow eco-PEN 300, ViscoTec, Germany), a $CO_2$ laser (firestar v20, wavelength 10.64 μm, SYNRAD, Inc., WA), a picosecond YAG laser (hereafter ps-laser, wavelength 1064 nm, Olive-1064-10, Attodyne, Inc. Toronto, Canada), and a Galvano scanner (intelliSCAN® III 14 (ID #128650)). The X-Y stage can move with very high precision (100 nm) with a wide speed range (from 100 nm/s up to 5 m/s); the $CO_2$ laser was used for rapid drying and rapid sintering; the ps-laser was used for precise polishing and cutting. The Galvano scanner was used to provide the faster movement of lasers for drying, sintering, polishing, and cutting. The I-AMLP system allows us to do advanced manufacturing of green or sintered ceramics parts easily by combining the 3D printing based on fast micro-extrusion printing, accurate subtractive manufacturing based on laser processing in-situ consolidation based on high-energy laser scanning. Starting from paste preparation from ball-milled precursor powders, by using the I-AMLP system, we can do the micro-extrusion-based 3D printing, rapid laser drying, rapid sintering, precise laser polishing, and precise laser cutting for the advanced manufacturing of PC parts (FIGS. 83A-83F).

Using the 40 wt % $BaCe_{0.7}Zr_{0.1}Y_{0.1}Yb_{0.1}O_{3-\delta}$ (BCZYYb)+60 wt % NiO hydrogen electrode material as an example, the preparation process for the pastes of the PC parts is described as the following procedures. The stoichiometric amounts of carbonate and oxide precursors (i.e., $BaCO_3$, $CeO_2$, $Y_2O_3$, $ZrO_2$, $Yb_2O_3$, and NiO) got ball-milled for 48 hrs with isopropanol as grinding solvent and 3 mm YSZ as grinding media. Then the ball-milled dry powder (FIG. 83A) was mixed with 15 wt % of deionized water, 0.7 wt % of dispersant (Darven 821A, Vanderbilt Minerals, CT, USA), and 1 wt % or 2 wt % (based on water amount) of binder HPMC (hydroxypropyl-methylcellulose, Alfa Aesar, MA, USA) by a vacuum mixer (VPM MINI COMP W/STAND 115V) for 30 min. The printable paste (FIG. 83B) was used to manufacture 2D and 3D PC objects. The pastes for manufacturing other PC parts with different compositions were prepared using the same method. The amounts of water, dispersant, and binder were adjusted to some degree according to the differences in materials compositions.

The different kinds of fresh pastes prepared in this work were fed to the pre-determined plastic syringe reservoirs to avoid cross-contamination. The compressed air was applied to drive the paste to the microextruder with a needle-type nozzle of 0.5 mm in diameter FIG. 83C. The distance between the nozzle and platform substrate usually is equal to the thickness of the wet layer (the printed layer before drying) introduced by 3D printing, which is around 450 μm for most of the 3D printing in this work. Usually, the paste extrusion flow rate Q is 0.3 mL/min, and the stage moving speed v is 15 mm/s. Under this 3D printing condition, according to the following equation, the filament with a width (d) of 740 μm can be obtained.

$$d = \frac{Q}{vh}$$

The tool paths for printing each layer vary versus the different geometries of the PC parts. Usually, the printing tool path can be adjusted to satisfy the requirement of the desired part geometry. For example, a tubular part can be printed using a spiral line path, while a simple square thin film can be printed using a line-by-line bi-directional path.

The pastes sometimes contained a little extra amount of solvent to allow smooth printing and effective bonding between the fresh and previous layers. However, the natural drying of the low-viscous layer in ambient air took a long time to slow down the 3D printing process significantly and caused the shape deformation because of paste gravity and fluidity. In our I-AMLP system, the $CO_2$ laser was used to dry each wet green layer (FIG. 83D) just after printing to speed up the 3D printing process and avoid shape deformation. The laser beam was usually defocused by 15 mm to increase its spot size to 1 mm and lower the laser energy density. The optimized laser operation parameters of laser power of ~10 W and a scan rate of 15 mm/s were able to efficiently dry the green layers without noticeable shrinkage and reactions observed. To further decrease the time consumption for drying, the Galvano scanner was equipped with the $CO_2$ laser, which allowed to use of the higher laser power and the faster scan rates for the drying process.

The $CO_2$ laser fixed on Z-axil (λ=10.6 μm, Ti100W, Synrad) was applied for the rapid sintering of PC parts (FIG. 83F). For example, the thoroughly dried BCZYYb electrolyte green layer printed on the fused silica substrate was subjected to rapid reactive laser sintering (RLRS). Laser sintering was successfully applied in PC sintering. The green components can be sintered into the right crystal phase and desired microstructures. In this work, the $CO_2$ laser through a cylindrical lens formed a line shape laser spot and was applied for the sintering and densifying of the electrolyte layers. The laser beam with a defocus distance of 20 mm, and a beam spot size of around 8 mm was used for achieving homogenous and moderate laser energy density. The laser power and the laser moving speed were 20 W and 0.1 mm/s, respectively. The sintered layers' microstructures were controlled by optimizing the laser parameters such as laser power, moving speed, defocus distance, and space of the hatching pattern.

Two kinds of laser scanning methods can be applied for the laser beam movement during the process in this system:

(1) 3D stages: Laser scanning can be controlled by a three-axial motorized translation stage (IMS-V series, Newport Inc.). The stage scanning speed can range from 100 nm/s to 1 m/s. Two kinds of ZnSe lenses are available to use. one for round shape laser spot focus and the other one with a cylindrical lens for line shape laser spot focus.

(2) Galvo scanner: A two-axial Galvo scanner (intelliSCAN 14, SCANLAB) was applied to control the rapid scanning of the laser beam in two dimensions. The Galvo scanner was fixed on the z-axis in the I-AMLP system. Therefore, the laser focus position can also be adjusted. The laser came inside into the scanner from one side entrance and was reflected out into different locations with the movement of the mirrors inside. At the scanner's output, a ZnSe f-Theta lens with a focal length of 200 mm was applied to focus the $CO_2$ laser beam into a spot size (D) of ~1 mm. Controlled by computer programs, the two mirrors will guide the laser beam to scan the designed patterns on materials. The scanning speed is in the range of 0.1 mm/s to 2 m/s.

The laser machining was performed using the ps-laser equipped with the L3DP system. An Nd:YAG picosecond laser (APL4000-1064, Attodyne Inc.) was picked for 3D-assisted micromachining. The maximum pulse energy can be obtained once the repetition rate is lower than 10 kHz, while the output power reaches the max level at the repetition rate of over 100 kHz. The Gaussian laser beam was guided through a 5-time objective lens (NA=0.13) to obtain a focusing beam with a spot size of ~20 μm and a working distance of ~11 mm. A CCD camera was fixed on top of the objective lens for in-situ monitoring of the fabrication process. The laser beam is moved by the three-axial translation stage under the computer control in a predesignated toolpath with speed up to 1 m/s.

The cutting and polishing operations on the green layers were studied. The ps-laser was focused on a spot with a size of 18 μm using a 5×lens (NA=0.13) for the laser cutting. The repetition rate, laser energy, and laser scan rate were 10 kHz, 150 μJ per pulse, and 5 mm/s, respectively. Under these conditions, the ps-laser usually could cut a depth of 150 μm in the green layers. The small unit cutting dimension of 18 μm×150 μm usually could result in very accurate cutting, which allowed cutting microchannels to make highly compacted microchannel membrane reactors or cutting edge and complicated contours to make complicated geometries for achieving larger area to volume ratio and improve the 3D printing feature accuracy. By setting the proper laser operation parameters, the ps-laser could also be used to polish 3D-printed green layers or parts to allow the achievement of a smooth finishing surface to next-step processing (e.g., dip-coating). In this experiment, the laser operation parameters of the repetition rate of 1 kHz, the laser energy of 114.4 μJ per pulse, and the laser scan rate of 50 mm/s were used for polishing green layers or parts obtained by the micro-extrusion-based 3D printing.

The L3DP method involved laser sintering could obtain PC sintered parts with desired microstructures, crystal structure, and geometry, which could directly be subjected to the measurement for properties or be assembled for constructing devices. However, in most cases, the I-AMLP method resulted in the protonic ceramic green parts, which need proper post-treatments such as sintering and coating to make the PC parts with desired microstructure, properties, and functions. The following post-treatments were performed to change the tubular PC half-cells from the I-AMLP-derived 40 wt % ($BaZr_{0.8}Y_{0.2}O_{3-\delta}$) BZY20+60 wt % NiO anode support. The L3DP-derived green anode tubes were first prefired at 1050° C. for 12 hrs using a conventional electric furnace to thoroughly vaporize paste solvent and partially burn the binders or dispersant. After that, the BZY20+1 wt % electrolyte precursor slurry comprised 50 wt % electrolyte precursor powder, 2 wt % dispersant (Polyethylene glycol), 5 wt % of the binder (Heraeus V006), and 43 wt % of ethanol solvent was dip-coated the outside surface of the tubes. After the dip coating, the green half-cells were dried in the air for two days. Finally, the co-firing of the green half-cells comprised of 40 wt % BZY20+60 wt % NiO|BZY20+1 wt % NiO was performed at 1450° C. for 12 hrs with a ramp rate of 1° C./min. As for the single-component PC green parts such as pellets, cylinder, and even microchannel-embedded green membranes, the conventional firing/sintering at high temperatures was performed to obtain the sintered PC parts.

The paste's viscosity was quantified by a rotational viscometer (ViscoLead Adv R, Fungilab, Barcelona, Spain). The paste was put into a container with an R4 spindle for measurement at room temperature. The I-AMLP-derived PC parts' microstructure was observed using a scanning electron microscope (SEM, Hitachi S4800, Hitachi, Ltd., Tokyo, Japan). The SEM images were mostly taken at 20 KV and 20 μA, with magnifications at 500, 1 k, and 2.5 k. Each material's crystal structure presented in this work was characterized by XRD (Rigaku Ultima IV, Cu-Kα) with 15 to 85 degrees at 1°/min scan speed. Archimedes' method was used to measure the porosities of the fabricated samples.

The pastes' viscosity is the most critical parameter to control the quality of micro-extrusion-based 3D printed parts because it directly determines the shape retention of the as-printed filament and bonding between each layer. In general, the increase in the paste viscosity can improve the shape retention property, while the adhesion (bonding) between layers becomes weak, which usually results in a high probability of delamination. Therefore, the paste's viscosity has to be optimized to meet the desired requirements for micro-extrusion-based 3D printing. Although the ceramic powder to water ratio (C/W) and the amount of binder both can adjust the viscosity of the paste to the desired range, in this work, we fixed the C/W at a volume ratio of 1:1 to prevent cracking during drying and varied the amount of the binder to optimize the paste viscosity. The pastes of 40 wt % BZY20+60 wt % NiO PC fuel cell anode precursor were prepared by mixing with 1 wt %, 2 wt %, and 3 wt % of the HPMC binder. The viscosity vs. the shear rate for these three pastes was investigated and shown in FIG. 84. All three pastes showed decreasing viscosity sharply when the shear rate initially increased from zero to ~20 $s^{-1}$. With the further increase in the shear rate, the viscosities level off quickly for all the pastes. The steady viscosities of ~100 P, ~700 P, and 1700 P were obtained for the three pastes with 1 wt %, 2 wt %, and 3 wt % of HPMC.

The photos of the green parts manufactured by 3D printing from these three pastes are shown in FIGS. 85A-85F. It can be clearly seen from FIG. 85A that the paste with a low viscosity of ~100 P prepared by adding 1 wt % HPMC could not sustain the paste weight when printing the thin wall parts (e.g., tubes). The printed paste filament flattened and changed shape quickly before it was dried naturally in the ambient environment. However, it was proved that the paste with a low viscosity was suitable for printing 2D objects such as thin films. FIG. 85E shows that the smooth and homogenous green thin films with an area ~25 $cm^2$ were successfully printed from this low viscous paste.

Furthermore, the use of low viscous paste in micro-extrusion-based 3D printing provided an effective way to achieve thin and uniform layers because of the flattening of individual paste filament and the merging between neighboring filaments. The thin film (FIG. 85F) shows that the uniform green film can be as thin as 180 μm. FIG. 85B indicates that the paste with a high viscosity of ~1700P resulted by adding 3 wt % HPMC resulted in a weak bonding between the previous filament and the fresh filament. Although the shape retention was kept well, the evident delamination was observed in the 3D printed green tubes. The medium viscous paste by adding 2 wt % HPMC allowed the successful 3D printing of thin-wall green parts. FIG. 85C indicates that the 3D printed green tubes obtained the desired shapes and achieved excellent bonding between layers or filaments. The high-magnification image (FIG. 85D) of this tube shows that the layer thickness (~350 μm) and connection valley between layers are very homogenous.

Figures 86A, 86B, 86C, 86D, 86G:
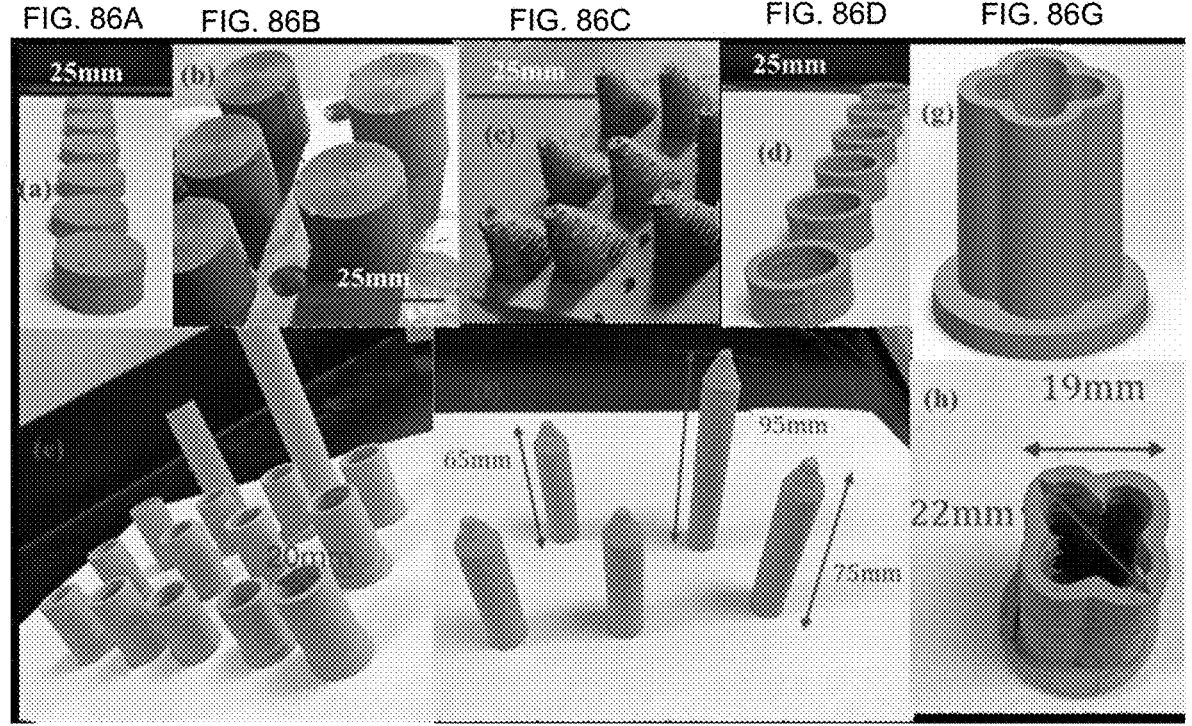

The microextrusion-based 3D printing without any consolidation treatment was investigated to manufacture the protonic ceramic green parts using the PC fuel cell anode of 40 wt % BZY20+60 wt % NiO as a case study. The green parts of pellets, cylinders, cones, rings, bottom-closed straight tubes, top-closed straight tubes, and top-closed and lobed tubes were manufactured by 3D printing. The photos of these parts are summarized in FIGS. 86A-86H. The PC pellets are commonly used to characterize microstructure and properties, which are also one of the most accessible parts to be manufactured by 3D printing. FIG. 86A provides six green pellets photos with a diameter of ~20 mm and thicknesses of 10-20 mm. Both the top view and the side view indicate that the pellets have enough smoothness and homogeneity for further investigation. FIG. 86B indicates that the solid cylinders with the same diameter (~20 mm) as the pellets but a height of 30 mm could be easily manufactured by 3D printing, which again shows excellent smoothness and homogeneity. The PCFC anode cylinders allow us to make bars for properties measurement (e.g., cut into rectangular bars for four-probe DC electrical measurement) or other long-dimension parts for further processing (e.g., produce single crystals using sintered long cylinders). The 3D printing of both pellets and cylinders only needs to print the same cross-section of green layers repeatedly. However, the printing of complex parts inevitably involves the printing of different cross-section layers. FIG. 86C shows that the cones with a bottom diameter of ~20 mm and a height of ~30 mm were manufactured by printing the layers with gradually decreasing the diameter of circular layers. Although the surface finishing was not good enough for direct use, the cones without any delamination and the slope angle around 70 degrees were obtained, which allowed the successful change of printing diameters of the circular cross-sections for complex geometries. Tubular protonic ceramic parts are practically used for membrane reactors and fuel cells because of the easiness of assembly, which conventionally is manufactured by extrusion and casting. The rings or short tubes were prepared by 3D printing to check the capability for making thin-wall tubes or other parts, which usually has many challenges. As shown in FIGS. 86A-86H, the proper paste viscosity has to be satisfied with keeping the shape and obtaining good bonding and merging between layers. FIG. 86D shows that the protonic ceramic anode rings with ID=15 mm, OD-20 mm, and height 20 mm were successfully obtained by 3D printing, which proved the capability of printing thin-wall green parts. For practical application, the one end-closed tubes usually are preferred, which can save the complicated post-sealing process or significantly simplify the design of membrane reactors. FIG. 86E shows that 15 perfect bottom-closed tubes with OD of 20 mm, ID of 15 mm, and the length of 40 mm-75 mm were successfully manufactured. The green tubes with membrane area as large as 47 cm$^2$ could be fabricated by 3D printing. FIG. 86F shows that the tubes with smaller diameters and a continuous and round closed end at the top were also successfully manufactured by 3D printing, which could be directly used as anode support for the preparation of protonic ceramic half cells and single cells. FIG. 86F indicates that the free-standing tubes usually have an OD of 15 mm, an ID of 10 mm, and a length up to 95 mm. One strategy for achieving a large surface area to volume ratio for PCEDs is to fabricate lobed-tube as described by the 3D model shown in FIG. 86G. The lobe number and depth can be adjusted to enhance the active membrane area per unit volume. FIG. 86H shows that a 4-lobed tube with a closed bottom end was successfully manufactured, which proved that the micro-extrusion-based 3D printing could fabricate complex geometries. Therefore, we conclude that our microextrusion-based 3D printing can successfully manufacture PC parts with versatile geometries, which can expand the application of PCs and lower the manufacturing prices or simplify the manufacturing for PCEDs.

It is always a dilemma to choose a fast 3D printing speed or high feature accuracy. The choice of nozzle diameter of the micro-extruder determines the paste filament diameter and complex structure dimension, and finishing accuracy. In our L3DP technique, laser drying, laser cutting, and laser polishing were introduced during the micro-extrusion-based 3D printing process to achieve high-quality complex protonic ceramic parts.

The low paste viscosity could not well hold the paste filament shape out of the microextruder nozzle, which usually flattened and resulted in the failure of printing thin-wall protonic ceramic parts (e.g., tubes). However, the viscosity resulted in thin, smooth, and homogeneous thin films. The protonic ceramic anode ring shown in FIG. 85D was manufactured using the paste with relatively low viscosity followed by $CO_2$ laser drying after printing each fresh layer. The laser drying quickly consolidated each printed layer, which not only allowed smooth printing (less clogging) but also resulted in excellent bonding. The SEM image (FIG. 87A) of the cross-section of a 3D printed green 40 wt % BZY20+60 wt % NiO tube with laser drying assistance indicates that the interfaces between neighbor layers could not be observed, although the side view shows the existence of valleys.

Furthermore, SEM's sintered tubes were characterized, and the results are summarized in FIGS. 87B-87F. FIG. 87B shows that the homogenous layers with thicknesses of ~340 μm were obtained. FIG. 87C indicates that the neighboring layers grew together entirely without any interfacial characteristics that could be found. The tube surface's SEM images with different magnifications further show that the sintered layers were well bonded and rounded without any sharp change observable.

As we know, the crystal structure of the materials fabricated through this developed system is important. It will directly affect the performance and achievability of this technique. The XRD measurements were done on all the samples related to this work. Firstly, the BZY20 sample by SSRS furnace sintering from 3D printed green part was proved with the right crystal phase, as shown in FIG. 88.

Although successfully design the printing patterns and complicated geometry with the computer, some path and movement of the printer may cause the resolution of the shape not precise due to paste accumulation or starved feeding for the changed spacing. Hence, the Ps-laser is applied to do 3D machining and surface modification. With Ps-laser, we can cut any geometry we want on each layer and fabricate the whole part layer by layer. The advantages of this method are non-touching, controllable, stable, high efficiency, and low loss. The Ps-laser system is shown in FIG. 89. The parameters, such as repetition rate, pulse energy, and repeat times, are well investigated for the BZY20 system. The machining mechanism of Ps-laser is the vaporization, dissociation, and ablation. According to the effect of the repeat times (FIGS. 90A and 90C), the more times we repeat, the deeper the gap was formed. After cutting several times, Z-axis feeding can assist the laser spot at the focus point and enhance the effectiveness of the process (FIG. 90B). Comparing FIGS. 90A and 90C, we can easily tell that the higher repetition rate can bring more pulse interaction at one location. However, the pulse energy will decrease, and the cutting area with a broader opening will cause the surface roughness to be higher and difficult for the coating process. The slower cutting speed FIGS. 90A and 90C) with z-axis feeding, the better cutting conditions can be obtained based on the current results.

Moreover, with the current cutting condition, applying pre-heating at 1050° C. for 12 hours in the air can further smooth the surface FIGS. 91C and 91D). Some of the parts fabricated through Ps-laser-assisted 3D machining and surface modification are presented in FIGS. 92A-92D. The multi-lobe tubular membrane reactors increase the effective membrane area for enhancing the performance of the MRs.

The green PC parts with much more complicated geometries and higher demand for accuracy can be achieved by laser cutting-assisted 3D printing. In this process, the parts' geometry was given not by the paste extrusion process but by the laser cutting. The CAD models of the protonic ceramic parts were designed to be a little bit larger than their desired size on purpose. The ps-laser cut off the support body of each printed layer during the layer-by-layer construction. FIG. 92A shows that a six-lobed short tube of anode 40 wt % BZY20+60 wt % NiO was manufactured by laser cutting assisted 3D printing. Its original CAD model was a cylinder without special features. Its complex geometry was made by cutting each printed layer into the six-lobed circular cross-section during the layer-by-layer construction. After removing inner and outer supports, the short tube with six lobes on both inside and outside was successfully obtained (FIG. 92B). The as-resulted inner support part was another short tube with six lobes on the outside surface and a smooth circular inside surface. The capability of laser cutting assisted 3D printing was further demonstrated by fabricating a top-closed tube with six deep outside and inside lobes (FIG. 92C and FIG. 92D) comprised of a dual-phase hydrogen-permeable protonic membrane ($BaCe_{0.85}Fe_{0.15}O_{3-\delta}$—$BaCe_{0.15}Fe_{0.85}O_{3-\delta}$). The crystal structures of the BZY20 anode and BCF membrane after SSRS in furnace sintering are summarized in FIG. 88.

The PC green parts usually were submitted to post-treatment, such as coating and sintering. For example, the 3D printed protonic ceramic anode green tubes were submitted to dip-coating to introduce a thin BZY20+1 wt % NiO electrolyte film to fabricate half cells and single cells. FIG. 87G (SEM image of the cross-section of a sintered tubular half-cell) indicates that the electrolyte film's thickness at the valley regions is obviously thicker than the region with an outward curvature. The unevenness of the electrolyte thin film resulting from the green tube (FIG. 87A) can cause poor current destitution during the electrochemical operation of PCEDs, which should be avoided. In our I-AMLP system, the ps-laser was used to polish the 3D printed 40 wt % BZY20+60 wt % NiO anode tubes to get a smooth surface for performing high-quality dip-coating of BZY20+1 wt % NiO electrolyte thin film. FIG. 87H (the SEM image of the laser-polished surface of the green tube) indicates that the valleys were efficiently removed, and an excellent smoothness was obtained. FIG. 87I (the SEM image of the cross-section of the sintered BZY20+1 wt % NiO|40 wt % BZY20+60 wt % NiO tubular half-cell) indicates that the homogeneous electrolyte thin film was successfully deposited the tubular anode. No stage effect was observed.

The I-AMLP-derived PC green parts were usually subjected to coating, firing, reducing processes for being utilized as PECDs since most of them are multi-layered cells. This study demonstrated that the L3DP followed by post-treatment could be successfully utilized for the manufacturing of 40 wt % BZY20+60 wt % NiO|BZY20+1 wt % NiO tubular half cells. The 40 wt % BZY20+60 wt % NiO green anode tubes fabricated by the I-AMLP, including the laser polishing process, were prefired to remove most of the organic additives. After that, the BZY20+1 wt % NiO electrolyte precursor slurry was coated by dip-coating on them. The resulted green half cells were co-fired at 1550° C. for 18 hrs to get sintered hall cells. FIG. 93A shows the appearance of the co-fired NiO-40 wt % BZY20+60 wt %|BZY20+1 wt % tubular half-cells. Their surfaces have a black color with shiny reflection due to the full densification of BZY20+1 wt % NiO electrolyte, as shown in FIG. 93B. FIG. 93C shows that the BZY20+1 wt % NiO dense layer was uniformly coated at a thickness of 15 μm. No delamination of the coated BZY20+1 wt % NiO electrolyte layer from the 40 wt % BZY20+60 wt % NiO anode support was observed even though the tubes were shrunk in ~35% by the co-firing. After the reduction treatment in 5% H2 atmosphere at 600° C., no delamination occurred between anode and electrolyte layers. (The SEM investigated every samples' bonding conditions while the representative result is shown here.) The BZY20+1 wt % NiO electrolyte layer is still fully dense, while ~27% of porosity was formed for the 40 wt % BZY20+60 wt % NiO anode because of the reduction of NiO to Ni (FIG. 93D). The crystal phase of the thin coated BZY20 electrolyte layer was detected with the correct crystal phase shown in FIGS. 93A-93D.

PC membrane reactors face a common significant challenge like other membrane reactors that the active membrane area per unit volume is very low for the conventional planar and tubular geometries. The novel concept of microchannel membrane reactors with a sizeable surface-area-to-volume ratio has recently attracted significant attention, which has to face manufacturing obstacles. Our L3DP method-based 3D printing and laser cutting allowed the manufacturing of microchannel membrane reactors. As a case study, the triple (O2-, H+, and e–/h+) conducting PC of BCFZY0.1, which may work as oxygen or water-permeable membranes, was fabricated into a microchannel-embedded membrane using the AMLP method. FIGS. 94A-94C provide the SEM characterization of the microchannel BCFZY0.1 membrane prepared by the L3DP and post-sintering in a furnace at 1400° C. for 5 hrs. The correct crystal phase was formed with the XRD result presented in FIG. 88. The microchannels were engraved by cutting each printed layer during construction; likewise, the objects' fabrications have complex geometries. The microchannels, which were 1-mm-deep and 300-μm-width triangular shape and aligned in 200 μm pitch, had no shape distortion even after the firing (FIG. 94A). The delamination between printed layers was neither observed. FIG. 94B shows the microchannels' top view (after removing the upper part of the microchannels). No cracks in the horizontal direction were observed, even at their corners. FIG. 94C further indicates that the microchannels had a fully densified microstructure. This demonstration suggests that the AMLP technique can fabricate the PC parts with complex geometries and have micro-scale structures.

This work developed a new technique, laser 3D printing (L3DP) method by integrating 3D and laser processing (e.g., rapid drying, rapid sintering, precise polishing, and precise cutting) that is capable of fabricating the green and sintered protonic ceramic parts for intermediate-temperature protonic ceramic devices with various complex geometries and controlled microstructures. As a demonstration, the protonic ceramic pellets, cylinders, cones, rings, straight tubes with either closed bottom or top, the lobed tube with closed bottom were successfully printed using the printable paste developed by us. The materials of NiO–BZY20 and NiO–BCZYYb anode, BZY20, and BCZYYb electrolyte, triple conducting BCFZY0.1 oxygen/water permeable membrane materials, and BCF-BFC hydrogen-permeable composite membrane materials were involved. The effectiveness of laser drying, laser cutting, laser polishing, and laser sintering was demonstrated. Either I-AMLP prepared the PC parts of 40 wt % BZY20+60 wt % NiO|BZY20+1 wt % BZY20 tubular half cells, BCFZY0.1 microchannel membranes, and planar 40 wt % BCZYYb+60 wt % NiO|BCZYYb+1 wt % half cells with proper post-treatment (e.g., sintering) or direct I-AMLP (integrated laser sintering).

Example 14—Rapid Laser Reactive Sintering for Protonic Ceramic Fuel Cell Processing Protonic ceramics show high ionic conductivities at intermediate temperatures (300-600° C.) because of their low activation energy for proton transportation. This unique property makes them promising electrolytes for solid oxide electrochemical devices such as protonic ceramic fuel cells (PCFCs), electrolysis cells, and membrane reactors. However, to prepare the fully densified protonic ceramic electrolyte membranes having a high proton conductivity, the sintering at high temperature (1600-1700° C.) for a long time (>10 h) is generally required since the state-of-the-art protonic ceramics of the acceptor-doped barium zirconate-cerate is very refractory. This long-term and high-temperature sintering usually is a problematic process, especially for the commonly used co-firing method, which has been extensively used for the fabrication of solid oxide fuel cells, including PCFCs. As shown in FIG. 95A, to achieve a fully densified electrolyte thin membrane, the dual green layers of electrolyte and anode have to be sintered at high temperature (1400-1600° C. for a long time (>10 hrs), which makes it impossible to get a well-controlled nanoporous microstructure for high-performance anodes. The challenge is going to be more severe when operating the fuel cells with non-hydrogen fuels (e.g., hydrocarbons). Recently, several creative techniques for lowering the sintering temperature and shorting the sintering time have been reported. Among them, the solid state reactive sintering (SSRS) method could lower the sintering temperature to ~1400° C. However, a sintering time longer than 10 hrs was still required to ensure the desired crystal and microstructure of electrolytes. Therefore, although the conflict between the nanoporous anode requirement and the fully densified electrolyte was mitigated a little bit due to the decrease in sintering temperature, the temperature of 1400° C. is still very high to achieve nanoporous anode.

It is out of the question that the best way to achieve a nanoporous anode and fully densified electrolyte is to fire the two layers separately. The physical vapor deposition and chemical vapor deposition have been used to deposit the dense electrolyte layers on the pre-sintered anode substrates. However, the complicated procures, expensive equipment, and limitation to sample size made them impractical for large-scale fabrication of PCFCs. Most recently, we developed rapid laser reactive sintering (RLRS) for the advanced manufacturing of protonic ceramic. The rapid scanning of the high-energy $CO_2$ laser beam allowed the rapid manufacturing of protonic ceramic with the desired crystal structure and microstructure. The RLRS has been proved to be much faster and more cost-effective than the SSRS method. The ceramic densification rate is comparable to the ultrafast sintering of ceramic reported by Wang et al. In this work, as described in FIG. 95B, we fulfilled the fabrication of PCFC single cells in three separate steps for providing the freedom to control the microstructure of each component layer independently. The RLRS showed many advantageous characteristics, such as quickness and ease to operate, no need for complicated procedures, less energy consumption, and controllable microstructure. The anode pellets of 40 wt % BCZYYb+60 wt % NiO (Ni(O)+BCZYYb) were prepared first by the conventional SSRS method and reduced in the hydrogen atmosphere. Then the dense BCZYYb electrolyte layer was deposited on the top of the as-prepared anode substrate by RLRS. After introducing BCFZY0.1 cathode thin film, the PCFC single cells were obtained, which were characterized for both electrochemical and physical properties.

Moreover, the fabrication process of PCEDs usually takes days, and multi-steps as different components/layers have different microstructures, layer thickness, function, sintering ability requirements. To achieve a good performance of the device, the electrolyte layer needs to be as thin as possible, which is usually deposited onto the anode support pellet via special methods. Fabrication route like this will challenge the application and cost of the PCED for industrial production and even realizability in real life. Thus, much more efficient, easier control, and higher PCEDs performance fabrication process is getting more and more crucial nowadays.

In this work, the recently developed rapid laser reactive sintering (RLRS) combined with the novel laser 3D printing method was applied in the PCFC/PCEC fabrication. The first path was used to fabricate PCFC single cells in three separate steps to control each component layer's microstructure independently. The anode pellets of 40 wt % BCZYYb+ 60 wt % NiO were prepared first by the common SSRS method. Then the fully densified BCZYYb electrolyte layer was deposited on the top of the as-prepared anode substrate by RLRS. After introducing BCFZY0.1 cathode thin film, the PCFC single cells were obtained, which were submitted to both electrochemical and physical characterization. The second path, the green anode layer, was deposited by 3D printing onto the substrate with a thin green electrolyte layer spray-coated onto it. The green half-cell was sintered by the RLRS method in one step. Cathode material was further deposited onto the laser-sintered half-cell and treated by furnace into a single cell. A full single cell was obtained within several minutes with the desired microstructure. The path is actually the concept of the layer-by-layer fabrication PCEDs, which show the high potential of the future and value of Direct Digital Manufacturing (DDM). It is a promising sustainable manufacturing paradigm that enables the manufacturing of batch size one with digitalized skill acquisition, a broader spectrum of users is empowered with the possibility of producing any products at a cost-effective price.

Since the single component has been successfully sintered with desired microstructures and pure crystal phase by the RLRS method, the concept of fabrication PCEDs has come to the next step, the device level process. As described below, an RLRS derived BCZYYb electrolyte was sintered onto the pre-fired BCZYYb anode substrate for a half-cell construction. The cathode layer was then deposited onto the half-cell into a single cell. The properties and performance of the single cell are characterized and discussed below.

The fabrication of PCFC single cells was performed according to the procedure described in FIG. 95B. The primary process of the RLRS electrolyte deposition can be illustrated as follow: (1) preparation of anode substrate; (2) coating of electrolyte precursor thin film; (3) deposition of the dense electrolyte by the RLRS method to form half-cell; (4) the deposition of porous cathode layer to form single cells. The anode pellet substrates consisted of Ni(O)+ BCZYYb were prepared using the SSRS method. The stoichiometric amounts of $BaCO_3$, $CeO_2$, $ZrO_2$, $Y_2O_3$, $Yb_2O_3$, NiO, and 30 wt % starch (pore former) were ball-milled for 48 h using 3 mm YSZ grinding media in isopropanol. The ball-milled powder was pelletized into green pellets with a 1-inch diameter and 5 mm thickness. The green pellets were then fired in the furnace at 1450° C. for 18 h, followed by reduced in 5% $H_2$+95% Ar at 650° C. for 20 h.

A green BCZYYb thin layer was cast on the reduced porous Ni(O)+BCZYY anode substrate by a doctor blade. The green BCZYYb paste for casting BCZYYb green films was prepared using the procedure described elsewhere. The ball-milling process mixed the BCZYYb+1 wt % NiO precursors of BaCO3, CeO2, ZrO2, Y2O3, Yb2O3, and NiO with stoichiometric amounts. The ball-milled BCZYYb+1 wt % NiO electrolyte precursor powder was mixed with de-ionized water, dispersant (DARVAN), and binder (HPMC) to the printable paste. The doctor-blade casting was conducted at a 200 μm gap between the frame and the blade, resulting in approximately 150 μm thick after drying at room temperature in the open air for 24 h. The prefired anode substrates were reduced before the laser treatment is aiming to generate more pores in the substrate and reduce the NiO to Ni. The porous structure can avoid the anode pellets' cracking issue during the laser treatment, as the porous structure can provide anti-crack ability. While the Ni in the substrate can conduct the heat faster to avoid the thermal stress generated by the huge temperature gradient.

The RLRS experiment was performed using a $CO_2$ laser (λ=10.6 μm, Ti100W, Synrad). The samples were preheated to 500° C. on a hot plate heated at 500° C. to mitigate thermal shock. The laser beam was focused not by general spherical lenses but by a cylindrical lens (focal length 1 inch, diameter 19.05 mm, Laser Mechanisms, Inc.) to increase the sintering area. The laser parameters of defocus distance, laser energy, and scan speed were set to be 20 mm, 95 W, and 0.1 mm/s, respectively, which resulted in a laser beam width of approximately 8 mm for scanning of the samples.

The state-of-the-art cathode BCFZY0.1 ink was prepared by following the procedure as described elsewhere. The PCFC single cells BCFZY0.1|BCZYYb+1 wt % NiO|Ni (O)–BCZYYb were prepared by depositing BCFZY0.1 cathode thin film on the half cells fabricated by the RLRS by the conventional screening printing followed by 900° C. furnace treatment for 2 hrs. A silver paste (T18F014) was used as a current collector. A ceramic bond (552-1219) was used to mount and seal the single cell on an alumina tube. The active area of the single-cell was approximately 0.18 $cm^2$. The PCFC single cell was first heated to 100° C. at a rate of 1° C./min and held for 1 hour, then heated to 300° C. at the same ramp rate and held for another 1 hour to cure the sealant. After that, the cell was increased to 600 at a ramp rate of 1.5° C./min. Both the anode and cathode were exposed in stagnant air during the heating process. 5% H2 (balance with Ar) with 20 ml/min was fed into anode for the first 6 hours, then switched to pure hydrogen for cell testing. Air was swept in the cathode with 150 ml/min. Its I-V characteristic and electrochemical impedance spectra were corrected using a potentiostat (Gamry Reference 3000) at different temperatures. The impedance frequency was ranged from 0.05-106 Hz with an amplitude of 10 mV. The temperature rate was controlled at 2° C./min in this process.

The crystal structure of the samples was characterized using X-ray diffraction (XRD). A Rigaku Ultima IV diffractometer with monochromatic Cu-Kα radiation was used. The XRD pattern was recorded at a rate of 1 degree/min in the range of 15-85 degrees. The microstructure of the fabricated cells was observed by a scanning electron microscope (SEM Hitachi 4800).

The XRD pattern of the RLRS-derived BCZYYb+1 wt % NiO electrolyte (FIG. 96) shows that the phase-pure perovskite crystal structure was formed, which is the same as the one obtained by the SSRS method. By comparing the XRD patterns (FIG. 96) for Ni(O)–BCZYYb anode substrates after and before the RLRS operation, it can be found that the RLRS did not cause a significant phase composition change in the anode composites, which are still comprised of BCZYYb, NiO, and Ni phases. However, the deeper observation indicated that the amount of NiO increased in the anode composite after the RLRS operation, which, however, did not affect the final performance of PCFC single cells since the NiO was reduced in-situ when operating the fuel cells. The formation of NiO in the anode composite could explain the excellent bonding (will be shown in FIGS. 97A-97E) between the electrolyte and the anode layer. Therefore, we can conclude that after the RLRS deposition of BCZYYb+1 wt % NiO electrolyte on the reduced Ni(O)+ BCZYYb anode substrate, the desired crystal structures for electrolyte and anode were either achieved or kept successfully.

The photograph (FIG. 97A) of the RLRS-derived BCZYYb+1 wt % NiO electrolyte on the Ni(O)–BCZYYb substrate shows that no visible macrocracks can be observed on the surface of the electrolyte layer supported on Ni(O)– BCZYYb anode substrate. The low-magnification SEM micrograph (FIG. 97B) of the electrolyte further shows no microcracks can be observed. The high-magnification SEM micrograph (FIG. 97C) of the electrolyte surface indicates that the electrolyte film is completely defect-free and was fully densified. This grain size (2-5 μm) is comparable to that prepared by the SSRS operation in a furnace. The SEM micrograph (FIG. 97D) of the cross-section of RLRS-derived BCZYYb+1 wt % NiO electrolyte further confirmed that the RLRS-derived electrolyte was fully densified, and the grain boundary distance was decreased significantly. The SEM micrograph (FIG. 97E) of the cross-section of half cells with electrolyte supported on anode substrate shows that the anode is still porous after the RLRS operation, which can ensure enough porosity after a further in-situ reduction during fuel cell operation. It can also be clearly seen that the bonding between the electrolyte and anode layer is excellent. No discontinuity was found at the interface between anode and electrolyte. We can conclude that after the RLRS deposition of BCZYYb+1 wt % NiO electrolyte on Ni(O)–BCZYYb anode substrate, the desired dense microstructure electrolyte was obtained and the desired the porous anode microstructure was kept. The RLRS mechanism for achieving crack-free fully densified electrolytes on pre-sintered anode substrate is still under investigation. The best assumption here is that the RLRS sintering involved the liquid phase sintering, like what we have observed during the study of the SSRS mechanism. The liquid phase sintering is supposed to be able to remove the stress and allow the only Z-direction shrinkage. In addition, the RLRS method is still relatively new, in which the sintering temperature still cannot easily and accurately be measured. The accurate temperature measurement during the RLRS is still under development.

The rapid sintering of ceramics usually resulted in the crack because of the large temperature gradient, which is the biggest challenge for the laser sintering of ceramics. In this work, the anode substrate was pre-heated to decrease the temperature gradient. The electrolyte film was relatively thin, which allowed the only Z-direction shrinkage. Furthermore, our previous study on solid state reactive sintering (SSRS) proved that the reactive sintering usually resulted in partially liquid phase sintering, which was thought to be the main reason why the electrolyte densification was not related to the anode substrate shrinkage. The reduction of the anode substrate was applied before the electrolyte layer was deposited by rapid laser reactive sintering. The electrolyte film has been tried to be deposited onto the as-sintered anode substrate without reduction. The deposited electrolyte films always showed microcracks. The reduction of the anode substrate can avoid the crack of both electrolyte and anode. It was confirmed that the deposition of the electrolyte by rapid laser reactive sintering on the reduced anode substrate could partially re-oxidize the anode near the electrolyte, which is one of the reasons why the electrolyte film can be bonded to the anode substrate well.

After deposition of BCFZY0.1 cathode thin film, the RLRS-derived half cells were made into BCFZY0.1|RLRS-BCZYYb|Ni(O)–BCZYYb single cells, which was measured under Air/H2 gradient at 600-650° C. The I-V and I-P curves (FIG. 98A) of a single cell show that the open-circuit voltages (OCV) of 0.97 V and 0.94 V were obtained at 600° C. and 650° C., respectively, which are comparable values comparing with those measured for the furnace-sintered PCFC single cells but are still 0.10-0.15V lower than the theoretical values. The sealing leakage was thought to be the main reason for the lower OCV because the separation of the sealant from electrolyte was observed after testing, while the microstructure of the single cells was kept well after testing. The peak power densities of the RLRS-derived single cell are 97 mW/cm$^2$ at 600° C. and 121 mW/cm$^2$ at 650° C., which are not as high as the peak power density obtained for the state-of-the-art PCFC single cells fabricated by the SSRS method. The reason for the relatively low power density of the RLRS-derived single cell was analyzed by the electrochemical impedance spectroscopy (EIS). The EIS spectra of the RLRS-derived single cell at 600° C. and 650° C. are shown in FIG. 98B. The ohmic resistance (Ro) and polarization resistance (Rp) were substructed as follows: Ro=0.97 $\Omega$cm2 and Rp=0.85 $\Omega$·cm2 at 600° C., and Ro=0.83 $\Omega$·cm2 and Rp=0.54 $\Omega$·cm2 at 650° C. Both the electrolyte resistance and the electrode resistance are relatively high. However, the SEM image (FIG. 98B) of this single cell after testing indicates that the electrolyte thin film has a thickness of ~36 μm, which resulted in a proton conductivity of $3.7 \times 10^{-3}$ S/cm for the RLRS-derived BCZYYb electrolyte, which is a moderate proton conductivity values comparing the BCZYYb electrolytes obtained by conventional methods. Therefore, the decreasing thickness of the electrolyte can result in high single-cell performance. Therefore, we can conclude that the PCFC single cells prepared by the RLRS method still have significant space to be further improved, and the RLRS is a promising fabrication method to allow independently adjust the electrolyte, anode, and cathode for achieving better PCFC performance. The rapid densification of protonic ceramic electrolyte and excellent bonding between electrolyte and electrode also can contribute to the rapid manufacturing of protonic ceramic energy devices using the newly developed integrated additive manufacturing and laser processing technique. Furthermore, the microstructure of the tested BCZYYb electrolyte did not show an obvious difference from the fresh BCZYYb just after the RLRS, which indicates that the RLRS has good microstructure stability.

In the current communication, we were trying to report that the RLRS method can deposit crack-free protonic ceramic electrolyte films with the desired crystal structure and microstructure on the pre-sintered anode substrate. The fast sintering process is the first emphasize point. The RLRS can result in the sintering rate of ~0.5 cm$^2$/min based on BaCe$_{0.7}$Zr$_{0.1}$Y$_{0.1}$Yb$_{0.1}$O$_{3-\delta}$ (BCZYYb) electrolyte. The usual electrolyte sintering temperature program for state-of-the-art solid state reactive sintering (SSRS) took ~32 hrs (increased from room temperature to 800° C. with a ramp rate of 2° C./min and held at 800° C. for 2 hrs, ramped to 1400° C. with a ramp rate of 2° C./min and held at 1400° C. for 18 hrs, and cooled down to room temperature with a cooling rate of 2° C./min). The maximum single cells we sintered in our laboratory are around ten single cells with a unit active electrolyte area of 1 cm$^2$, which indicated that we could achieve 10 cm$^2$ electrolyte film within 32 hrs. The electrolyte film sintering rate by furnace sintering was estimated to be ~0.0005 cm$^2$/min, which is two orders of magnitudes slower than the RLRS method. The second point we want to emphasize is that the RLRS allows the deposition of desired electrolyte thin films on pre-sintered anode substrate, which permits the independent optimization of anode microstructure to improve the fuel cell performance. Most of the fuel cells reported in the literature were fabricated using the cofiring technique. In order to fully densify the thin electrolyte layer, the anode substrate has to be sintered at the same high temperature and long time, which makes it impossible to optimize the anode microstructure. When using non-hydrogen fuels, the demand for optimizing anode performance is inevitable. Very few sintering techniques for fabricating fuel cells with well-controlled anodes have been reported in the literature. The current RLRS technique shows the great potential to fulfill the independently processing anode and electrolyte, which makes it possible to well optimize the anode structure without mitigating the electrolyte performance. Therefore, this communication is to introduce the new promising fabrication technique to our fuel cell manufacturing community instead of reporting the best performance. We are confident that high performance can be achieved by using this method, which, however, needs extensive effort contribution. Instead of waiting for achieving the best results, we prefer to let the community know this method first and hope the community can contribute to the optimization and get a better fuel cell performance and make this method mature quickly.

Though the OCV is still lower than the theoretical values calculated at the corresponding temperature, we have done extensive SEM observation at different locations of the thin electrolyte films. The majority of the SEM images are the same as the one shown in FIGS. 97B-97E. Therefore, we have enough evidence to show that the electrolyte film is fully densified, which will not contribute to the relatively low OCV. The observation of the separation of Ceram-bond sealant from the electrolyte thin film probably means the sealing leakage, which is assumed to be the reason for relatively lower OCV.

The relatively low fuel cell performance has resulted from multiple reasons. The straightforward reasons are the sealing leakage, the thick electrolyte layer, the thick cathode, and the less porosity in both anode and cathode. As the fabrication process is still under optimization to achieve the best performance. It is not surprising to observe this result since many fabrication parameters decided the electrode performance.

The state-of-the-art protonic ceramic electrolyte $BaCe_{0.7}Zr_{0.1}Y_{0.1}Yb_{0.1}O_{3-\delta}$ (BCZYYb) dense films were successfully deposited on as-prepared BCZYYb+Ni/NiO anode substrate by recently developed rapid laser reactive sintering method. The separation of the preparation of dense electrolyte and porous anode makes it possible to manufacture protonic ceramic fuel cells (PCFCs) with more desirable electrolyte and anode microstructures. The PCFC single cells prepared after introducing the cathode thin film $BaCo_{0.4}Fe_{0.4}Zr_{0.1}Y_{0.1}O_{3-\delta}$ (BCFZY0.1) showed OCVs 0.94-0.97V and peak power densities of 97 mW/cm$^2$ at 600° C. and 121 mW/cm$^2$ at 600-650° C. under Air/H$_2$ gradient. The proton conductivity of the BCZYYb film prepared by the RLRS technique showed a comparable proton conductivity of $3.7×10^{-3}$ S/cm at 600° C. The higher PCFC performance can be expected by decreasing electrolyte film thickness and optimizing electrode microstructure.

Example 15—Rapid Laser Reactive Sintering of BCZYYb|BCZYYb Anode Half-Cell

The electrolyte layer has been successfully deposited onto the pre-fired anode substrate by the previous example's RLRS method. However, as the investigation of the parameters that limited the fabricated cell's performance, the sintered electrolyte conditions are the main reason. Based on the results of the previous example, though a hot plate was applied for heat treatment to reduce the temperature gradient of the anode substrate in the Z-direction, thermal stress still existed. Thus, a new direction of RLRS of one-step treatment to both anode and electrolyte precursors green layers simultaneously was proposed to reduce the different shrinkage and thermal stress of two layers during the sintering process.

Following the routine paste preparation procedure, hydrogen electrode/anode material, 40 wt % BCZYYb|60 wt % NiO, was deposited onto fused silica 3D printing. The thickness of the anode layer was controlled around 400 μm, and geometry as a dog-bone shape (FIG. 99). The bone shape layer's total length is 80 mm, and the principal part width is 8 mm. The Gaussian energy distribution of the CO$_2$ laser that the effective sintering spot size was around 8 mm after the laser beam passes the cylindrical lens. To fully cover the green layer, the 3D printed anode layer was set into width 8 mm. Moreover, with further increase in the anode layer's width, due to the uniform drying condition in the in-plane directions, there will be a gap forming on the green layer, resulting in cracks after RLRS treatment (FIG. 100). The dog-bone shape was selected is based on large quantities of experiments that, in the beginning, the wider green sample (wider than the spot size 8 mm) can help the sample bond or attach to the substrate better and resulted in a flat sintered sample after RLRS treatment.

Since the paste for 3D printing was prepared with water as a solvent, at the very beginning, the slurries of BCZYYb+1 wt % NiO electrolyte green precursor for spray coating were prepared as water-based as well. Four different binders were applied in electrolyte slurry for spray coating. The surface morphology of the coatings was presented in FIG. 101. The top two images are with HPMC and WSR-301 as the binder, which is rough and shows cracks appear after drying. The bottom two images are with PVA and WSR-N750 as the binder. After drying, the electrolyte layers seem ideal, while under the microscope (FIG. 102), there are still micro-cracks showing up. Since surface cracking conditions will influence the co-sintering process, the green's homogeneity will affect the shrinkage and stress during laser processing. Thus, none of the four binders are ideal for the electrolyte spray coating slurries in the following work.

With the coating process and parameters investigated, we found that the solvent's drying process in the slurries will affect the bonding, cracking, and uniformity of the deposited layers. Thus, acetone was picked up as the solvent as it has a much lower evaporation temperature, meanwhile a much faster drying rate. The new recipe was developed as 30 g BCZYYb+1 wt % NiO electrolyte green precursors powder, with 30 g acetone as a solvent, 3 g dispersant (20 wt. % solsperse 28000 (Lubrizol) dissolved in terpinol) and 1 g binder (5 wt. % V-006 (Heraeus) dissolved in terpinol) added into a glass jar with 50 g 3 mm YSZ grinding balls for 2 days ball milling. The slurry was applied for spray coating by an air-brush gun. (TG-100D https://www.paascheairbrush.com/product/tg-100d/) The air-brush gun pressure can be controlled by the compressor pump (⅕ HP piston compressor) and pressure set as 25 psi. By moving the spray gun, a thin layer was coated onto the substrate with controllable thickness from ~10 μm to ~100 μm (green layer). The drying of the coated layer will be done at RT in 5 minutes. With the self-developed recipe for electrolyte thin layer deposition, FIG. 103 has presented the samples fabricated condition, non-crack, uniform, and good quality, which is important for further laser treatment.

RLRS method was applied as a one-step co-sintering of anode and electrolyte layers into a half-cell. (FIG. 104) The desired half-cell was achieved under 70 W power, 0.1 mm/s speed, and 13 mm defocus distance within several minutes. A summary of part of the RLRS one-step fabricated 40 wt % BCZYYb 60 wt % NiO|BCZYYb+1 wt % NiO half-cells are presented in FIG. 105.

The sintered half-cell strip was cut into a button cell structure by ps-laser for an easy test, as shown in FIG. 106. The diameter of the cut button half-cell can be around 7 mm.

The microstructure of the one-step fabricated 40 wt % BCZYYb 60 wt % NiO|BCZYYb+1 wt % NiO half-cells were investigated by SEM shown in FIGS. 107A-107D. From the SEM results, it can be easily told that one-step fabricated anode layer, 40 wt % BCZYYb 60 wt % NiO and electrolyte layer, BCZYYb+1 wt % NiO bonded to each other very well. A porous BCZYYb anode and a fully densified electrolyte were successfully fabricated, as shown in FIG. 107A in the cross-section view of the cell. FIG. 107B presented a zoomed-in looked into the cross-section of the electrolyte that BCZYYb electrolyte was sintered into fully dense. FIGS. 107C and 107D take a detailed look at the top surface of the fabricated cell (electrolyte) that no micro-crack showed up, which meets the requirement of the cell construction.

To confirm that the RLRS method is more efficient and productive than the conventional fabrication routine. The cost of rapid laser reactive sintering (RLRS) and the conventional furnace sintering method was initially compared based on the laboratory-scale fabrication of protonic ceramic fuel cell (PCFC) planar single cells. The cost was estimated mainly based on electricity consumption for fabricating twenty PCFC single cells with an area of 10×10 cm$^2$. For the RLRS method, a CO$_2$ laser is used to sinter the component layers of PCFC single cells. The laser power is about 0.7 kW for co-sintering anode supported electrolyte half-cells and 0.2 kW for sintering cathode. Laser scanning time is around 0.28 hours for each sintering with an electron to laser power conversion efficiency of 10% (the usual efficiency is 10%-40%). The estimated electricity consumption for every single cell by RLRS is 2.52 kWh. The total electricity consumption for 20 PCFC single cells is around 50.4 kWh. As for the traditionally furnace sintering method, the electricity is mainly consumed during two sintering processes. The temperature program for co-firing electrolyte/anode half cells and is shown in FIG. 108A. The temperature program for annealing the cathode to finish the fabrication of single cells is shown in FIG. 108B. The powers of furnace working on 1400° C. and 900° C. are around 1.33 KW and 0.86 KW, respectively. Based on two temperature programs shown in FIG. 4.14, the electricity consumption for these two sintering processes is estimated to be around 28.04 kWh and 8.98 kWh, respectively. Assuming one-batch furnace sintering can handle five single cells, we need to operate the two sintering processes for four times to achieve 20 single cells. The energy consumption of each cell for the furnace sintering processes is around 7.4 kWh. The total electricity consumption of 20 cells is 148 kWh. Therefore, based on the initial laboratory-scale fabrication of PCFC single cells, the energy cost for the RLRS method is only 34% of the energy cost for the conventional furnace sintering method.

Moreover, free-standing green half-cell samples in bone shape (FIG. 109) were furnace sintered. After 18 hours of furnace sintering at 1450° C. the microstructure was characterized by SEM and presented in FIGS. 110A-110D. From the microstructure, we can see, though the dense electrolyte and porous anode construction were obtained, the porosity of the anode (FIG. 110A) can be much lower than the RLRS fabricated one, which in theory will limit the gas diffusion. On the other hand, the electrolyte was sintered into densified while, from the detailed look at FIGS. 110B and 110D of the electrolyte layer both in cross-section view and top surface views that there are many pores existed which will make a contribution to limited performance. These results can be explained by RLRS is a partially liquid phase sintering (LPS) is this process as the laser treatment can obtain a higher range of temperatures in quick time than furnace generating more liquid phase. As a result, the solid grains are wetted in the liquid phase, creating a capillary force that pulls the grains together.

By comparing both the cost and the quality/microstructures of the same samples fabricated by two different methods, the RLRS and conventional one, we can say that RLRS has potential fabricated PCEDs more efficiently and productively than the conventional method at this point.

To test the sintering ability and stability of the green half-cell under laser treatment, multi-time laser treatment was made on the green half-cell samples. The green half-cells were prepared in the same conditions as mentioned above. Three laser treatments were made onto the sample:

(1) 20% laser power, 13 mm defocus distance, 0.1 mm/s speed
(2) 40% laser power, 13 mm defocus distance, 0.1 mm/s speed
(3) 70% laser power, 13 mm defocus distance, 0.1 mm/s speed From FIG. 111, we can see, the multi-time laser treatments will not generate more cracks; the sample is still crack-free with a shining top layer, which is the dense electrolyte layer. Though the first time has color change, the phase may form as the SSRS/RLRS method introduced; the 3rd laser treatment generated the greatest change as the sample finally get enough heat treatment from the laser into the desired microstructure. Hence, we did prove that the laser multi-treatment can make the samples successfully prepared with good stability in-phase and excellent microstructures (FIG. 112).

The full cell was finally constructed with screen-printed a state-of-the-art cathode BaCo0.4Fe0.4Zr0.1Y0.1O3-δ (BCFZY0.1) on the top of an RLRS half-cell (BCZYYb+1 wt % NiO|40 wt % BCZYYb+60 wt % NiO) followed by furnace sintering at 900° C. for 10 hours. The method routine and recipe of the cathode are following previous work. The microstructure of the obtained single cell in the cross-section view, as shown in FIG. 113. The cathode bonded to the electrolyte very well, and no crack or delamination between the three layers. The performance of the obtained fuel cell was then tested with a self-design test station. The general and top views of the test station are shown in FIG. 114. The top view presented a fabricated cell with silver paste and wires as current collectors and ceramic bonds sealed to the alumina tube with an effective area 0.193 cm$^2$. Inside the outer alumina tube, atmosphere A, and inside the inner alumina tube, atmosphere B are two different gas atmospheres for the test based on different mode, e.g., fuel cell mode: pure hydrogen as the fuel from B side with a flow rate of 20 ml/min and stationary air as the oxidant from A side.

The single-cell electrochemical performance is shown in FIG. 115 and FIG. 116. The open-circuit voltages (OCV) of the cell were 0.99V, 1.03V, and 1.06V at 550° C. 600° C., and 650° C., respectively, and the corresponding maximum power densities were 0.153 W/cm$^2$, 0.223 W/cm$^2$, and 0.287 W/cm$^2$. The single-cell presents the highest power density at 650° C. with 0.287 W/cm$^2$ with the lowest specific area resistance ohmic resistance R$_o$=0.33 Ω·cm$^2$ and polarization resistance R$_p$=0.42 Ω·cm$^2$. The summary of the detailed cell performance data is summarized in Table 12.

TABLE 12

| The performance results summary of the single-cell under different temperatures | | | | |
|---|---|---|---|---|
| Temperature | OCV | Max power density | Resistance (Ω · cm$^2$) | |
| (° C.) | (V) | (W/cm$^2$) | Ohmic | Polarization |
| 650 | 0.99 | 0.287 | 0.33 | 0.42 |
| 600 | 1.03 | 0.223 | 0.39 | 0.69 |
| 550 | 1.06 | 0.153 | 0.45 | 1.32 |

The long-term stability test of the single-cell was carried out for around 35 hours, the maximum power density, OCV, specific area ohmic, and polarization resistances were presented in FIG. 117. The result indicated that the cell fabricated through our novel technique is successful with comparable performance and stability as a conventional method. Moreover, both the microstructure and photo of the tested cell are presented in FIG. 118. The cell electrolyte layer was also analyzed composition under the EDS with the right phase (FIG. 119).

The one-step RLRS fabricates half-cell with desired microstructures and ideal performance, indicating this new method, combined 3D printing, laser processing, and sintering all together, is presenting a high potential of the promising sustainable manufacturing paradigm of PCEDs fabrication, which shows the high potential of the future and value of Direct Digital Manufacturing (DDM).

Example 16—Direct Inkjet Printing of Mullite Nano-Ribbons from the Sol-Gel Precursor Bio-inspired ceramics that can overcome the brittleness of ceramics require building blocks with a thickness of a few hundred nanometers. It is extremely challenging to precisely fabricate the building blocks for the bio-inspired ceramics. In this example, we demonstrate the processing of dense mullite nano-ribbons using the sol-gel inkjet printing method with post-heat treatment. These nano-ribbons had precisely controllable dimensions of sub-micrometer thickness and width of a few hundreds of micrometers. A novel single-phase ink from the water-based mullite sol-gel precursor was developed that ensured inkjet printability and low-temperature formation of pure mullite phase. One of the greatest challenges was how to achieve a uniform track from such inks because the sol-gel inks had non-zero receding contact angles with the substrate. According to previous theoretical studies, the ink track would eventually become discrete bends. However, we found that solvent-evaporation-induced gelation played an important role in the stability of the printed lines. Taking advantage of the solvent evaporation and sol-gel transition upon substrate heating, we were able to print stable and continuous gel lines. After firing these printed lines at 1000° C., the pure mullite phase without any undesirable intermediate phases was achieved. The printed lines and dots retained their shapes during firing. It is shown that the crack-free mullite nano-ribbons of thickness ranging between ~90 and ~200 nm can be printed directly on substrates.

Overcoming the brittleness of the ceramics has attracted much attention. In recent years, bio-inspired ceramic structures have shown great potentials in achieving excellent toughness without sacrificing strength. These bio-inspired ceramics have a laminar microstructure that consists of thin building blocks of a few hundred nanometers thick. Precisely, fabricating ultrathin ceramic ribbons is extremely important for the manufacturing of these bio-inspired ceramics. Due to the high hardness and brittleness, ceramics are difficult to be machined into small dimensions and complex shapes, especially when the dimension is down to <1 μm. Additive manufacturing (AM) methods for fabricating complex ceramic components from ceramic precursors offers novel solutions to this problem. Among these AM methods, inkjet printing demonstrates great potential in the sub-micrometer-precision deposition of ceramic droplets at the desired locations. Therefore, the formulation of ceramic inks and understanding the criterion for the stability of printed lines are of great importance. The commonly used inks are made of dispersed nanopowders in liquid media. After the solvent evaporates from the printed spots, the residual ceramic powder can then be sintered.

One of the major challenges of direct inkjet printing using such nanopowder-based ceramic inks is that the required sintering temperatures are usually very high, and high sintering temperatures cause fast microstructural deterioration. Because of the loose packing of the nanoparticles, usually, high-density sintered parts are difficult to be achieved, unless excessive temperatures are used. The high sintering temperatures result in poor microstructure, particularly in the sub-micrometer dimensions. This problem is especially detrimental for the processing of ultrathin ceramics because the excessive temperature will quickly deteriorate the microstructure at the nanoscale.

Using the sol-gel precursor as printing inks can potentially solve the above challenge because the sol-gel precursors only need a much lower temperature to be sintered to fully dense than the powder compacts. In our previous studies, we have demonstrated the low-temperature sintering at 1200° C. of fully dense mullite fibers and coatings processed from the sol-gel precursors. Convectional sintering of mullite to fully dense from the powder usually requires a temperature of above 1600° C.

Moreover, the sol-gel precursor has the advantages of having controllable rheology, homogeneous, and well-controlled chemical compositions. Printing requires a certain viscosity range to guarantee droplet generation. The sol-gel precursor inks have well-controllable rheology that can easily meet the demand. The homogenous chemistry in the liquid state can avoid the dispersing and sedimentation problems of the nanopowder-based inks. The sol-gel ceramic inks have been used for the decoration of ceramic tiles. However, in these reports, no detailed studies on the printing mechanism or microstructure analyses were carried out.

In this example, we demonstrate mullite nano-ribbons processed from the inkjet printing of sol-gel precursors as the ink. Mullite has been widely used as the high temperature structural and insulating materials due to its excellent mechanical properties, such as high mechanical strength and low creep rate at high temperatures. However, mullite has intrinsic low toughness, which is typical for engineering ceramics. With the demonstration of mullite nano-ribbons, we lay the foundation for the fabrication of bio-inspired mullite that potentially can have significantly higher toughness. In our previous studies, we demonstrated that using the sol-gel precursors, the mullite phase can be obtained at below 1000° C., and mullite fibers and coatings can be sintered to fully dense at 1000-1200° C. The obtained mullite fibers showed excellent mechanical properties.

Using the inkjet printing method, we printed a set of single droplets and the adjacent drops interact and coalesce to form a line. Due to the capillary action, the adjacent drops tend to merge into a larger drop rather than forming a line. This is known as the line stability problem during inkjet printing. In this example, we study the line stability during inkjet printing of mullite sol-gel precursor. We report that the lines printed using ceramic sols have complex stability: at room temperature, the lines were not stable; increasing the substrate temperature, the line stability can be significantly improved.

A large volume shrinkage of the printed material during heat treatment often initiates cracking, which should be prevented. The cracking behavior of the printed lines during firing was also studied with the addition of polyvinylpyrrolidone (PVP) to the ceramic sol as the stress relaxer during firing. The critical thickness, above which cracking occurs in the printed lines was determined from the experiment.

The mullite sol-gel ink was prepared from mullite sol according to our previous studies. The precursor was prepared from aluminum isopropoxide (AIP, Al(C$_3$H$_{70}$)$_3$, 98%, Alfa Aesar, MA, USA), aluminum nitrate (AN, Al(NO$_3$)$_3$·9H$_2$O, 98%, Alfa Aesar, MA, USA), and tetraethyl orthosilicate (TEOS, Si(OC2H5)4, 98%, Acros Organics, NJ, USA) and DI water with the mole ratio of 0.44:0.2:0.16:10. The AN was dissolved in deionized water at room temperature by vigorously stirring it for 30 min. Then AIP and TEOS were added to the solution and stirred for 20 h. AIP and TEOS were dissolved completely, and clear solutions were obtained. The solution was then refluxed at 80° C. for 5 h. Approximately ⅔ of the solvent was removed using a rotary evaporator (IKA RV 10 digital, China). The obtained solution was then set in an oven at 80° C. until viscous sols were obtained. The hydrolyzed sols were then diluted with distilled water and mixed with PVP (Mw 58,000 Da, Sigma-Aldrich, MO, USA) using an ultra-sonicator. The mullite yield, w, is defined as the weight percentage of the final mullite after firing the total ink weight. The final mullite yield in the inks was set to 2.5 wt %. The sol-gel precursors with PVP of 30 and 45% of the mullite yield by weight were named as 30PVP and 45PVP.

Substrates used in this study were polished fused silica slides (MTI Corp, Richmond, CA). For comparison, some as-received substrates were cleaned and coated with a thin layer of polyvinyl butyral (PVB, Butvar B-98, Eastman, USA) using the dip-coating method. The PVB solution for dip coating was prepared by dissolving PVB in acetone (Alfa Aesar, MA, USA) with a concentration of 0.75 g/mL. The withdrawal speed during dip coating was set to be 20 mm/min. After dip coating, the substrates were dried in an oven at 40° C. for 24 h before use.

A piezoelectric drop-on-demand printhead (MJ-AT-01-40, orifice diameter 40 µm, MicroFab Inc, Plano, TX, USA) was used in this study. The diameter of the generated droplet was about 50 µm. The printing frequency was set to 200 Hz. To study the effect of droplet spacing p on the printing stability, the moving speed of the substrate was set as: v=pf, where f is the printing frequency. The viscosities of the inks were measured by an Ubbelohde viscometer (Cannon instrument, PA, USA). Dynamic contact angle and surface tension were measured by Kruss drop shape analyzer (DSA100, Hamburg, Germany). To measure the advanced contact angle, a sessile drop was first generated using the needle, and then the ink was slowly added into the sessile drop until the contact line moved. After the contact line became stable, the image of the drop was taken and analyzed by the Kruss drop shape analyzer. The receding contact angle was measured by a similar way except the ink was sucked from the sessile drop.

After printing, the substrates were fired at 1100° C. for 1 h with a heating rate of 10° C./min. To identify the phases using X-ray diffraction (XRD, Rigaku Co., Ltd, Tokyo, Japan), mullite powder was prepared from mullite gel by firing at a target temperature. The microstructure of the printed lines was characterized using scanning electron microscopy (SEM, Hitachi S4800, Hitachi, Ltd, Tokyo, Japan). The surface features of the printed patterns were measured using an atom force microscope (WITec Aplpha 300, WITec GmbH, Ulm, Germany).

The XRD traces of the mullite gel heated at 800, 1000, and 1200° C. for 2 h are shown in FIG. 120. The sol-gel powder remained amorphous after being calcined at 800° C., and became crystalline when the powder was calcined at 1000° C., which is consistent with our previous studies. The droplet generation is driven by the surface tension, promoted by the inertial forces, and retarded by the viscous forces. To evaluate the contribution of viscous forces relative to the surface tension forces during fluid flow in the liquid droplets forming at the printhead, the dimensionless Ohnesorge number is introduced:

$$Oh = \frac{\eta}{\sqrt{\gamma \rho a}},$$

where $\eta$ is the viscosity, $\gamma$ is the surface tension, $\rho$ is the density, and a is the diameter of ink drops. The inverse Ohnesorge number Z=1/Oh is typically introduced to describe the printability of the ink: the inks can be printed one droplet per trigger if 1<Z<10. If Z value is too low, the inks are non-printable. If the Z value is too high, some satellite droplets will be formed, resulting in nonuniform droplets and uncontrollable printing.

The densities, viscosities, and surface tensions of the sol-gel inks are given in Table 13. The Z value of our 30PVP ink and 45PVP ink was 4.83 and 4.87, respectively, both indicating good printability. FIG. 121 shows a series of images during droplet printing. The droplets were printed without any satellite droplets. The diameter of the printhead was 40 µm and the printing frequency was 200 Hz. The images were taken by a high-speed camera with a frequency of 5000 fps. The diameter of the droplets was ~50 µm.

TABLE 13

| Density viscosity and surface tension of 30PVP and 45PVP inks at room temperature | | | |
|---|---|---|---|
| Ink | Density (g/cm³) | Viscosity (cP) | Surface tension (mN/m) |
| 30PVP | 1.00 | 1.14 ± 0.01 | 58.0 ± 0.1 |
| 45PVP | 1.00 | 1.17 ± 0.01 | 64.9 ± 0.5 |

In order to study the effect of contact angle on the line stability, we use two types of substrates. One type is the as-received silica substrates and the other is the silica substrates coated with PVB (coated substrates) to modify the contact angle between sol-gel ink and substrate. The advanced and receding contact angles of 30PVP ink on as-received and PVB-coated substrates are shown in Table 14. FIGS. 122A-122D and 123A-123D show the microstructure of the printed line with 30PVP on the as-received and PVB-coated substrates, respectively. From FIGS. 122A-122D, we found that when the drop spacing was sufficiently large (e.g., p=100 µm, FIG. 122A), no line was formed and only isolated droplets were observed.

TABLE 14

| Advanced and receding contact angles of 30PVP and 45PVP ink on as-received and PVB-coated substrates | | | | |
|---|---|---|---|---|
| | Advanced contact angle (°) | | Receding contact angle (°) | |
| Substrate | 30PVP | 45PVP | 30PVP | 45PVP |
| As-received | 68 ± 3 | 68 ± 2 | 15 ± 2 | 15 ± 2 |
| PVB coated | 85 ± 1 | 84 ± 1 | 18 ± 1 | 19 ± 1 |

The diameter of a single droplet on the as-received substrates was 72±2 µm. When the drop spacing was between 50 and 100 µm, the receding of the liquid ink caused the line to coalesce into isolated islands as shown in FIG. 122B. Bugles were observed when the drop spacing, p, was between 5 and 25 µm, as shown in FIGS. 122C and 122D. This is because the liquid line tends to minimize the surface energy by reducing the surface area. A larger bulge size was observed for smaller drop spacing. No stable printed lines that have straight edges were obtained regardless of the change of the drop spacing p.

When the PVB-coated substrates were used, we observed a similar phenomenon. No stable lines (lines with straight edges) were obtained. Either isolated islands or lines with bulges were observed. The droplets had a slightly smaller diameter (66±2 µm) on the PVB-coated substrates. The printed lines were less stable on the PVB-coated substrates than that on the as-received substrates. The liquid bridge between the bulges had irregular widths and edges, when the drop spacing was smaller than 50 µm (FIGS. 123B-123D). The 45PVP ink showed very similar printing behavior to the 30PVP ink on both as-received and the PVB-coated substrates, hence the results are not shown in detail here.

At room temperature, no stable lines were obtained from the mullite sol-gel inks on either as-received or the PVB-coated substrates. The effect of substrate temperature on the printing stability was further studied. When the mullite sol-gel inks were printed on the as-received substrates upon heating, the bugling was suppressed. However, stable lines were not observed until the substrate temperature was raised to 75° C., as shown in FIGS. 124A-124E and 125. When the drop spacing p is large (e.g., p=75 μm), the lines formed lines with "scalloped" edges, also called "scalloped lines." When the drop spacing was between 25 and 50 μm, stable lines were obtained. When the drop spacing was further decreased to 5 μm, lines with bulges were observed.

The effect of the p parameter on the line stability was also investigated using the PVB-coated substrates upon heating, as shown in FIGS. 126A-126H. Stable lines were also observed on hot PVB-coated substrate at elevated temperature using 30PVP as printing ink. At 57° C., stable lines were observed for p=50 μm, rather than the bulged lines obtained at room temperature (FIG. 123B). Further increasing the substrate temperature to 75° C., we observed scalloped lines when the drop spacing was 50 μm (FIG. 126F). Stable lines without bulges were observed at this temperature when the drop spacing decreased to 25 μm, as shown in FIG. 126G.

The optical images of printed lines after firing at 1100° C. using 30PVP ink are shown in FIGS. 127A-127E. When the drop spacing was 100 μm, the distance between adjacent droplets was too large to form a line. No cracks were observed on the isolated droplets. The lines remained crack free when p=50 μm. When the drop spacing was 25 μm, cracks were observed. The density of cracks has increased substantially when the drop spacing was reduced from 25 to 5 μm. The morphology of the lines printed using the 45PVP ink was similar to that made from the 30PVP ink, as shown in FIGS. 128A-128D. Bugles became smaller with the larger droplet spacing. Since bugles are made of several droplets, they tended to have a large thickness and resulted in severe cracking. The lines between the bulges were found to be free of macro-cracks under an optical microscope and thus the area was checked under SEM to study the microstructure. The SEM micrograph of the fired line by 45PVP ink is shown in FIG. 129, which was the magnification of the line area of FIG. 128C. Dense surface was obtained after firing without micro-cracks.

To print fine and complexly shaped features, small droplets are desired. Considering that a droplet generated by the printhead has a diameter do, after hitting the substrate, it spreads over into a spot of diameter d. If the gravity is much smaller than the surface tension force, i.e., the Bond number is much smaller than 1:

$$Bo = \frac{\rho g d_0^2}{\sigma_{LV}} \ll 1,$$

One can ignore the effect of gravity on the drop shaping. For the 30PVP and 45PVP inks, we estimate the Bond number as Bo=4.23×10-7 and 3.77×10-7. Thus, the effect of the droplet weight can be neglected and the drop shape can be safely assumed to be an ideal spherical cap with:

$$d = d_0 \beta_{eqn},$$

where:

$$\beta_{eqn} = \sqrt[3]{\frac{8}{\tan\left(\frac{\theta}{2}\right)\left[3 + \tan^2\left(\frac{\theta}{2}\right)\right]}},$$

and θ is the advanced contact angle.

According to the above equation, the greater the contact angle the ink has, the smaller the droplet size on the substrate. In our experiments, the advanced contact angle for as-received substrates is 68°, so the spreading diameter on the substrate was 75 μm. The PVB-coated substrates were prepared to reduce the drop size because the contact angle on the PVB-coated substrates was 85° which led to a spreading diameter of 66 μm. These calculated drop spreading diameters, using the above equation, were excellently consistent with our measured value (d=72±2 μm on as-received substrates and d=66±2 μm on the PVB-coated substrates).

The boundary conditions between liquid and substrates are found to be critical to the line stability. An initial study on line stability was done by Davis using a full flow model for liquid rivulets. When considering three boundary conditions for the liquid rivulet on the substrate: (1) fixed contact lines; (2) fixed contact angles; (3) contact angles change with contact line speed, Davis showed that only case (1) has resulted in stable lines when the nominal contact angle is <90°. This prediction was examined and confirmed by Schiaffino using inkjet printing. The condition of fixed contact lines means that the contact lines of the drops are pinned at the substrates. However, for obtaining a stable printed line, the fixed contact line with the contact angle <90° is hard to achieve in practical situations. The ink made of the phase changing material was the only type of the ink reported that provided a fixed contact line with a contact angle <90°.

Actually, the lines may be still stable for the contact line hysteresis if the contact angle is <90°, as discussed by Benilov. Duivevled studied the case that the contact lines can move forward but may not move backward and reported stable lines under this condition. Inks that have an advanced contact angle <90° but a zero receding angle would satisfy this condition, such as the powder-based inks. However, under this condition, the lines were only stable at certain the printing speed and frequency combination, which was predicted by Stringer.

In this study, both inks do not meet these boundary conditions. The drops were not pinned in our experiments, because the inks have a non-zero receding angle on both as-received and the PVB-coated substrates (Table 14). Thus, the printed lines were not stable at room temperature on these substrates. However, when the substrates were heated, we observed a new stable printing condition window as shown in FIG. 130. In general, increasing the substrate temperature helped to stabilize the printing lines. This was consistent with our previous results. Further analysis was carried out to understand this phenomenon.

The flow of liquid in printed lines is driven by the capillary pressure. Thus, one of the possible reasons for the increased line stability is that the surface tension of the ink decreased significantly as the substrate temperature increased and consequently eliminated the driving force to cause the printing instability. Another possible reason was that the viscosity of the ink increased dramatically with increasing temperature and thus the line effectively solidifies after solvent evaporation.

We hereby show that our stable lines at elevated temperature were not resulted from these reasons. The schematic for measuring the surface tension at different temperatures is shown in FIG. 131. Pendant drops were ejected from the needle tip in a sealed chamber. After reaching the temperature of interest, a droplet was kept for 5 min before each measurement to ensure saturation of the vapor pressures in the chamber. From the results shown in FIGS. 132A-132B, we found that the surface tension only decreased slightly as the temperature increased, so the change of surface tension is not a dominant factor.

To show that without solvent evaporation, the ink viscosity decreases as temperature increases, we have conducted measurements of viscosity in the closed cap. The decrease in the viscosity with the increase in temperature was significant (FIG. 132B). This reduction of viscosity at high temperatures would worsen the stability of the printed line by enhancing the flow in the lines. Therefore, neither the change of surface tension nor the change of viscosity due to the increase of temperatures was the main reason for the stability change of printed lines.

The increase of the line stability on the hot substrate was also reported by Soltman. He showed that printed lines can be stable at some unstable printing conditions by increasing the delay time (the time between two consequent droplets were generated) or heating the substrates, indicating that the boundary condition might be changed. However, this phenomenon has not been extensively studied in the previous works because heating will enhance evaporation and thus worsen the "coffee ring" effect. Before instability occurs, if the ink can gel to become sufficiently viscous by solvent evaporation, the drops could be pinned and the stable lines could be obtained. In addition, the heating accelerates the polymerization of the sol, causing the viscosity to increase even more significantly. Since the substrate was heated, the combined effect of drying and fast gelation at the droplet edge helps to pin the contact line.

However, not all printing parameters resulted in stable lines at the elevated substrate temperatures. The printing parameters, the printing frequency f, the drop spacing p and the stage moving speed v, are correlated: v=pf. These parameters determine the virtual flow rate of the line, i.e., how much liquid is printed to the tail of the printing line. In the experiments, we kept the printing frequency as the constant, so the increase in drop spacing decreased the virtual flow rate. If the drop spacing was greater than the spread diameter of the drop on the substrate, the line would become discontinued. If the line was stabilized by solvent evaporation and polymer gelation, the higher flow rate would request faster evaporation and gelation rate to stabilize the printing tracks. Therefore, low virtual flow rate and high temperature promoted the line stability. This explained the processing window in FIG. 130 that: (1) the window became wider when the temperature rose from 62 to 75° C. and (2) when drop spacing was 25 μm, the printed line was unstable at room temperature but became stable at 75° C. If we keep the drop spacing constant but increase the printing frequency, the virtual flow rate will increase and the line may be unstable. This prediction was confirmed in experiments. When printing frequency was increased to 400 Hz, the printed lines remained unstable even if the substrates were heated to 75° C., as shown in FIG. 126E.

In our previous study, the critical thickness, or the maximum thickness without cracks for sol-gel mullite coating, is generally <100 nm. If PVP was added as a stress releasing agent to the sol-gel precursor to increase the critical thickness. The thicknesses of a single drop printed by using 30PVP and 45PVP were ~90 and ~200 nm, respectively, as shown in FIGS. 133A and 133B. This is very consistent with our previous studies. The thickness of the crack-free lines printed by using 45PVP ink is three times thicker than that printed by using 30PVP ink. The thickness of the printed lines (FIG. 133C) was ~80 nm. This thickness is thinner than that of a single droplet due to the large droplet spacing of the line.

Both 30PVP and 45PVP ink resulted in severe cracking in large bulges because the accumulated liquid in the bugles making the thickness in the bulges exceeds the critical thickness. In our previous study, about 50 wt % PVP to mullite yield would obtain maximum critical thickness. A small number of cracks were observed in nano-ribbons obtained from 45PVP ink, which indicates that the thickness of the lines/drops printed by 45PVP ink almost reaches the upper limit. The thickness of a drop printed using 45PVP after firing is reduced from ~1 μm to ~200 nm. Although the lines printed using 45PVP ink on hot substrates can be stable, the thickness of the stable lines before firing can be ranging from ~1-3 μm depending on drop spacing. Likewise, the stable lines printed by 30PVP were also above the critical thickness and could not survive after firing. Thus we cannot obtain crack-free and stable lines unless using inks with lower concentration.

The thickness of the scalloped lines is smaller than that of the stable lines due to the increase of droplet spacing. Thus, crack-free lines can still be obtained, as shown in FIG. 127E. The thickness of the printed lines on hot substrates is not uniform as shown in FIG. 134: the thickness of the edge is about 300 nm but the thickness of the center is only about 100 nm. This valley-like structure was formed probably due to the coffee ring effect which resulted in the deposition of the material at the edge of the droplet by nonuniform deposition. The coffee ring effect requires pinned contact lines, so this result indicated that the contact lines were changed from unpinned at room temperature to pinned at 75° C. This result agreed with our assumption above.

Aqueous single-phase mullite precursor inks were prepared with good printability. We found that the stable printed lines can be obtained using these sol-gel inks on the substrates even when the receding contact angle is >0. The existing theories and experiments show that no stable lines could be printed under these conditions. In this study, we found that the stability of printed lines from the sol-gel inks can be promoted by increasing the temperature. The printed lines on as-received and the PVB-coated substrates were unstable at room temperature. By heating the substrate to 75° C., we successfully obtained stable lines from the mullite sol-gel inks. Neither the change of surface tension nor the change of viscosity of the non-evaporating ink could result in the line stabilization. A possible explanation is that the hot substrates accelerate solvent evaporation and sol polymerization. These effects dramatically increase the ink viscosity resulting in solidification of the printed line. This assumption also met the observation of the coffee ring effect at a hot substrate (75° C.). After firing at 1100° C., ceramic nano-ribbons were obtained. We also found that due to the effect of stress relaxation of the polymer during heat treatment, an increase of the PVP concentration results in an increased nano-ribbon thickness without cracking.

Example 17—Rapid Laser Reactive Sintering of Protonic Ceramic Materials

The refractory nature of ceramics is beneficial to use them as structural materials; however, it is sometimes recognized as an encumbrance when using them as functional materials. A typical case is the protonic ceramics used for energy conversion and storage devices (e.g., fuel cells, electrolyzers, membrane reactors). The components electrodes, electrolyte, and interconnect involved in protonic ceramic energy devices require to be fired at relatively high temperatures; especially, the last two components need temperature as high as 1700° C. for longer than 10 hours to achieve high relative density. This high-temperature and long-time processes have been abhorred not only for its energy and time consuming but also for the volatilization of the materials leading to poor performance. Moreover, when fabricating the devices (i.e., single cells and stacks), the refractory nature becomes a more severe problem because the dense electrolyte and interconnect must be integrated with the porous electrode layers, which need to have an excellent nanoporous structure for ensuring enough surface area for excellent electrocatalytic fuel oxidation or oxygen reduction reactions.

Figure 68:
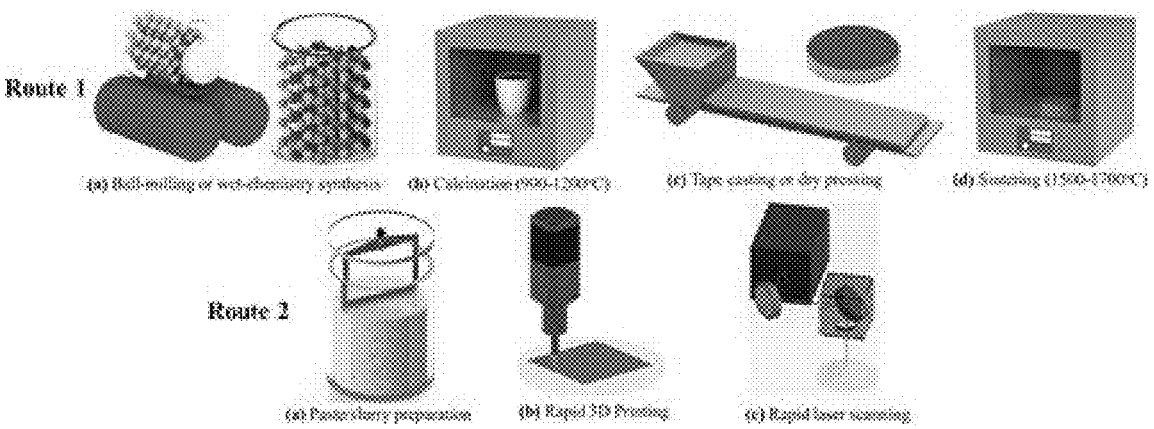
FIG. 68 is a schematic description of protonic ceramics. Route 1 includes a conventional ceramic-processing method and Route 2 includes a rapid laser reactive processing method.

The conventional method for manufacturing protonic ceramics with desired crystal structures and microstructure is described by route 1 in FIG. 68. The primary four steps of (a) mixing raw powders of each material by ball milling, (b) calcination of each material, (c) shape formation by pelletizing (bulks) or tape casting (films), and (d) sintering are needed. The calcination step usually is performed at a temperature higher than 900° C. for more than 10 hrs to obtain phase-pure ceramic powders. Sometimes, the particular wet-chemistry method is used to obtain pure-phase nanopowder for better controlling the microstructure during sintering, which inevitably results in more expensive precursors and much longer preparation time (e.g., a week or so is needed to prepare fine $BaZr0.8Y0.2O3-\delta$ (BZY20) powder through modified Pechini method).

In 2010, Tong et al. developed a solid state reactive sintering (SSRS) technique, which allows fabricating dense large-grain (~5 μm) pellets of $BaZr0.8Y0.2O3-\delta$, the most refractory and stable proton conducting oxide, at moderate firing temperatures (e.g., 1400° C.). This SSRS technique has been successfully used for fabricating PCFC button cells at moderate firing temperatures, and promising performance has been demonstrated for both power density and long-term stability. By the same SSRS technique, the tubular protonic ceramic membrane reactors were fabricated, in which the promising performance of the methane dehydroaromatization was achieved because of the simultaneous removal of hydrogen and the addition of oxygen. Although the SSRS technique has been successfully applied recently, it still needs long-term cofiring of the electrolyte and electrode (e.g., anode cermet) at a high temperature around 1400° C., which unavoidably ruled out the possibility for creating nanostructures for high-performance supporting electrodes. It is still a challenge to combine the PCFCs/PCECs with low-temperature and cost-effective stainless-steel interconnectors. Furthermore, the SSRS method still has to face the challenge of integrating a fully densified electrolyte or interconnect with porous electrodes. Therefore, the new processing techniques for selectively sintering different layers of protonic ceramics for achieving controllable microstructures (e.g., fully densified and nanoporous) are desperately needed for further accelerating the progress of protonic ceramic energy devices.

In this work, a rapid laser reactive sintering (RLRS) technique was initially discovered for rapid sintering 3D printed electrolyte green layers of protonic ceramic electrolytes BZY20 and BCZYYb into dense films to develop integrated additive manufacturing and laser processing of protonic ceramic electrolyzer stacks. The combination of rapid heating and instant solid state reaction allowed the fast phase formation and the densification of BZY20 and BCZYYb. This RLRS technique is schematically described by Route 2 in FIG. 68, which can be simply divided into three steps of paste preparation, 3D printing, and laser reactive sintering. A much more controllable and rapid 3D printing was added, while the time and energy-consuming calcination and sintering steps were replaced by a fast and straightforward, cost-effective laser scanning step. In the present work, the RLRS technique was extensively used for processing the protonic ceramics of electrolytes, hydrogen electrodes, oxygen electrodes, oxygen/hydrogen electrode scaffolds, interconnects, and mixed conducting dual-phase composites) for fulfilling the rapid integrated additive and laser processing of protonic ceramic energy devices sustainably and cleanly. Not only the desired crystal structures but also the desired microstructures (e.g., fully dense or highly porous structures) were obtained by the RLRS method. The fabrication of half-cells and single cells was demonstrated above. The RLRS provided a corner-stone knowledge for rapid integrated additive manufacturing and laser processing of protonic ceramic energy devices and other ceramic devices.

This study provided a new rapid laser reactive sintering (RLRS) method for the preparation of nine protonic ceramics (i.e., $BaZr0.8Y0.2O3-\delta$ (BZY20), BZY20+1 wt % NiO, $BaCe0.7Zr0.1Y0.1Yb0.1O3-\delta$ (BCZYYb), BCZYYb+1 wt % NiO, 40 wt % BCZYYb+60 wt % NiO, $BaCe0.85Fe0.15O3-\delta$-$BaCe0.15Fe0.85O3-\delta$ (BCF), $BaCo0.4Fe0.4Zr0.1Y0.1O3-\delta$ (BCFZY0.1) $BaCe0.6Zr0.3Y0.1O3-\delta$ (BCZY63), and $La0.7Sr0.3CrO3-\delta$ (LSC)) with desired crystal structures and microstructures. The initial cost estimation based on electricity consumption during the sintering process for the fabrication of PCFC single cells showed that RLRS is more competitive than the conventional furnace sintering. This RLRS can be combined with the rapid additive manufacturing of ceramics for the sustainable and clean manufacturing of protonic ceramic energy devices and other ceramic devices' processing.

The state-of-the-art protonic ceramic components of dense electrolytes (BCZYYb+1 wt % NiO, BCZYYb, BZY20+1 wt % NiO, and BZY20), porous electrodes/electrode scaffolds (40 wt % BCZYYb+60 wt % NiO, $BaCo0.4Fe0.4Zr0.1Y0.1O3-\delta$ (BCFZY0.1) $BaCe0.6Zr0.3Y0.1O3-\delta$ (BCZY63)), dense interconnect ($La0.7Sr0.3CrO3-\delta$/LSC), and dense mixed protonic and electronic-conduction composite ($BaCe0.85Fe0.15O3-\delta$-$BaCe0.15Fe0.85O3-\delta$/BCF) were chosen as model materials for the study of the RLRS processing of protonic ceramics. Green pastes of these protonic ceramic component precursors were prepared by ball-milling the respective raw materials of oxide and carbonate powders (e.g., $BaCO3$ (Alfa Aesar 99.8%), $Fe2O3$ (Alfa Aesar 99.9%), $CeO2$ (Alfa Aesar 99.9%), $ZrO2$ (Alfa Aesar 99.7%), $La2O3$ (Alfa Aesar 99.9%), $Cr2O3$ (Alfa Aesar 99%), $SrCO3$ (Alfa Aesar 99.9%), NiO (Alfa Aesar Ni 78.5%), $Y2O3$ (Alfa Aesar 99.9%), and $Yb2O3$ (Alfa Aesar 99.9%)) for 48 h in the stoichiometric ratio and followed by mixing of the ball-milled powder with water, dispersant, and binder. The green films of the component precursors prepared either micro-extrusion-based 3D printed or simple drop coating on substrates of alumina plates, fused silica, or sintered BCZYYb electrolyte pellet). The thin films with a usual thickness of ~150 μm were deposited and dried in the ambient atmosphere for 24 h. The $CO_2$ laser (Firestar TI100, wavelength 10.6 μm) was used to perform the RLRS. The laser was scanned across the green films by placing the films on a 3D printing stage with X-Y motions to control scan speed and a Z-direction motion to control the degree of laser beam focus. The detailed laser operation parameters of laser power, scanning speed, and defocus distance were summarized in Table 10 for each protonic ceramic component film. Energy density can be one of the methods to describe the laser parameters in a simple way-ED=p/vd where ED is energy density, P is laser power (W), v is laser scanning speed (mm/s), and d is the diameter of the laser spot (mm).

The rapid laser heating has been successfully used to prepare large plastic and metal parts based on the melting and consolidating mechanism. However, the intrinsic large temperature gradient of laser heating made the rapid sintering of ceramics very difficult, which usually resulted in cracks even in a minimal area. Combining with the SSRS process, which involved partial liquid phase sintering, the thermal stress was released to some degree. FIGS. 135A-135D shows that using conducting oxides of $BaCe0.7Zr0.1Y0.1Yb0.1O3-\delta$ (BCZYYb) and $BaZr0.8Y0.2O3-\delta$ (BZY20) as a case study, the crack-free protonic ceramic parts of straight strips (~10 mm in length, ~1 mm in width, and 30-200 μm in thickness) (FIG. 135A), spiral strips (~200 mm in length, ~1 mm in width, and 30-200 μm in thickness) (FIG. 135C), and squared films (~4.5 mm in both length and width and 30-200 μm in thickness) (FIG. 135D) were successfully fabricated by RLRS method. FIG. 135B provides a low-magnification SEM micrograph of the cross-section for one representative BCZYYb strip. No cracks are existing in the observed cross-section region. The strip thickness varies in the range of 30-200 μm, corresponding to the different relative densities. The center's thickness is thinner than the two edges, which is consistent with the Gaussian distribution of laser power during laser scanning.

Figure 69:
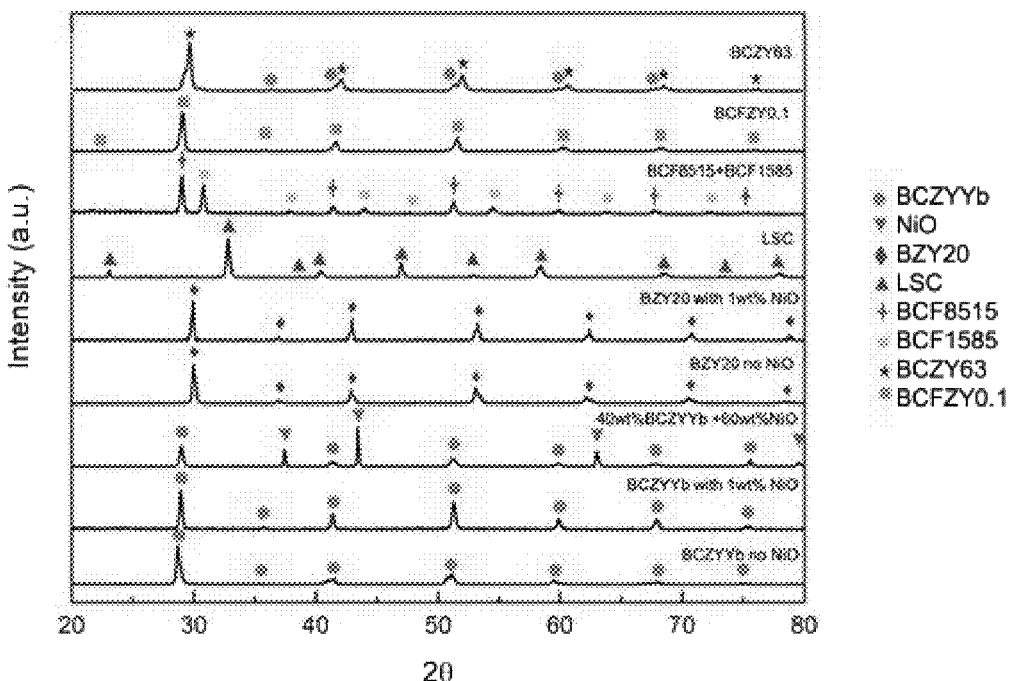
FIG. 69 is a chart showing XRD patterns of the protonic ceramic component films obtained by the RLRS.

The crystal structure of each protonic ceramic component films prepared by RLRS was characterized by X-ray diffraction (XRD, Rigaku Ultima IV). The laser-irradiated films were ground into powder. The XRD patterns were obtained by monochromatic Cu-Kα radiation from 20 to 80 degrees with 1°/min. The microstructures of representative protonic ceramic component films were observed by a scanning electron microscope (SEM, Hitachi S4800, Hitachi, Ltd., Tokyo, Japan). All the RLRS precursors materials were sintered into pure crystal phase, as shown in FIG. 69 with the laser parameters mentioned in Table 10.

In general, although the interaction between the laser beam and the materials was only around several seconds, it was enough to form the desired crystal structures for all the samples. As for the BCZYYb, BCZYYb+1 wt % NiO, BZY20, BZY20+1 wt % electrolytes, the LSC interconnect, the BCFZY0.1 electrode, and the BCZY63 electrode scaffold (the thin film of BCZY63 was deposited on the BCZYYb electrolyte pellet, which resulted in the existence of BCZYYb peaks), the phase-pure perovskite structure was obtained. Furthermore, the cermet hydrogen electrode based on BCZYYb electrolyte and NiO also showed the desired crystal structures of BCZYYb and NiO. There are no other peaks ascribed to impurities found. BCF is a complicated dual-phase material system comprised of a cubic perovskite $(BaCe0.85Fe0.15O3-\delta, BCF8515)$ and an orthorhombic perovskite $(BaCe0.15Fe0.85O3-\delta, BCF1585)$ for using as a mixed protonic and electronic conducting hydrogen permeation membrane, which usually is synthesized by using the modified Pechini method with extended processing time. Therefore, we can conclude that the RLRS method can achieve the desired crystal structure for extensive protonic ceramic component materials.

For comparison, the XRD patterns for the two corresponding BCZYYb and BZY20 pellets fabricated by SSRS are also presented in FIG. 136. It can be easily seen that the BCZYYb-RLRS strips and BCZYYb-SSRS pellets show precisely the same XRD patterns, which can be ascribed to the pure orthorhombic perovskite structure similar to BaCeO3. In detail, the peaks for BCZYYb-RLRS strips are a relatively higher sharpener than those for BCZYYb-SSRS pellets, which probably indicates the better crystallinity for RLRS samples. On the other hand, the BZY20-RLRS strips and the BZY20-SSRS pellets behave like the BCZYYb ceramics do. Both BZY20-RLRS strips and BZY20-SSRS pellets show the same XRD patterns, which can be ascribed to cubic perovskite similar to BaZrO3. However, the crystallinity difference for the BZY20 ceramics is not apparent. Therefore, the RLRS process with only a couple of seconds can achieve the same crystal structures for BCZYYb and BZY20 ceramics as the state-of-the-art SSRS process with at least 10 hours at temperatures of 1400-1500° C.

It has been extensively reported that the PC's microstructures significantly affected the PCED performance. For example, the PCFCs usually need the large-grained fully dense protonic ceramic films for electrolytes and the highly porous nanostructures for electrodes. Two remarkably different firing conditions should be used to obtain the hierarchical electrolyte and electrode layers selectively. Therefore, the capability of engineering microstructures for protonic ceramics is one of the most critical factors for evaluating the new fabrication techniques for protonic ceramics.

The relative densities of the RLRS components were analyzed from multiple SEM images using the ImageJ software. The SEM images were imported into the ImageJ software for relative density calculation. By changing the Black/White contrast (threshold) of the images, the pores can be automatically identified with significant color/contrast difference to the crystal grain/dense area. By counting the pixels of the pores and grains' areas, we calculated the percentage of the pores and then relative densities. Each sample's relative density was measured by this method five times to achieve average values.

FIGS. 70A-70D provide the SEM characterization of BCZYYb+1 wt % electrolyte, BZY20+1 wt % NiO electrolyte, LSC interconnect, and BCF composite films obtained by RLRS. The cross-section image (FIG. 70A) of BCZYYb+1 wt % NiO clearly shows that the electrolyte films were fully dense. The relative density analyzed by Image J based on multiple SEM images is high than 95%. The relatively large grain size was obtained, which will be significantly beneficial to this film's total proton conductivity. FIG. 70B indicates that the most refractory protonic ceramic electrolyte of BZY20 was fully densified with the help of 1 wt % of NiO sintering aid. The grain boundary was almost entirely removed by adjusting laser operating parameters. The relative density is around 98.9%. LSC is the state-of-the-art interconnect for solid oxide fuel cells, which, however, is very difficult to be densified too. For example, the sintering at 1550° C. for 10 hrs usually only gets a relative density of ~80% by the conventional method, as described in route 1 in FIG. 68. FIG. 70C provides the LSC's SEM image after RLRS for a couple of seconds, from which it can be clearly seen that the LSC has been fully densified already. The relative density is around 98.7%. BCF composite was recently reported to be a hydrogen-permeable membrane comprised of $BaCe0.85Fe0.15O3-\delta$ and $BaCe0.15Fe0.85O3-\delta$, which usually needs to utilize the improved Pechini method to achieve the desired phase composite. FIG. 70D shows that our newly developed RLRS method can fully densify the composite BCF films for hydrogen permeation. The BCF membrane showed a relative density of ~93%.

FIGS. 71A-71C provide the SEM characterization results of porous protonic ceramic components of 40 wt % BCZYYb+60 wt % NiO hydrogen electrode, BCFZY0.1 oxygen electrode BCZY63 scaffold. It is evident that by optimizing the laser operation parameters, the highly porous microstructures of these three protonic ceramic component films were obtained successfully, which proved that the RLRS could also achieve porous protonic ceramic component films for working as electrode or electrode scaffold.

BCZYYb with 1 wt % NiO was picked up as a representative protonic ceramic electrolyte material. Different laser parameters were performed onto the 100 μm green layer on 300 μm fused silica substrate with 1 mm/s speed, 1.2 mm laser spot diameter (20 mm defocus) with different laser power 5 W, 5.6 W, 6.2 W, and 7 W. The cross-section view of the RLRS BCZYYb electrolyte microstructure is shown in FIG. 137, and the top surface view under SEM is shown in FIG. 138. From the SEM results, we can easily tell that the electrolyte densification with laser energy density increased with laser energy density. As the grain boundary resistance in the PCFC electrolyte will affect the cell's performance, larger gain size or grain boundary-free electrolyte will perform a better result. Hence, the grain size and distribution with laser power in this test were summarized in FIG. 139.

The proton conductivity is one of the most important properties for evaluating protonic ceramics' performance fabricated by different methods. The proton conductivities for the BCZYYb ceramic strips prepared using RLRS were analyzed by electrochemical impedance spectroscopy (EIS). The symmetrical cells for EIS measurement are presented in FIG. 140. The as-prepared protonic ceramic strips usually contain a dense center and two porous edges due to the Gaussian distribution of laser power. A Picosecond laser (PS-laser, APL-4000, ATTODYNE, wavelength 1064 nm, pose width 6 ps, repetition rate 100 kHz, output power 15% of 4 W) were used to cut off the porous parts, leaving the fully dense region for EIS testing. In order to improve the measurement accuracy and avoid the mechanical failure, five dense protonic ceramic strips with 1 mm length were embedded in the pre-cut channels on a fused silica substrate. The silver paste was filled into the two large troughs to obtain well-contacted electrodes, and gold wires were used to extend electrodes to external conducting wires. The EIS data were recorded using a Gamry Reference 600 plus with a perturbation voltage of 10 mV in the frequency range of 1 mHz to 2 MHz at temperatures of 300-700° C. under dry Ar, wet Ar, or wet 5% H2 balanced by Ar. After the measurement, the cross-section areas of each strip were analyzed by SEM images, and the average areas were obtained for calculating the conductivities.

Here, the proton conductivity for the BCZYYb strips after removing the porous edges and assembling into the five-strip symmetrical samples (FIG. 141) was analyzed by electrochemical impedance spectroscopy (EIS) at different conditions. FIG. 142 provides a typical EIS Nyquist plot for the measurement under the atmosphere of 5% H2 balanced by Ar, which shows high-frequency arc and low-frequency arc in the whole temperature range of 300-700° C. The high-frequency arc goes through the origin, which can be ascribed to the electrolyte contribution. The separation of grain bulk and grain boundary contributions was not observed even at a low temperature of 300° C., which is consistent with most of the other SSRS BCZYYb pellet samples. The low-frequency arc can be ascribed to the electrode kinetics, which gradually evolves to an almost straight line (pure constant phase element (CPE)) from the full arc (resistance R and CPE in parallel), corresponding to the gradual decrease in electrode kinetics with the decreasing temperature. The similar EIS Nyquist plots for BCZYYb samples were also observed under both dry Ar and wet Ar atmospheres at the same temperature range, which can be explained in the same way. Therefore, based on the high-frequency arcs, we obtained the BCZYYb five-strip sample's total conductivities at 300-700° C. under wet 5% H2 balanced by Ar, wet Ar, and dry Ar atmospheres, which is shown in FIG. 142. It is not surprising that the wet reducing atmosphere (wet 5% H2 balanced by Ar) shows the highest total conductivities since this atmosphere allows the formation of the highest proton concentration in the BCZYYb structure. A large amount of steam in the wet Ar atmosphere also allows the formation of high proton concentration because of the hydration reaction between water and oxygen vacancy and lattice oxygen in the BCZYYb structure. However, the dry Ar only allows the existence of very low concentration of protons because of the extremely low H2 and H2O concentration in the dry Ar. The primary charged carriers in BCZYYb under dry Ar atmosphere should be oxygen vacancy and electron-hole. Since the dry Ar, in fact, is also the most oxidizing atmosphere, the corresponding ionic defect concentration (oxygen vacancy) should be the lowest (the absolution oxygen vacancies in wet H2 and wet Ar are small since the formation of protons. However, the sum of proton and oxygen vacancy is big). According to the Arrhenius equation ($\sigma=\sigma 0 exp$ (−E$\alpha$/RT), the activation energies for the total conductivities under wet atmospheres were calculated to be 0.441+/−0.008 eV and 0.457+/−0.007 eV for wet 5% H2 and wet Ar, respectively. It is very clear that activation energies in wet atmospheres are close and are similar to the common value reported for proton conduction in BCZYYb and other protonic ceramics. However, the activation energy under dry Ar can be split into two ranges. At lower temperatures 300-500° C., the activation energy of 0.343+/−0.005 eV was obtained, indicating that the electron hole contribution might play a significant role in the transport process in the dry and relatively oxidizing atmosphere. At a higher temperatures 500-700° C., the high activation energy of 0.689+/−0.020 eV was obtained, which can be ascribed to the oxygen vacancy transport process. In general, we conclude that the BCZYYb dense strips fabricated by the RLRS method shows very good proton conductivity under wet atmospheres, consistent with the results for the BCZYYb pellets obtained by the SSRS technique. However, this preliminary proton conductivity is still slightly lower than that obtained from the corresponding BCZYYb pellets obtained by the SSRS technique.

With further optimization of the experimental operation parameters, the BCZYYb with 1 wt % NiO electrolyte strip was fabricated by RLRS 3D printed green layer. The green layer was 3D printed on to the fused silica with ~400 μm. The laser power was set at 20 W, 1 mm/s speed with 10 mm defocus distance and point shape laser lens was applied. The fully densified large-grain electrolyte film was obtained (inset photo and SEM image in FIG. 143) after the RLRS. The proton conductivity of the BCZYYb thin film was measured by electrochemical spectroscopy at different temperatures. The sample was cut into size 5 mm×1 mm×0.16 mm for testing. Two atmospheres were applied, the wet argon and 5% hydrogen balanced in argon. The temperature varied from 450° C. to 700° C. with a step size of 50° C. The promising proton conductivity of 6.95×10-3S/cm was obtained at 600° C. in a wet 5% H2 atmosphere.

The cost of the RLRS and the conventional furnace sintering method was initially compared based on the laboratory-scale fabrication of protonic ceramic fuel cell (PCFC) planar single cells. The energy cost for the RLRS method is only ~34% of the energy cost for the conventional furnace sintering method. The detailed analysis was shown above.

The newly developed RLRS method was proven to be able to fabricate the electrolytes, electrodes, interconnect, gas-permeation composite, and half cells for protonic ceramic energy devices with nine compositions. The XRD and SEM characterization showed that the desired crystal structures and microstructures for these protonic ceramic component films could be achieved. The initial conductivity measurement of protonic ceramic electrolytes prepared by RLRS showed comparable values to those obtained by the furnace sintering method. The cost estimation based on the electricity consumption for the fabrication of PCFC single cells indicated that the RLRL method is more competitive than the conventional furnace sintering method. Therefore, the RLRS method can be used for the fabrication of protonic ceramic. The RLRS is expected to sinter other ceramics with controllable microstructure rapidly and desired crystal structure and properties for other ceramic-based energy devices. The instantaneous, controllable, and cost-effective advantages of the RLRS method allow it to be integrated with additive manufacturing for rapid additive manufacturing of ceramics, which can open a new avenue for advanced ceramics manufacturing.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

What is claimed is:

1. A method of forming a silica film, the method comprising:

depositing silica sol-gel coating on a silica substrate; and sintering the coating by scanning the coating using a $CO_2$ laser to form the silica film, wherein scanning the coating comprises scanning the coating at a fixed scanning speed of about 0.1 mm/sec and using a laser power density of about 0.7 W.

2. The method of claim 1 wherein:

scanning the coating comprises scanning the coating in a straight line track of about 10 mm.

3. The method of claim 1 wherein:

scanning the coating comprises scanning the coating using a Galvo scanner and in a two-dimensional pattern to form the silica film with a two-dimensional pattern corresponding to the two dimensional pattern.

4. The method of claim 1 wherein the silica sol-gel coating comprises an Er-doped silica sol-gel coating and the silica film comprises an Er-doped silica film.

5. A method of 3D printing a component formed of fused silica glass, the method comprising:

(a) depositing a first layer of fused silica paste based on a first 2D slice of a 3D model corresponding to the component;

(b) melting the first layer of fused silica paste using a $CO_2$ laser;

(c) depositing a second layer of fused silica paste based on a second 2D slice of the 3D model corresponding to the component;

(d) melting the second layer of fused silica paste using the $CO_2$ laser; and (e) depositing and melting at least a third layer of fused silica paste to 3D print the component, the method further comprising increasing laser power during the melting steps to reduce the porosity of the component to thereby increase the transparency of the component.

6. A method of forming an optical fiber sensor, the method comprising:

machining a microchannel in a ceramic substrate using a laser, the microchannel having a first portion having a first width and a second portion having a second width that is greater than the first width;

receiving an optical fiber in the first portion of the microchannel;

filling the second portion of the microchannel with a ceramic slurry to cover the optical fiber;

preheating the slurry by scanning with a laser at a first power density and a first scanning speed; and sintering the slurry by scanning with the laser at a second power density that is greater than the first power density and at a second scanning speed that is slower than the first scanning speed.

7. The method of claim 6 wherein the machining step is carried out using a ps laser.

8. The method of claim 6 wherein the preheating step is carried out using a $CO_2$ laser.

9. A method of forming a fiber-optic sensor, the method comprising:

3D printing a housing on a diaphragm, the housing comprising a first cone-shaped portion and a second tubular portion on the first portion, the housing comprising a plurality of layers, wherein each layer is formed by extruding paste and irradiating the paste using a laser to melt the paste;

coating an inner surface of the diaphragm;

inserting a glass tube into the housing;

filling a gap between the glass tube and the housing by inserting paste and melting the paste using a laser;

inserting an optical fiber into the glass tube such that an end of the optical fiber is proximate the diaphragm;

fixing the optical fiber in place using laser irradiation.

10. The method of claim 9 wherein the 3D printing step, the filling step, and/or the fixing step are carried out using a $CO_2$ laser.

11. The method of claim 9 wherein the paste comprises fused silica paste.

12. The method of claim 9 wherein the coating comprises gold.

* * * * *